(12) United States Patent
Mandle

(10) Patent No.: US 11,183,098 B2
(45) Date of Patent: *Nov. 23, 2021

(54) SYSTEM AND METHOD FOR A SIX-PRIMARY WIDE GAMUT COLOR SYSTEM

(71) Applicant: Baylor University, Waco, TX (US)

(72) Inventor: Gary B. Mandle, Los Altos, CA (US)

(73) Assignee: BAYLOR UNIVERSITY, Waco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/345,560

(22) Filed: Jun. 11, 2021

(65) Prior Publication Data

US 2021/0304657 A1 Sep. 30, 2021

Related U.S. Application Data

(63) Continuation of application No. 17/076,365, filed on Oct. 21, 2020, now Pat. No. 11,037,480, which is a (Continued)

(51) Int. Cl.
*G09G 3/20* (2006.01)
*G02F 1/1335* (2006.01)
(Continued)

(52) U.S. Cl.
CPC ............ *G09G 3/2003* (2013.01); *G02B 5/201* (2013.01); *G02F 1/133514* (2013.01); *G09G 3/3413* (2013.01); *G09G 5/02* (2013.01); *G09G 2300/0452* (2013.01); *G09G 2320/0242* (2013.01); *G09G 2340/06* (2013.01)

(58) Field of Classification Search
None
See application file for complete search history.

(56) References Cited

U.S. PATENT DOCUMENTS 3,481,258 A 12/1969 Mori et al.
3,971,065 A 7/1976 Bayer
(Continued)

FOREIGN PATENT DOCUMENTS

WO 2017184784 A1 10/2017

OTHER PUBLICATIONS

Samsung You tube video "Quantum Dot Technology on Samsung monitors", posted on Mar. 24, 2017 (Year: 2017).
(Continued)

*Primary Examiner* — Yingchun He
(74) *Attorney, Agent, or Firm* — Neo IP

(57) ABSTRACT

Systems and methods for a six-primary color system for display. A six-primary color system increases the number of primary colors available in a color system and color system equipment. Increasing the number of primary colors reduces metameric errors from viewer to viewer. The six-primary color system includes Red, Green, Blue, Cyan, Yellow, and Magenta primaries. The systems of the present invention maintain compatibility with existing color systems and equipment and provide systems for backwards compatibility with older color systems.

20 Claims, 99 Drawing Sheets
(72 of 99 Drawing Sheet(s) Filed in Color)

Related U.S. Application Data continuation of application No. 16/853,203, filed on Apr. 20, 2020, now Pat. No. 10,997,896, which is a continuation-in-part of application No. 16/831,157, filed on Mar. 26, 2020, now Pat. No. 10,950,160, which is a continuation of application No. 16/659,307, filed on Oct. 21, 2019, now Pat. No. 10,607,527.

(60) Provisional application No. 62/876,878, filed on Jul. 22, 2019, provisional application No. 62/847,630, filed on May 14, 2019, provisional application No. 62/805,705, filed on Feb. 14, 2019, provisional application No. 62/750,673, filed on Oct. 25, 2018.

(51) Int. Cl.
*G09G 3/34* (2006.01)
*G09G 5/02* (2006.01)
*G02B 5/20* (2006.01)

(56) References Cited

U.S. PATENT DOCUMENTS

| | | |
|---|---|---|
| 4,489,349 A | 12/1984 | Okada |
| 5,216,522 A | 6/1993 | Ishikawa |
| 5,479,189 A | 12/1995 | Chesavage et al. |
| 5,844,629 A | 12/1998 | Murray et al. |
| 6,160,579 A * | 12/2000 | Shiraiwa ............ H04N 1/4072 348/224.1 |
| 6,175,644 B1 | 1/2001 | Scola et al. |
| 6,539,110 B2 | 3/2003 | Myers |
| 6,570,584 B1 | 5/2003 | Cok et al. |
| 6,769,772 B2 | 8/2004 | Roddy et al. |
| 6,870,523 B1 | 3/2005 | Ben-David et al. |
| 6,897,876 B2 | 5/2005 | Murdoch et al. |
| 6,962,414 B2 | 11/2005 | Roth |
| 7,077,524 B2 | 7/2006 | Roth |
| 7,113,152 B2 | 9/2006 | Ben-David et al. |
| 7,242,478 B1 | 7/2007 | Dombrowski et al. |
| 7,627,167 B2 | 12/2009 | Roth et al. |
| 7,787,702 B2 | 8/2010 | Elliott et al. |
| 7,812,797 B2 | 10/2010 | Joo et al. |
| 7,876,341 B2 | 1/2011 | Credelle et al. |
| 7,916,939 B2 | 3/2011 | Roth et al. |
| 7,929,193 B2 | 4/2011 | Roth |
| 7,948,507 B2 | 5/2011 | Okada et al. |
| 7,990,393 B2 | 8/2011 | Higgins |
| 8,018,476 B2 | 9/2011 | Credelle et al. |
| 8,044,967 B2 | 10/2011 | Belik et al. |
| 8,063,862 B2 | 11/2011 | Hisatake |
| 8,081,835 B2 | 12/2011 | Elliott et al. |
| 8,228,275 B2 | 7/2012 | Langendijk |
| 8,237,751 B2 | 8/2012 | Belik |
| 8,248,430 B2 | 8/2012 | Hekstra et al. |
| 8,310,498 B2 | 11/2012 | Ben-Chorin et al. |
| 8,339,344 B2 | 12/2012 | Okada et al. |
| 8,390,652 B2 | 3/2013 | Nakanishi et al. |
| 8,405,675 B2 | 3/2013 | Peng et al. |
| 8,405,687 B2 | 3/2013 | Miyazaki et al. |
| 8,411,022 B2 | 4/2013 | Elliott et al. |
| 8,436,875 B2 | 5/2013 | Ueki et al. |
| 8,451,405 B2 | 5/2013 | Roth et al. |
| 8,599,226 B2 | 12/2013 | Ben-Chorin et al. |
| 8,654,050 B2 | 2/2014 | Ueki et al. |
| 8,698,856 B2 | 4/2014 | Roth et al. |
| 8,717,348 B2 | 5/2014 | Basile et al. |
| 8,773,340 B2 | 7/2014 | Tomizawa et al. |
| 8,837,562 B1 | 9/2014 | Betts et al. |
| 8,885,120 B2 | 11/2014 | Ben-David et al. |
| 8,922,603 B2 | 12/2014 | Yonemaru et al. |
| 8,979,272 B2 | 3/2015 | Roth |
| 8,982,038 B2 | 3/2015 | Higgins et al. |
| 8,982,144 B2 | 3/2015 | Park |
| 9,041,724 B2 | 5/2015 | Zeng et al. |
| 9,091,884 B2 | 7/2015 | Kim et al. |
| 9,099,046 B2 | 8/2015 | Whitehead et al. |
| 9,117,711 B2 | 8/2015 | Suzuki et al. |
| 9,147,362 B2 | 9/2015 | Znamenskiy et al. |
| 9,280,940 B2 | 3/2016 | Chen et al. |
| 9,311,841 B2 | 4/2016 | Nakagawa et al. |
| 9,317,939 B2 | 4/2016 | Yang et al. |
| 9,318,075 B2 | 4/2016 | Kim et al. |
| 9,324,286 B2 | 4/2016 | Mori et al. |
| 9,373,305 B2 | 6/2016 | Kawaguchi |
| 9,412,316 B2 | 8/2016 | Ben-David et al. |
| 9,430,974 B2 | 8/2016 | Roth |
| 9,430,986 B2 | 8/2016 | Ito et al. |
| 9,583,054 B2 | 2/2017 | Nakagawa et al. |
| 9,607,576 B2 | 3/2017 | Buckley |
| 9,659,517 B2 | 5/2017 | Wu |
| 9,697,761 B2 | 7/2017 | Li |
| 9,886,932 B2 | 2/2018 | Yoshida et al. |
| 9,911,387 B2 | 3/2018 | Kim et al. |
| 9,953,590 B2 | 4/2018 | Ben-David et al. |
| 9,966,014 B2 | 5/2018 | Yashiki |
| 10,222,263 B2 | 3/2019 | Shigezane |
| 10,504,437 B2 | 12/2019 | Zhang et al. |
| 10,832,611 B2 | 11/2020 | Xi et al. |
| 10,847,498 B2 | 11/2020 | Nakamura et al. |
| 10,896,635 B2 | 1/2021 | Xi et al. |
| 2001/0021260 A1 | 9/2001 | Chung et al. |
| 2002/0130957 A1 | 9/2002 | Gallagher et al. |
| 2003/0137610 A1 | 7/2003 | Ohsawa |
| 2004/0017379 A1 | 1/2004 | Ajito et al. |
| 2004/0070736 A1 | 4/2004 | Roddy et al. |
| 2004/0070834 A1 | 4/2004 | Hendrix et al. |
| 2004/0145599 A1 | 7/2004 | Taoka et al. |
| 2004/0196381 A1 * | 10/2004 | Matsuzaka ......... H04N 9/04557 348/222.1 |
| 2004/0263638 A1 | 12/2004 | Ohsawa et al. |
| 2005/0083344 A1 | 4/2005 | Higgins |
| 2005/0083352 A1 | 4/2005 | Higgins |
| 2005/0099426 A1 | 5/2005 | Primerano et al. |
| 2005/0134808 A1 | 6/2005 | Pettitt |
| 2005/0190967 A1 | 9/2005 | Ok et al. |
| 2005/0244051 A1 * | 11/2005 | Shiohara ............... G06T 11/001 382/162 |
| 2005/0275806 A1 | 12/2005 | Roth |
| 2005/0280851 A1 | 12/2005 | Kim et al. |
| 2006/0285217 A1 | 12/2006 | Roth |
| 2007/0001994 A1 | 1/2007 | Roth |
| 2007/0035752 A1 | 2/2007 | Evans et al. |
| 2007/0052861 A1 | 3/2007 | Osawa et al. |
| 2007/0118821 A1 | 5/2007 | Yee et al. |
| 2007/0160057 A1 | 7/2007 | Kimn et al. |
| 2007/0165946 A1 | 7/2007 | Hong et al. |
| 2007/0176948 A1 | 8/2007 | Ben-David et al. |
| 2007/0189266 A1 | 8/2007 | Izumi et al. |
| 2007/0199039 A1 | 8/2007 | Diroo et al. |
| 2007/0220525 A1 | 9/2007 | State et al. |
| 2007/0268205 A1 | 11/2007 | Sasaguri |
| 2008/0012805 A1 | 1/2008 | Duncan et al. |
| 2008/0018506 A1 | 1/2008 | Raveendran |
| 2008/0024410 A1 | 1/2008 | Ben-David et al. |
| 2008/0158097 A1 | 7/2008 | Guo |
| 2008/0204469 A1 | 8/2008 | Jaspers |
| 2008/0252797 A1 | 10/2008 | Hamer et al. |
| 2008/0303927 A1 | 12/2008 | Khanh |
| 2009/0058777 A1 | 3/2009 | Cheng |
| 2009/0085924 A1 | 4/2009 | Ben-Chorin et al. |
| 2009/0091582 A1 | 4/2009 | Ajito et al. |
| 2009/0096815 A1 | 4/2009 | Fukuda et al. |
| 2009/0313669 A1 | 12/2009 | Boudani et al. |
| 2010/0118047 A1 | 5/2010 | Ajito et al. |
| 2010/0188437 A1 | 7/2010 | Itoh et al. |
| 2010/0214315 A1 | 8/2010 | Nguyen et al. |
| 2010/0265283 A1 | 10/2010 | Langendijk et al. |
| 2011/0080520 A1 | 4/2011 | Tomizawa et al. |
| 2011/0148910 A1 | 6/2011 | Botzas et al. |
| 2011/0188744 A1 | 8/2011 | Sun |
| 2011/0255608 A1 | 10/2011 | Kim et al. |
| 2011/0273493 A1 | 11/2011 | Yoshiga et al. |
| 2011/0303750 A1 | 12/2011 | Wang |
| 2012/0242719 A1 | 9/2012 | Klompenhouwer et al. |

(56) References Cited

U.S. PATENT DOCUMENTS

| | | |
|---|---|---|
| 2012/0287146 A1 | 11/2012 | Elliott et al. |
| 2012/0287168 A1 | 11/2012 | Botzas et al. |
| 2012/0299946 A1 | 11/2012 | Kim et al. |
| 2013/0063573 A1 | 3/2013 | Erinjippurath |
| 2013/0278993 A1 | 10/2013 | Heikenfeld et al. |
| 2014/0022410 A1 | 1/2014 | Gish et al. |
| 2014/0028698 A1 | 1/2014 | Maier et al. |
| 2014/0028699 A1 | 1/2014 | Kurtz et al. |
| 2014/0043371 A1 | 2/2014 | Langendijk et al. |
| 2014/0092105 A1 | 4/2014 | Guttag et al. |
| 2014/0218511 A1 | 8/2014 | Lee |
| 2014/0218610 A1 | 8/2014 | Chujoh et al. |
| 2014/0225912 A1 | 8/2014 | Govil et al. |
| 2014/0341272 A1 | 11/2014 | Miller et al. |
| 2015/0022685 A1 | 1/2015 | Gish et al. |
| 2015/0189329 A1 | 7/2015 | Wada |
| 2015/0256778 A1 | 9/2015 | Kusaka |
| 2015/0339996 A1 | 11/2015 | Schuck et al. |
| 2016/0117993 A1 | 4/2016 | Buckley et al. |
| 2016/0205367 A1 | 7/2016 | Wallace et al. |
| 2016/0300538 A1 | 10/2016 | Lee et al. |
| 2017/0006273 A1 | 1/2017 | Borer et al. |
| 2017/0085878 A1 | 3/2017 | Rojals et al. |
| 2017/0085896 A1 | 3/2017 | Ramasubramanian et al. |
| 2017/0140556 A1 | 5/2017 | Safaee-Rad et al. |
| 2017/0147516 A1 | 5/2017 | De |
| 2017/0153382 A1 | 6/2017 | Wang et al. |
| 2017/0200309 A1 | 7/2017 | Qian et al. |
| 2017/0201751 A1 | 7/2017 | Seo |
| 2017/0285307 A1 | 10/2017 | Kamm et al. |
| 2017/0339418 A1 | 11/2017 | Ramasubramanian et al. |
| 2018/0063500 A1 | 3/2018 | Rusanovskyy et al. |
| 2018/0084024 A1 | 3/2018 | Xie et al. |
| 2018/0146533 A1 | 5/2018 | Goodman et al. |
| 2018/0160127 A1 | 6/2018 | Ström et al. |
| 2018/0198754 A1 | 7/2018 | Kielhofner et al. |
| 2018/0224333 A1 | 8/2018 | Sakakibara et al. |
| 2018/0308410 A1 | 10/2018 | Chen |
| 2018/0324481 A1 | 11/2018 | Bordes et al. |
| 2018/0376047 A1 | 12/2018 | Li et al. |
| 2019/0043179 A1 | 2/2019 | Lucas et al. |
| 2019/0069768 A1 | 3/2019 | Chiba |
| 2019/0098317 A1 | 3/2019 | Lu et al. |
| 2019/0130519 A1 | 5/2019 | Hu et al. |
| 2019/0147832 A1 | 5/2019 | Kim et al. |
| 2019/0158894 A1 | 5/2019 | Lee et al. |
| 2019/0172415 A1 | 6/2019 | Davis et al. |
| 2019/0265552 A1 | 8/2019 | Shiomi |
| 2019/0356881 A1 | 11/2019 | Huang et al. |
| 2020/0045340 A1 | 2/2020 | Chen et al. |
| 2020/0128220 A1 | 4/2020 | Bao et al. |
| 2020/0144327 A1 | 5/2020 | Lee et al. |
| 2020/0209678 A1 | 7/2020 | Hsu et al. |
| 2020/0226965 A1 | 7/2020 | Xi et al. |
| 2020/0226967 A1 | 7/2020 | Mandle |
| 2020/0251039 A1 | 8/2020 | Mandle et al. |
| 2020/0258442 A1 | 8/2020 | Mandle et al. |
| 2020/0294439 A1 | 9/2020 | Mandle et al. |
| 2020/0402441 A1 | 12/2020 | Mandle |
| 2021/0027692 A1 | 1/2021 | Mandle et al. |
| 2021/0027693 A1 | 1/2021 | Mandle et al. |
| 2021/0035486 A1 | 2/2021 | Mandle |
| 2021/0035487 A1 | 2/2021 | Bogdanowicz et al. |
| 2021/0043127 A1 | 2/2021 | Bogdanowicz et al. |
| 2021/0097922 A1 | 4/2021 | Mandle |

OTHER PUBLICATIONS

Decarlo, Blog "4:4:4 vs 4:2:0: Which Chroma Subsampling Do You Need for Your Video Application?", posted on May 2, 2014 @ https://www.semiconductorstore.com/blog/2014/444-vs-420-chroma-subsampling/667/ (Year: 2014).

Urban, "How Chroma Subsampling Works", downloaded @ https://blog.biamp.com/how-chroma-subsampling-works/, posted on Sep. 14, 2017 (Year: 2017).

"Affordable Colour Grading Monitors", downloaded@https://jonnyelwyn.co.uk/film-and-video-editing/affordable-colour-grading-monitors-2/, posted on Apr. 4, 2015 (Year: 2015).

"Color Temperature Scale", downloaded@https://web.archive.org/web/20170711064110/https://www.atlantalightbulbs.com/color-temperature-scale/, available online Jul. 2017 (Year: 2017).

Ajito, T., Obi, T., Yamaguchi, M., & Ohyama, N. (2000). Expanded color gamut reproduced by six-primary projection display. In Projection Displays 2000: Sixth in a Series (vol. 3954, pp. 130-138). International Society for Optics and Photonics. https://doi.org/10.1117/12.383364.

Brill, M. H., & Larimer, J. (2005a). Avoiding on-screen metamerism in N-primary displays. Journal of the Society for Information Display, 13(6), 509-516. https://doi.org/10.1889/1.1974003.

Brill, M. H., & Larimer, J. (2005b). Color-matching issues in multi-primary displays. SID Conference Record of the International Display Research Conference, 119-122.

Centore, et. al, Extensible Multi-Primary Control Sequences, Oct. 2011.

Chan, C.-C., Wei, G.-F., Hui, C.-K., & Cheng, S.-W. (2007). Development of multi-primary color LCD.

Chang, C.-K. (2013). The Effect on Gamut Expansion of Real Object Colors in Multi-primary Display. Retrieved from http://www.color.org/events/chiba/Chang.pdf.

ColorSpace.Rgb, downloaded@https://web.archive.org/ web/20171113045313/ https://developer.android.com/reference/ android/graphics/ ColorSpace.Rgb.html, archived on Nov. 13, 2017 (Year: 2017).

Consumer Technology Association CTA Standard CTA-861-G (Nov. 2016). A DTV Profile for Uncompressed High Speed Digital Interfaces including errata dated Sep. 13, 2017 and Nov. 28, 2017.

CYGM filter, Wikipedia published on Dec. 14, 2017, downloaded@https://en.wikipedia.org/w/index.php?title=CYGM_filter&oldid=815388285 (Year: 2017).

De Vaan, A. T. S. M. (2007). Competing display technologies for the best image performance. Journal of the Society for Information Display, 15(9), 657-666. https://doi.org/10.1889/1.2785199.

Display Daily WCG Standards Needed for Multi-Primary Displays, Matthew Brenneshotz. https://www.displaydaily.com/article/display-daily/wcg-standards-needed-for-multi-primary-displays.

Dolby Labs white paper V7.2 What is ICtCp? https://www.dolby.com/us/en/technologies/dolby-vision/ICtCp-white-paper.pdf.

Eliav, D., Roth, S., & Chorin, M. B. (2006). Application driven design of multi-primary displays.

Hsieh, Y.-F., Chuang, M.-C., Ou-Yang, M., Huang, S.-W., Li, J., & Kuo, Y.-T. (2008). Establish a six-primary color display without pixel-distortion and brightness loss. In Emerging Liquid Crystal Technologies III (vol. 6911, p. 69110R). International Society for Optics and Photonics. https://doi.org/10.1117/12.762944.

Kerr, The CIE XYZ and xyY Color Space, downloaded @ https://graphics.stanford.edu/courses/cs148-10-summer/docs/2010—kerr--cie_xyz.pdf, Mar. 21, 2010 (Year: 2010).

Langendijk, E. H. A., Belik, O., Budzelaar, F., & Vossen, F. (2007). Dynamic Wide-Color-Gamut RGBW Display. SID Symposium Digest of Technical Papers, 38(1), 1458-1461. https://doi.org/10.1889/1.2785590.

Li, Y., Majumder, A., Lu, D., & Gopi, M. (2015) Content-Independent Multi-Spectral Display Using Superimposed Projections. Computer Graphics Forum, 34(2), 337-348. https://doi.org/10.1111/cgf.12564.

Nagase, A., Kagawa, S., Someya, J., Kuwata, M., Sasagawa, T., Sugiura, H., & Miyata, A. (2007). Development of PTV Using Six-Primary-Color Display Technology. SID Symposium Digest of Technical Papers, 38(1), 27-30. https://doi.org/10.1889/1.2785217.

Noble, The Technology Inside the New Kodak Professional DCS 620x Digital Camera High-Quality Images at Extremely High ISO Settings, available online @ https://web.archive.org/web/20160303171931/http://www.modernimaging.com/Kodak_DCS-620x_ Technology.htm on Mar. 3, 2016 (Year: 2016).

Pointer, M. R. (1980), The Gamut of Real Surface Colours. Color Res. Appl., 5: 145-155. doi:10.1002/col.5080050308.

(56) References Cited

OTHER PUBLICATIONS

Poynton, Chroma subsampling notation, downloaded @ https://poynton.ca/PDFs/Chroma_subsampling_notation.pdf, published on Jan. 24, 2008 (Year: 2008).
RFC4566, SOP: Session Description Protocol, published in Jul. 2006 (Year: 2006).
Song et al. Studies on different primaries for a nearly-ultimate gamut in a laser display, Optics Express, vol. 36, No. 18, Sep. 3, 2018 (Year: 2018).
Susstrunk, "Computing Chromatic Adaptation", PhD thesis, Univ. of East Anglia Norwich, Jul. 2005 (Year: 2005).
Trémeau, A., Tominaga, S., & Plataniotis, K. N. (2008). Color in Image and Video Processing: Most Recent Trends and Future Research Directions. EURASIP Journal on Image and Video Processing, 2008, 1-26. https://doi.org/10.1155/2008/581371.
Xilinx, Implementing SMPTE SDI Interfaces with 7 Series GTX transceivers, 2018 (Year: 2018).

* cited by examiner

Mosaic Using Magenta Filter

Mosaic Not Using Magenta Filter

| Value | Sampling | Value | Sampling | Value | Sampling | Value | Sampling |
|---|---|---|---|---|---|---|---|
| 0h | 4:2:2:4 (Y/Cb/Cr/Cc/Cy) | 1h | 4:4:4 (Y/Cb/Cr) | 2h | 4:4:4 (G/B/R) | 3h | 4:2:0 (Y/Cb/Cr) |
| 4h | 4:2:2:4 (Y/Cb/Cr/A) | 5h | 4:4:4 (Y/Cb/Cr/A) | 6h | 4:4:4:4 (G/B/R/A) | 7h | 4:2:0 (Y/Cb/Cr/Cc/Cy) |
| 8h | 4:2:2:4 (Y/Cb/Cr/D) | 9h | 4:4:4 (Y/Cb/Cr/D) | Ah | 4:4:4:4 (G/B/R/D) | Bh | 4:2:2 (CL-Y/Cb/Cr/Cc/Cy) |
| Ch | 4:2:2 (Y/Cb/Cr/Cc/Cy) | Dh | 4:4:4 (G/B/R/M/Y/C) | Eh | 4:4:4 (X'Y'Z') | Fh | Sys 1/Sys2 |

FIG. 61

| Value | Sampling | Value | Sampling | Value | Sampling | Value | Sampling |
|---|---|---|---|---|---|---|---|
| 0h | Unknown/Unspecified | 1h | 4:2:2 10 bit | 2h | 4:4:4 10 bit | 3h | 4:4:4:4 10 bit |
| 4h | Reserved | 5h | 4:2:2 12 bit | 6h | 4:4:4 12 bit | 7h | 4:4:4:4 12 bit |
| 8h | (4:2:2:4) 12 bit | 9h | 6P 4:2:0 10 bit | Ah | 6P 4:2:0 12 bit | Bh | 6P 4:2:2 10 bit |
| Ch | 6P 4:2:2 12 bit | Dh | 6P 4:4:4 10 bit | Eh | 6P 4:4:4 12 bit | Fh | Reserved |

FIG. 62

|  | R0' | G0' | B0' | R1' | G1' | B1' | R2' | G2' | B2' | R3' | G3' | B3' |
|---|---|---|---|---|---|---|---|---|---|---|---|---|
| $G'_{INT} + M'_{INT}$ |  | O |  |  | O |  |  | O |  |  | O |  |
| $R'_{INT} + C'_{INT}$ | O |  |  | O |  |  | O |  |  | O |  |  |
| $B'_{INT} + Y'_{INT}$ |  |  | O |  |  | O |  |  | O |  |  | O |

FIG. 63

|  | R0' | G0' | B0' | R1' | G1' | B1' | R0' | G0' | B0' | R1' | G1' | B1' |
|---|---|---|---|---|---|---|---|---|---|---|---|---|
| $G'_{INT} + M'_{INT}$ |  | O |  |  | O |  |  | O |  |  | O |  |
| $R'_{INT} + C'_{INT}$ | O |  |  | O |  |  | O |  |  | O |  |  |
| $B'_{INT} + Y'_{INT}$ |  |  | O |  |  | O |  |  | O |  |  | O |

FIG. 64

| | Cb0' | Y0' | Cr0' | Y1' | Cb1' | Y2' | Cr1' | Y3' | Cb2' | Y4' | Cr2' | Y5' |
|---|---|---|---|---|---|---|---|---|---|---|---|---|
| $E'_{Y_6-INT}$ | | O | | O | | O | | O | | O | | O |
| $E'_{Cb-INT} + E'_{Cy-INT}$ | O | | | | O | | | | O | | | |
| $E'_{Cr-INT} + E'_{Cc-INT}$ | | | O | | | | O | | | | O | |

FIG. 65

| | Cb0' | Y0' | Cr0' | Y1' | Cb1' | Y2' | Cr1' | Y3' | Cb2' | Y4' | Cr2' | Y5' |
|---|---|---|---|---|---|---|---|---|---|---|---|---|
| $E'_{Y_6-INT}$ | | O | | O | | O | | O | | O | | O |
| $E'_{Cb-INT} + E'_{Cy-INT}$ | O | | | | O | | | | O | | | |
| $E'_{Cr-INT} + E'_{Cc-INT}$ | | | O | | | | O | | | | O | |

FIG. 67

|  | R0' | G0' | B0' | R1' | G1' | B1' | R2' | G2' | B2' | R3' | G3' | B3' |
|---|---|---|---|---|---|---|---|---|---|---|---|---|
| $G'_{INT}$ |  | O |  |  |  |  |  | O |  |  |  |  |
| $B'_{INT}$ |  |  | O |  |  |  |  |  | O |  |  |  |
| $R'_{INT}$ | O |  |  |  |  |  | O |  |  |  |  |  |
| $M'_{INT}$ |  |  |  |  | O |  |  |  |  |  | O |  |
| $Y'_{INT}$ |  |  |  |  |  | O |  |  |  |  |  | O |
| $C'_{INT}$ |  |  |  | O |  |  |  |  |  | O |  |  |

FIG. 69

| | R0' | G0' | B0' | R1' | G1' | B1' | R0' | G0' | B0' | R1' | G1' | B1' |
|---|---|---|---|---|---|---|---|---|---|---|---|---|
| $G'_{INT}$ | | ○ | | | | | | ○ | | | | |
| $R'_{INT}$ | | | ○ | | | | | | ○ | | | |
| $B'_{INT}$ | ○ | | | | | | ○ | | | | | |
| $M'_{INT}$ | | | | | ○ | | | | | | ○ | |
| $Y'_{INT}$ | | | | | | ○ | | | | | | ○ |
| $C'_{INT}$ | | | | ○ | | | | | | ○ | | |

| | R2' | G2' | B2' | R3' | G3' | B3' | R2' | G2' | B2' | R3' | G3' | B3' |
|---|---|---|---|---|---|---|---|---|---|---|---|---|
| $G'_{INT}$ | | ○ | | | | | | ○ | | | | |
| $R'_{INT}$ | | | ○ | | | | | | ○ | | | |
| $B'_{INT}$ | ○ | | | | | | ○ | | | | | |
| $M'_{INT}$ | | | | | ○ | | | | | | ○ | |
| $Y'_{INT}$ | | | | | | ○ | | | | | | ○ |
| $C'_{INT}$ | | | | ○ | | | | | | ○ | | |

FIG. 70

| | Cb0' | Y0' | Cr0' | Y1' | Cb1' | Y2' | Cr1' | Y3' | Cb2' | Y4' | Cr2' | Y5' |
|---|---|---|---|---|---|---|---|---|---|---|---|---|
| $E'_{Y_{RGB}-INT}$ | | O | | | | | | | | | | |
| $E'_{Y_{CYM}-INT}$ | | | | O | | | | | | | | O |
| $E'_{Cr-INT}$ | | | O | | | | | O | | | | |
| $E'_{Cb-INT}$ | | | | | | | | | O | | | |
| $E'_{Cc-INT}$ | | | | | | O | O | | | | O | |
| $E'_{Cy-INT}$ | | | | | O | | | | | O | | |

FIG. 71

| | Cb0' | Y0' | Cr0' | Y1' | Cb1' | Y2' | Cr1' | Y3' | Cb2' | Y4' | Cr2' | Y5' |
|---|---|---|---|---|---|---|---|---|---|---|---|---|
| $E'_{Y_{RGB}-INT}$ | | O | | | | | | | | | | |
| $E'_{Y_{CYM}-INT}$ | | | | O | | O | | O | | O | | O |
| $E'_{Cr-INT}$ | | | O | | | | O | | | | O | |
| $E'_{Cb-INT}$ | O | | | | O | | | | O | | | |
| $E'_{Cc-INT}$ | | | | | | | | | | | | |
| $E'_{Cy-INT}$ | | | | | | | | | | | | |

FIG. 72

SYSTEM AND METHOD FOR A SIX-PRIMARY WIDE GAMUT COLOR SYSTEM

CROSS REFERENCES TO RELATED APPLICATIONS

This application is a continuation of U.S. patent application Ser. No. 17/076,365, filed Oct. 21, 2020, which is a continuation of U.S. patent application Ser. No. 16/853,203, filed Apr. 20, 2020, which is a continuation-in-part of U.S. patent application Ser. No. 16/831,157, filed Mar. 26, 2020, which is a continuation of U.S. patent application Ser. No. 16/659,307, filed Oct. 21, 2019, which is related to and claims priority from U.S. Provisional Patent Application No. 62/876,878, filed Jul. 22, 2019, U.S. Provisional Patent Application No. 62/847,630, filed May 14, 2019, U.S. Provisional Patent Application No. 62/805,705, filed Feb. 14, 2019, and U.S. Provisional Patent Application No. 62/750,673, filed Oct. 25, 2018, each of which is incorporated herein by reference in its entirety.

BACKGROUND OF THE INVENTION

1. Field of the Invention

The present invention relates to color systems, and more specifically to a wide gamut color system with an increased number of primary colors.

2. Description of the Prior Art

It is generally known in the prior art to provide for an increased color gamut system within a display.

Prior art patent documents include the following:

U.S. Pat. No. 10,222,263 for RGB value calculation device by inventor Yasuyuki Shigezane, filed Feb. 6, 2017 and issued Mar. 5, 2019, is directed to a microcomputer that equally divides the circumference of an RGB circle into 6×n (n is an integer of 1 or more) parts, and calculates an RGB value of each divided color. (255, 0, 0) is stored as a reference RGB value of a reference color in a ROM in the microcomputer. The microcomputer converts the reference RGB value depending on an angular difference of the RGB circle between a designated color whose RGB value is to be found and the reference color, and assumes the converted RGB value as an RGB value of the designated color.

U.S. Pat. No. 9,373,305 for Semiconductor device, image processing system and program by inventor Hiorfumi Kawaguchi, filed May 29, 2015 and issued Jun. 21, 2016, is directed to an image process device including a display panel operable to provide an input interface for receiving an input of an adjustment value of at least a part of color attributes of each vertex of n axes (n is an integer equal to or greater than 3) serving as adjustment axes in an RGB color space, and an adjustment data generation unit operable to calculate the degree of influence indicative of a following index of each of the n-axis vertices, for each of the n axes, on a basis of distance between each of the n-axis vertices and a target point which is an arbitrary lattice point in the RGB color space, and operable to calculate adjusted coordinates of the target point in the RGB color space.

U.S. Publication No. 20130278993 for Color-mixing bi-primary color systems for displays by inventor Heikenfeld, et. al, filed Sep. 1, 2011 and published Oct. 24, 2013, is directed to a display pixel. The pixel includes first and second substrates arranged to define a channel. A fluid is located within the channel and includes a first colorant and a second colorant. The first colorant has a first charge and a color. The second colorant has a second charge that is opposite in polarity to the first charge and a color that is complimentary to the color of the first colorant. A first electrode, with a voltage source, is operably coupled to the fluid and configured to moving one or both of the first and second colorants within the fluid and alter at least one spectral property of the pixel.

U.S. Pat. No. 8,599,226 for Device and method of data conversion for wide gamut displays by inventor Ben-Chorin, et. al, filed Feb. 13, 2012 and issued Dec. 3, 2013, is directed to a method and system for converting color image data from a, for example, three-dimensional color space format to a format usable by an n-primary display, wherein n is greater than or equal to 3. The system may define a two-dimensional sub-space having a plurality of two-dimensional positions, each position representing a set of n primary color values and a third, scaleable coordinate value for generating an n-primary display input signal. Furthermore, the system may receive a three-dimensional color space input signal including out-of range pixel data not reproducible by a three-primary additive display, and may convert the data to side gamut color image pixel data suitable for driving the wide gamut color display.

U.S. Pat. No. 8,081,835 for Multiprimary color sub-pixel rendering with metameric filtering by inventor Elliot, et. al, filed Jul. 13, 2010 and issued Dec. 20, 2011, is directed to systems and methods of rendering image data to multiprimary displays that adjusts image data across metamers as herein disclosed. The metamer filtering may be based upon input image content and may optimize sub-pixel values to improve image rendering accuracy or perception. The optimizations may be made according to many possible desired effects. One embodiment comprises a display system comprising: a display, said display capable of selecting from a set of image data values, said set comprising at least one metamer; an input image data unit; a spatial frequency detection unit, said spatial frequency detection unit extracting a spatial frequency characteristic from said input image data; and a selection unit, said unit selecting image data from said metamer according to said spatial frequency characteristic.

U.S. Pat. No. 7,916,939 for High brightness wide gamut display by inventor Roth, et. al, filed Nov. 30, 2009 and issued Mar. 29, 2011, is directed to a device to produce a color image, the device including a color filtering arrangement to produce at least four colors, each color produced by a filter on a color filtering mechanism having a relative segment size, wherein the relative segment sizes of at least two of the primary colors differ.

U.S. Pat. No. 6,769,772 for Six color display apparatus having increased color gamut by inventor Roddy, et. al, filed Oct. 11, 2002 and issued Aug. 3, 2004, is directed to a display system for digital color images using six color light sources or two or more multicolor LED arrays or OLEDs to provide an expanded color gamut. Apparatus uses two or more spatial light modulators, which may be cycled between two or more color light sources or LED arrays to provide a six-color display output. Pairing of modulated colors using relative luminance helps to minimize flicker effects.

SUMMARY OF THE INVENTION

It is an object of this invention to provide an enhancement to the current RGB systems or a replacement for them.

In one embodiment, the present invention is a system for displaying a six primary color system, including a set of image data, wherein the set of image data is comprised of a first set of color channel data and a second set of color channel data, wherein the set of image data further includes a bit level, an image data converter, wherein the image data converter includes a digital interface, wherein the digital interface is operable to encode and decode the set of image data, at least one transfer function (TF) for processing the set of image data, a set of Session Description Protocol (SDP) parameters, wherein the set of SDP parameters is modifiable, at least one display device, wherein the at least one display device and the image data converter are in network communication, wherein the image data converter is operable to convert the bit level of the set of image data, thereby creating an updated bit level, wherein the image data converter is operable to convert the set of image data for display on the at least one display device, wherein once the set of image data has been converted by the image data converter for the at least one display device the set of SDP parameters are modified based on the conversion, and wherein the at least one display device is operable to display a six-primary color system based on the set of image data, such that the SDP parameters indicate that the set of image data being displayed on the at least one display device is using a six-primary color system.

In another embodiment, the present invention is a system for displaying a six-primary color system, including a set of image data, wherein the set of image data includes a first set of color channel data and a second set of color channel data, wherein the set of image data includes a bit level, a magenta primary value, wherein the magenta primary value is derived from the set of image data, an image data converter, wherein the image data converter includes a digital interface, wherein the digital interface is operable to encode and decode the set of image data, at least one transfer function (TF) for processing the set of image data, a set of Session Description Protocol (SDP) parameters, wherein the set of SDP parameters are modifiable, at least one display device, wherein the at least one display device and the image data converter are in network communication, wherein the image data converter is operable to convert the bit level for the set of image data to a new bit level, wherein the at least one data converter is operable to convert the set of image data for display on the at least one display device, wherein once the set of image data has been converted for the at least one display device the set of SDP parameters are modified based on the conversion, and wherein the at least one display device is operable to display a six-primary color system based on the set of image data, such that the SDP parameters indicate the magenta primary value and that the set of image data being displayed on the at least one display device is using a six-primary color system.

In yet another embodiment, the present invention is a system for displaying a set of image data using a six-primary color system, including a set of image data, wherein the set of image data includes a bit level, a magenta primary value, wherein the magenta primary value is derived from the set of image data, an image data converter, wherein the image data converter includes a digital interface, wherein the digital interface is operable to encode and decode the set of image data, at least one transfer function (TF) for processing the set of image data, a set of Session Description Protocol (SDP) parameters, wherein the set of SDP parameters are modifiable, at least one electronic luminance component, wherein the electronic luminance component is derived from the set of image data, at least one display device, wherein the at least one display device and the image data converter are in network communication, wherein the image data converter is operable to convert the set of image data to a new bit level, wherein the image data converter is operable to convert the set of image data for display on the at least one display device, wherein once the set of image data has been converted for the at least one display device the set of SDP parameters are modified based on the conversion, and wherein the at least one display device is operable to display a six-primary color system based on the set of image data, such that the SDP parameters indicate the magenta primary value, the at least one electronic luminance component, and that the set of image data being displayed on the at least one display device is using a six-primary color system.

These and other aspects of the present invention will become apparent to those skilled in the art after a reading of the following description of the preferred embodiment when considered with the drawings, as they support the claimed invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3A illustrates the spectral output of an LCD display using a CCFL backlight and a simulation of what Viewer A is sensitive to.

FIG. 3B illustrates the spectral output of an LCD display using a CCFL backlight and a simulation of what Viewer B is sensitive to.

FIG. 61 illustrates modifications to the SMPTE ST352 standards for a six-primary color system.

FIG. 62 illustrates modifications to the SMPTE ST2022 standard for a six-primary color system.

FIG. 63 illustrates a table of 4:4:4 sampling for a six-primary color system for a 10-bit video system.

FIG. 64 illustrates a table of 4:4:4 sampling for a six-primary color system for a 12-bit video system.

FIG. 65 illustrates sequence substitutions for 10-bit and 12-bit video in 4:2:2 sampling systems in a Y Cb Cr Cc Cy color space.

FIG. 67 illustrates sequence substitutions for 10-bit and 12-bit video in 4:2:0 sampling systems using a Y Cb Cr Cc Cy color space.

FIG. 69 illustrates modifications to SMPTE ST2110-20 for a 10-bit six-primary color system in 4:4:4 video.

FIG. 70 illustrates modifications to SMPTE ST2110-20 for a 12-bit six-primary color system in 4:4:4 video.

FIG. 71 illustrates modifications to SMPTE ST2110-20 for a 10-bit six primary color system in 4:2:2 video FIG. 72 illustrates modifications to SMPTE ST2110-20 for a 12-bit six-primary color system in 4:2:0 video.

DETAILED DESCRIPTION

Figure 1:
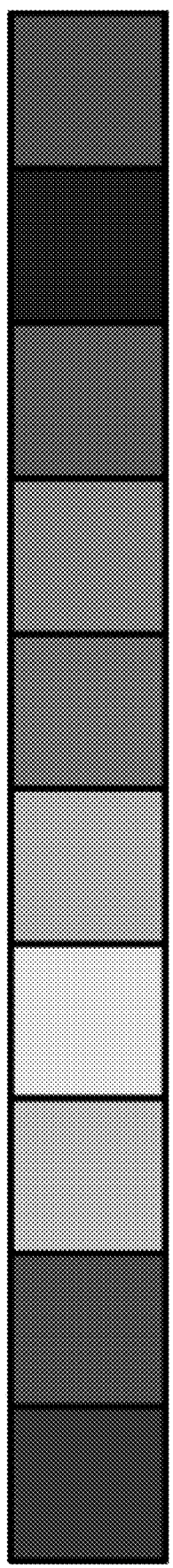
FIG. 1 illustrates color spectrum.

The present invention is generally directed to a six-primary color system.

In one embodiment, the present invention is a system for displaying a six primary color system, including a set of image data, wherein the set of image data is comprised of a first set of color channel data and a second set of color channel data, wherein the set of image data further includes a bit level, an image data converter, wherein the image data converter includes a digital interface, wherein the digital interface is operable to encode and decode the set of image data, at least one transfer function (TF) for processing the set of image data, a set of Session Description Protocol (SDP) parameters, wherein the set of SDP parameters is modifiable, at least one display device, wherein the at least one display device and the image data converter are in network communication, wherein the image data converter is operable to convert the bit level of the set of image data, thereby creating an updated bit level, wherein the image data converter is operable to convert the set of image data for display on the at least one display device, wherein once the set of image data has been converted by the image data converter for the at least one display device the set of SDP parameters are modified based on the conversion, and wherein the at least one display device is operable to display a six-primary color system based on the set of image data, such that the SDP parameters indicate that the set of image data being displayed on the at least one display device is using a six-primary color system. In one embodiment, the first set of color channel data is a set of values for red (R), green (G), and blue (B) (collectively "RGB") primaries and the second set of color channel data is a set of values for cyan (C), yellow (Y), and magenta (M) (collectively "CYM") primaries. In one embodiment, the bit level of the set of image data is 12 bits, wherein the image data converter remaps the bit level to 11 bits using the at least one TF, wherein the output from the at least one TF includes the updated bit level, wherein the updated bit level is 11 bits. In one embodiment, the bit level of the set of image data is 10 bits, wherein the image data converter remaps the bit level to 9 bits using the at least one TF, wherein the output from the at least one TF includes the updated bit level, wherein the updated bit level is 9 bits. In another embodiment, the system includes a set of saturation data corresponding to the set of image data, wherein the saturation data is calculated using the first set of color channel data, the second set of color channel data, and an illuminant white point, wherein the illuminant white point is the Standard Illuminant D65 (D65) white point, wherein the saturation data is used to extend a set of hue angles for the first set of color channel data and the second set of color channel data, wherein extending the huge angles produces an updated set of image data with equal saturation values. In yet another embodiment, the first set of color channel data includes a first bit value defining black and a first bit value defining white, wherein the second set of color channel data includes a second bit value defining black and a second bit level defining white, wherein the TF is operable to redefine the first bit value defining black, the first bit level defining white, the second bit level defining black, and the second bit level defining white. In yet another embodiment, the set of SDP parameters are modified to include data corresponding to the first set of color channel data and the second set of color channel data, wherein the first set of color channel data is a set of values for RGB primaries and the second set of color channel data is a set of values for CYM primaries. In yet another embodiment, the digital interface encodes and decodes the set of image data using at least one color difference component, wherein the at least one color difference component is operable for up-sampling and/or down-sampling.

In another embodiment, the present invention is a system for displaying a six-primary color system, including a set of image data, wherein the set of image data includes a first set of color channel data and a second set of color channel data, wherein the set of image data includes a bit level, a magenta primary value, wherein the magenta primary value is derived from the set of image data, an image data converter, wherein the image data converter includes a digital interface, wherein the digital interface is operable to encode and decode the set of image data, at least one transfer function (TF) for processing the set of image data, a set of Session Description Protocol (SDP) parameters, wherein the set of SDP parameters are modifiable, at least one display device, wherein the at least one display device and the image data converter are in network communication, wherein the image data converter is operable to convert the bit level for the set of image data to a new bit level, wherein the at least one data converter is operable to convert the set of image data for display on the at least one display device, wherein once the set of image data has been converted for the at least one display device the set of SDP parameters are modified based on the conversion, and wherein the at least one display device is operable to display a six-primary color system based on the set of image data, such that the SDP parameters indicate the magenta primary value and that the set of image data being displayed on the at least one display device is using a six-primary color system. In one embodiment, the first set of color channel data is a set of values for red (R), green (G), and blue (B) (collectively "RGB") primaries and the second set of color channel data is a set of values for cyan (C), yellow (Y), and magenta (M) (collectively "CYM") primaries, wherein the M primary value is calculated based on values for R and B from the first set of color channel data. In one embodiment, the first set of color channel data defines a first minimum color luminance and a first maximum color luminance, wherein the second set of color channel data defines a second minimum color luminance and a second maximum color luminance. In another embodiment, the at least one TF quantizes the bit level of the set of image data to a lower bit level, thereby creating an updated bit level for the set of image data. In another embodiment, a peak brightness and a minimum brightness are calculated for the first set of color channel data and the second set of color channel data. In another embodiment, the system includes a standardized transport format, wherein the standardized transport format is operable to receive the first set of image data and the second set of image data as a combined set of image data, wherein the combined set of image data has a combined bit level equal to the bit level for the set of image data. In yet another embodiment, the SDP parameters include the first set of color channel data, the second set of color channel data, mapping data for the set of image data, framerate data for the set of image data, a sampling standard for the set of image data, a flag indicator, an active picture size code, a timestamp for the set of image data, a clock frequency for the set of image data, a frame count for the set of image data, a scrambling indicator, and/or a video format indicator. In yet another embodiment, the system includes a set of saturation data corresponding to the set of image data, wherein the saturation data is calculated using the first set of color channel data, the second set of color channel data, and an illuminant white point, wherein the illuminant white point is the Standard Illuminant D60 (D60) white point. In yet another embodiment, the at least one TF is an EOTF. In yet another embodiment, the magenta primary value is not defined as a wavelength.

In yet another embodiment, the present invention is a system for displaying a set of image data using a six-primary color system, including a set of image data, wherein the set of image data includes a bit level, a magenta primary value, wherein the magenta primary value is derived from the set of image data, an image data converter, wherein the image data converter includes a digital interface, wherein the digital interface is operable to encode and decode the set of image data, at least one transfer function (TF) for processing the set of image data, a set of Session Description Protocol (SDP) parameters, wherein the set of SDP parameters are modifiable, at least one electronic luminance component, wherein the electronic luminance component is derived from the set of image data, at least one display device, wherein the at least one display device and the image data converter are in network communication, wherein the image data converter is operable to convert the set of image data to a new bit level, wherein the image data converter is operable to convert the set of image data for display on the at least one display device, wherein once the set of image data has been converted for the at least one display device the set of SDP parameters are modified based on the conversion, and wherein the at least one display device is operable to display a six-primary color system based on the set of image data, such that the SDP parameters indicate the magenta primary value, the at least one electronic luminance component, and that the set of image data being displayed on the at least one display device is using a six-primary color system. In one embodiment, the at least one electronic luminance component is not calculated within the at least one display. In one embodiment, the set of image data includes red (R), green (G), blue (B), cyan (C), yellow (Y), and magenta (M) color primary values, wherein the magenta primary value is calculated based on the R and B color primary values. In one embodiment, the at least one TF is an OOTF. In another embodiment, the system further includes a sampling system, wherein the sampling system is a 4:4:4 sampling system, wherein the sampling system includes a bit for black and a bit for white, wherein the bit for black and the bit for white are operable to redefined within the sampling system. In another embodiment, the bit level for the set of image data is 12 bits. In another embodiment, the bit level for the set of image data is 10 bits. In yet another embodiment, the image data converter encoding and decoding are based on the ITU-R BT.709 color space. In yet another embodiment, the image data converter encoding and decoding are based on the SMPTE RP431-2 color space. In yet another embodiment, the set of image data is converted by the image data converter in real-time and/or near real-time. In yet another embodiment, the digital interface includes payload identification (ID) metadata, wherein the payload ID metadata is operable to identify the set of image data as a six-primary color set of image data.

The present invention relates to color systems. A multitude of color systems are known, but they continue to suffer numerous issues. As imaging technology is moving forward, there has been a significant interest in expanding the range of colors that are replicated on electronic displays. Enhancements to the television system have expanded from the early CCIR 601 standard to ITU-R BT.709-6, to SMPTE RP431-2, and ITU-R BT.2020. Each one has increased the gamut of visible colors by expanding the distance from the reference white point to the position of the Red (R), Green (G), and Blue (B) color primaries (collectively known as "RGB") in chromaticity space. While this approach works, it has several disadvantages. When implemented in content presentation, issues arise due to the technical methods used to expand the gamut of colors seen (typically using a more-narrow emissive spectrum) can result in increased viewer metameric errors and require increased power due to lower illumination source. These issues increase both capital and operational costs.

With the current available technologies, displays are limited in respect to their range of color and light output. There are many misconceptions regarding how viewers interpret the display output technically versus real-world sensations viewed with the human eye. The reason we see more than just the three emitting primary colors is because the eye combines the spectral wavelengths incident on it into the three bands. Humans interpret the radiant energy (spectrum and amplitude) from a display and process it so that an individual color is perceived. The display does not emit a color or a specific wavelength that directly relates to the sensation of color. It simply radiates energy at the same spectrum which humans sense as light and color. It is the observer who interprets this energy as color.

When the CIE 2° standard observer was established in 1931, common understanding of color sensation was that the eye used red, blue, and green cone receptors (James Maxwell & James Forbes 1855). Later with the Munsell vision model (Munsell 1915), Munsell described the vision system to include three separate components: luminance, hue, and saturation. Using RGB emitters or filters, these three primary colors are the components used to produce images on today's modern electronic displays.

There are three primary physical variables that affect sensation of color. These are the spectral distribution of radiant energy as it is absorbed into the retina, the sensitivity of the eye in relation to the intensity of light landing on the retinal pigment epithelium, and the distribution of cones within the retina. The distribution of cones (e.g., L cones, M cones, and S cones) varies considerably from person to person.

Enhancements in brightness have been accomplished through larger backlights or higher efficiency phosphors. Encoding of higher dynamic ranges is addressed using higher range, more perceptually uniform electro-optical transfer functions to support these enhancements to brightness technology, while wider color gamuts are produced by using narrow bandwidth emissions. Narrower bandwidth emitters result in the viewer experiencing higher color saturation. But there can be a disconnect between how saturation is produced and how it is controlled. What is believed to occur when changing saturation is that increasing color values of a color primary represents an increase to saturation. This is not true, as changing saturation requires the variance of a color primary spectral output as parametric. There are no variable spectrum displays available to date as the technology to do so has not been commercially developed, nor has the new infrastructure required to support this been discussed.

Instead, the method that a display changes for viewer color sensation is by changing color luminance. As data values increase, the color primary gets brighter. Changes to color saturation are accomplished by varying the brightness of all three primaries and taking advantage of the dominant color theory.

Expanding color primaries beyond RGB has been discussed before. There have been numerous designs of multi-primary displays. For example, SHARP has attempted this with their four-color QUATTRON TV systems by adding a yellow color primary and developing an algorithm to drive it. Another four primary color display was proposed by Matthew Brennesholtz which included an additional cyan primary, and a six primary display was described by Yan Xiong, Fei Deng, Shan Xu, and Sufang Gao of the School of Physics and Optoelectric Engineering at the Yangtze University Jingzhou China. In addition, AU OPTRONICS has developed a five primary display technology. SONY has also recently disclosed a camera design featuring RGBCMY (red, green, blue, cyan, magenta, and yellow) and RGBCMYW (red, green, blue cyan, magenta, yellow, and white) sensors.

Actual working displays have been shown publicly as far back as the late 1990's, including samples from Tokyo Polytechnic University, Nagoya City University, and Genoa Technologies. However, all of these systems are exclusive to their displays, and any additional color primary information is limited to the display's internal processing.

Additionally, the Visual Arts System for Archiving and Retrieval of Images (VASARI) project developed a colorimetric scanner system for direct digital imaging of paintings. The system provides more accurate coloring than conventional film, allowing it to replace film photography. Despite the project beginning in 1989, technical developments have continued. Additional information is available at (last accessed Mar. 30, 2020), which is incorporated herein by reference in its entirety.

None of the prior art discloses developing additional color primary information outside of the display. Moreover, the system driving the display is often proprietary to the demonstration. In each of these executions, nothing in the workflow is included to acquire or generate additional color primary information. The development of a six-primary color system is not complete if the only part of the system that supports the added primaries is within the display itself.

Referring now to the drawings in general, the illustrations are for the purpose of describing one or more preferred embodiments of the invention and are not intended to limit the invention thereto.

FIG. 1 illustrates one example of a color spectrum. The color spectrum can be stated as a colorimetric measurement, indicating the presence of ten distinct colors, and a radiometric measurement, wherein there are ten combinations of three distinct spectra. Colors on the spectrum include, but are not limited to red (R), blue (B), green (G), cyan (C), yellow (Y), and magenta (M).

Figure 2:
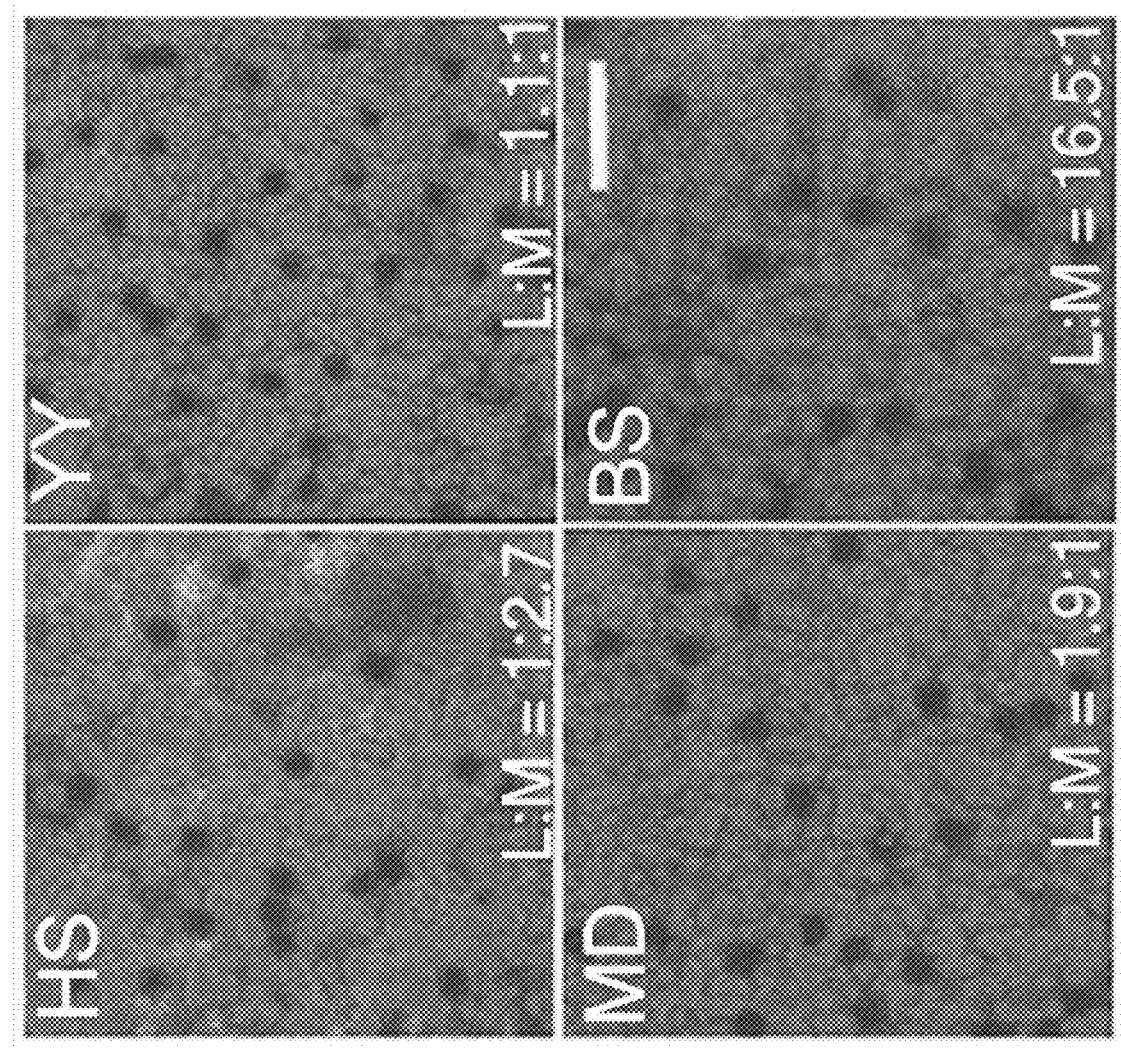
FIG. 2 illustrates an adaptive optics view of the mosaic of L (red), M (green), and S (blue) cones in four human subjects with normal color vision.

FIG. 2 illustrates an adaptive optics view of the mosaic of L cones (shown in red), M cones (shown in green), and S cones (shown in blue) in four human subjects with normal color vision. The ratio of S to L and M cones is constant but that of L to M cones varies from 1:2.7 (L:M) to 16.51:1 (L:M).

Figure 3A:
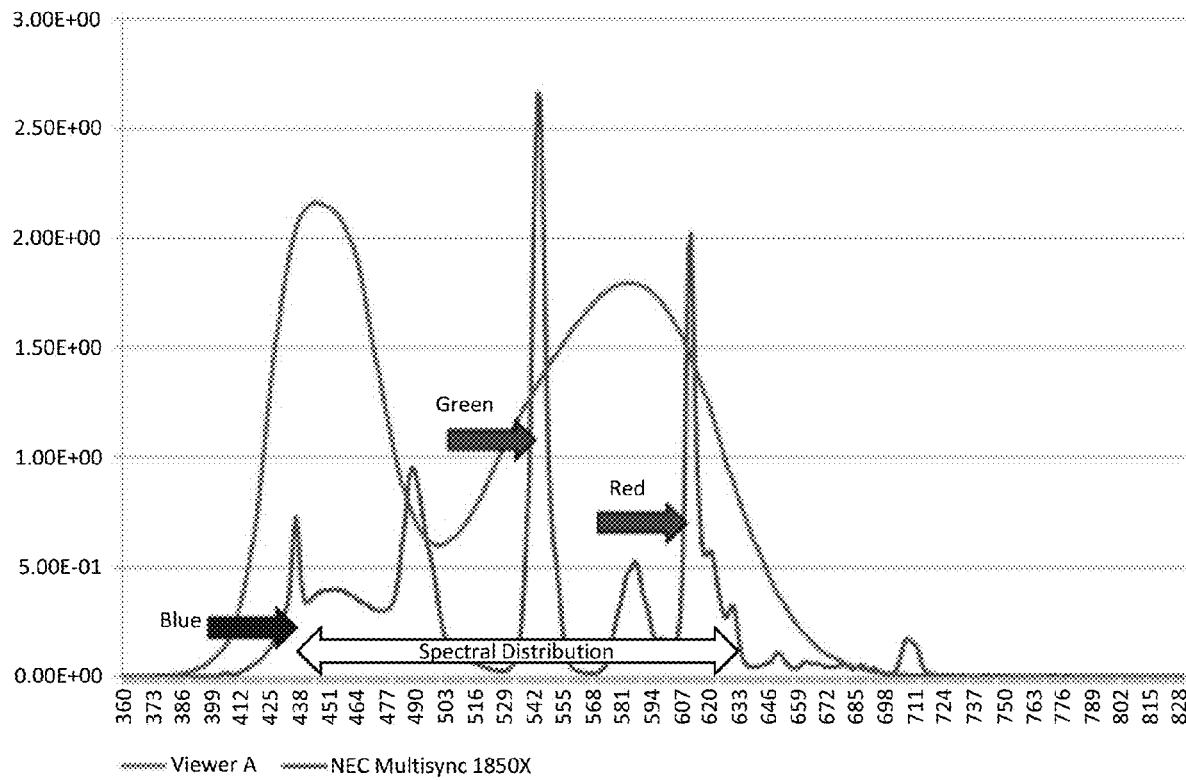
Figure 3B:
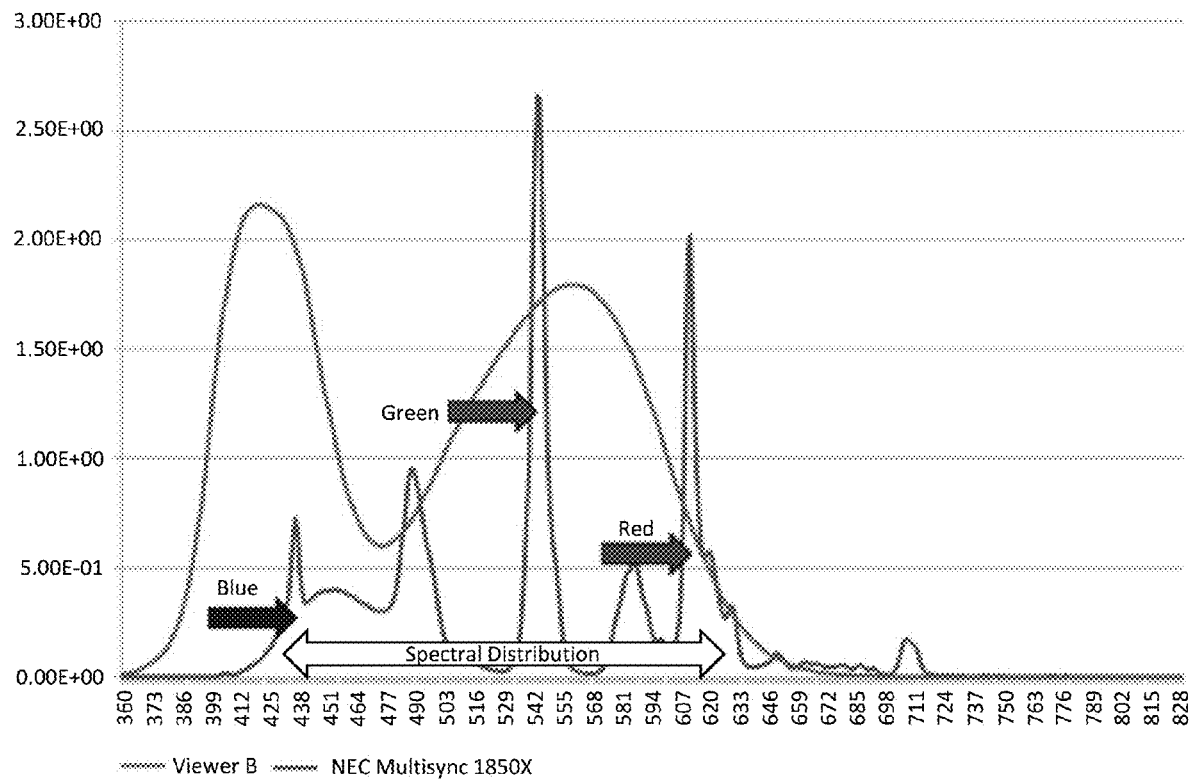

FIG. 3A and FIG. 3B illustrate spectral output of an LCD display using a cold cathode fluorescent lamp (CCFL) backlight and a simulation of what Viewer A and Viewer B are sensitive to, respectively. The display output has a fairly broad spectral distribution (white arrow), so as the viewer looks at the image, differences in viewer sensitivity can be covered by this wider spectral distribution output from the display. The colored arrows show that the majority of the spectrum output falls under the area of the viewer's sensitivity. This means that the viewer has more information available to judge what that color is and that fewer metamerism issues are present.

Figure 4A:
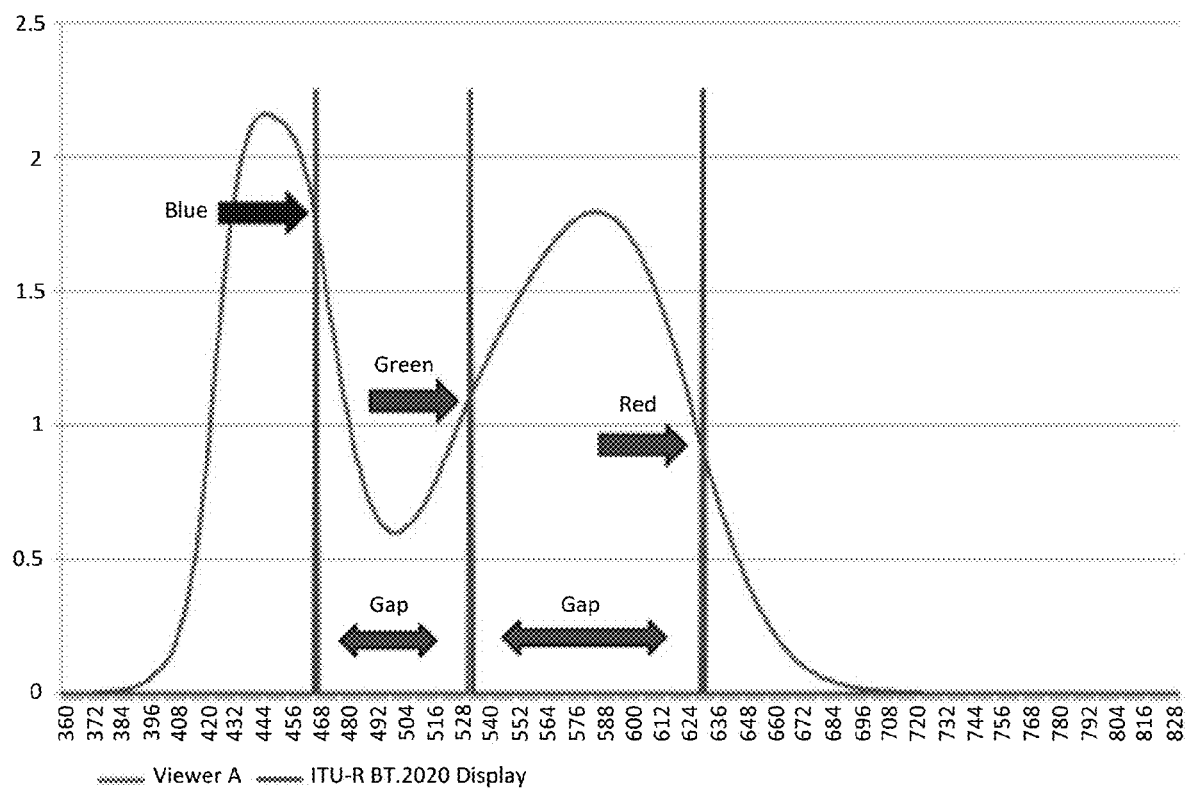
FIG. 4A illustrates a spectral output of a laser driven display using discrete RGB laser emitters and a simulation of what Viewer A is sensitive to, where the display is using an ITU-R BT.2020 gamut.
Figure 4B:
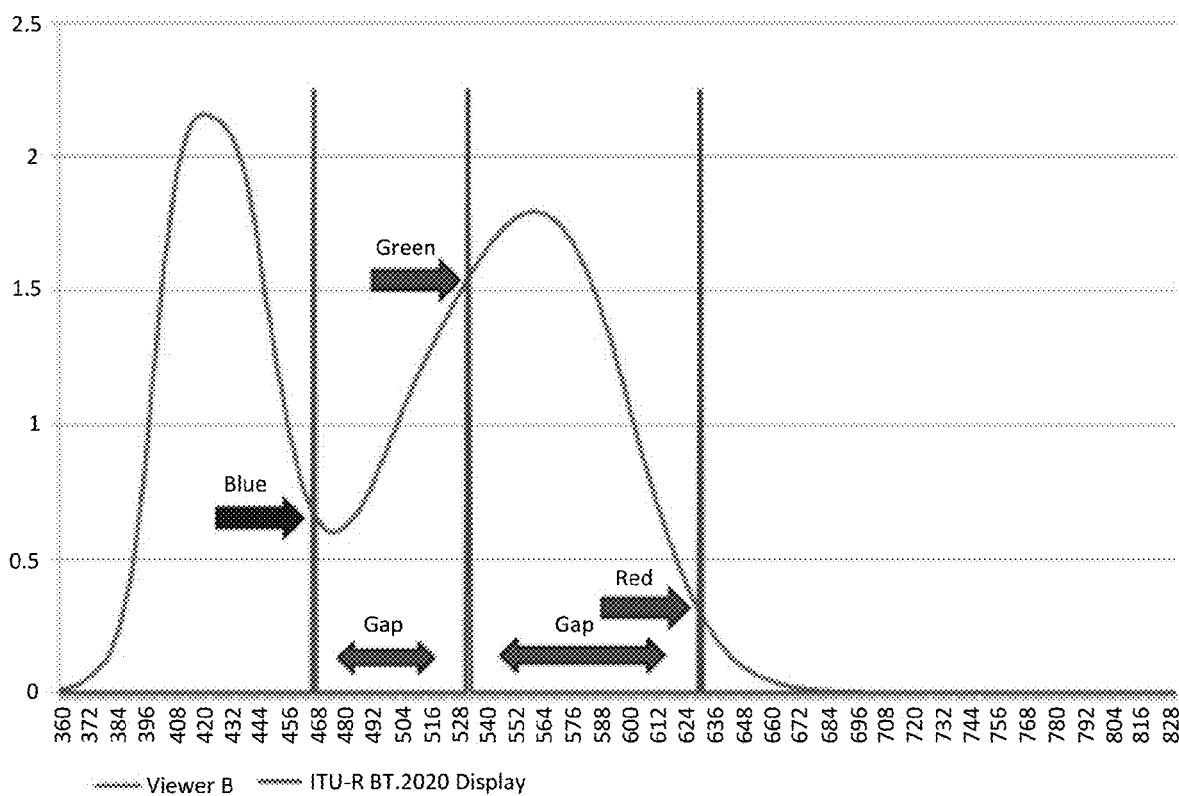
FIG. 4B illustrates a spectral output of a laser driven display using discrete RGB laser emitters and a simulation of what Viewer B is sensitive to, where the display is using an ITU-R BT.2020 gamut.

FIG. 4A and FIG. 4B illustrate spectral output of a laser driven display using discrete RGB laser emitters and a simulation of what each viewer is sensitive to, where the display is using an ITU-R BT.2020 gamut. As shown from the colored arrows, the level of sensitivity for each color primary emission crosses a very different level between the two viewers. Also illustrated by the purple arrows are large gaps in the output spectrum where no radiant energy is emitted. This results in the eye seeing less light for the same spectral peak amplitude. This results in greater color discrepancy from viewer-to-viewer.

Figure 5:
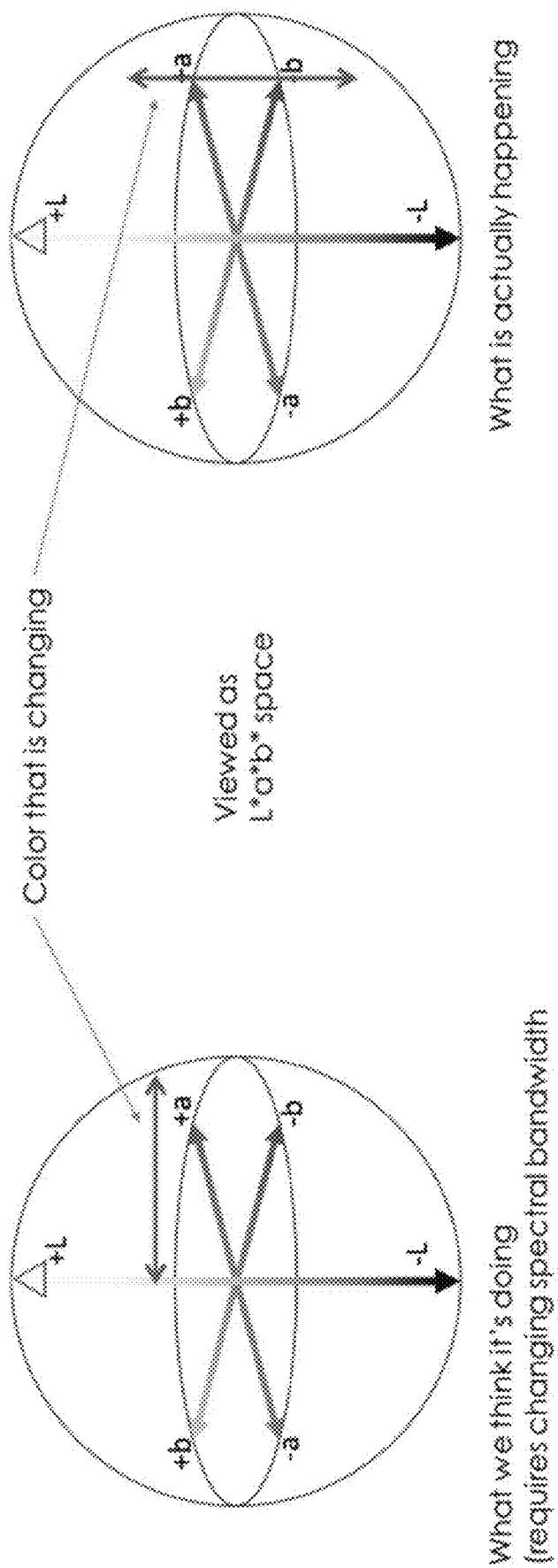
FIG. 5 illustrates how a display simulates color using the Commission on Illumination (CIE 1976) color space shown as L*a*b.

FIG. 5 illustrates how a display simulates color using the Commission on Illumination (CIE 1976) color space shown as L*a*b (CIELAB). CIELAB color space is a color space defined by the International Commission on Illumination (CIE) in 1976. It expresses color as three values: L* for the lightness from black (0) to white (100), a* from green (−) to red (+), and b* from blue (−) to yellow (+). CIELAB was designed so that the same amount of numerical change in these values corresponds roughly to the same amount of visually perceived change. The CIELAB color space is typically used when graphics for print have to be converted from RGB to CMYK, as the CIELAB gamut includes both the gamuts of Red (R), Green (G), and Blue (B) (collectively RGB) and Cyan (C), Magenta (M), Yellow (Y), and Black (K) (collectively CMYK) color models. Because three parameters are measured, the space itself is a three-dimensional (3D) real number space, allowing for infinitely many possible colors. In practice, the space is mapped onto a 3D integer space for digital representation. Referring to FIG. 5, what an observer thinks when changing saturations is that increasing values of a color primary increase color saturation (assumption shown on left side of figure). While this is true, it is not practical. There are no variable spectrum displays available to date as the technology to do this has not been commercially developed. Neither has the new infrastructure required to support this even been discussed.

Color saturation increases are actually accomplished by increasing brightness of the brightest primary for a particular color and reducing brightness for the other two primaries. The limiting saturation of the display does not change.

Figure 6:
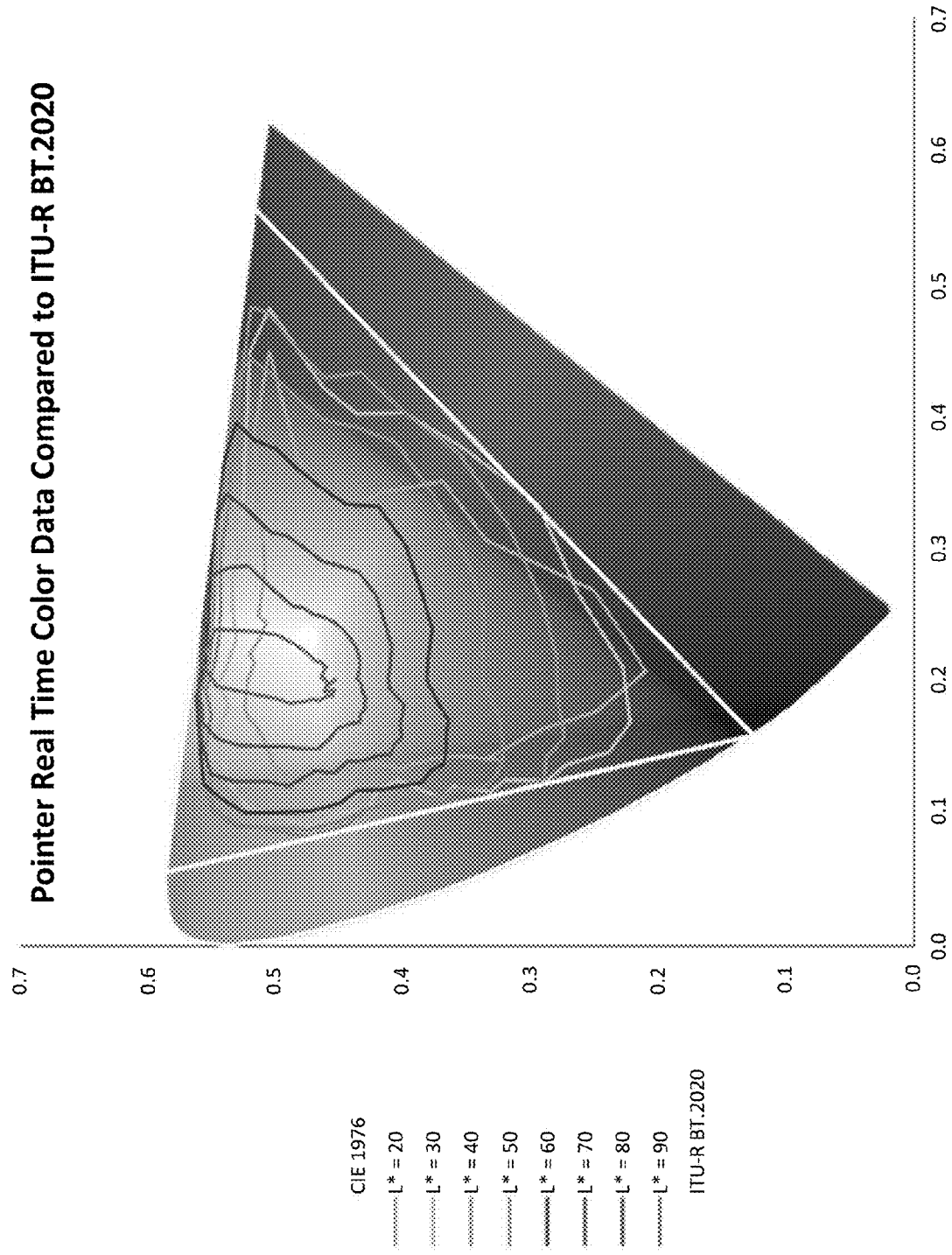
FIG. 6 illustrates a comparison of the ITU-R BT.2020 color gamut to the Pointer data set of real colors.

FIG. 6 illustrates a comparison of the ITU-R BT.2020 color gamut to the Pointer data set of real colors. ITU-R BT.2020 was designed to make a maximum range of colors within an RGB space. To do this, the standard assigns its color primaries to the edge of the 1931 standard observer locus. In order to make this work, the color primaries are in effect single frequency emitters with center frequencies at 630 nm (Red), 532 nm (Green), and 467 nm (Blue). If viewed as CIE 1976 Yu'v', this looks quite large and should have a maximum range of color. ITU-R BT.2020 completely covers all of Pointer's data set. This should also be the goal of a six primary system. However, the six primary system should use wide bandwidth spectral output to minimize any metamerism issues. ITU-R BT.2020 defines various aspects of ultra-high-definition television (UHDTV) with standard dynamic range (SDR) and wide color gamut (WCG), including picture resolutions, frame rates with progressive scan, bit depths, color primaries, RGB, luma-chroma color representations, chroma subsampling, and an opto-electronic transfer function. The ITU-R BT.2020 color space can reproduce colors that cannot be shown with ITU-R BT.709 (HDTV) color space. The RGB primaries used by ITU-R BT.2020 are equivalent to monochromatic light sources on the CIE 1931 spectral locus.

Figure 7:
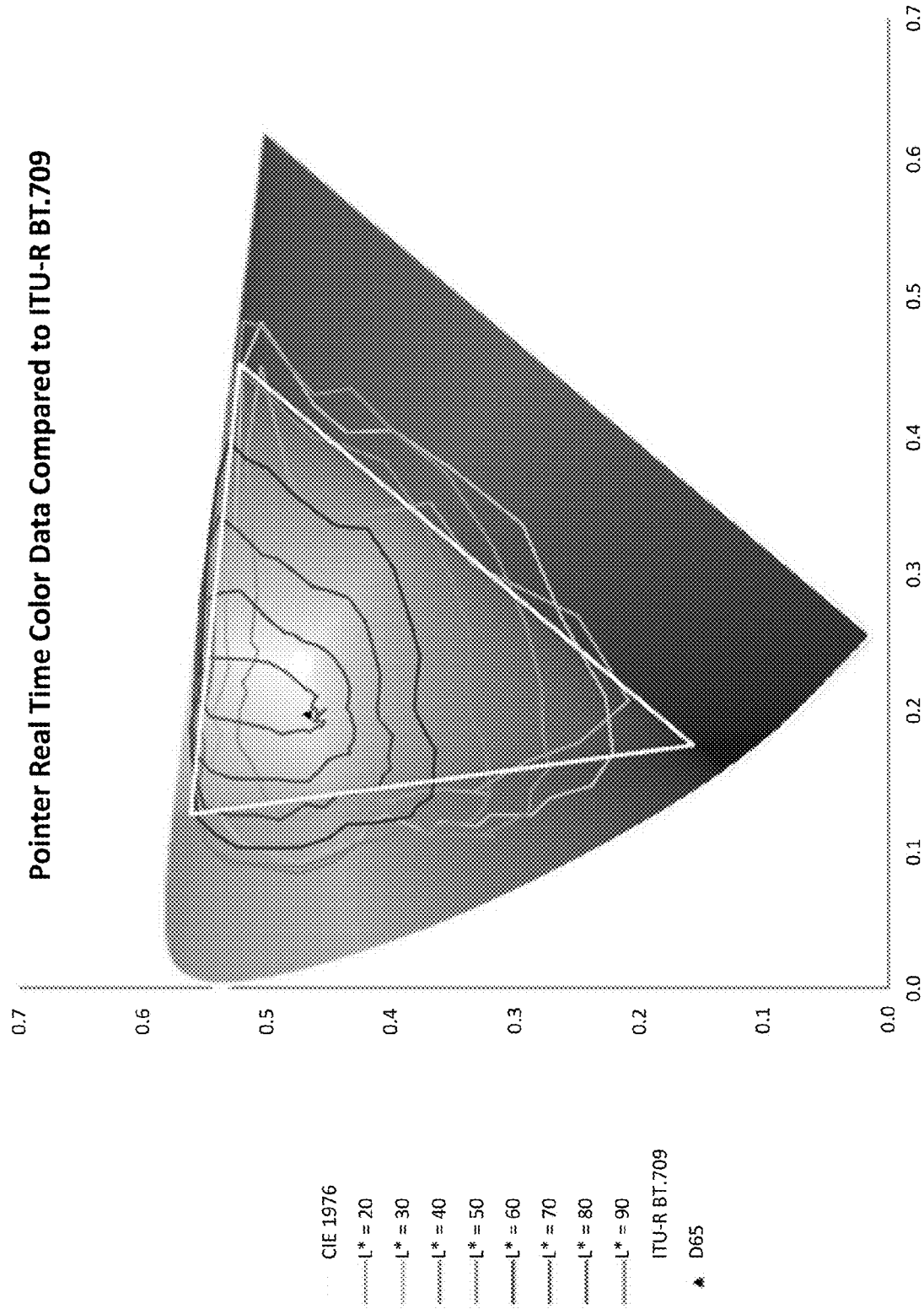
FIG. 7 illustrates a comparison of the ITU-R BT.709-6 color gamut to the Pointer data set of real colors.

FIG. 7 illustrates a comparison of the ITU-R BT.709-6 color gamut to the Pointer data set of real-world surface colors. ITU-R BT.709-6 is the maximum gamut that can currently be displayed using the most broad standard spectral emission primaries, and thus minimizes metameric issues. FIG. 7 also shows that a significant portion of the Pointer data set is not covered by the ITU-R BT.709-6 standard. ITU-R BT.709 standardizes the format of high-definition television (HDTV), having a 16:9 (widescreen) aspect ratio. ITU-R BT.709 refers to HDTV systems having roughly two million luma samples per frame. ITU-R BT.709 has two parts. Part 1 codifies what are now referred to as 1035i30 and 1152i25 HDTV systems. The 1035i30 system is now obsolete, having been superseded by 1080i and 1080p square-sampled ("square-pixel") systems. The 1152i25 system was used for experimental equipment and was never commercially deployed. Part 2 codifies current and prospective 1080i and 1080p systems with square sampling by defining a common image format (CIF) with picture parameters independent of the picture rate.

A six-primary color system offers enhancements to the current RGB systems. It extends current color gamuts to a wider usable color gamut than currently offered and minimizes metamerisms (i.e., everyone sees the same color). By doubling the number of primaries, and making the primaries wide spectrum rather than narrow, viewer metameric errors are reduced.

In one embodiment, the six-primary color system is based on the ITU-R BT.709-6 color system. The ITU-R BT.709-6 color system offers the least amount of metameric errors due to its limited gamut requirement. In addition, the ITU-R BT.709-6 color system makes use of wide spectral energies, resulting in a more consistent color sensation from viewer to viewer. A six-primary color system using the ITU-R BT.709-6 color system requires three additional primary colors: Cyan (C), Yellow (Y), and Magenta (M). It is important to match these additional color primaries to an equal saturation level and to be at complementary wavelengths to the original ITU-R BT.709-6 RGB and SMPTE RP431-2 RGB primary colors.

In addition, ITU-R BT.709-6 supports picture scanning characteristics including, but not limited to, an order of sample presentation in a scanned system, a total number of lines, field frequency, frame frequency, segment frequency, interlace ratio, picture rate (Hz), samples per full line, nominal analogue signal bandwidths (MHz), sampling frequency (MHz) for RGBY, and/or sampling frequency (MHz) for Cb Cr.

Saturation is defined between two coordinates, a white point and a color primary. Saturation is calculated as:

$$S_{uv}=13[u'u'_n)^2+(v'-v'_n)^2]^{1/2}$$

wherein u' and v' reference coordinate points in a chromaticity diagram. In one embodiment, the chromaticity diagram is the Commission on Illumination (CIE) 1976 u'v' chromaticity diagram.

In one embodiment, the white point for image is defined as the CIE Standard Illuminant D65 (D65). D65 is a commonly used standard illuminant and is part of the D series illuminants that attempt to portray standard illumination conditions at open-air in different parts of the world. D65 corresponds roughly to the average midday light in Western and Northern Europe, comprised of both direct sunlight and the light diffused by a clear sky. As any standard illuminant is represented as a table of averaged spectrophotometric data, any light source which statistically has the same relative spectral power distribution (SPD) can be considered a D65 light source. The D65 white point is used for ITU-R BT.709. Alternatively, the white point is defined as a D60 white point. The D60 white point is used for SMPTE RP431, which is discussed infra.

Saturation values with a D65 white point are as follows:
$S_{Red}$=3.3630315
$S_{Green}$=1.5477145
$S_{Blue}$=4.046013

The additional primaries for a six-primary color system using the ITU-R BT.709-6 color system are inverted and equidistant from the original RGB primaries. In order to accomplish this, a hue rotation is necessary. The hue rotation can be calculated as:

$$h_{uv} = \tan^{-1}(v^*/u^*)$$

Using the above hue rotation calculation, the following hue angles are produced:
$H_{Red}$=167.823°
$H_{Green}$=52.28490
$H_{Blue}$=85.8743°

Extending the hue angles to the opposite side of the gamut locus, and assigning a CYM ($S_{CYM}$) primary set at an equal saturation value to an opposing color (e.g., cyan equal to red, yellow equal to blue, magenta equal to green) results in a balanced six-color primary system.

In one embodiment, the six-primary color system is based on the ITU-R BT.2020 color system. The ITU-R BT.2020 color system is the current standardized wide gamut system. This standard assigns its color primaries to the edge of the 1931 standard observer locus. In a six-primary color system using this standard, the color primaries are single frequency emitters with frequencies centered at 630 nm (Red), 532 nm (Green), and 467 nm (Blue). In another embodiment, the six-primary color system is based on the ITU-R BT.709 color system. In another embodiment, the six-primary color system is based a color system other than ITU-R BT.709 or ITU-R BT.2020.

Figure 8:
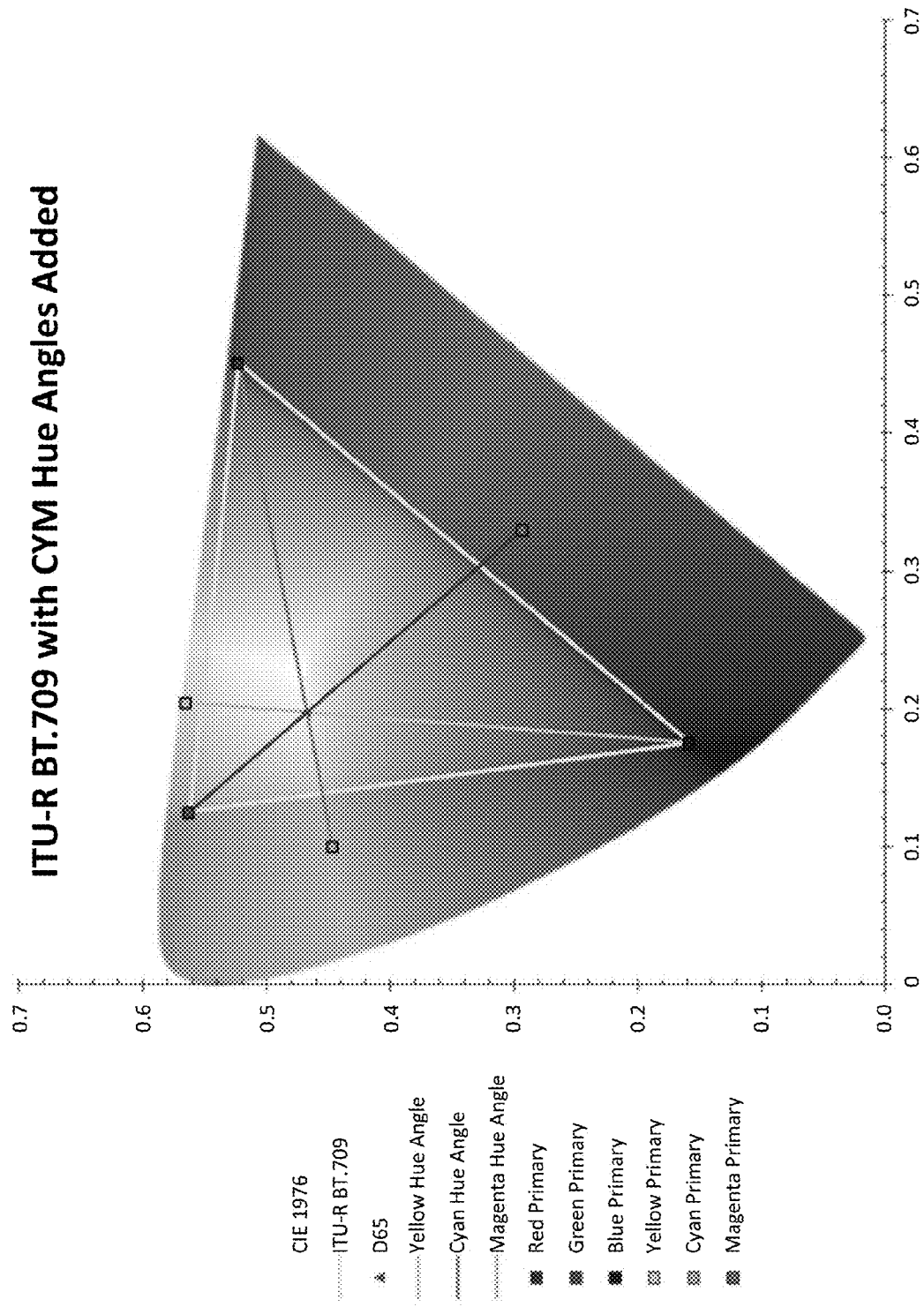
FIG. 8 illustrates the CYM hue angles added to a legacy RGB color gamut based on equal saturation defined by ITU-R BT.709-6.

FIG. 8 illustrates the ITU-R BT.709-6 color gamut with CYM hue angles added. In addition, a D65 white point is used for the additional hue angles. In another embodiment, the white point is a D60 white point.

Figure 9:
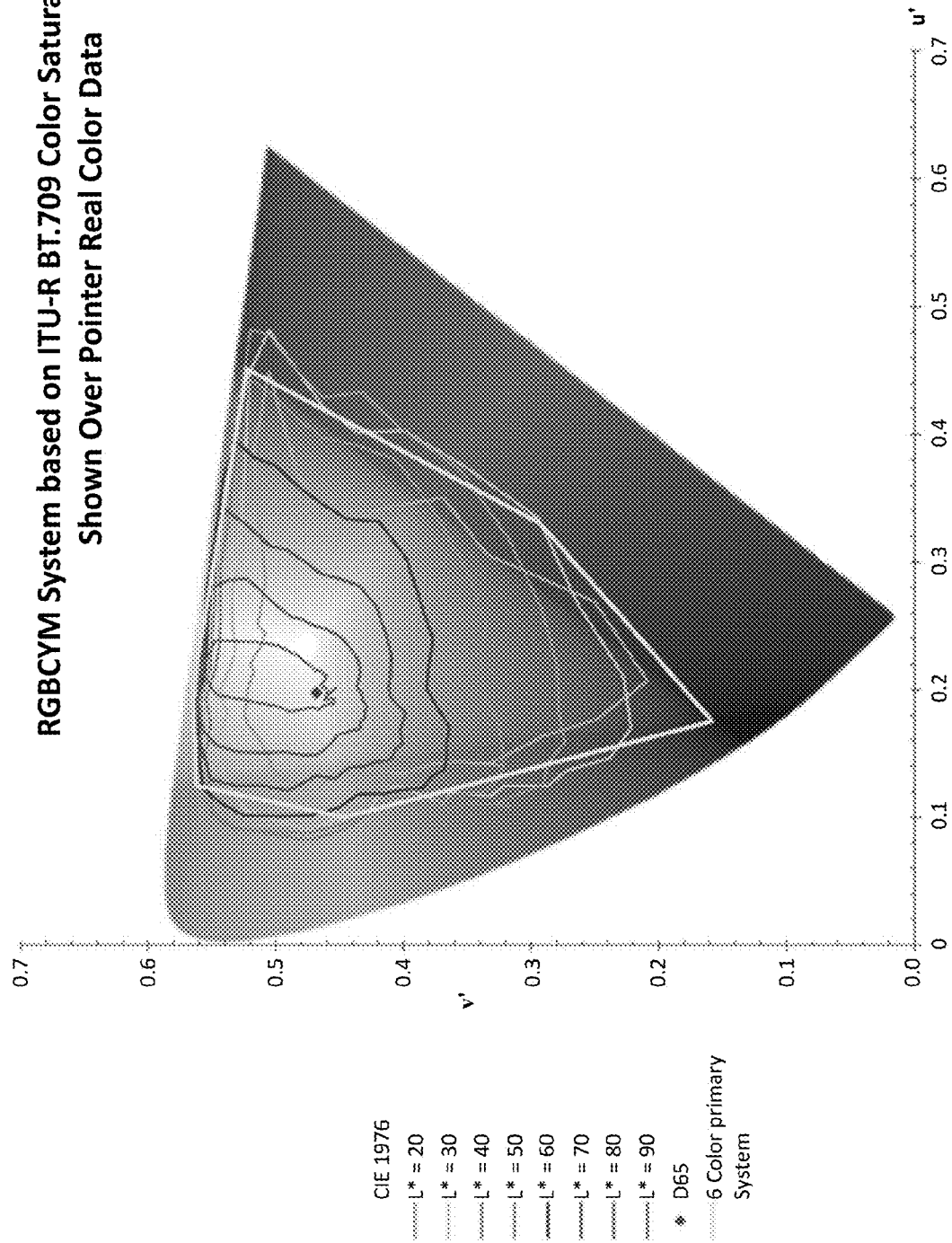
FIG. 9 illustrates a RGBCYM system based on the ITU-R BT.709-6 color saturation shown over the Pointer data set of real colors.

FIG. 9 illustrates a RGBCYM system based on the ITU-R BT.709-6 color saturation ("6P-B") shown over the Pointer data set of real colors. The D65 white point is indicated by the red triangle. This RGBCYM system covers six primary colors, with hue angles for Yellow, Cyan, and Magenta. The biggest difference between this primary set and the primary set of ITU-R BT.2020 is that the gamut shown as a six primary system is using a wide bandwidth set of primaries.

Figure 10A:
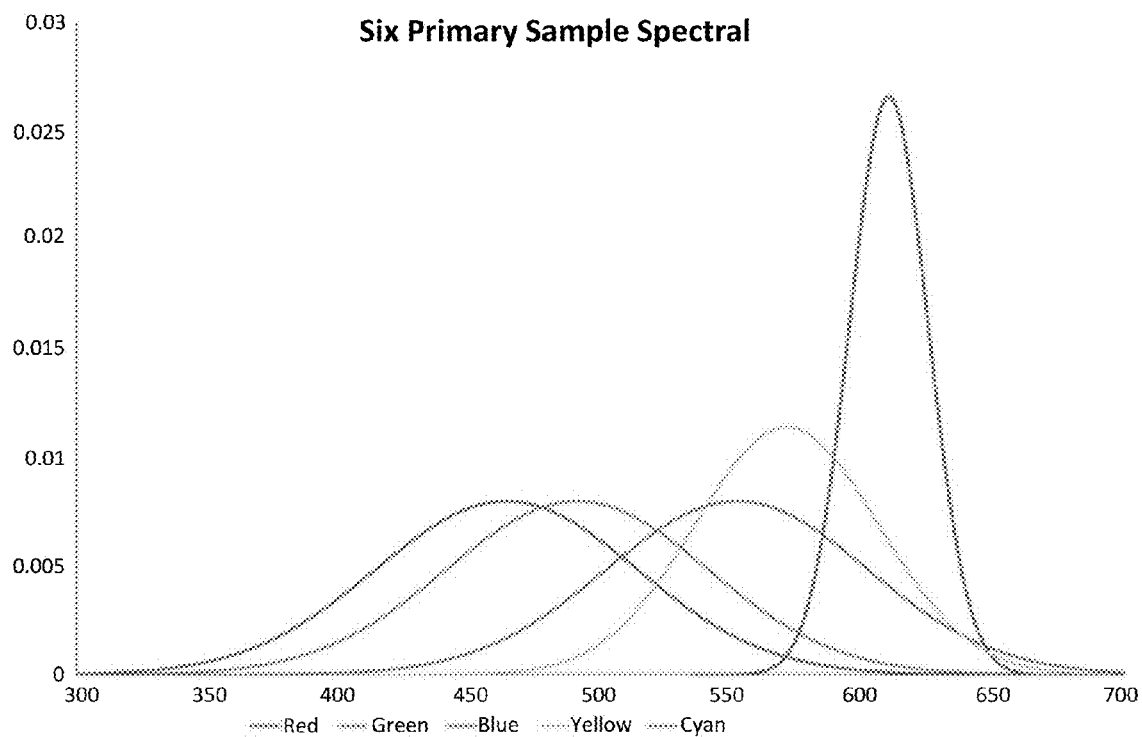
FIG. 10A illustrates a comparison of the overall gamut values between a six-primary system and an ITU-R BT.2020 system, with estimated differences between spectral displayed outputs.
Figure 10B:
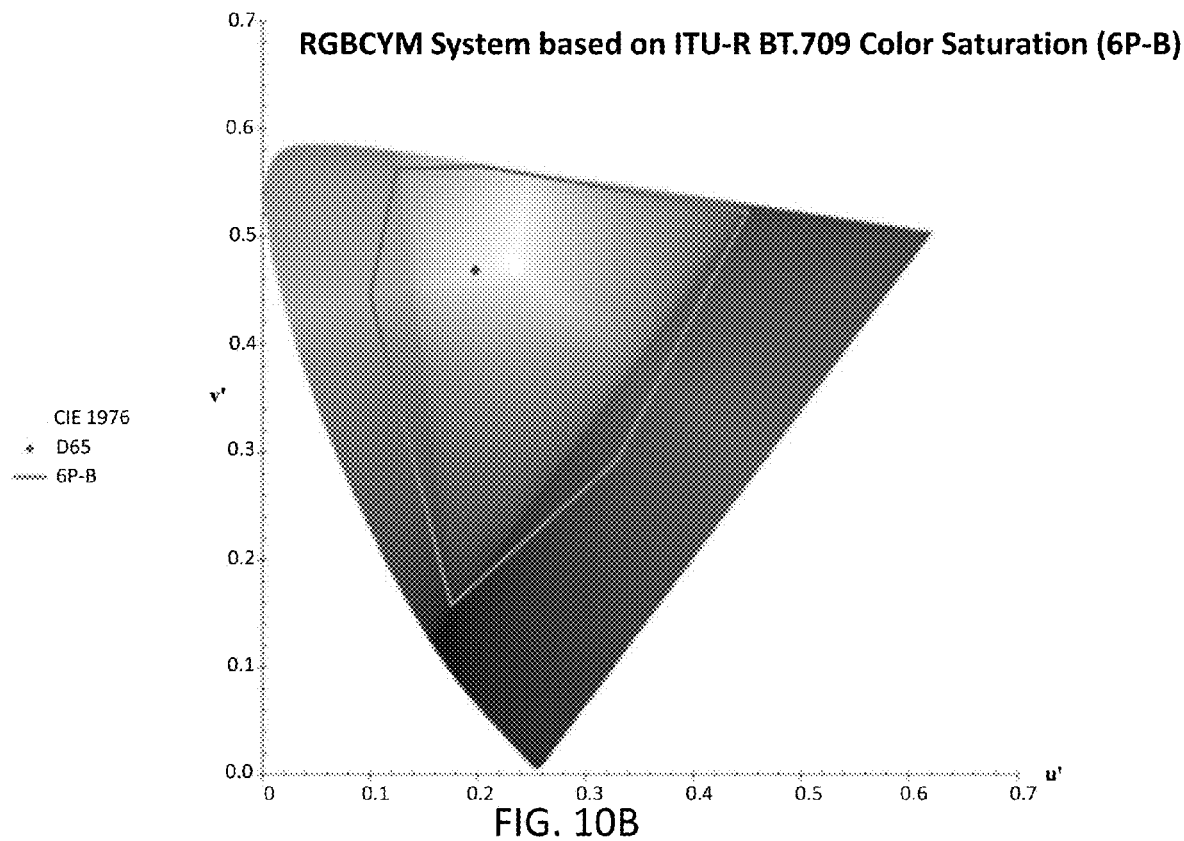
FIG. 10B illustrates an RGBCYM system based on ITU-R BR 709 Color Saturation (6P-B).
Figure 10C:
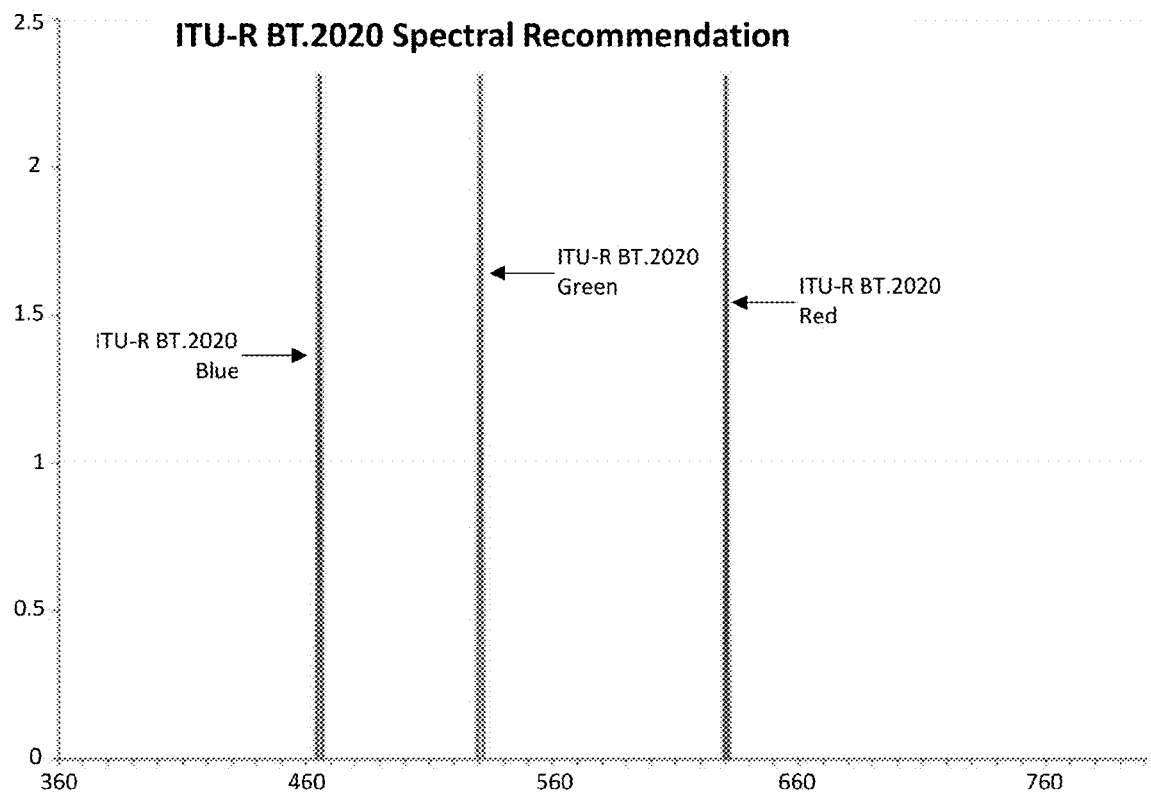
FIG. 10C illustrates the ITU-R BR.2020 spectral recommendation.
Figure 10D:
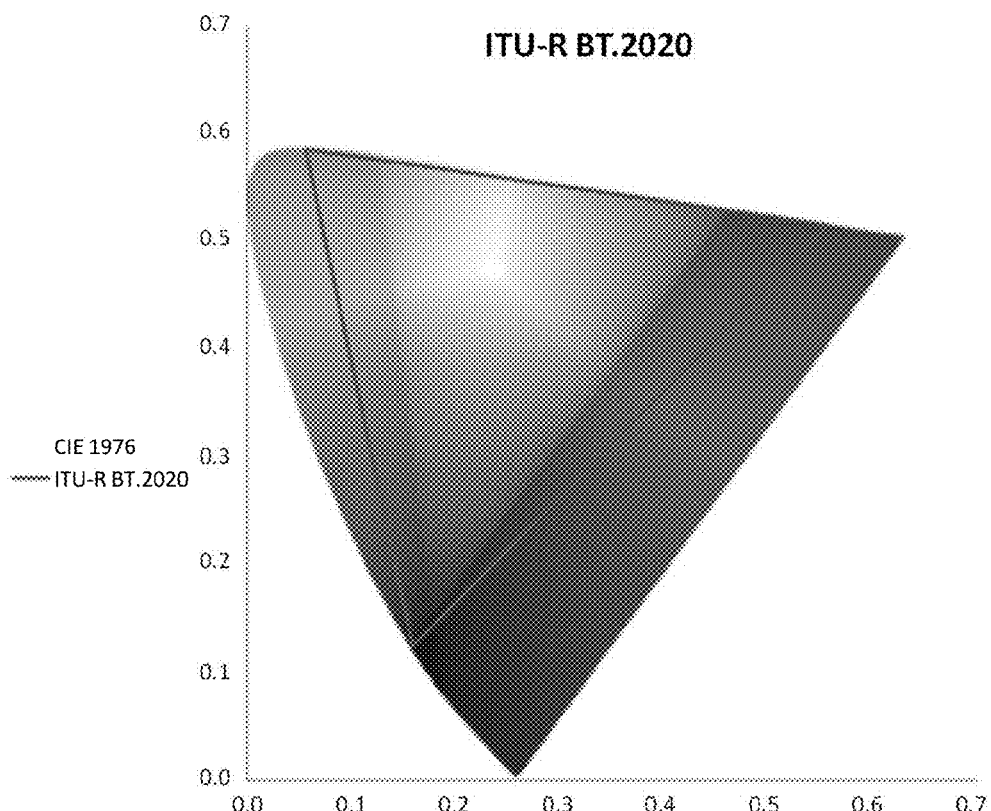
FIG. 10D illustrates the ITU-R BT.2020 system. In one embodiment, the white point is a D60 white point

FIG. 10A illustrates a six primary sample spectrum. FIG. 10B illustrates an RGBCYM system based on ITU-R BT.709 Color Saturation (6P-B). FIG. 10C illustrates the ITU-R BT.2020 spectral recommendation. FIG. 10D illustrates the ITU-R BT.2020 system. In one embodiment, the white point is a D60 white point. In another embodiment, the white point is a D65 white point.

Figure 11:
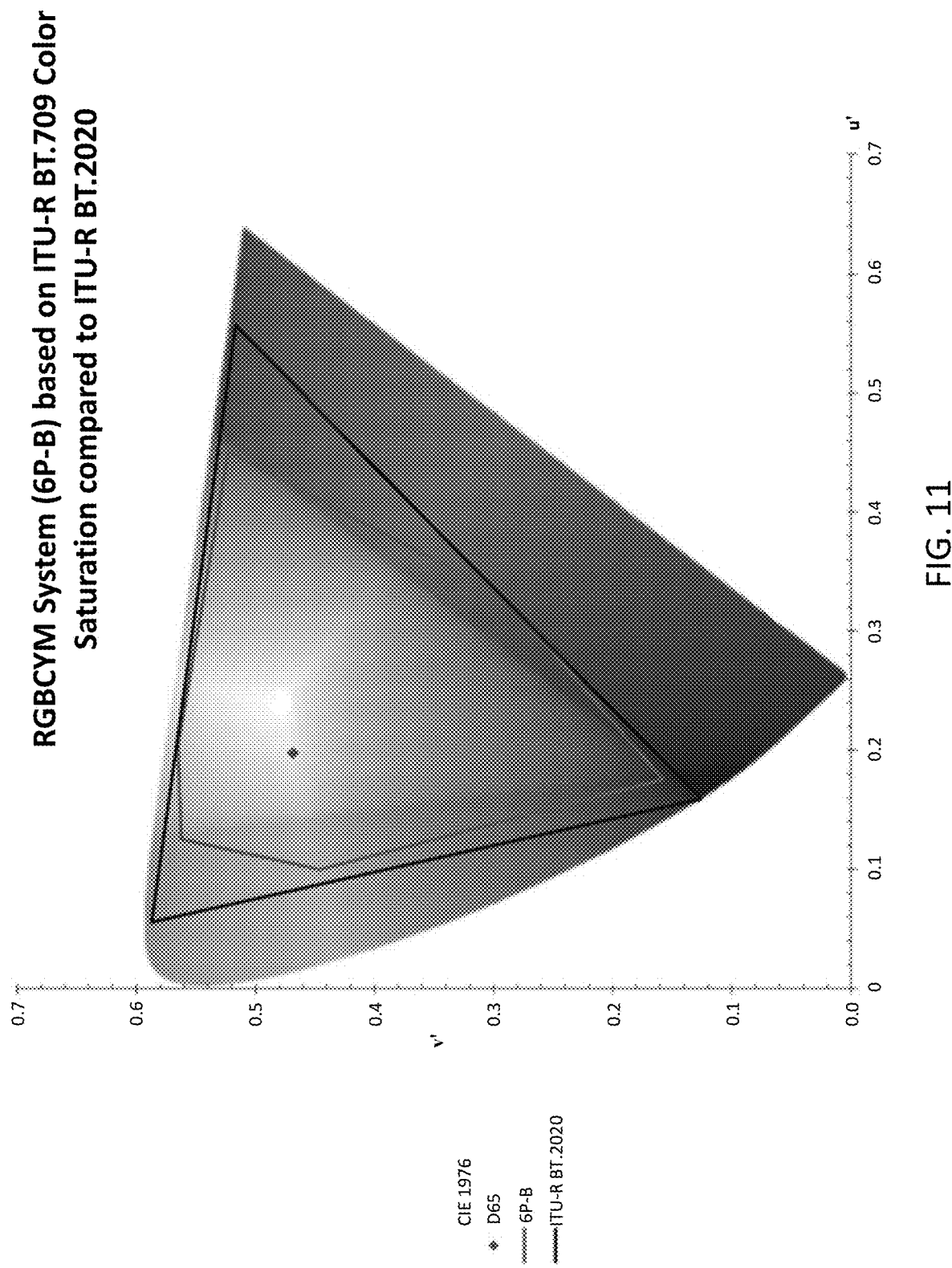
FIG. 11 illustrates a RGBCYM system based on ITU-R BT.709 color saturation compared to ITU-R BT.2020.

FIG. 11 illustrates a RGBCYM system based on ITU-R BT.709 color saturation compared to ITU-R BT.2020. While the ITU-R BT.2020 system covers a larger volume, the six-primary color system benefits from a more repeatable color sensation between viewers. This repeatability makes a six-primary color system advantageous over non six-primary color systems.

White Point Designation

With any three-primary color system, the white point is a separate consideration regardless of color gamut. This is true in that saturation, dominant wavelength, and complementary wavelength are defined between two coordinates, white point and color primary. In a six-primary color system, this becomes more complicated. Hue angles for CYM are provided as the inverse vector of RGB (180° hue angle). Therefore, saturation changes must be defined through a three-part coordinate system. Additionally, in order for the system to function correctly, the white point should lie on a line drawn between two inverted primary colors. Thus, selection of D65 for a SMPTE RP431-2 gamut will not track. The same is true if there is a need to use the SMPTE ST431-1 standard white point.

The Society of Motion Picture and Television Engineers (SMPTE) is a global professional association of engineers, technologists, and executives working in the media and entertainment industry. The SMPTE has more than 800 standards, recommended practices, and engineering guidelines for broadcast, filmmaking, digital cinema, audio recording, information technology (IT), and medical imaging.

Specific primary positions related to that white point are used to implement this change. Each set of primaries now have a direct corresponding white point that is no longer a variable. There are three white points normally used for production. These are D65, D60, and the white point designated in SMPTE ST431-1. In another embodiment, the system uses a P3D65 white point. The SMPTE standard white point does not have a CIE/ISO spectral description, only a coordinate designation. D65 is described in spectral terms in CIE/ISO 11664-2 and formally in ISO 10526-1991. D60 is derived by linear interpolation based on the D65 spectral standard as:

$$x_{D60} = 0.244,063 + 0.09911\frac{10^3}{60} + 2.967,8\frac{10^6}{60^2} - 4.607,0\frac{10^9}{60^3},$$

$$y_{D60} = -3.000 x_{D60}^2 + 2.870 x_{D60} - 0.275$$

These two white points are designated as D65 for television production and D60 for film production. Thus, one separate set of color primaries is designated for each application and each system has one individual matrix solution. TABLE 1 is the color space for D65 white point, which assumes ITU-R BT.709 saturation. TABLE 2 is the color space for D60 white point, which uses SMPTE RP431-2 saturation.

TABLE 1

Color space for D65 white point

| Color | u' | v' | $\lambda_D$ |
|---|---|---|---|
| White | 0.1978 | 0.4683 | — |
| Red | 0.4507 | 0.5229 | 610 nm |
| Green | 0.125 | 0.5625 | 552 nm |
| Blue | 0.1754 | 0.1579 | 464 nm |
| Yellow | 0.204 | 0.565 | 571 nm |
| Cyan | 0.100 | 0.446 | 491 nm |
| Magenta | 0.330 | 0.293 | Combined red & blue |

TABLE 2

Color space for D60 white point

| Color | u' | v' | $\lambda_D$ |
|---|---|---|---|
| White | 0.2010 | 0.4740 | — |
| Red | 0.4964 | 0.5256 | 617 nm |
| Green | 0.0098 | 0.5777 | 543 nm |
| Blue | 0.1754 | 0.1579 | 464 nm |
| Yellow | 0.2078 | 0.5683 | 571 nm |

TABLE 2-continued

Color space for D60 white point

| Color | u' | v' | $\lambda_D$ |
|---|---|---|---|
| Cyan | 0.0960 | 0.4540 | 492 nm |
| Magenta | 0.3520 | 0.3200 | Combined red & blue |

Adding Three More Color Primaries within SMPTE RP431-2 Spaces

In one embodiment, the system is designed using the saturation and hue design from SMPTE RP431-2 ("6P-C"). What results is a system where the saturation levels are equal to what is used for digital cinema. Both the color gamut and the white point require modification. Since the white point is changed from D65 to D60, the saturation values and hue angles change to the following:

$S_{RED}$=3.90028 $H_{RED}$=170.160
$S_{GREEN}$=1.88941 $H_{GREEN}$=45.3515°
$S_{BLUE}$=4.12608 $H_{BLUE}$=85.4272°

Figure 12:
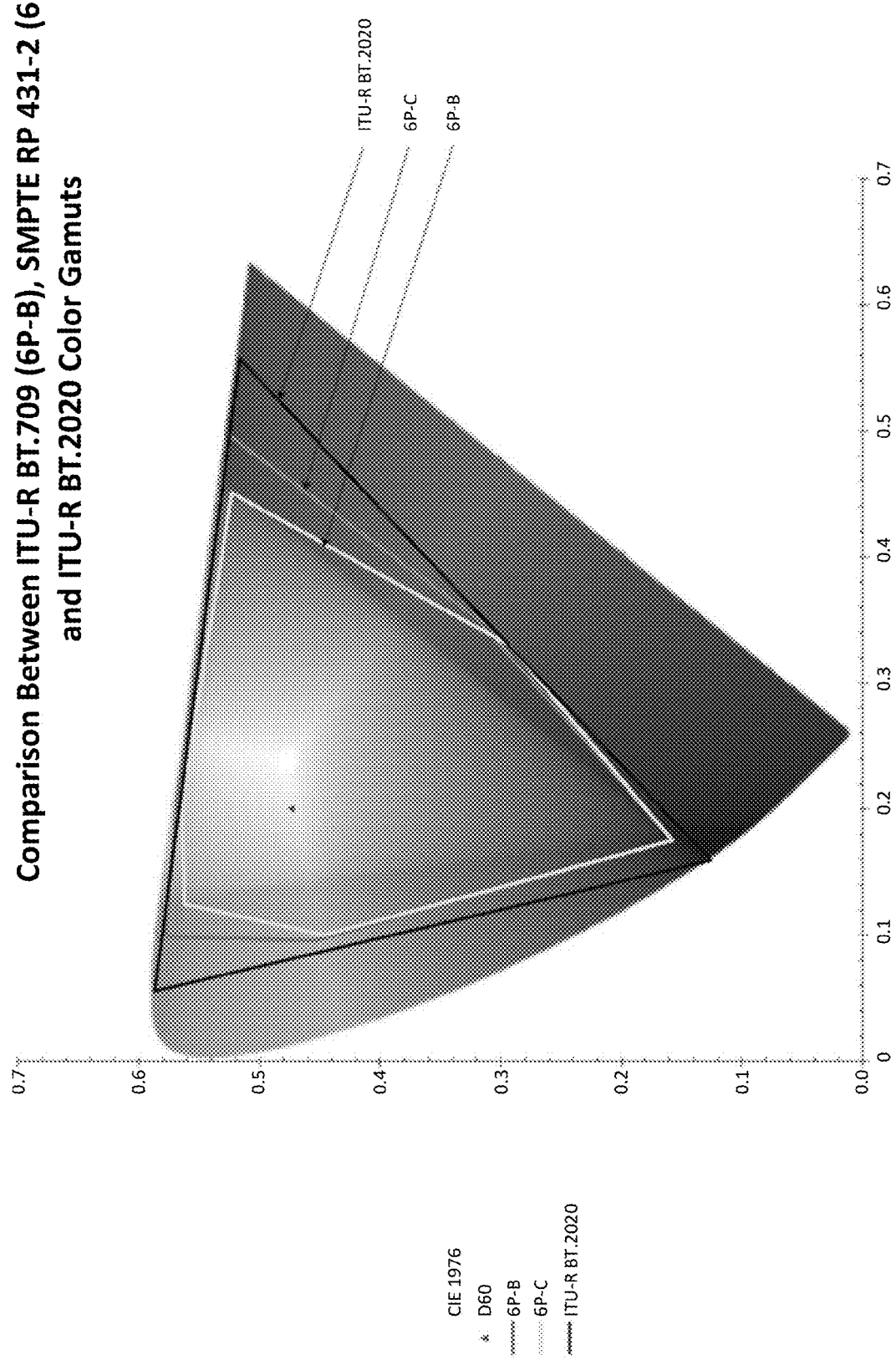
FIG. 12 illustrates a comparison between ITU-R BT.709, SMPTE RP431-2, and ITU-R BT.2020 color gamuts.

FIG. 12 illustrates a comparison between ITU-R BT.709, SMPTE RP431-2, and ITU-R BT.2020 color gamuts. The illustration uses a D60 white point value. In one embodiment, the six-primary color system uses a D65 white point value.

Figure 13:
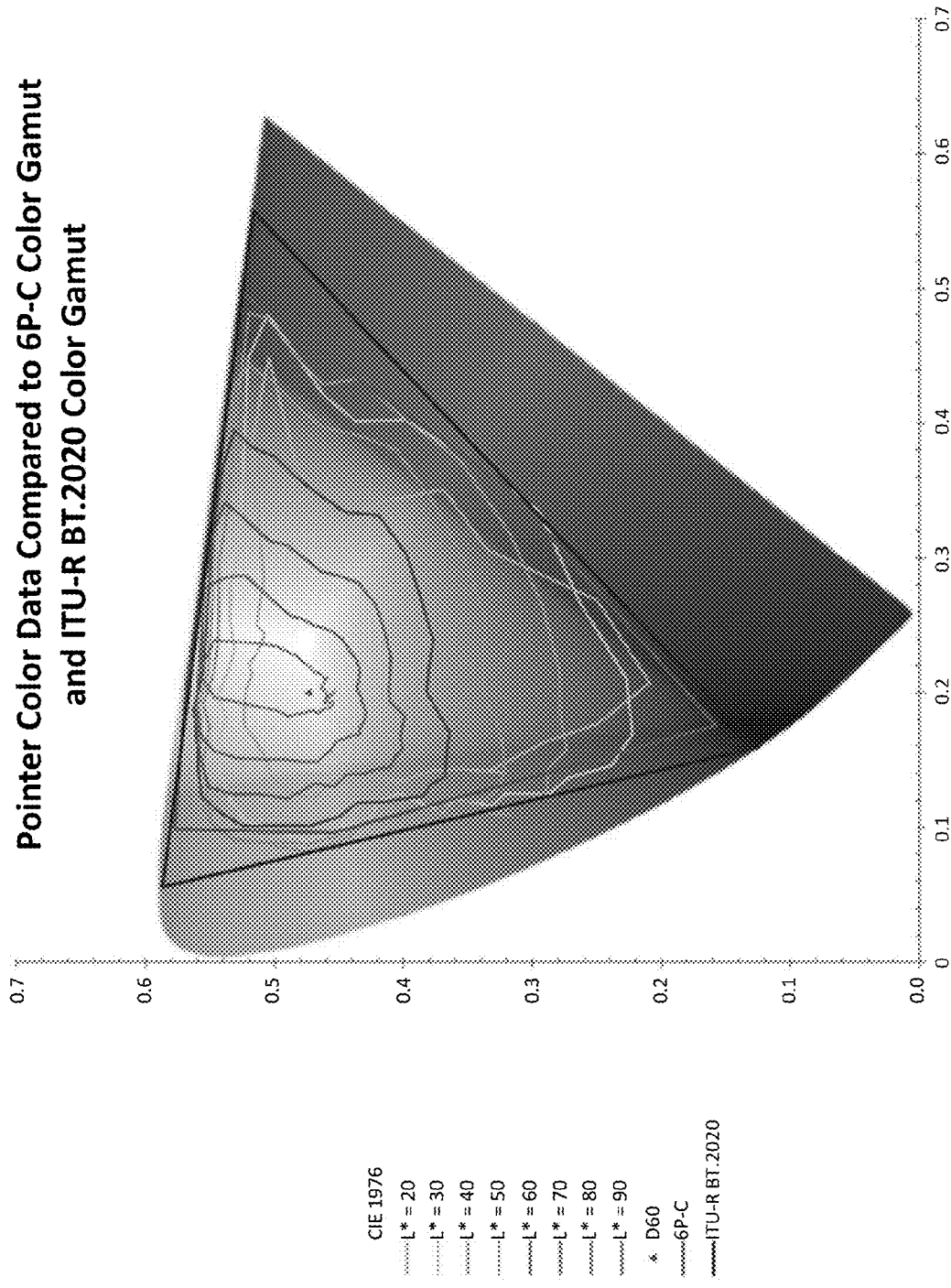
FIG. 13 illustrates the Pointer color data set with a six-primary color system based on SMPTE RP431-2 saturation and ITU-R BT.2020 superimposed.

FIG. 13 illustrates the Pointer color data set with a six-primary color system based on SMPTE RP431-2 saturation and ITU-R BT.2020 superimposed. The red triangle is the white point, which is a D60 white point. In another embodiment, the white point is a D65 white point.

Transfer Functions

The system design minimizes limitations to use standard transfer functions for both encode and/or decode processes. Current practices used in standards include, but are not limited to, ITU-R BT.1886, ITU-R BT.2020, SMPTE ST274, SMPTE ST296, SMPTE ST2084, and ITU-R BT.2100. These standards are compatible with this system and require no modification.

Acquisition

The development of a six-primary color system is not practical if the only part of the system that supports the added primaries is within the display itself. There is a need for the ability to acquire, transport, and store images as a six-primary color system. One aspect that will support a six-primary color system is the camera.

In one embodiment, modifications are made to an existing wide gamut camera. In one embodiment, RAW images are converted from an existing camera to six channels. In one embodiment, optical modifications are made to a single imager camera by using new filters. In another embodiment, signal inversion in a single imager camera is performed. In another embodiment, modifications are made to a six-imager camera.

Figure 14:
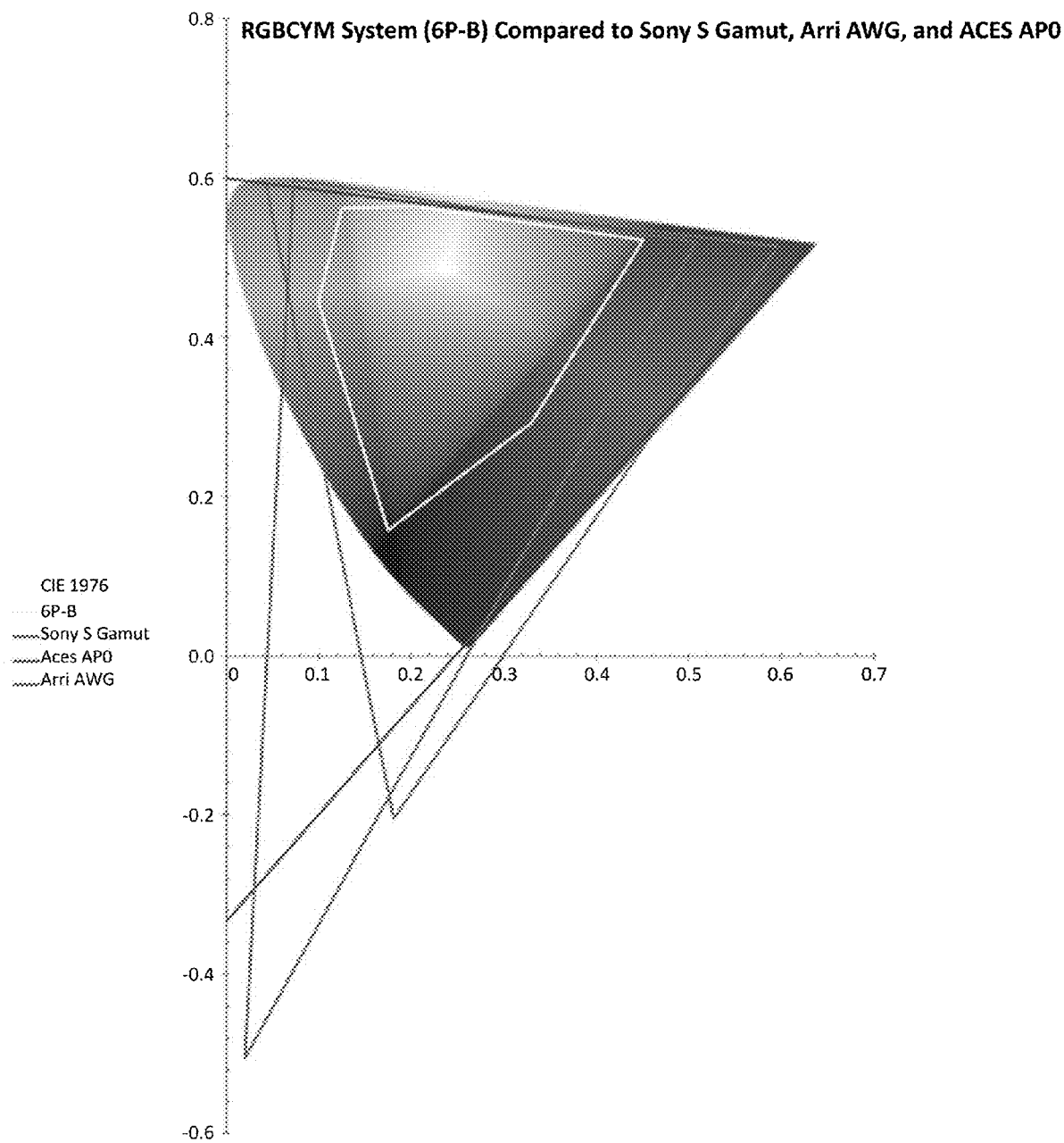
FIG. 14 illustrates a RGBCYM system compared to a Sony S gamut, Arri AWG, and ACES APO.

FIG. 14 illustrates a system in which modifications have been made to an existing wide gamut camera. The current large format single imager camera sensors generally have capability to capture all colors that can be seen by the human vision system, albeit with some error. This is done using wide bandpass optical filters combined with the design of the imager photoconductor. In this system, all six primary points are covered by most acquisition technologies. Since these cameras supporting RAW output are already in use, they can serve as entry points into six-primary color system workflows.

In one embodiment, the optical filter is an absorptive optical filter. Absorptive filters have a coating of different organic and inorganic materials that absorb certain wavelengths of light, thus allowing the desired wavelengths to pass through. Since they absorb light energy, the temperature of these filters increases during operation. Absorptive filters are simple filters and are added to plastics to make less-costly filters than glass-based counterparts. The operation of absorptive filters does not depend on the angle of the incident light but on the properties of the material that makes up the filter.

In one embodiment, the optical filter is a dichroic filter. Dichroic filters consist of a series of optical coatings with precise thicknesses that are designed to reflect unwanted wavelengths and transmit the desired wavelength range. This is achieved by causing the desired wavelengths to interfere constructively on the transmission side of the filter, while other wavelengths interfere constructively on the reflection side of the filter.

In one embodiment, the optical filter is a short pass filter. Short pass filters allow shorter wavelengths than the cut-off wavelength to pass through, while it attenuates longer wavelengths. In one embodiment, the optical filter is a long pass filter. Long pass filters transmit longer wavelengths than the cut-on wavelength while blocking shorter wavelengths. In another embodiment, the optical filter is a band pass filter. Band pass filters let a particular range, or "band", of wavelengths to go through, but attenuate all wavelengths around the band. In another embodiment, the optical filter is a multi-bandpass filter. In another embodiment, the optical filter is a multi-band dichroic beam splitter.

In one embodiment, the optical filter is a neutral density (ND) filter. ND filters are used in imaging and laser applications where excessive light can be damaging to camera sensors or other optical components. ND filters also prevent excessive light from causing inaccurate results in photometer applications.

In another embodiment, the optical filter is a machine vision filter. Machine vision filters are designed to improve image quality and contrast in imaging and other machine vision applications. Machine vision filters are used to increase or decrease color temperature, block unwanted ultraviolet or infrared light, reduce overall light transmittance, and transmit light of a specific polarization state.

In another embodiment, the optical filter is a notch filter. Notch filters are used in spectroscopy, confocal and multi-photon microscopy, laser-based fluorescence instrumentation, and other life science applications. Notch filters are filters that selectively reject a portion of the spectrum, while transmitting all other overall wavelengths.

Figure 15:
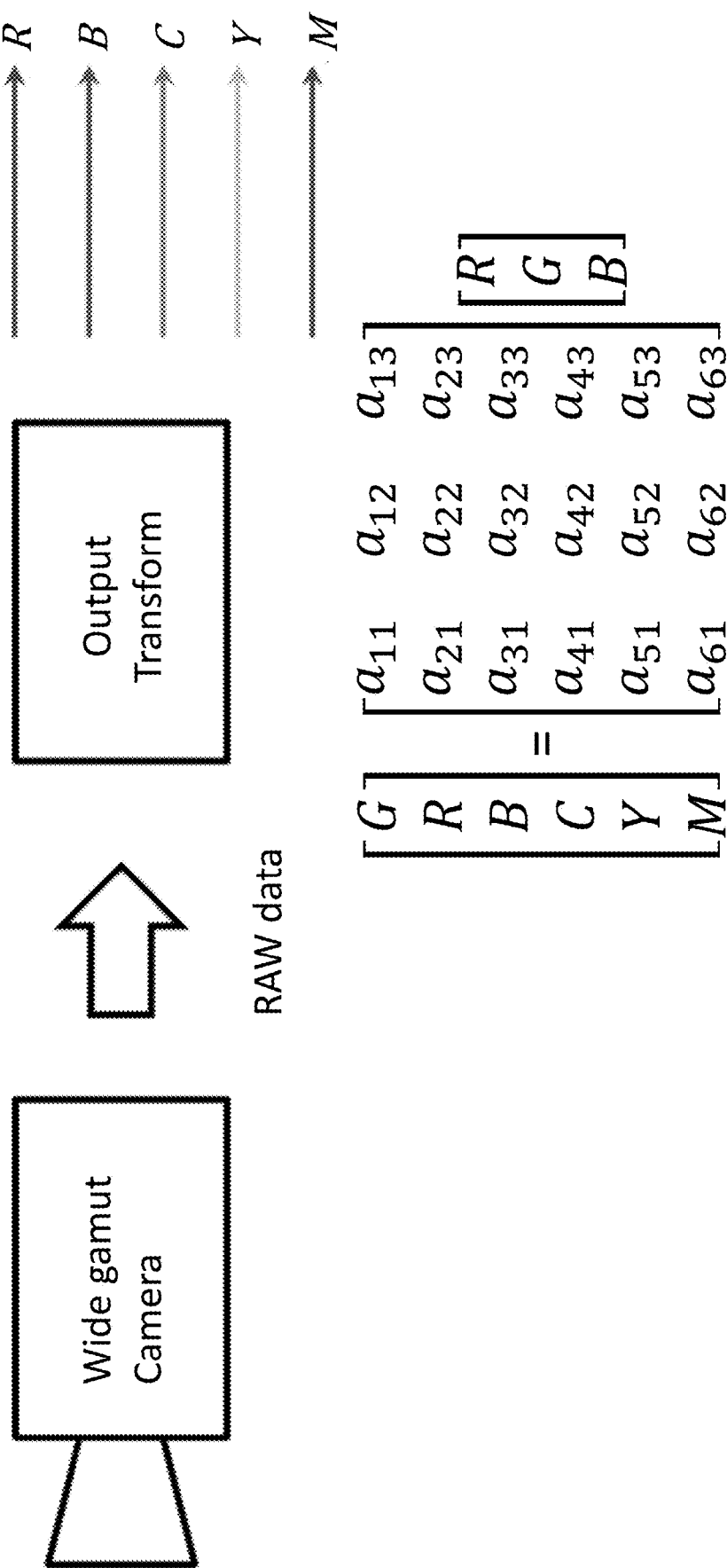
FIG. 15 illustrates the workflow to use a six-primary color system using a new input transfer transform.

FIG. 15 illustrates the workflow to use a six-primary color system using a new input transfer transform. This new input transfer transform maps the full RAW signals down to six-primary color signals. In one embodiment, RAW data captured from a wide gamut camera is received by an output transform, wherein the output transform maps the RAW data signals down to six-primary color signals.

Figure 16A:
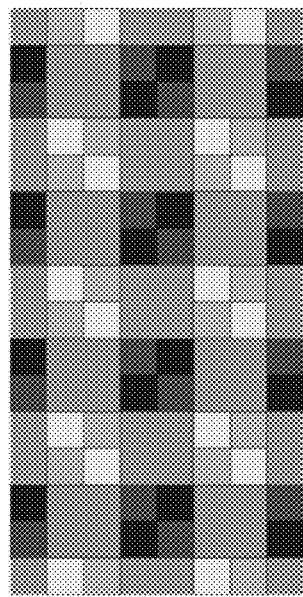
FIG. 16A illustrates a mosaic filter configuration using a magenta filter for the present invention.
Figure 16B:
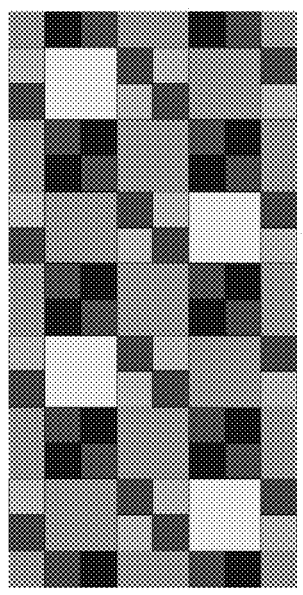
FIG. 16B illustrates a mosaic filter configuration not using a magenta filter for the present invention.

FIG. 16A and FIG. 16B illustrate the use of two mosaic filter configurations of the present invention. In one embodiment, a Bayer pattern optical filter modified using a magenta filter is used. In another embodiment, a Bayer pattern optical filter not using a magenta filter is used, wherein the magenta element will be calculated later in the process by a serial data decoder. Difference in size of the yellow and green elements can be used to increase camera sensitivity.

Figure 17:
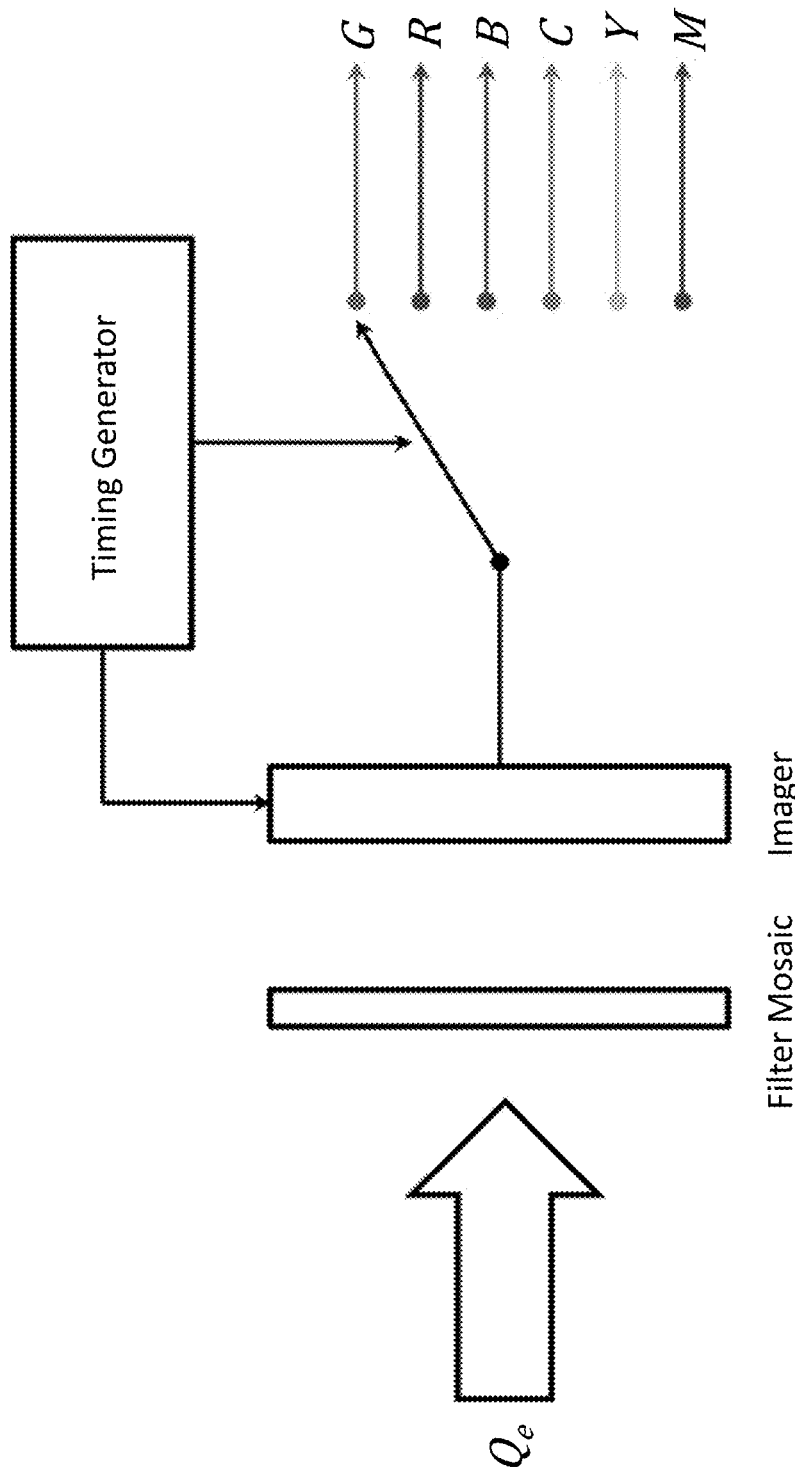
FIG. 17 illustrates an expansion to the demuxing process to handle the placement of additional color elements.

FIG. 17 illustrates an expansion to the demuxing process to handle the placement of additional color elements. The camera demuxing process handles placement of the additional color elements by changing the imager timing generator and modifying demuxing switching at the imager output. Timing involves a simple sequence based on which color exited the imager and switching to the correct color processing path.

TABLE 3 compares the number of pixels required for different systems.

TABLE 3

| System | H Resolution | V Resolution | Native Sub Pixel Count | Bayer Sub Pixel Count |
|---|---|---|---|---|
| 2K RGB | 2048 | 1080 | 6,635,520 | 4,804,608 |
| 2K RGBCY | 2048 | 1080 | 11,059,200 | 8,007,680 |
| 2K RGBCYM | 2048 | 1080 | 12,509,184 | 9,609,216 |
| 4K RGB | 4096 | 2160 | 26,542,080 | 19,906,560 |
| 4K RGBCY | 4096 | 2160 | 44,236,800 | 33,177,600 |
| 4K RGBCYM | 4096 | 2160 | 53,084,160 | 39,813,120 |

Signal Inversion in a Single Imager Camera

Figure 18:
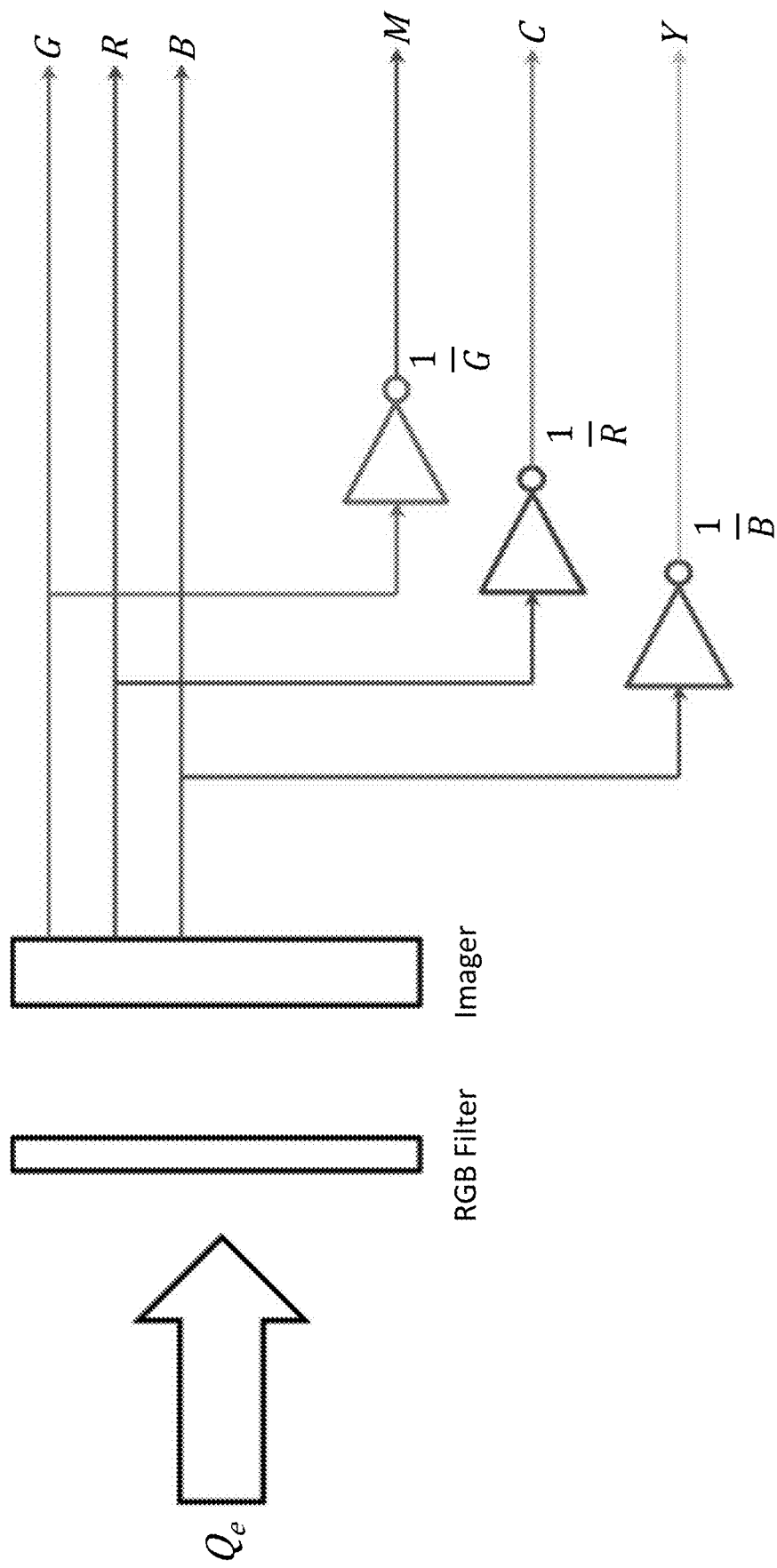
FIG. 18 illustrates a signal inversion process in a single imager camera.

FIG. 18 illustrates a signal inversion process in a single imager camera. In some applications, the use of a low-cost, low-weight, and/or smaller size camera is required. Devices included in these categories include, but are not limited to, home movies, a cell phone, a tablet computing device, and/or a remote camera. These applications have limits which do not support high-quality optics or processing. In one embodiment, a six-primary color system for these applications inverts the RGB signals, which become the CYM color components. In such an embodiment, all color components have equal saturation values and 180° hue angles. Issues with gamma tracking and white point designation are eliminated.

Six Imager Camera

In one embodiment, a device in network communication with multiple sensors is used. Situations requiring a device in network communication with multiple sensors include, but are not limited to, recording quick movements within an image, high-speed photography, and/or recording and/or capturing live events. The main component of such a system is a glass prism which distributes images from the lens to each sensor.

Figure 19:
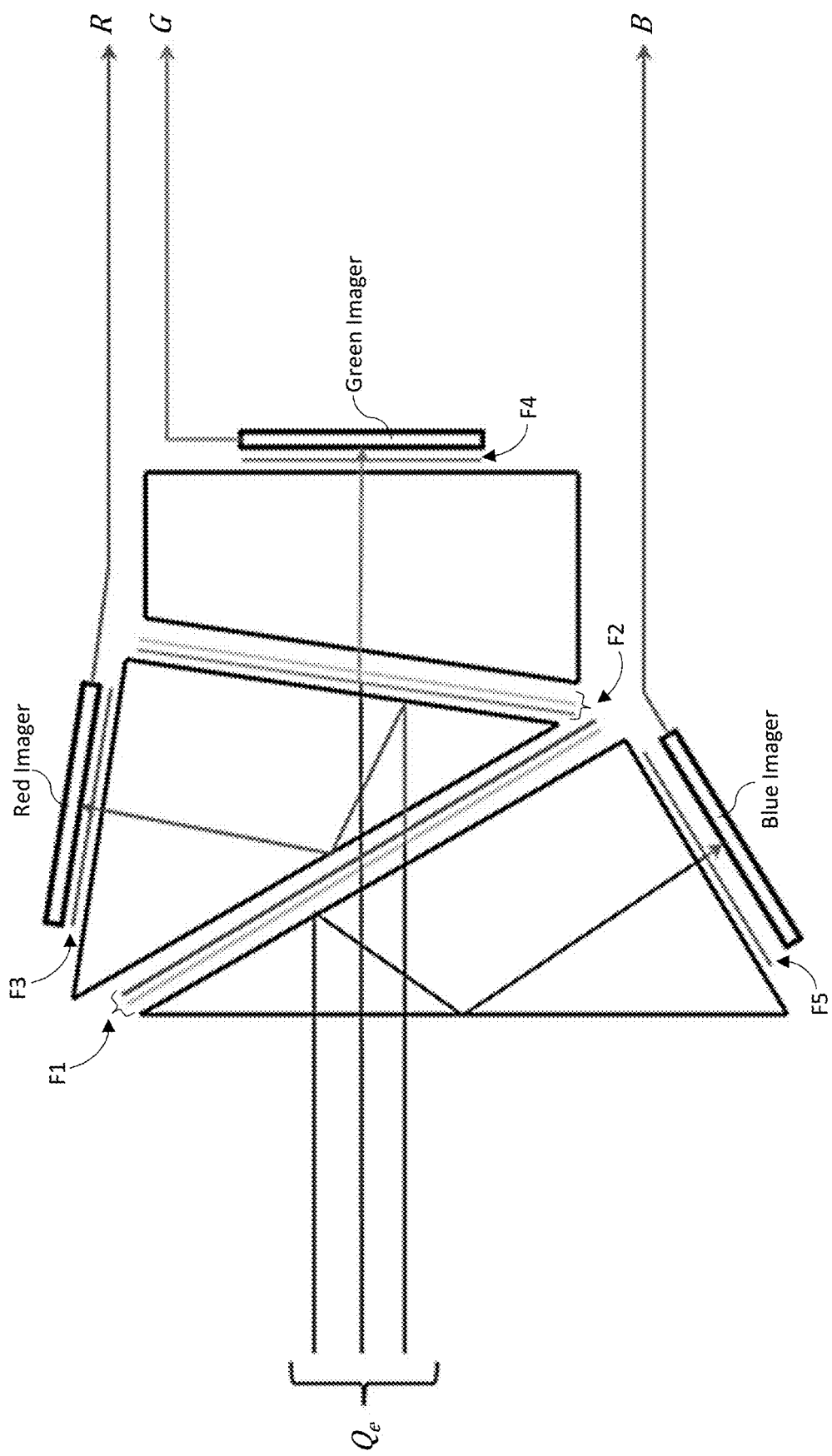
FIG. 19 illustrates a prism made up of three glass elements and two dichroic filters.

FIG. 19 illustrates a prism made up of three glass elements and two dichroic filters. In one embodiment, the glass prism is comprised of three glass elements and two dichroic filters. In one embodiment, the glass prism is comprised of three glass elements, two dichroic filters, and at least one trim filter, wherein the at least one trim filter is mounted in front of each sensor. TABLE 4 lists filters and operations for each filter as shown in FIG. 19.

TABLE 4

| Filter | Operation |
|---|---|
| F1 | Reflect and reject blue |
| F2 | Reflect and reject red |
| F3 | Trim red component |
| F4 | Trim green component |
| F5 | Trim blue component |

Figure 20:
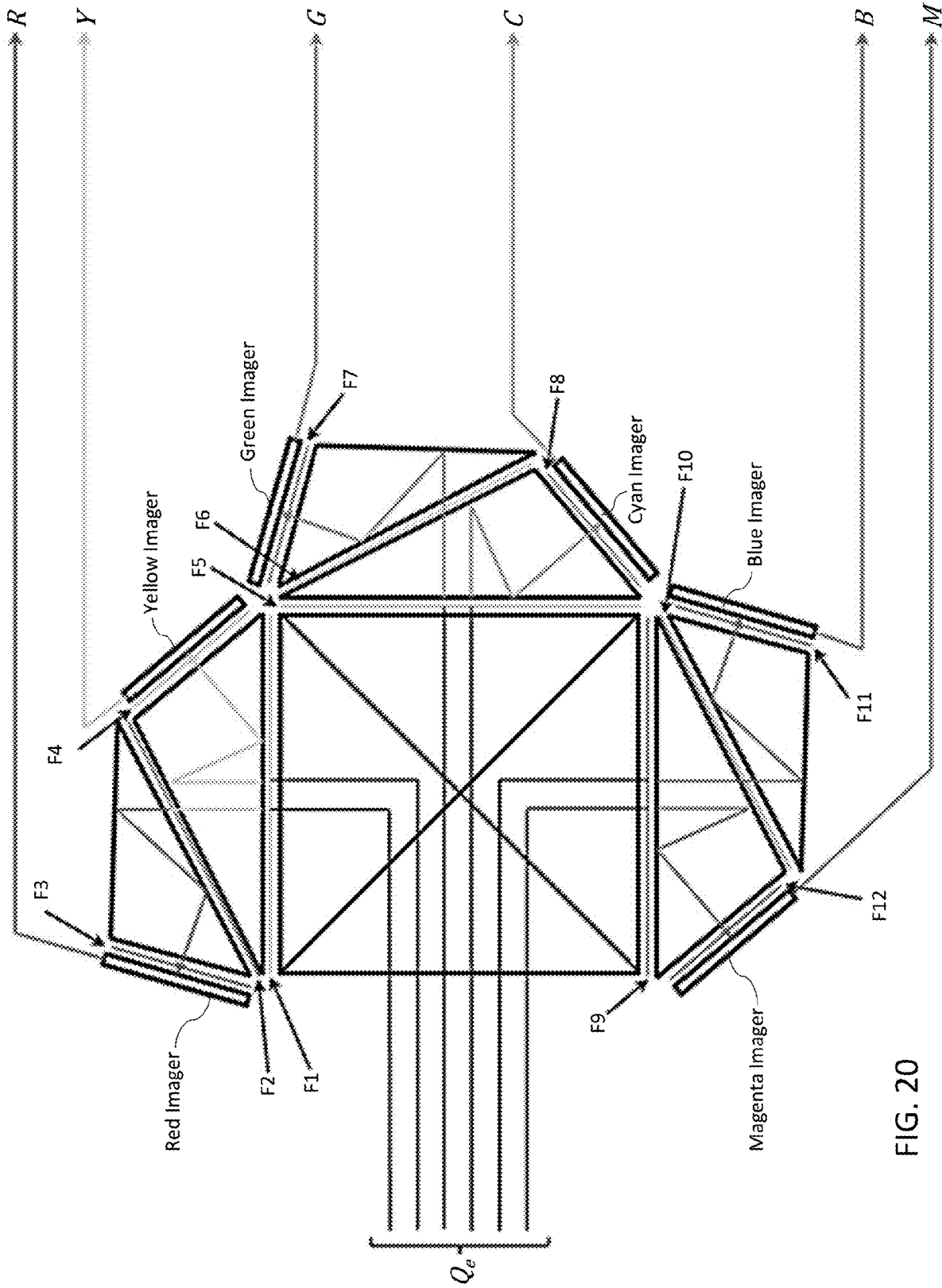
FIG. 20 illustrates a prism design for a six-imager camera for use in a six-primary color system.

FIG. 20 illustrates a new prism design for a six-primary color system. The optics distribute six-primary color components without distortion and/or mirror artifacts. Reflections and/or flare within the glass elements are minimized, and light is passed through the prism more efficiently than a traditional three-primary color system. The delay of light passing through the new optical block is equal between color paths, minimizing any group delays. In one embodiment, the main distribution optics is composed of a beam splitter cross prism. Faces at each junction in the cube are half-mirrored to direct the image to at least three outside flats.

Mounted to each of the at least three outside flats are a set of prisms which, used in combination with at least one optical filter, distribute light to the correct sensor. Sensors are mounted to the output of the appropriate prism face. With this design, a full image is distributed to all six sensors. Three filters (F1, F5, and F9) are used to reject any part of the spectrum not used by the related sensors. These are fairly wide in that each passes about $\frac{1}{3}^{rd}$ of the visual spectrum. Rejection filters (F2, F6, and F10) are used to split off the secondary color from the adjacent color primary. Trim filters (F3, F4, F7, F8, F11, and F12) are placed in front of each sensor to tune the spectrum for the correct response. TABLE 5 lists filters, colors, start, and stop for each filter as shown in FIG. 20.

TABLE 5

| Filter | Color | Start | Stop |
|---|---|---|---|
| F1 | R-Y | 630 nm | 540 nm |
| F2 | Y reject | | |
| F3 | R Trim | 620 nm | 600 nm |
| F4 | Y Trim | 595 nm | 545 nm |
| F5 | G-C | 600 nm | 470 nm |
| F6 | Cyan reject | | |
| F7 | G Trim | 580 nm | 540 nm |
| F8 | C Trim | 535 nm | 475 nm |
| F9 | M-B | 510 nm | 380 nm |
| F10 | Magenta reject | | |
| F11 | B Trim | 500 nm | 435 nm |
| F12 | M Trim | 445 nm | 395 nm |

In one embodiment, the set of prisms mounted to each of the at least three outside flats are a set of dichroic prisms. In another embodiment, the set of prisms mounted to each of the at least three outside flats are a set of trichroic prisms.

Packaging and Mapping Six Color Primaries

In one embodiment, the six-primary color system is compatible with legacy systems. A backwards compatible six-primary color system is defined by a sampling method. In one embodiment, the sampling method is 4:4:4. In one embodiment, the sampling method is 4:2:2. In another embodiment, the sampling method is 4:2:0. In one embodiment of a backwards compatible six-primary color system, new encode and decode systems are divided into the steps of performing base encoding and digitization, image data stacking, mapping into the standard data transport, readout, unstacking, and image decoding ("System 1"). System 1 combines opposing color primaries within three standard transport channels and identifies them by their code value. In one embodiment of a backwards compatible six-primary color system, the processes are analog processes. In another embodiment of a backwards compatible six-primary color system, the processes are digital processes.

In one embodiment, the sampling method for a six-primary color system is a 4:4:4 sampling method. Black and white bits are redefined. Putting black at midlevel within each data word allows the addition of CYM color data.

Figure 21:
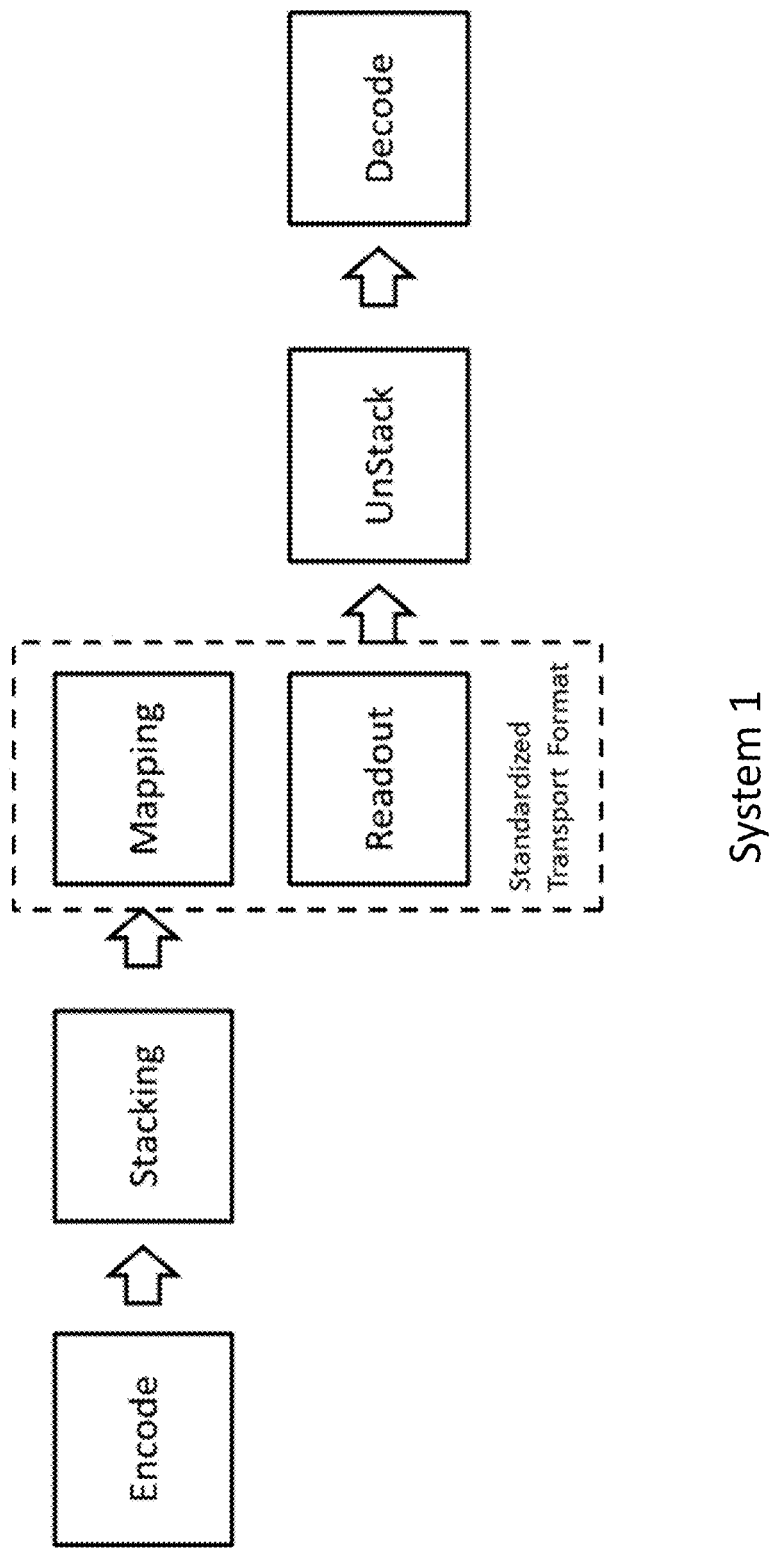
FIG. 21 illustrates an embodiment of an encode and decode system for a six-primary color system.

FIG. 21 illustrates an embodiment of an encode and decode system for a six-primary color system. In one embodiment, the six-primary color system encode and decode system is divided into a base encoder and digitation, image data stacking, mapping into the standard data transport, readout, unstack, and finally image decoding ("System 1"). The method of this system combines opposing color primaries within the three standard transport channels and identifies them by their code value. In one embodiment, the encode and decode for a six-primary color system are analog-based. In another embodiment, the encode and decode for a six-primary color system are digital-based.

Figure 22:
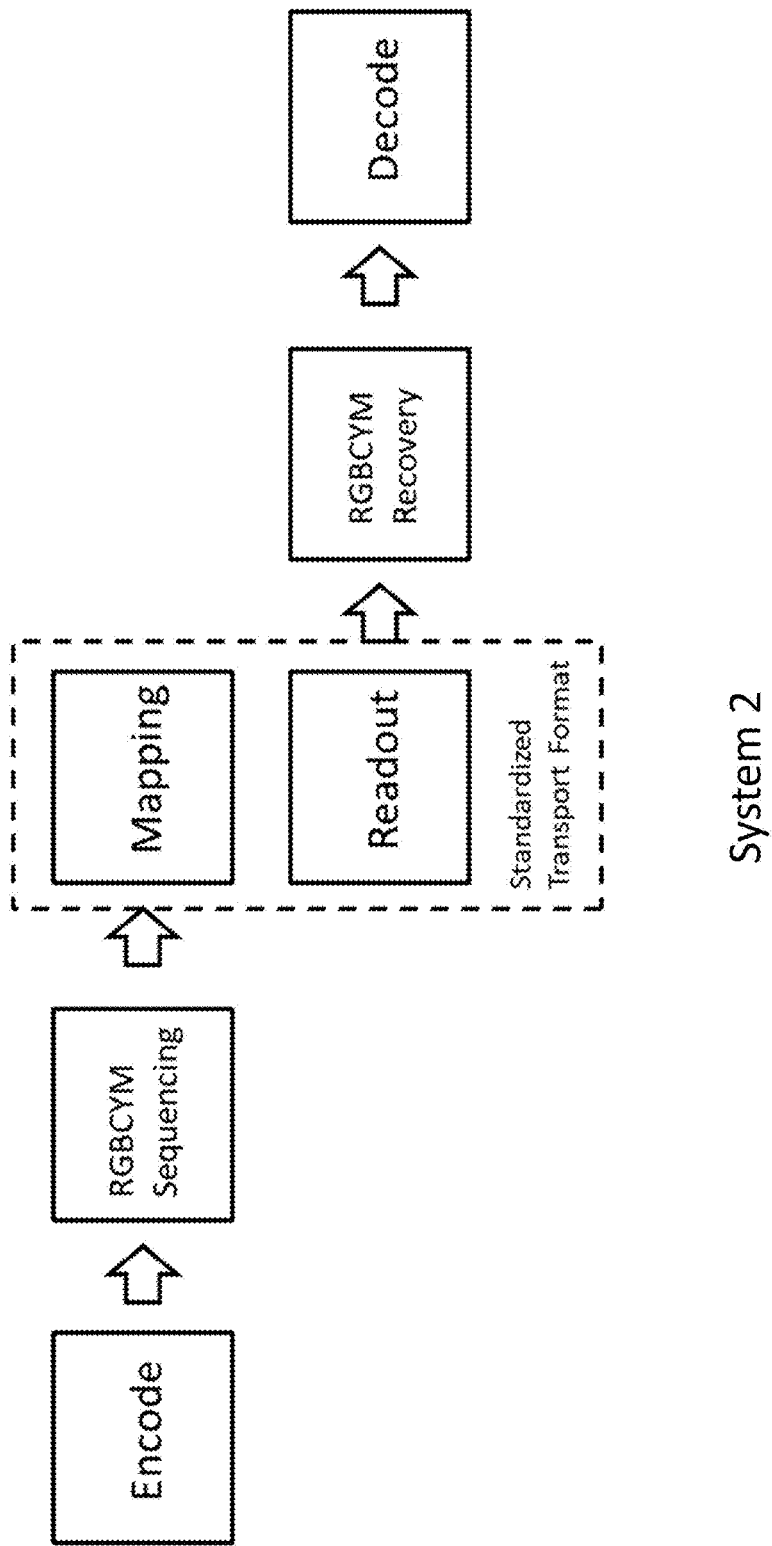
FIG. 22 illustrates a sequential method where three color primaries are passed to the transport format as full bit level image data and inserted as normal.

FIG. 22 illustrates a sequential method where three color primaries are passed to the transport format as full bit level image data and inserted as normal ("System 2"). The three additional channels are delayed by one pixel and then placed into the transport instead of the first colors. This method is useful in situations where quantizing artifacts is critical to image performance. In one embodiment, this system is comprised of six primaries (RGBCYM), a method to delay the CYM colors for injection, image resolution identification to all for pixel count synchronization, start of video identification, RGB delay, and for YCCCCC systems, logic to select the dominant color primary.

Six-Primary Color Encode Using a 4:4:4 Sampling Method

Figure 23:
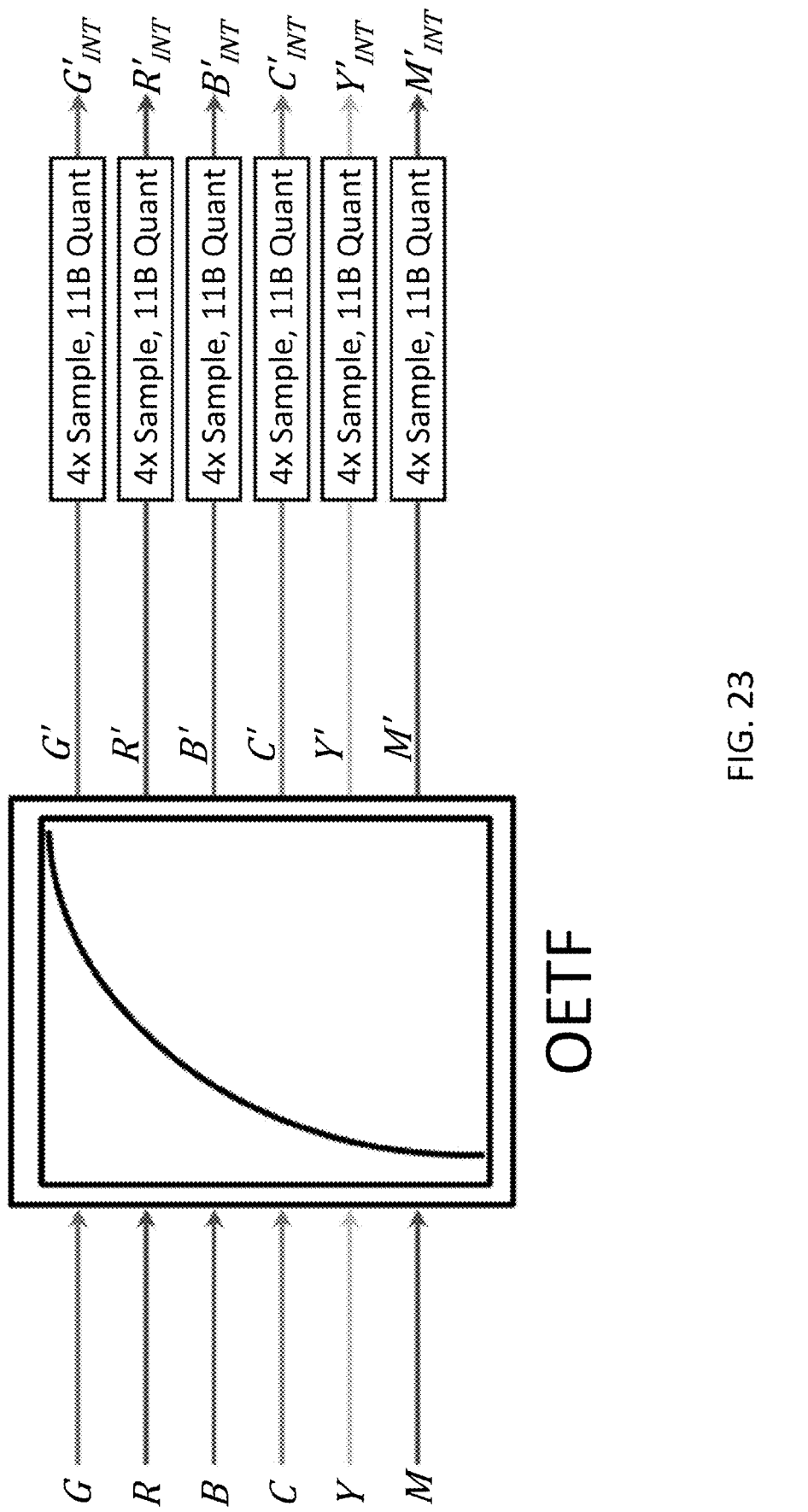
FIG. 23 illustrates one embodiment of a six-primary color system encode using a 4:4:4 sampling method.

FIG. 23 illustrates one embodiment of a six-primary color system encode using a 4:4:4 sampling method.

Current serial digital transport systems support 12 bits. Remapping six color components to a 12-bit stream is accomplished by lowering the bit limit to 11 bits (values 0 to 2047) for 12-bit serial systems or 9 bits (values 0 to 512) for 10-bit serial systems. This process is accomplished by processing RGBCYM video information through a standard Optical Electronic Transfer Function (OETF) (e.g., ITU-R BT.709-6), digitizing the video information as four samples per pixel, and quantizing the video information as 11-bit or 9-bit.

In another embodiment, the RGBCYM video information is processed through a standard Optical Optical Transfer Function (OOTF). In yet another embodiment, the RGBCYM video information is processed through a Transfer Function (TF) other than OETF or OOTF. TFs consist of two components, a Modulation Transfer Function (MTF) and a Phase Transfer Function (PTF). The MTF is a measure of the ability of an optical system to transfer various levels of detail from object to image. In one embodiment, performance is measured in terms of contrast (degrees of gray), or of modulation, produced for a perfect source of that detail level. The PTF is a measure of the relative phase in the image(s) as a function of frequency. A relative phase change of 180°, for example, indicates that black and white in the image are reversed. This phenomenon occurs when the TF becomes negative.

There are several methods for measuring MTF. In one embodiment, MTF is measured using discrete frequency generation. In one embodiment, MTF is measured using continuous frequency generation. In another embodiment, MTF is measured using image scanning. In another embodiment, MTF is measured using waveform analysis.

In one embodiment, the six-primary color system is for a 12-bit serial system. Current practices normally set black at bit value 0 and white at bit value 4095, for 12-bit video. In order to package six colors into the existing three-serial streams, the bit defining black is moved to bit value 2048. Thus, the new encode has RGB values starting at bit value 2048 for black and bit value 4095 for white and CYM values starting at bit value 2047 for black and bit value 0 as white. In another embodiment, the six-primary color system is for a 10-bit serial system.

Figure 24:
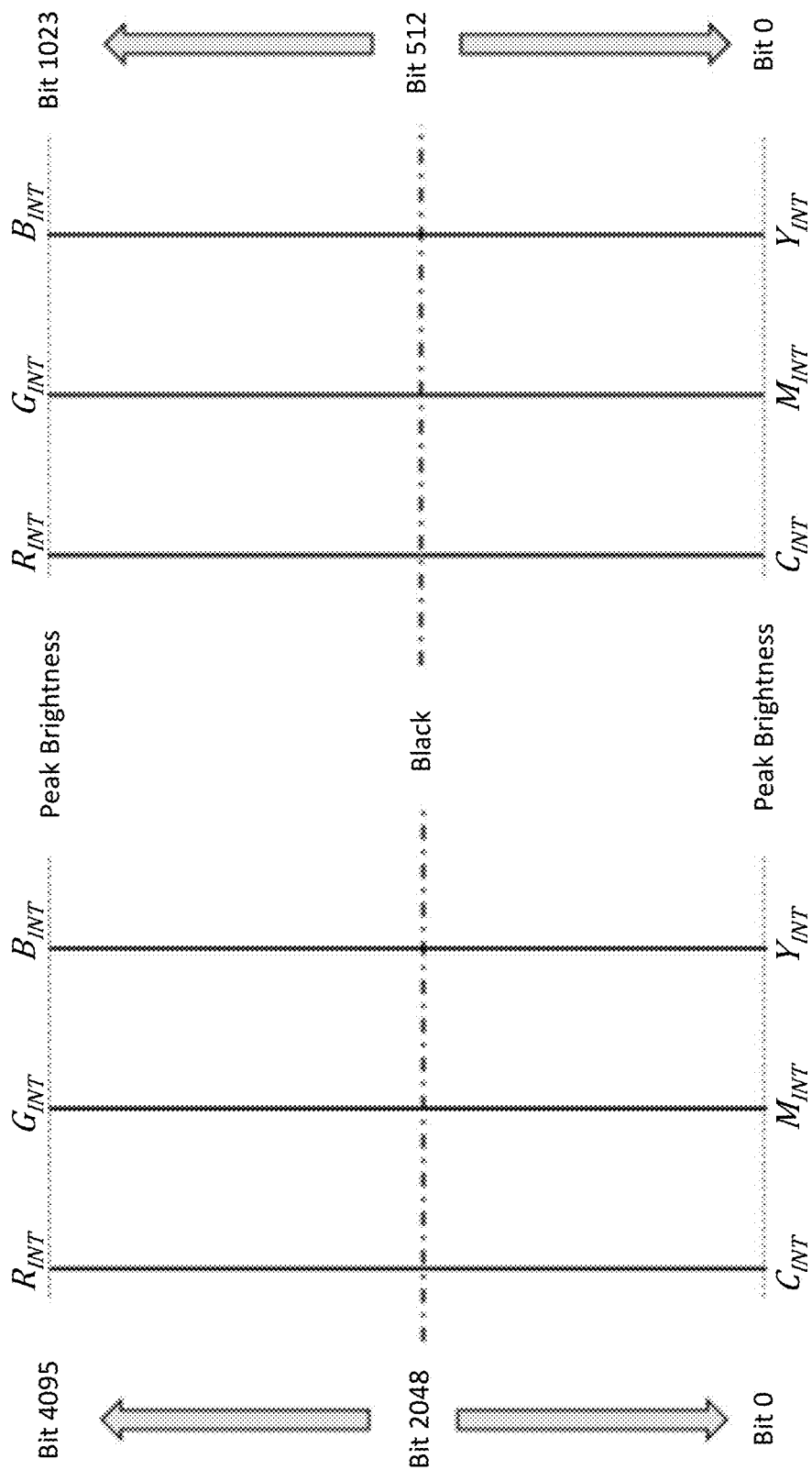
FIG. 24 illustrates one embodiment for a method to package six channels of primary information into the three standard primary channels used in current serial video standards by modifying bit numbers for a 12-bit SDI and a 10-bit SDI.
Figure 25:
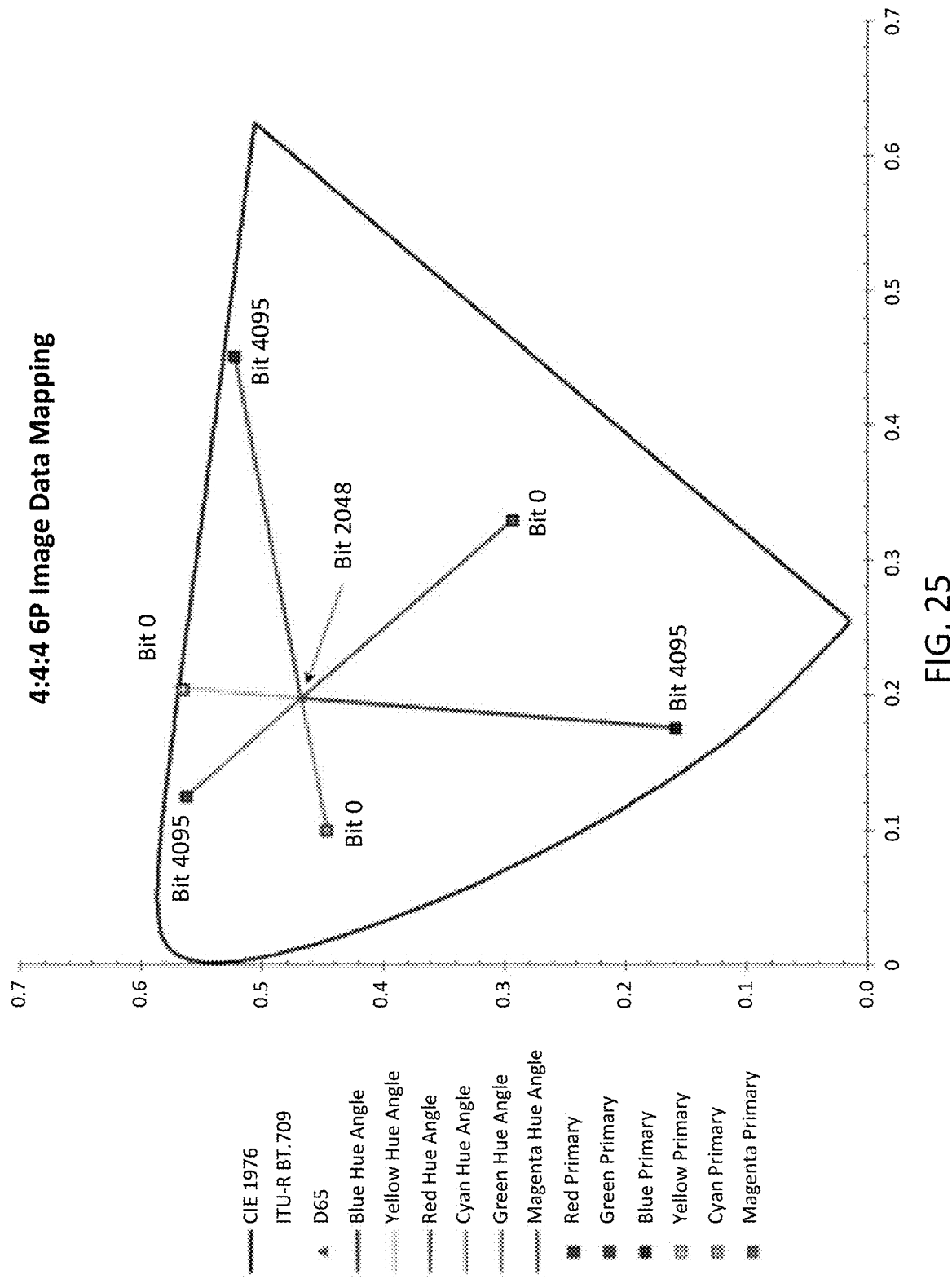
FIG. 25 illustrates a simplified diagram estimating perceived viewer sensation as code values define each hue angle.

FIG. 24 illustrates one embodiment for a method to package six channels of primary information into the three standard primary channels used in current serial video standards by modifying bit numbers for a 12-bit SDI and a 10-bit SDI. FIG. 25 illustrates a simplified diagram estimating perceived viewer sensation as code values define each hue angle. TABLE 6 and TABLE 7 list bit assignments for computer, production, and broadcast for a 12-bit system and a 10-bit system, respectively.

TABLE 6

| | 12-Bit Assignments | | | | | |
|---|---|---|---|---|---|---|
| | Computer | | Production | | Broadcast | |
| | RGB | CYM | RGB | CYM | RGB | CYM |
| Peak Brightness | 4095 | 0 | 4076 | 16 | 3839 | 256 |
| Minimum Brightness | 2048 | 2047 | 2052 | 2032 | 2304 | 1792 |

TABLE 7

| | 10-Bit Assignments | | | | | |
|---|---|---|---|---|---|---|
| | Computer | | Production | | Broadcast | |
| | RGB | CYM | RGB | CYM | RGB | CYM |
| Peak Brightness | 1023 | 0 | 1019 | 4 | 940 | 64 |
| Minimum Brightness | 512 | 511 | 516 | 508 | 576 | 448 |

In one embodiment, the OETF process is ITU-R BT.709-6. In one embodiment, the OETF process is ITU-R BT.709-5. In another embodiment, the OETF process is ITU-R BT.709-4. In yet another embodiment, the OETF process is ITU-R BT.709-3. In yet another embodiment, the OETF process is ITU-R BT.709-2. In yet another embodiment, the OETF process is ITU-R BT.709-1.

In one embodiment, the encoder is a non-constant luminance encoder. In another embodiment, the encoder is a constant luminance encoder.

Six-Primary Color Packing/Stacking Using a 4:4:4 Sampling Method

Figure 26:
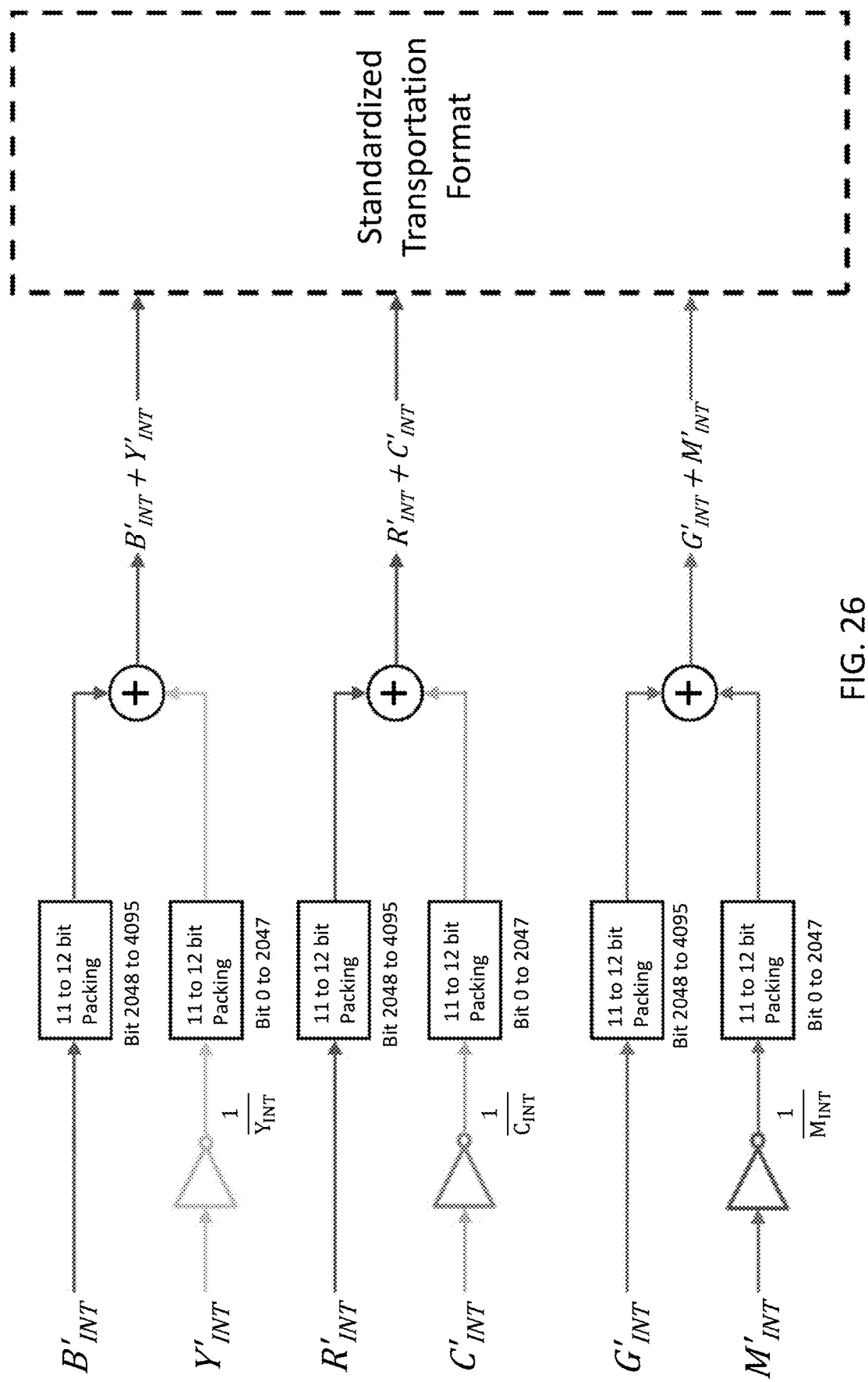
FIG. 26 illustrates one embodiment for a method of stacking/encoding six-primary color information using a 4:4:4 video system.

FIG. 26 illustrates one embodiment for a method of stacking/encoding six-primary color information using a 4:4:4 video system. Image data must be assembled according the serial system used. This is not a conversion process, but instead is a packing/stacking process. In one embodiment, the packing/stacking process is for a six-primary color system using a 4:4:4 sampling method.

Figure 27:
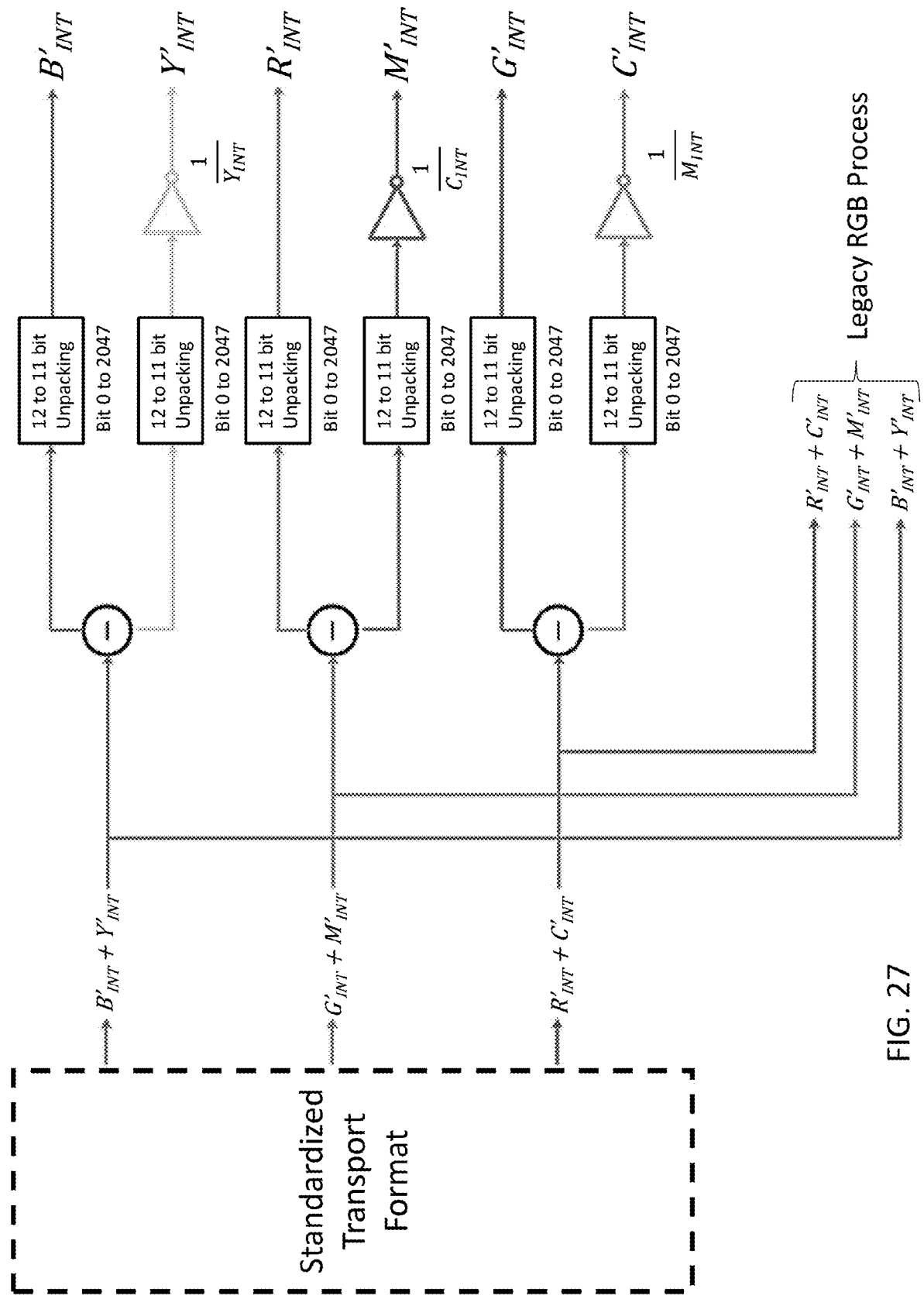
FIG. 27 illustrates one embodiment for a method of unstacking/decoding six-primary color information using a 4:4:4 video system.
Figure 28:
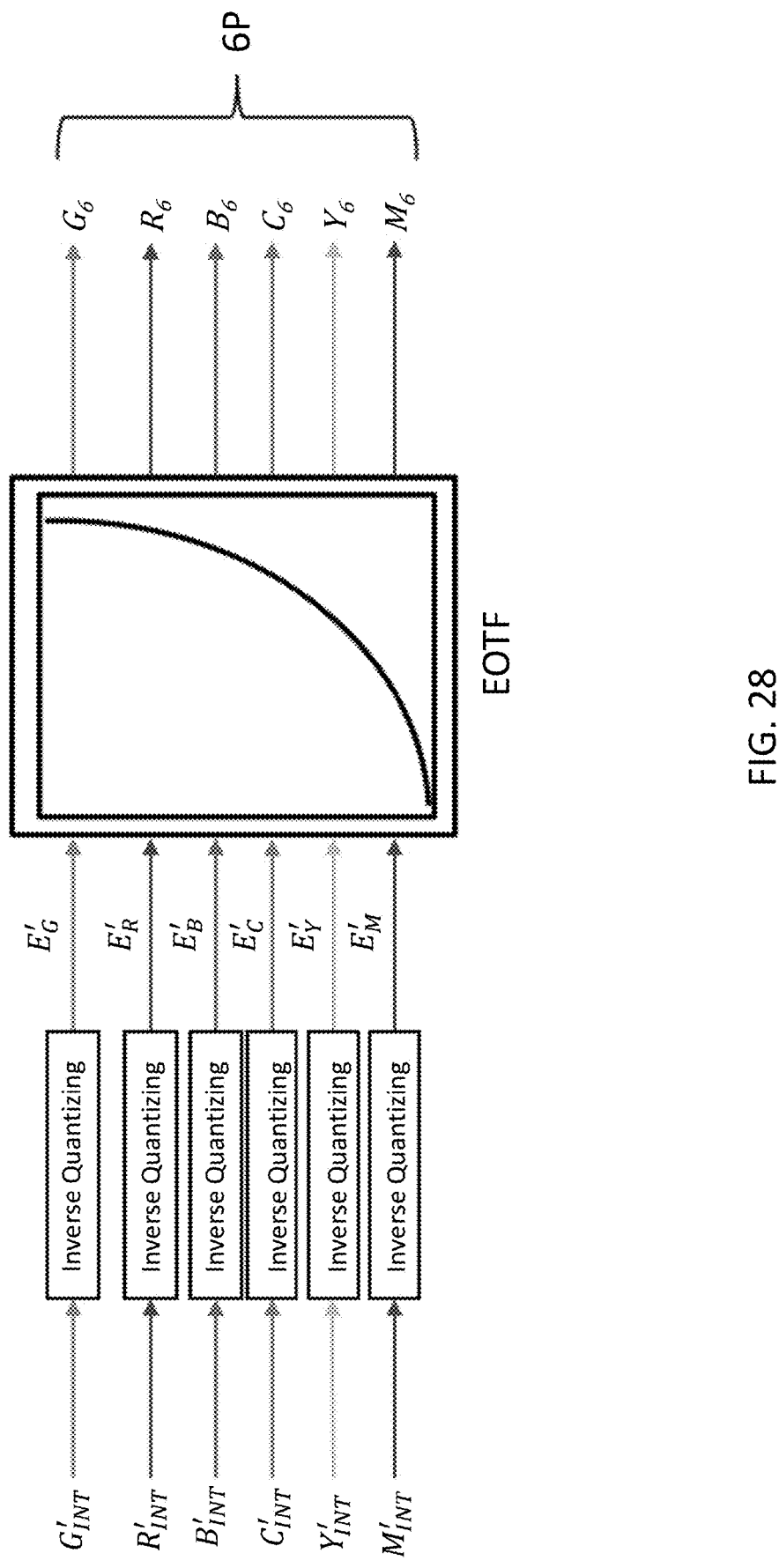
FIG. 28 illustrates one embodiment of a 4:4:4 decoder for a six-primary color system.

FIG. 27 illustrates one embodiment for a method of unstacking/decoding six-primary color information using a 4:4:4 video system. In one embodiment, the RGB channels and the CYM channels are combined into one 12-bit word and sent to a standardized transport format. In one embodiment, the standardized transport format is SMPTE ST424 SDI. In one embodiment, the decode is for a non-constant luminance, six-primary color system. In another embodiment, the decode is for a constant luminance, six-primary color system. In yet another embodiment, an electronic optical transfer function (EOTF) (e.g., ITU-R BT.1886) coverts image data back to linear for display. FIG. 28 illustrates one embodiment of a 4:4:4 decoder.

System 2 uses sequential mapping to the standard transport format, so it includes a delay for the CYM data. The CYM data is recovered in the decoder by delaying the RGB data. Since there is no stacking process, the full bit level video can be transported. For displays that are using optical filtering, this RGB delay could be removed and the process of mapping image data to the correct filter could be eliminated by assuming this delay with placement of the optical filter and the use of sequential filter colors.

Figure 93:
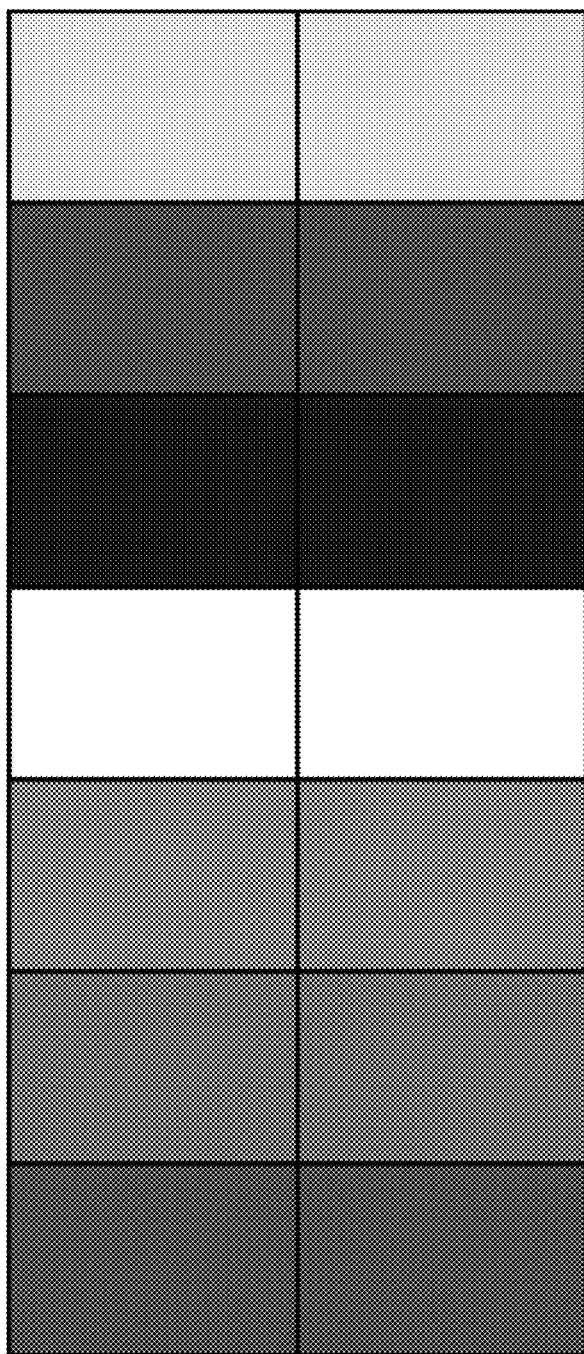
FIG. 93 illustrates one embodiment of an optical filter.
Figure 94:
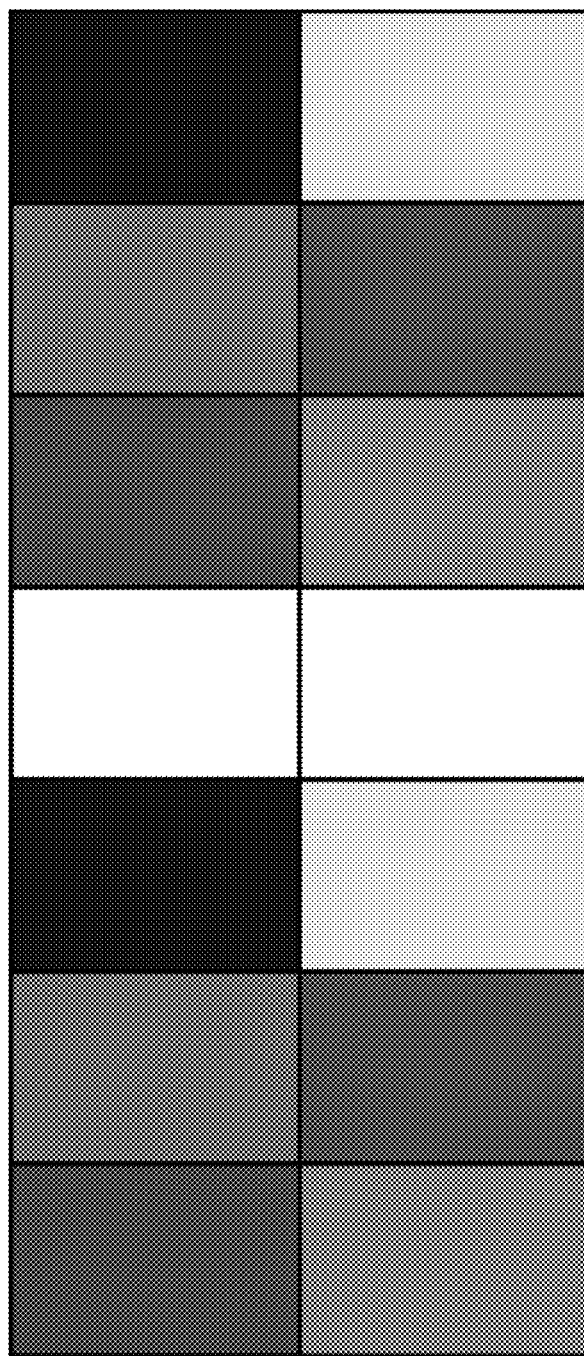
FIG. 94 illustrates another embodiment of an optical filter.

Two methods can be used based on the type of optical filter used. Since this system is operating on a horizontal pixel sequence, some vertical compensation is required. This can be either as a line double repeat using the same RGBCYM data to fill the following line as shown in FIG. 93, or could be separated as RGB on line one and CYM on line two as shown in FIG. 94.

Figure 29:
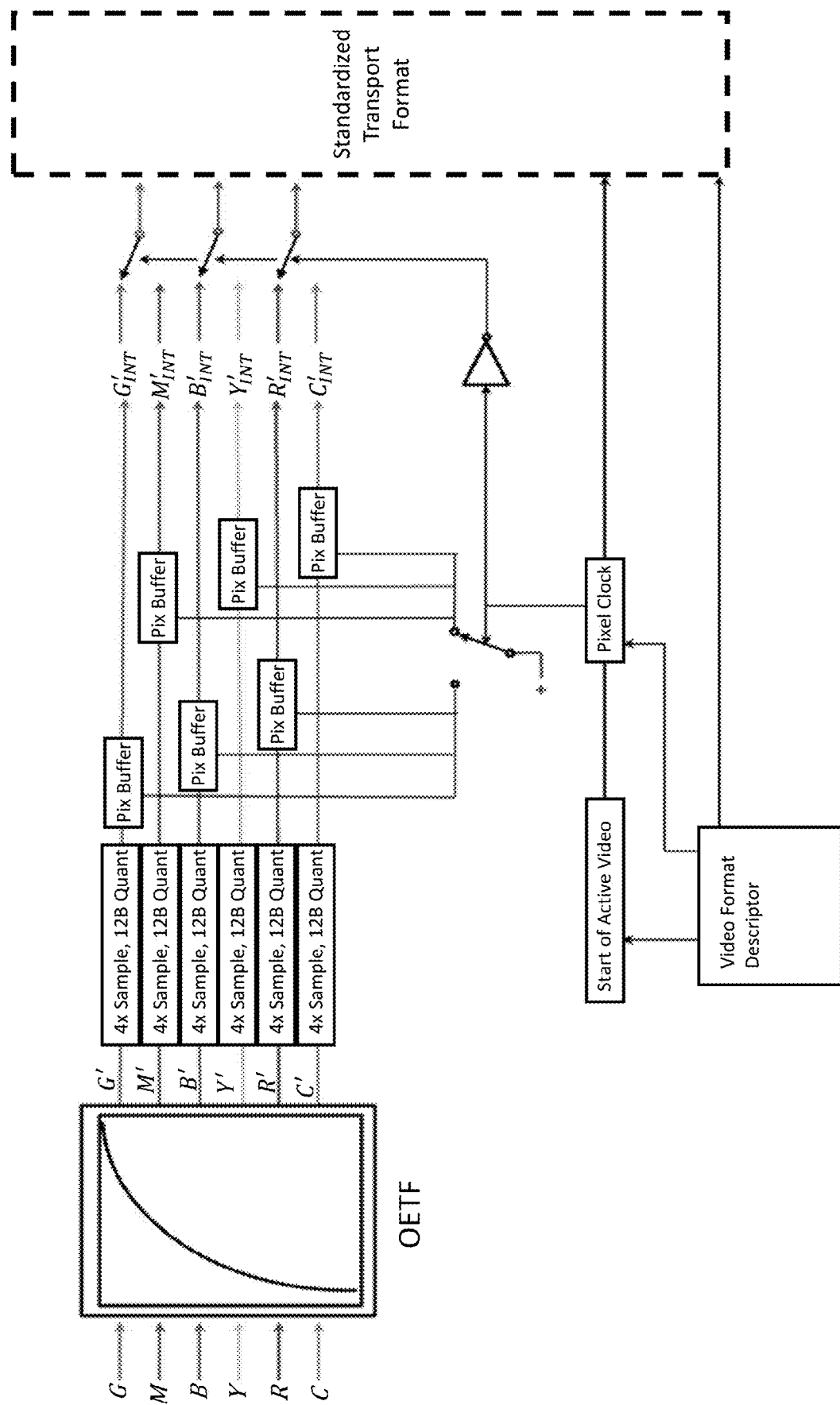
FIG. 29 illustrates an embodiment of the present invention for sending six primary colors to a standardized transport format.

FIG. 29 illustrates an embodiment of the present invention for sending six primary colors to a standardized transport format using a 4:4:4 encoder according to System 2. Encoding is straight forward with a path for RGB sent directly to the transport format. RGB data is mapped to each even numbered data segment in the transport. CYM data is mapped to each odd numbered segment. Because different resolutions are used in all of the standardized transport formats, there must be identification for what they are so that the start of each horizontal line and horizontal pixel count can be identified to time the RGB/CYM mapping to the transport. The identification is the same as currently used in each standardized transport function. TABLE 8, TABLE 9, TABLE 10, and TABLE 11 list 16-bit assignments, 12-bit assignments, 10-bit assignments, and 8-bit assignments, respectively.

TABLE 8

16-Bit Assignments

|  | Computer | | Production | |
| --- | --- | --- | --- | --- |
|  | RGB | CYM | RGB | CYM |
| Peak Brightness | 65536 | 65536 | 65216 | 65216 |
| Minimum Brightness | 0 | 0 | 256 | 256 |

TABLE 9

12-Bit Assignments

|  | Computer | | Production | | Broadcast | |
| --- | --- | --- | --- | --- | --- | --- |
|  | RGB | CYM | RGB | CYM | RGB | CYM |
| Peak Brightness | 4095 | 4095 | 4076 | 4076 | 3839 | 3839 |
| Minimum Brightness | 0 | 0 | 16 | 16 | 256 | 256 |

TABLE 10

10-Bit Assignments

|  | Computer | | Production | | Broadcast | |
| --- | --- | --- | --- | --- | --- | --- |
|  | RGB | CYM | RGB | CYM | RGB | CYM |
| Peak Brightness | 1023 | 1023 | 1019 | 1019 | 940 | 940 |
| Minimum Brightness | 0 | 0 | 4 | 4 | 64 | 64 |

TABLE 11

8-Bit Assignments

|  | Computer | | Production | | Broadcast | |
| --- | --- | --- | --- | --- | --- | --- |
|  | RGB | CYM | RGB | CYM | RGB | CYM |
| Peak Brightness | 255 | 255 | 254 | 254 | 235 | 235 |
| Minimum Brightness | 0 | 0 | 1 | 1 | 16 | 16 |

Figure 30:
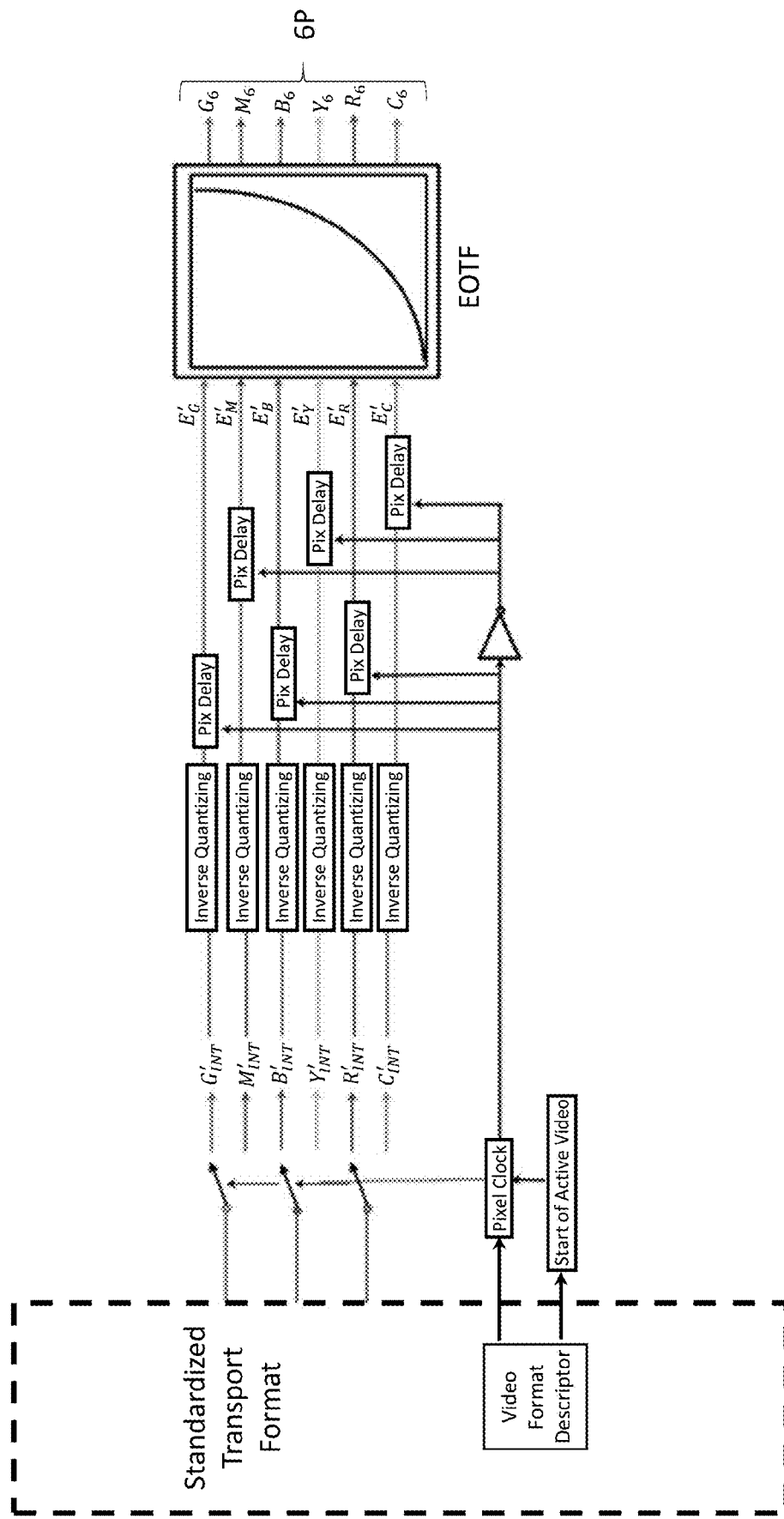
FIG. 30 illustrates one embodiment of a decode process adding a pixel delay to the RGB data for realigning the channels to a common pixel timing.

The decode adds a pixel delay to the RGB data to realign the channels to a common pixel timing. EOTF is applied and the output is sent to the next device in the system. Metadata based on the standardized transport format is used to identify the format and image resolution so that the unpacking from the transport can be synchronized. FIG. 30 shows one embodiment of a decoding with a pixel delay.

In one embodiment, the decoding is 4:4:4 decoding. With this method, the six-primary color decoder is in the signal path, where 11-bit values for RGB are arranged above bit value 2048, while CYM levels are arranged below bit value 2047 as 11-bit. If the same data set is sent to a display and/or process that is not operable for six-primary color processing, the image data is assumed as black at bit value 0 as a full 12-bit word. Decoding begins by tapping image data prior to the unstacking process.

Six-Primary Color Encode Using a 4:2:2 Sampling Method

In one embodiment, the packing/stacking process is for a six-primary color system using a 4:2:2 sampling method. In order to fit the new six-primary color system into a lower bandwidth serial system, while maintaining backwards compatibility, the standard method of converting from RGBCYM to a luminance and a set of color difference signals requires the addition of at least one new image designator.

In order for the system to package all of the image while supporting both six-primary and legacy displays, an electronic luminance component (Y) must be derived. The first component is: $E_{Y_6}'$. It can be described as:

$$E_{Y_6}' = 0.1063 E_{Red}' + 0.23195 E_{Yellow}' + 0.3576 E_{Green}' + 0.19685 E_{Cyan}' + 0.0361 E_{Blue}' + 0.0712 E_{Magenta}'$$

Critical to getting back to legacy display compatibility, value $E_{-Y}'$ is described as:

$$E_{-Y}' = E_{Y_6}' - (E_{Cyan}' + E_{Yellow}' + E_{Magenta}')$$

In addition, at least two new color components are disclosed. These are designated as Cc and Cy components. The at least two new color components include a method to compensate for luminance and enable the system to function with older Y Cb Cr infrastructures. In one embodiment, adjustments are made to Cb and Cr in a Y Cb Cr infrastructure since the related level of luminance is operable for division over more components. These new components are as follows:

$$E_{CR}' = \frac{(E_R' - E_{Y_6}')}{1.7874}, \quad E_{CB}' = \frac{(E_B' - E_{Y_6}')}{1.9278},$$

$$E_{CC}' = \frac{(E_C' - E_{Y_6}')}{1.6063}, \quad E_{CY}' = \frac{(E_Y' - E_{Y_6}')}{1.5361}$$

Within such a system, it is not possible to define magenta as a wavelength. This is because the green vector in CIE 1976 passes into, and beyond, the CIE designated purple line. Magenta is a sum of blue and red. Thus, in one embodiment, magenta is resolved as a calculation, not as optical data. In one embodiment, both the camera side and the monitor side of the system use magenta filters. In this case, if magenta were defined as a wavelength, it would not land at the point described. Instead, magenta would appear as a very deep blue which would include a narrow bandwidth primary, resulting in metameric issues from using narrow spectral components. In one embodiment, magenta as an integer value is resolved using the following equation:

$$M_{INT} = \left[\frac{\frac{B_{INT}}{2} + \frac{R_{INT}}{2}}{2}\right]$$

The above equation assists in maintaining the fidelity of a magenta value while minimizing any metameric errors. This is advantageous over prior art, where magenta appears instead as a deep blue instead of the intended primary color value.

Six-Primary Non-Constant Luminance Encode Using a 4:2:2 Sampling Method

Figure 31:
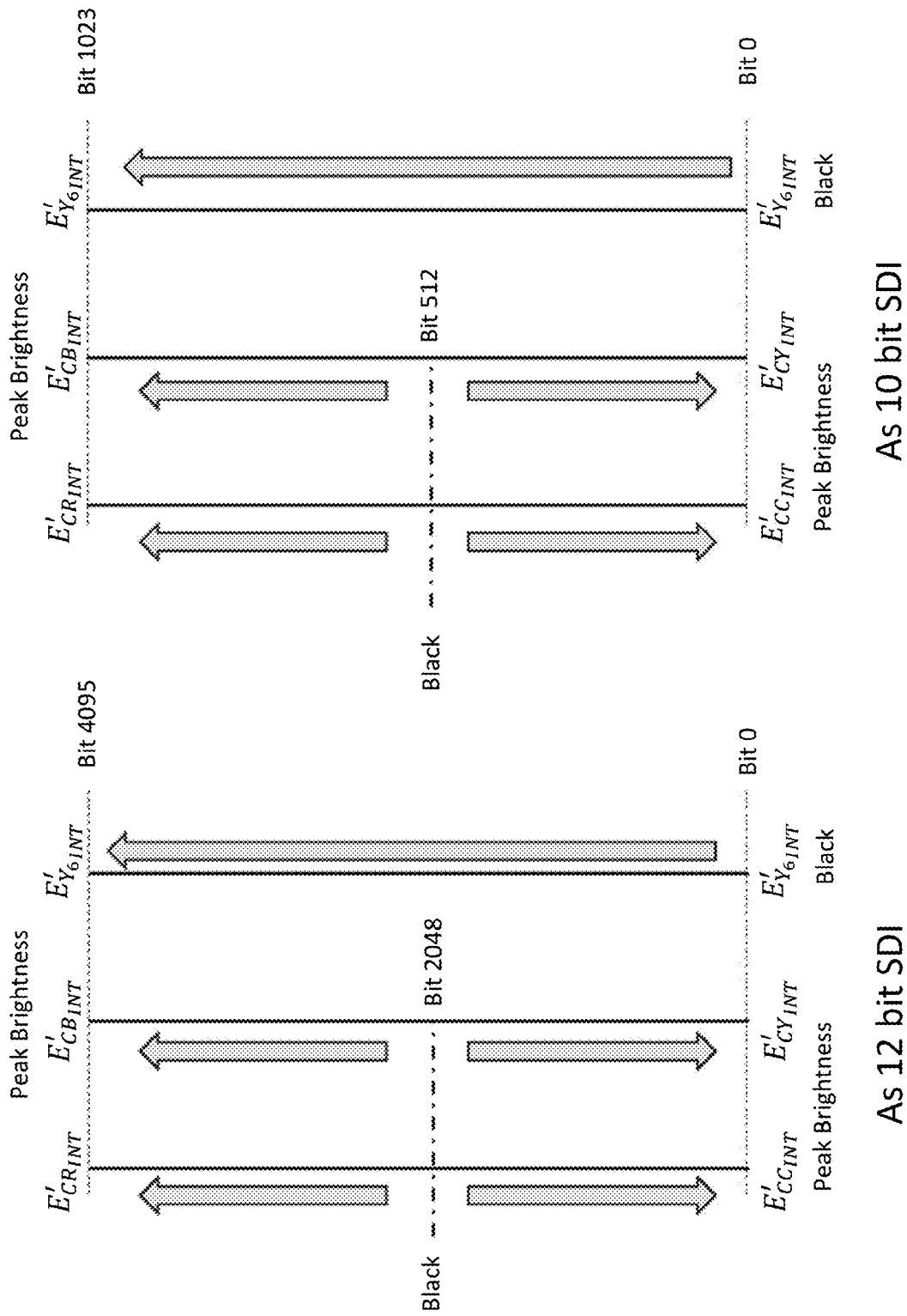
FIG. 31 illustrates one embodiment of an encode process for 4:2:2 video for packaging five channels of information into the standard three-channel designs.

In one embodiment, the six-primary color system using a non-constant luminance encode for use with a 4:2:2 sampling method. Current practices use a non-constant luminance path design, which is found in all the video systems currently deployed. FIG. 31 illustrates one embodiment of an encode process for 4:2:2 video for packaging five channels of information into the standard three-channel designs. For 4:2:2, a similar method to the 4:4:4 system is used to package five channels of information into the standard three-channel designs used in current serial video standards. FIG. 31 illustrates 12-bit SDI and 10-bit SDI encoding for a 4:2:2 system. TABLE 12 and TABLE 13 list bit assignments for a 12-bit and 10-bit system, respectively.

$E_{Y_6}$ encoder. The output of this encoder includes all of the image detail information. In one embodiment, all of the image detail information is output as a monochrome image.

The output is then subtracted from $E_R'$, $E_B'$, $E_C'$, and $E_Y'$ to make the following color difference components:

$E_{CR}'$, $E_{CB}'$, $E_{CC}'$, $E_{CY}'$

These components are then half sampled (×2) while $E_{Y_6}'$ is fully sampled (×4).

Figure 33:
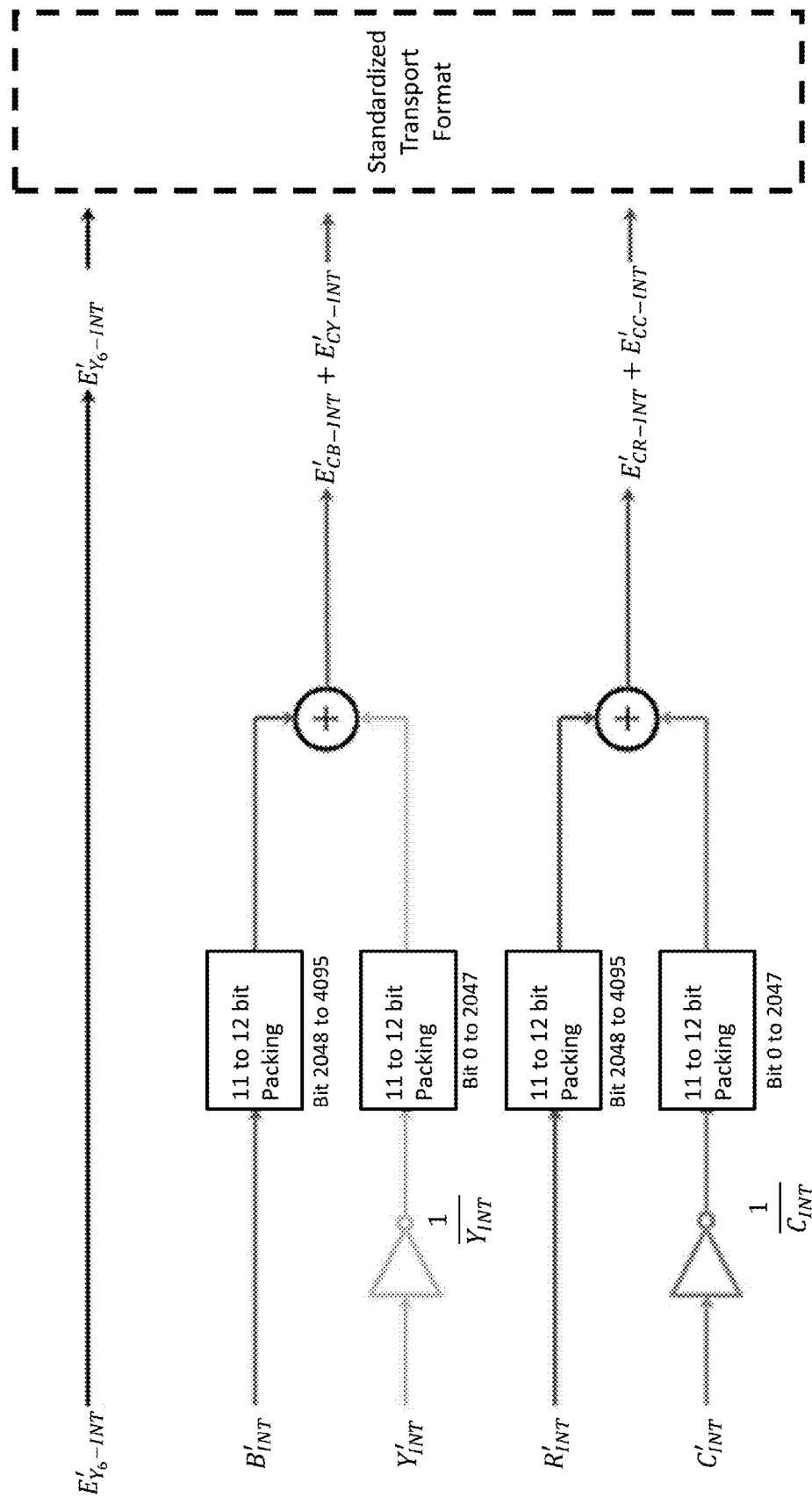
FIG. 33 illustrates one embodiment of a packaging process for a six-primary color system.

FIG. 33 illustrates one embodiment of a packaging process for a six-primary color system. These components are then sent to the packing/stacking process. Components $E_{CY\text{-}INT}'$ and $E_{CC\text{-}INT}'$ are inverted so that bit 0 now defines peak luminance for the corresponding component. In one embodiment, this is the same packaging process performed with the 4:4:4 sampling method design, resulting in two 11-bit components combining into one 12-bit component.

Six-Primary Non-Constant Luminance Decode Using a 4:2:2 Sampling Method

Figure 34:
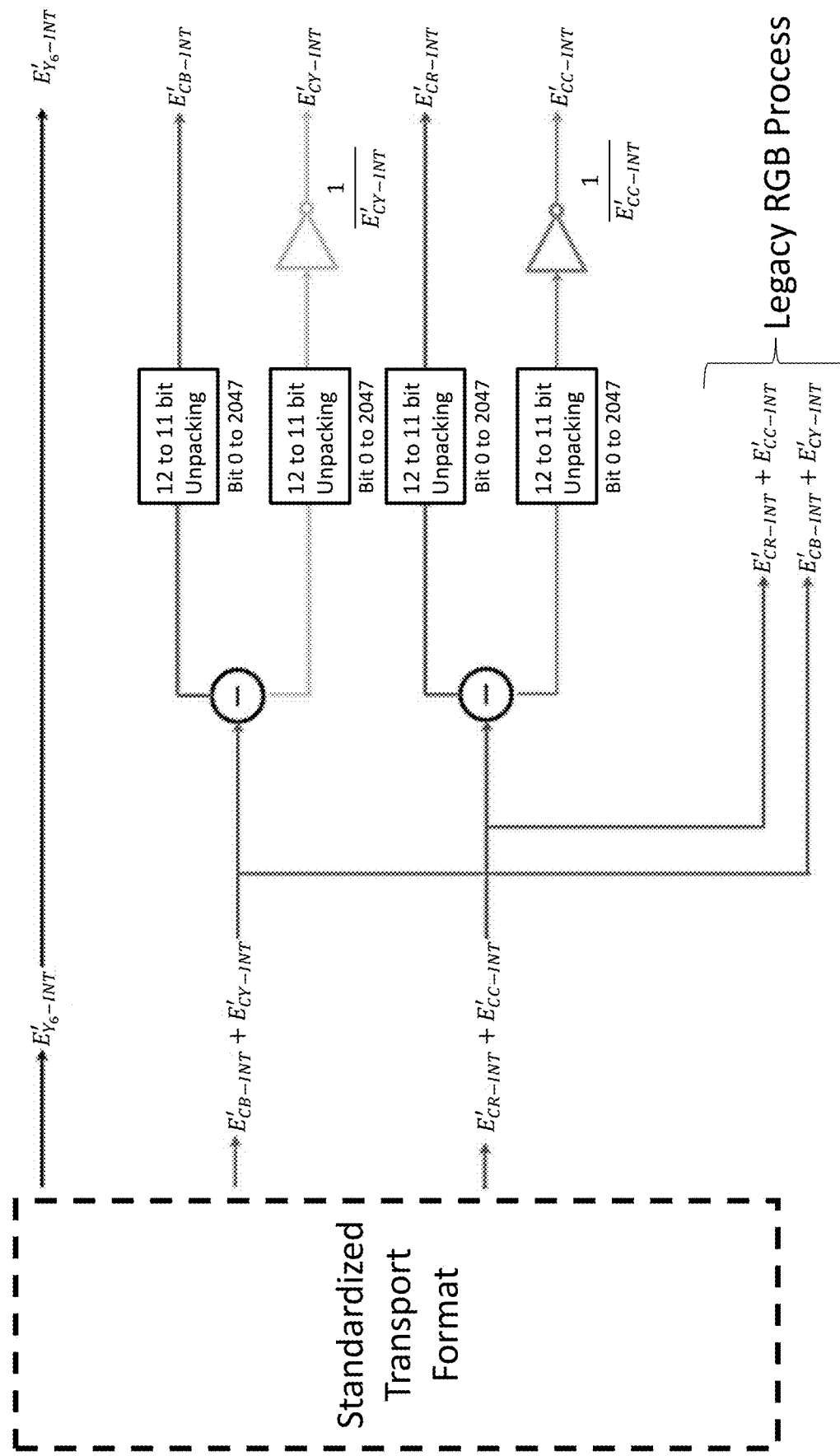
FIG. 34 illustrates a 4:2:2 unstack process for a six-primary color system.

FIG. 34 illustrates a 4:2:2 unstack process for a six-primary color system. In one embodiment, the image data is extracted from the serial format through the normal processes as defined by the serial data format standard. In another embodiment, the serial data format standard uses a 4:2:2 sampling structure. In yet another embodiment, the serial data format standard is SMPTE ST292. The color difference components are separated and formatted back to valid 11-bit data. Components $E_{CY\text{-}INT}'$ and $E_{CC\text{-}INT}'$ are inverted so that bit value 2047 defines peak color luminance.

Figure 35:
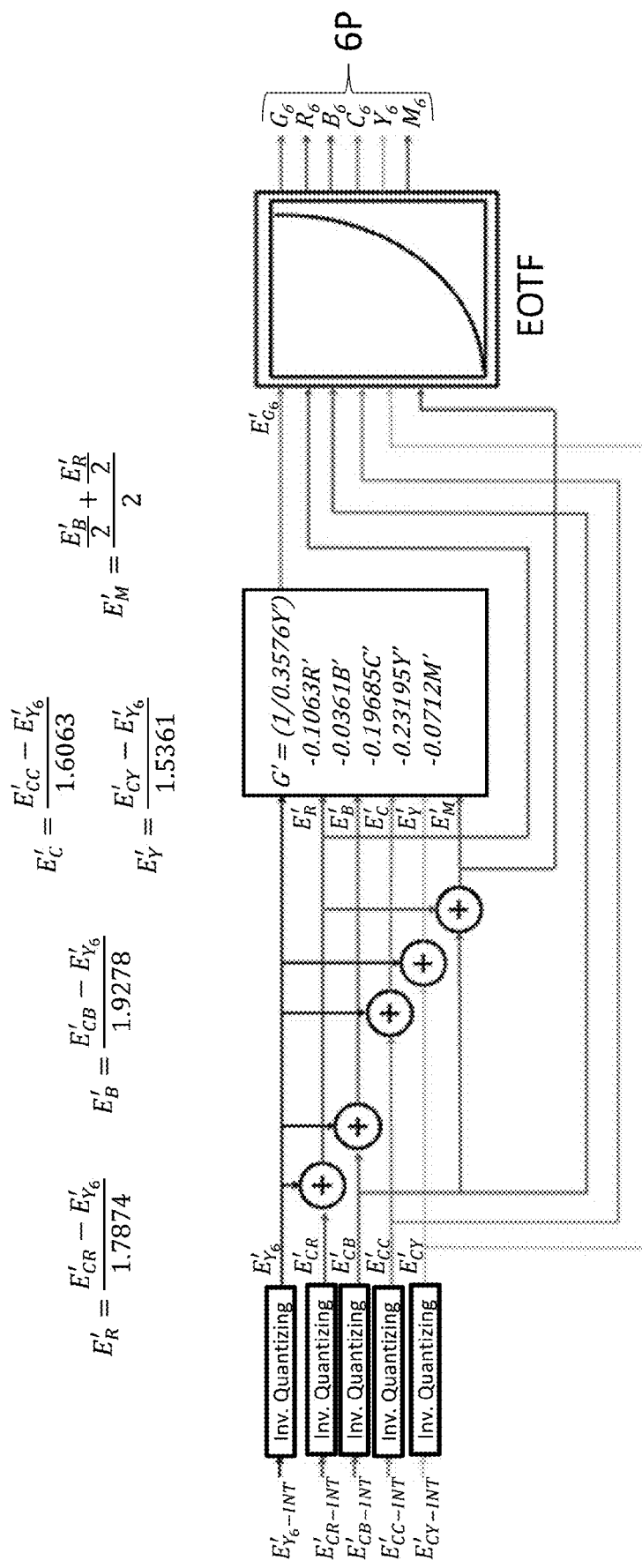
FIG. 35 illustrates one embodiment of a process to inversely quantize each individual color and pass the data through an electronic optical function transfer (EOTF) in a non-constant luminance system.

FIG. 35 illustrates one embodiment of a process to inversely quantize each individual color and pass the data through an electronic optical function transfer (EOTF) in a non-constant luminance system. The individual color components, as well as $E_{Y_6\text{-}INT}'$, are inversely quantized and summed to breakout each individual color. Magenta is then calculated and $E_{Y_6\text{-}INT}'$ is combined with these colors to resolve green. These calculations then go back through an

TABLE 12

12-Bit Assignments

| | Computer | | | Production | | | Broadcast | | |
|---|---|---|---|---|---|---|---|---|---|
| | $EY_6$ | $EC_R, EC_B$ | $EC_C, EC_Y$ | $EY_6$ | $EC_R, EC_B$ | $EC_C, EC_Y$ | $EY_6$ | $EC_R, EC_B$ | $EC_C, EC_Y$ |
| Peak Brightness | 4095 | 4095 | 0 | 4076 | 4076 | 16 | 3839 | 3839 | 256 |
| Minimum Brightness | 0 | 2048 | 2047 | 16 | 2052 | 2032 | 256 | 2304 | 1792 |

TABLE 13

10-Bit Assignments

| | Computer | | | Production | | | Broadcast | | |
|---|---|---|---|---|---|---|---|---|---|
| | $EY_6$ | $EC_R, EC_B$ | $EC_C, EC_Y$ | $EY_6$ | $EC_R, EC_B$ | $EC_C, EC_Y$ | $EY_6$ | $EC_R, EC_B$ | $EC_C, EC_Y$ |
| Peak Brightness | 1023 | 1023 | 0 | 1019 | 1019 | 4 | 940 | 940 | 64 |
| Minimum Brightness | 0 | 512 | 511 | 4 | 516 | 508 | 64 | 576 | 448 |

Figure 32:
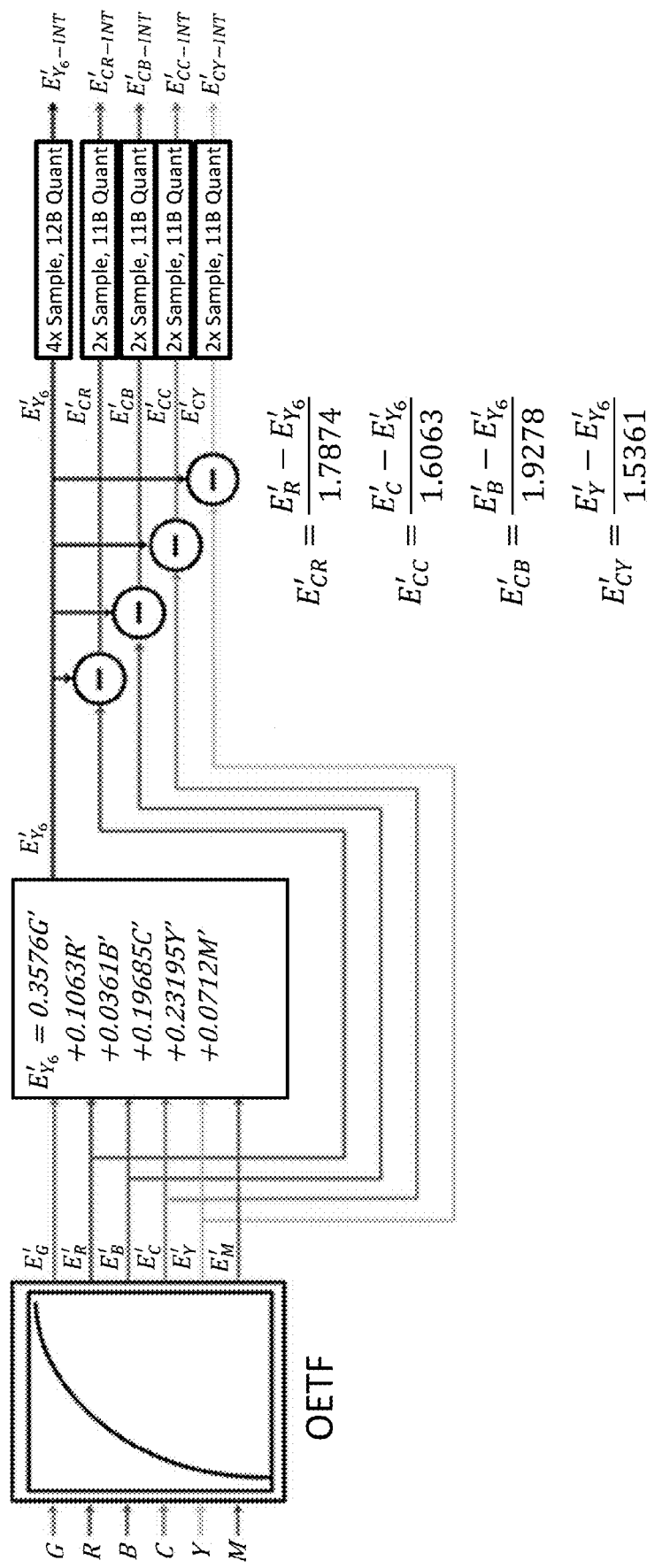
FIG. 32 illustrates one embodiment for a non-constant luminance encode for a six-primary color system.

FIG. 32 illustrates one embodiment for a non-constant luminance encoding process for a six-primary color system. The design of this process is similar to the designs used in current RGB systems. Input video is sent to the Optical Electronic Transfer Function (OETF) process and then to the Electronic Optical Transfer Function (EOTF) process to output the six-primary color system.

In one embodiment, the decoding is 4:2:2 decoding. This decode follows the same principles as the 4:4:4 decoder. However, in 4:2:2 decoding, a luminance channel is used instead of discrete color channels. Here, image data is still taken prior to unstack from the $E_{CB\text{-}INT}'+E_{CY\text{-}INT}'$ and $E_{CR\text{-}INT}'+E_{CC\text{-}INT}'$ channels. With a 4:2:2 decoder, a new component, called $E_{-Y}'$, is used to subtract the luminance levels that are present from the CYM channels from the $E_{CB\text{-}INT}'+E_{CY\text{-}INT}'$ and $E_{CR\text{-}INT}'+E_{CC\text{-}INT}'$ components. The resulting output is now the R and B image components of the EOTF process. $E_{-Y}'$ is also sent to the G matrix to convert the luminance and color difference components to a green output. Thus, R'G'B' is input to the EOTF process and output as $G_{RGB}$, $R_{RGB}$, and $B_{RGB}$. In another embodiment, the decoder is a legacy RGB decoder for non-constant luminance systems.

In one embodiment, the standard is SMPTE ST292. In one embodiment, the standard is SMPTE RP431-2. In one embodiment, the standard is ITU-R BT.2020. In another embodiment, the standard is SMPTE RP431-1. In another embodiment, the standard is ITU-R BT.1886. In another embodiment, the standard is SMPTE ST274. In another embodiment, the standard is SMPTE ST296. In another embodiment, the standard is SMPTE ST2084. In yet another embodiment, the standard is ITU-R BT.2100. In yet another embodiment, the standard is SMPTE ST424. In yet another embodiment, the standard is SMPTE ST425. In yet another embodiment, the standard is SMPTE ST2110.

Six-Primary Constant Luminance Decode Using a 4:2:2 Sampling Method

Figure 36:
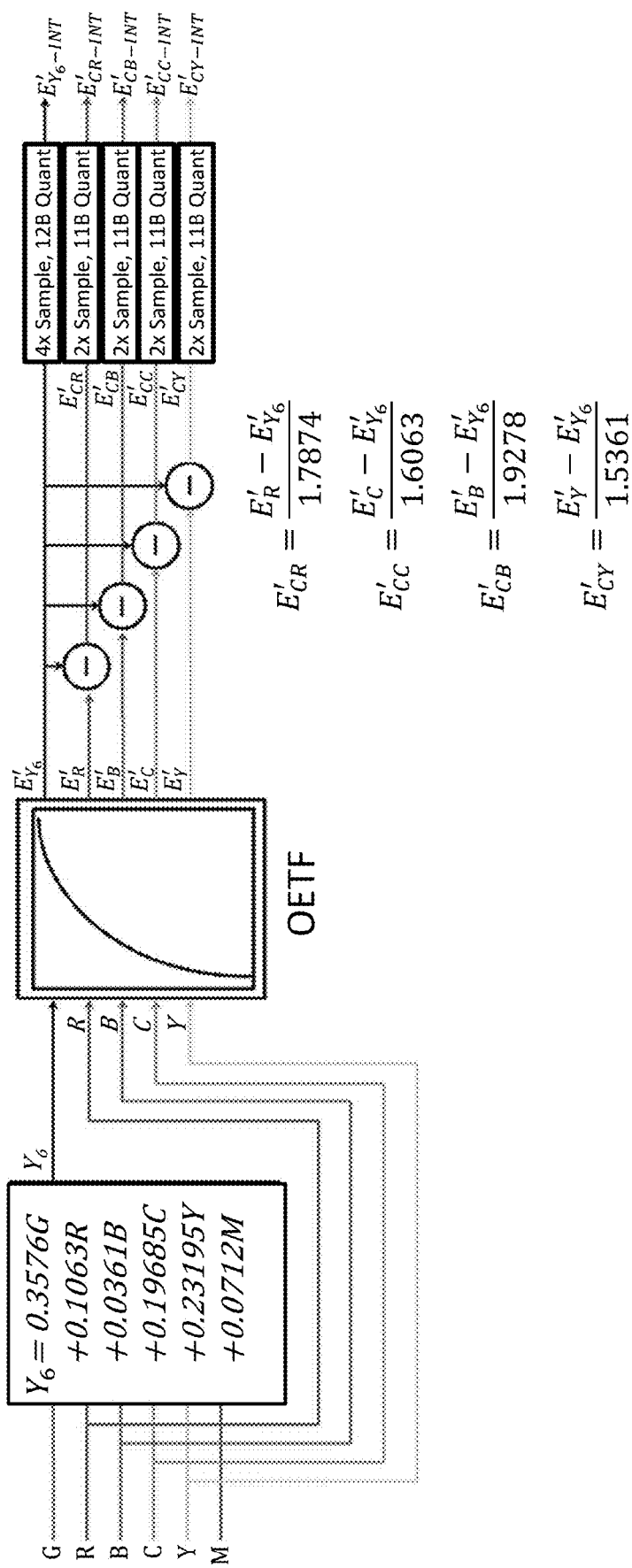
FIG. 36 illustrates one embodiment of a constant luminance encode for a six-primary color system.
Figure 37:
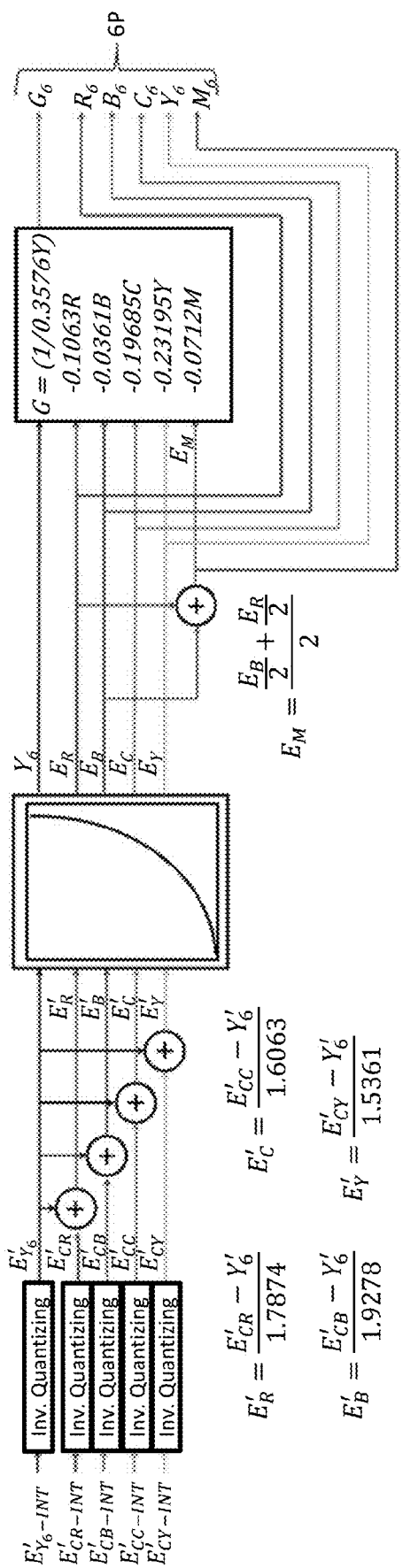
FIG. 37 illustrates one embodiment of a constant luminance decode for a six-primary color system.

FIG. 36 illustrates one embodiment of a constant luminance encode for a six-primary color system. FIG. 37 illustrates one embodiment of a constant luminance decode for a six-primary color system. The process for constant luminance encode and decode are very similar. The main difference being that the management of $E_{Y_6}$ is linear. The encode and decode processes stack into the standard serial data streams in the same way as is present in a non-constant luminance, six-primary color system. In one embodiment, the stacker design is the same as with the non-constant luminance system.

System 2 operation is using a sequential method of mapping to the standard transport instead of the method in System 1 where pixel data is combined to two color primaries in one data set as an 11-bit word. The advantage of System 1 is that there is no change to the standard transport. The advantage of System 2 is that full bit level video can be transported, but at double the normal data rate.

The difference between the systems is the use of two Y channels in System 2. $Y_{RGB}$ and $Y_{CYM}$ are used to define the luminance value for RGB as one group and CYM for the other.

Figure 38:
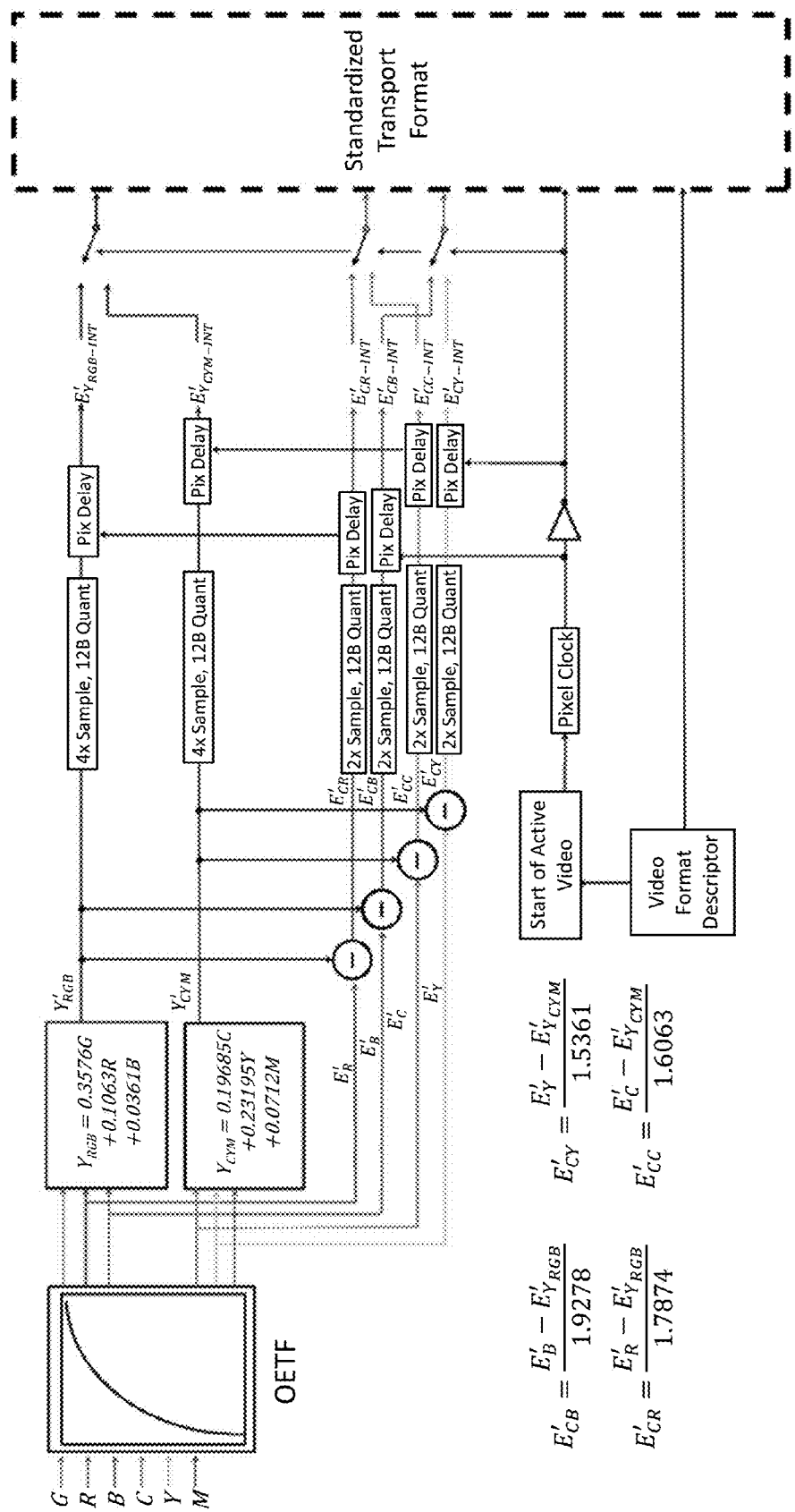
FIG. 38 illustrates one example of 4:2:2 non-constant luminance encoding. (illustrates one embodiment for channeling six-primary color system output into a standard SMPTE ST292 serial system.)

FIG. 38 illustrates one example of 4:2:2 non-constant luminance encoding. Because the RGB and CYM components are mapped at different time intervals, there is no requirement for a stacking process and data is fed directly to the transport format. The development of the separate color difference components is identical to System 1.

The encoder for System 2 takes the formatted color components in the same way as System 1. Two matrices are used to build two luminance channels. $Y_{RGB}$ contains the luminance value for the RGB color primaries. $Y_{CYM}$ contains the luminance value for the CYM color primaries. A set of delays are used to sequence the proper channel for $Y_{RGB}$, $Y_{CMY}$, and the RBCY channels. This sequences $Y_{RGB}$, CR, and CC channels into the even segments of the standardized transport and $Y_{CMY}$, CB, and CY into the odd numbered segments. Since there is no combining color primary channels, full bit levels can be used limited only by the design of the standardized transport method. In addition, for use in matrix driven displays, there is no change to the input processing and only the method of outputting the correct color is required if the filtering or emissive subpixel is also placed sequentially.

Timing for the sequence is calculated by the source format descriptor which then flags the start of video and sets the pixel timing.

Figure 39:
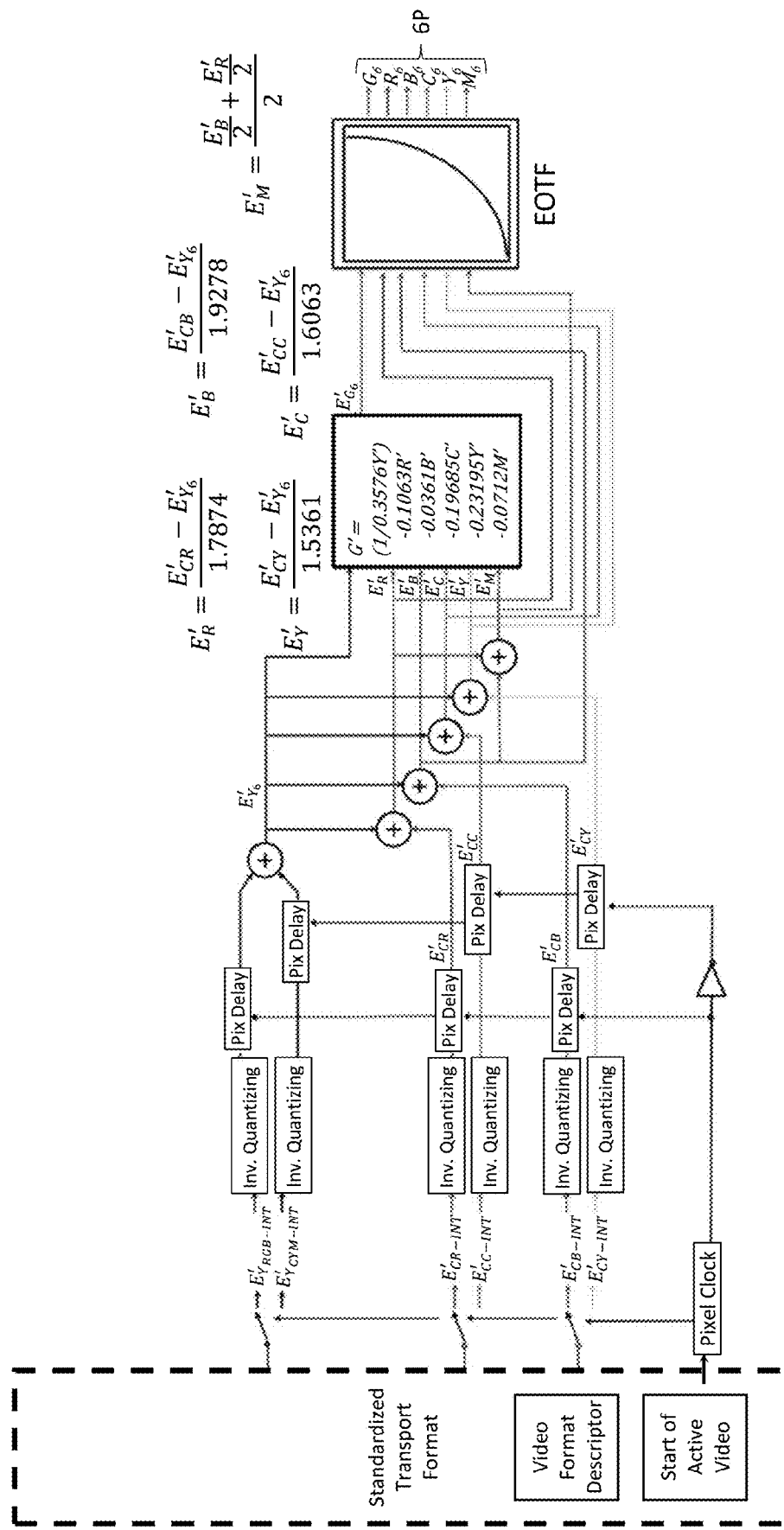
FIG. 39 illustrates one embodiment of a non-constant luminance decoding system.

FIG. 39 illustrates one embodiment of a non-constant luminance decoding system. Decoding uses timing synchronization from the format descriptor and start of video flags that are included in the payload ID, SDP, or EDID tables. This starts the pixel clock for each horizontal line to identify which set of components are routed to the proper part of the decoder. A pixel delay is used to realign the color primarily data of each subpixel. $Y_{RGB}$ and $Y_{CMY}$ are combined to assemble a new $Y_6$ component which is used to decode the CR, CB, CC, CY, and CM components into RGBCYM.

Figure 40:
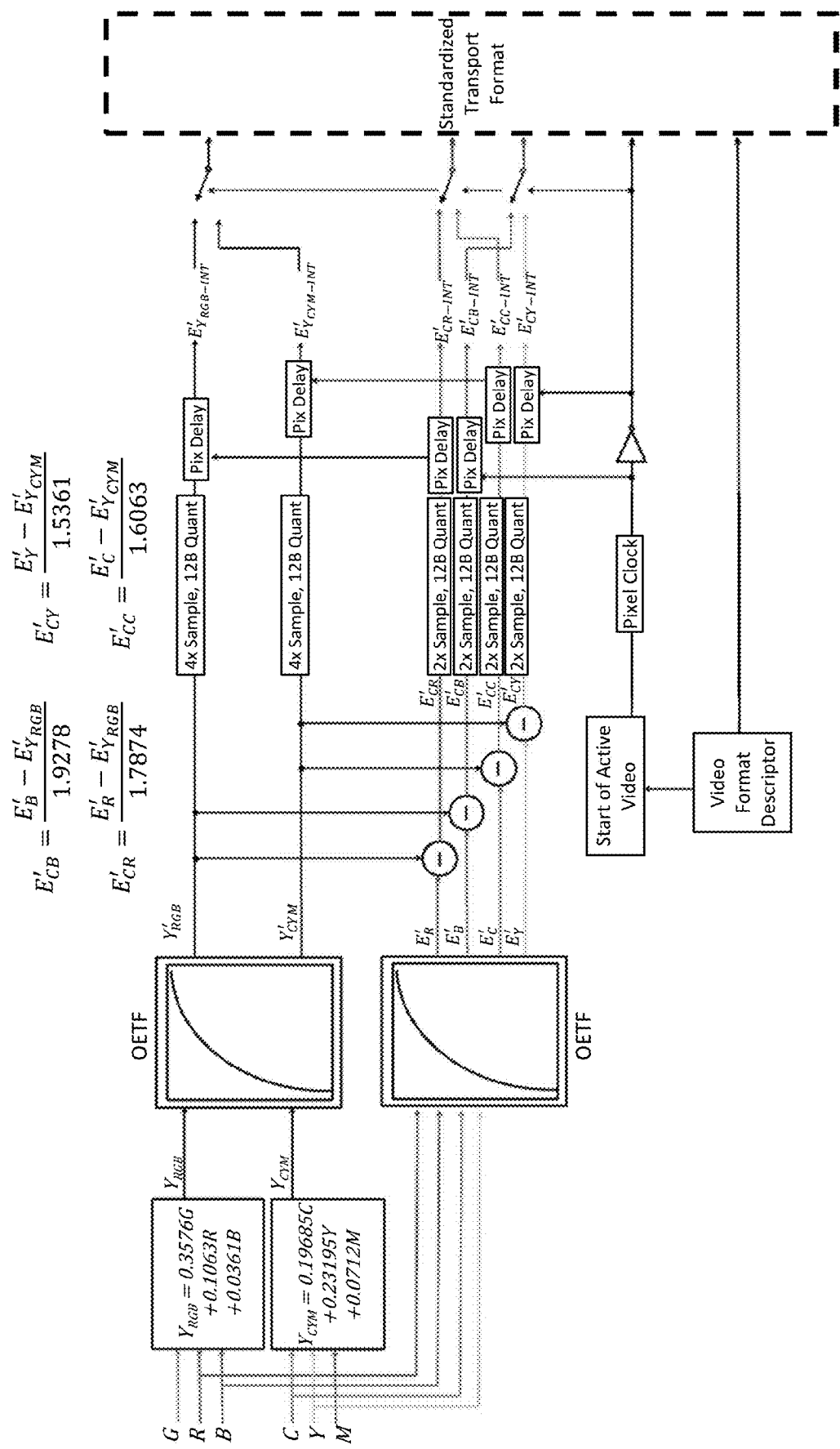
FIG. 40 illustrates one embodiment of a 4:2:2 constant luminance encoding system.
Figure 41:
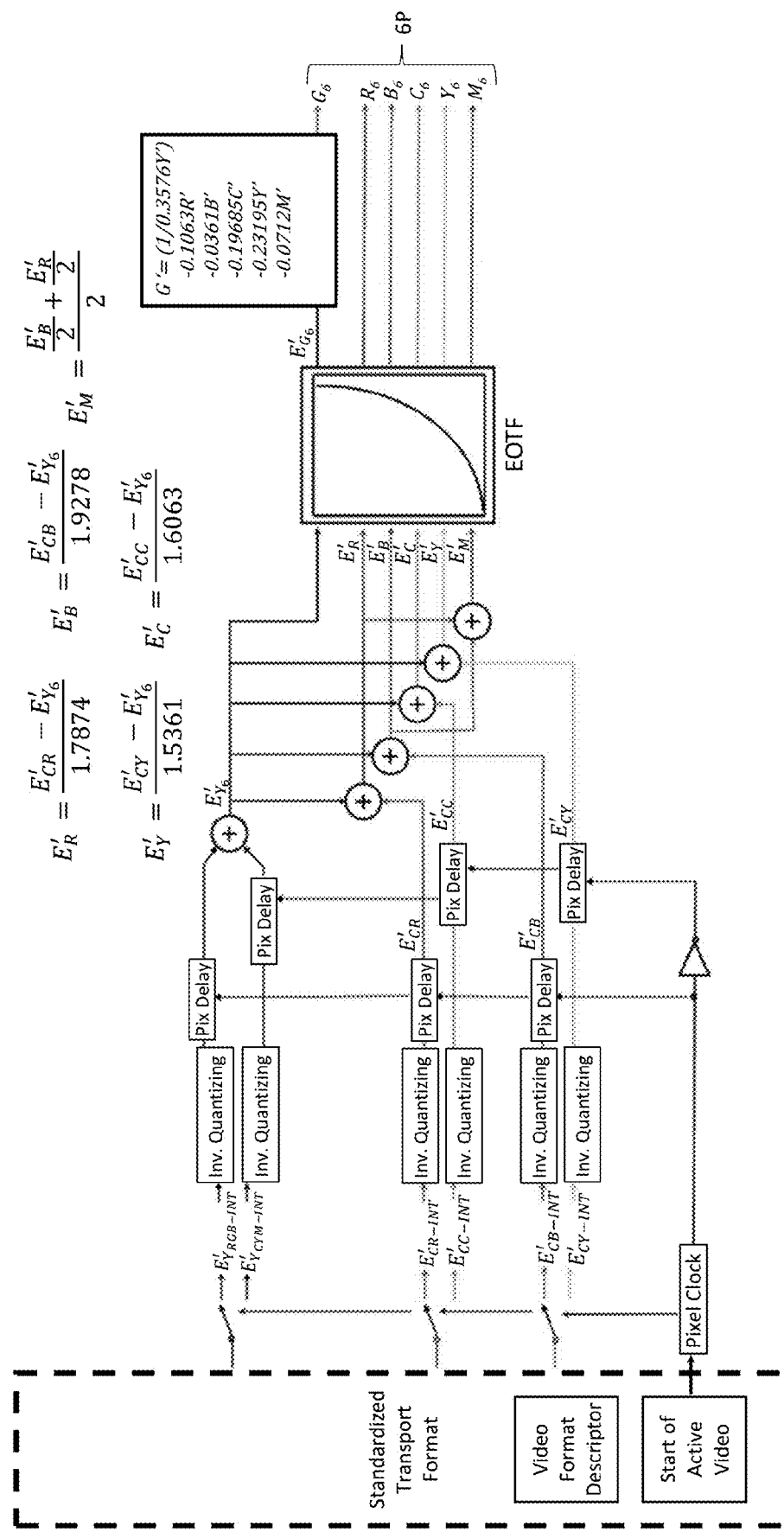
FIG. 41 illustrates one embodiment of a 4:2:2 constant luminance decoding system.

The constant luminance system is not different from the non-constant luminance system in regard to operation. The difference is that the luminance calculation is done as a linear function instead of including the OOTF. FIG. 40 illustrates one embodiment of a 4:2:2 constant luminance encoding system. FIG. 41 illustrates one embodiment of a 4:2:2 constant luminance decoding system.

Six-Primary Color System Using a 4:2:0 Sampling System

In one embodiment, the six-primary color system uses a 4:2:0 sampling system. The 4:2:0 format is widely used in H.262/MPEG-2, H.264/MPEG-4 Part 10 and VC-1 compression. The process defined in SMPTE RP2050-1 provides a direct method to convert from a 4:2:2 sample structure to a 4:2:0 structure. When a 4:2:0 video decoder and encoder are connected via a 4:2:2 serial interface, the 4:2:0 data is decoded and converted to 4:2:2 by up-sampling the color difference component. In the 4:2:0 video encoder, the 4:2:2 video data is converted to 4:2:0 video data by down-sampling the color difference component.

There typically exists a color difference mismatch between the 4:2:0 video data from the 4:2:0 video data to be encoded. Several stages of codec concatenation are common through the processing chain. As a result, color difference signal mismatch between 4:2:0 video data input to 4:2:0 video encoder and 4:2:0 video output from 4:2:0 video decoder is accumulated and the degradation becomes visible.

Filtering within a Six-Primary Color System Using a 4:2:0 Sampling Method

When a 4:2:0 video decoder and encoder are connected via a serial interface, 4:2:0 data is decoded and the data is converted to 4:2:2 by up-sampling the color difference component, and then the 4:2:2 video data is mapped onto a serial interface. In the 4:2:0 video encoder, the 4:2:2 video data from the serial interface is converted to 4:2:0 video data by down-sampling the color difference component. At least one set of filter coefficients exists for 4:2:0/4:2:2 up-sampling and 4:2:2/4:2:0 down-sampling. The at least one set of filter coefficients provide minimally degraded 4:2:0 color difference signals in concatenated operations.

Filter Coefficients in a Six-Primary Color System Using a 4:2:0 Sampling Method

Figure 42:
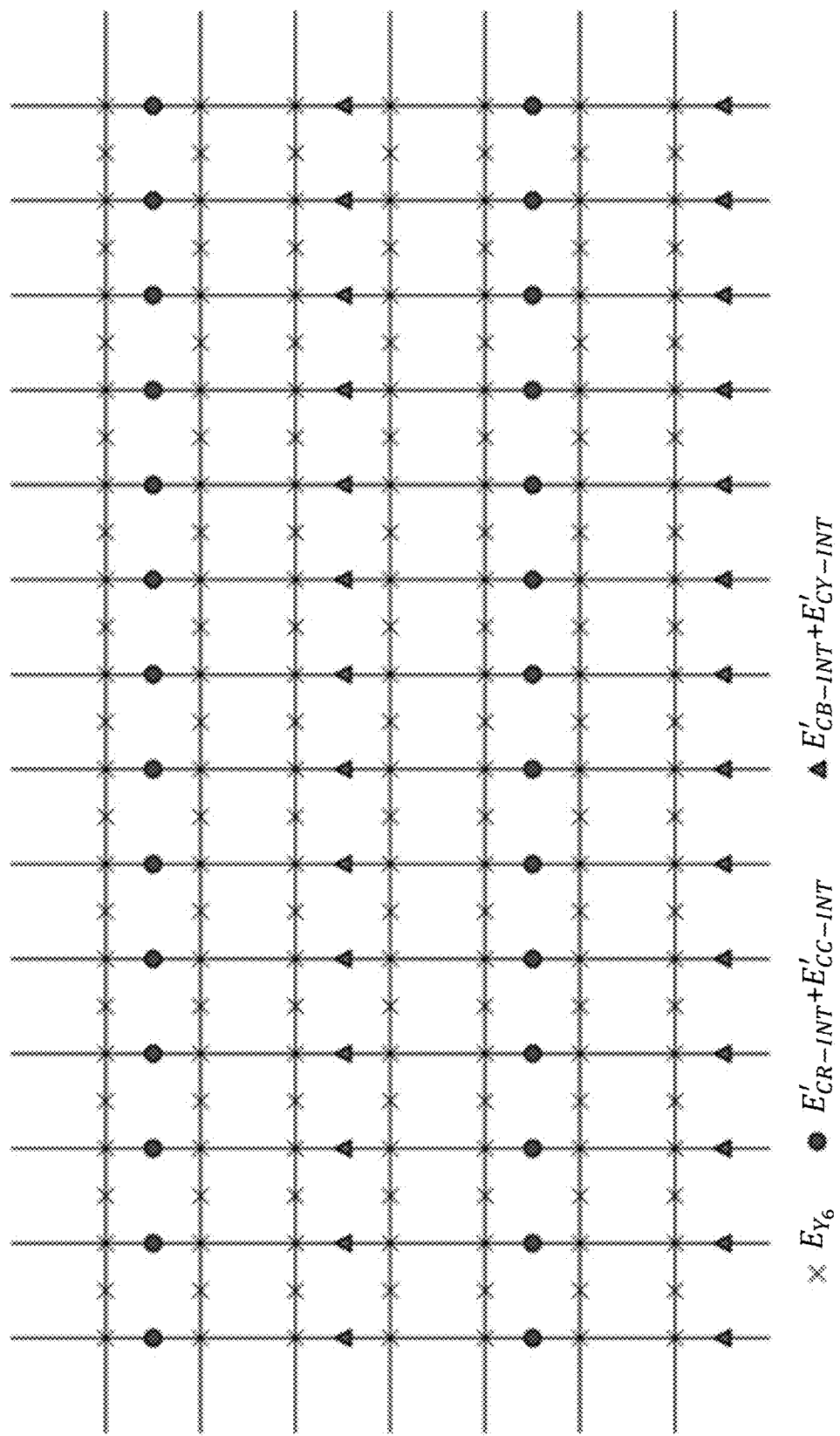
FIG. 42 illustrates a raster encoding diagram of sample placements for a six-primary color system.

FIG. 42 illustrates one embodiment of a raster encoding diagram of sample placements for a six-primary color 4:2:0 progressive scan system. Within this compression process, horizontal lines show the raster on a display matrix. Vertical lines depict drive columns. The intersection of these is a pixel calculation. Data around a particular pixel is used to calculate color and brightness of the subpixels. Each "X"

shows placement timing of the $E_{Y_6\text{-}INT}$ sample. Red dots depict placement of the $E_{CR\text{-}INT}'+E_{CC\text{-}INT}'$ sample. Blue triangles show placement of the $E_{CB\text{-}INT}'+E_{CY\text{-}INT}'$ sample.

In one embodiment, the raster is an RGB raster. In another embodiment, the raster is a RGBCYM raster.

System 3

Figure 95:
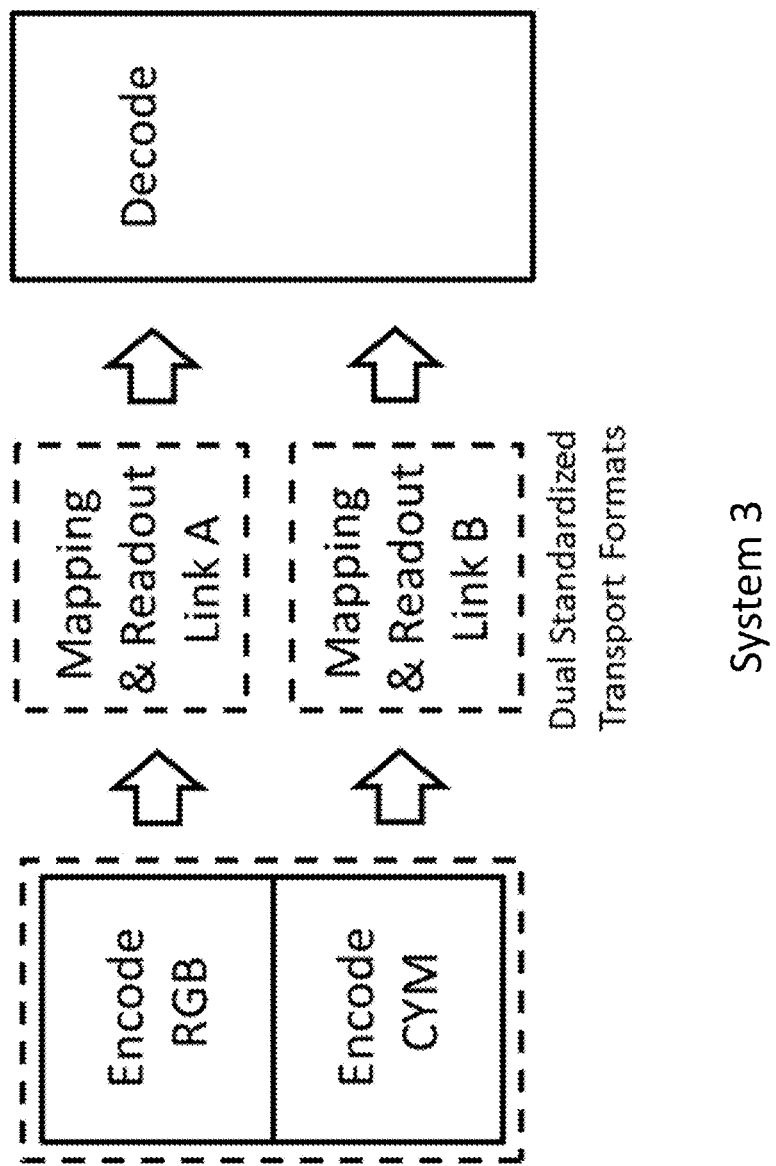
FIG. 95 illustrates one embodiment of a system encode and decode process using a dual link method.

FIG. 95 illustrates one embodiment of a system encode and decode process using a dual link method ("System 3"). System 3 utilizes a dual link method where two wires are used. RGB is sent to link A and CYM is sent to link B. After arriving at the image destination, the two links are recombined.

System 3 is simpler and more straight forward than Systems 1 and 2. The advantage with this system is that adoption is simply to format CYM on a second link. So, for an SDI design, RGB is sent on a standard SDI stream just as it is currently done. There is no modification to the transport and this link is operable to be sent to any RGB display requiring only the compensation for the luminance difference because the CYM components are not included. CYM data is transported in the same manner as RGB data. This data is then combined in the display to make up a 6P image. The downside is that the system requires two wires to move one image. This system is operable to work with most any format including SMPTE ST292, 424, 2082, and 2110. It also is operable to work with dual HDMI/CTA connections. In one embodiment, the system includes at least one transfer function (e.g., OETF, EOTF).

Figure 96:
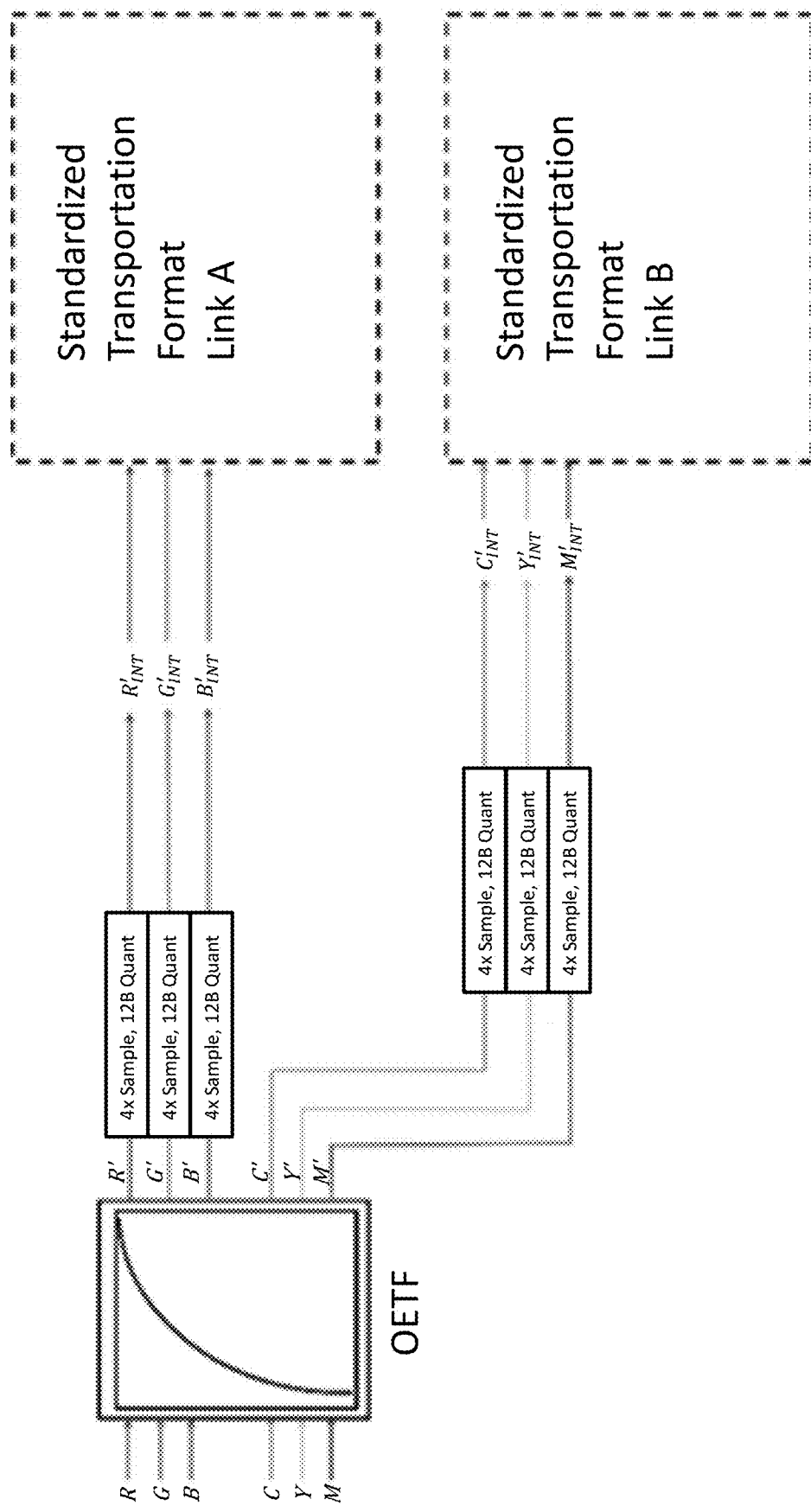
FIG. 96 illustrates one embodiment of an encoding process using a dual link method.

FIG. 96 illustrates one embodiment of an encoding process using a dual link method.

Figure 97:
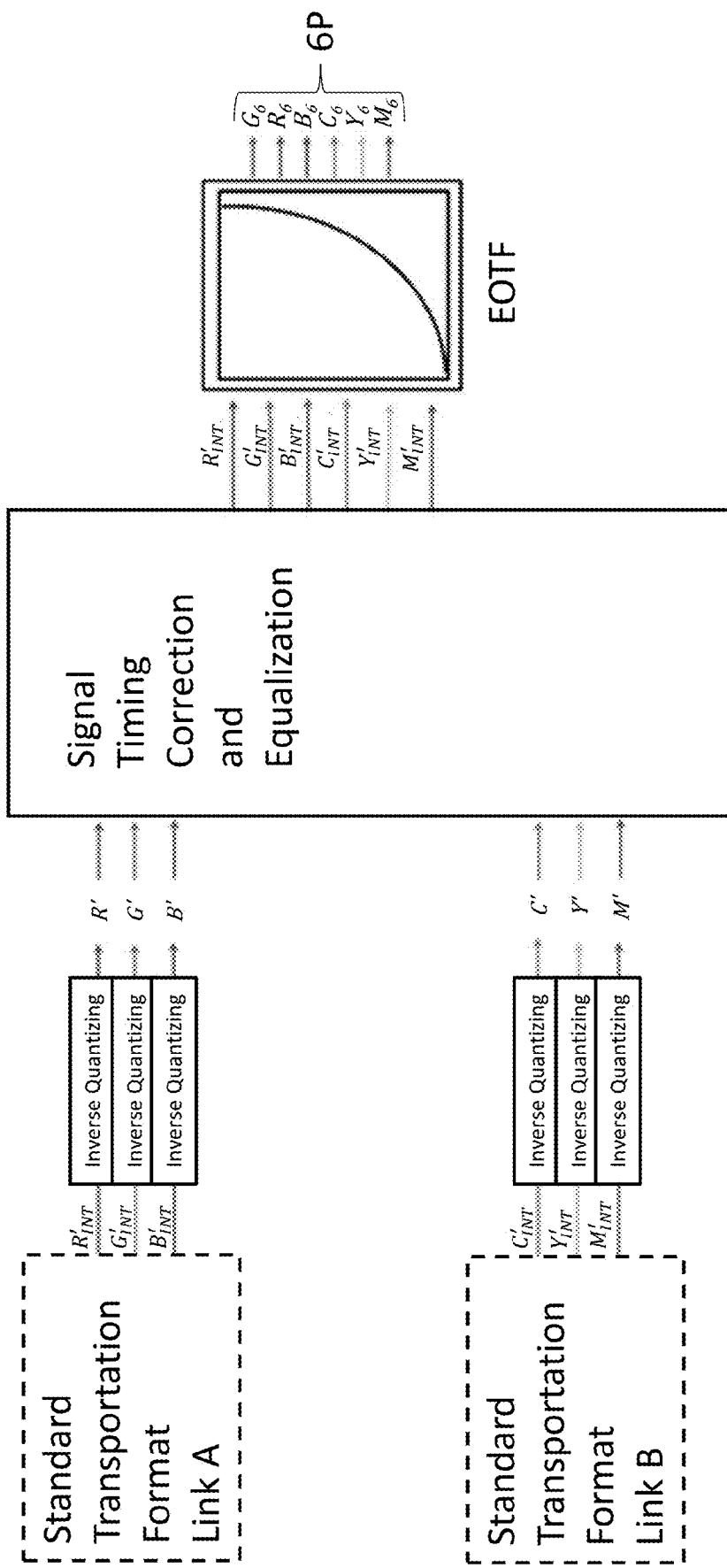
FIG. 97 illustrates one embodiment of a decoding process using a dual link method.

FIG. 97 illustrates one embodiment of a decoding process using a dual link method.

Comparison of Three Systems

Advantageously, System 1 fits within legacy SDI, CTA, and Ethernet transports. Additionally, System 1 has zero latency processing for conversion to an RGB display. However, System 1 is limited to 11-bit words.

System 2 is advantageously operable to transport 6 channels using 16-bit words with no compression. Additionally, System 2 fits within newer SDI, CTA, and Ethernet transport formats. However, System 2 requires double bit rate speed. For example, a 4K image requires a data rate for an 8K RGB image.

In comparison, System 3 is operable to transport 6 channels using 16-bit words with compression and at the same data rate required for a specific resolution. For example, a data rate for an RGB image is the same as for a 6P image using System 3. However, System 3 requires a twin cable connection within the video system.

Six-Primary Color System Backwards Compatibility

By designing the color gamut within the saturation levels of standard formats and using inverse color primary positions, it is easy to resolve an RGB image with minimal processing. In one embodiment for six-primary encoding, image data is split across three color channels in a transport system. In one embodiment, the image data is read as six-primary data. In another embodiment, the image data is read as RGB data. By maintaining a standard white point, the axis of modulation for each channel is considered as values describing two colors (e.g., blue and yellow) for a six-primary system or as a single color (e.g., blue) for an RGB system. This is based on where black is referenced. In one embodiment of a six-primary color system, black is decoded at a mid-level value. In an RGB system, the same data stream is used, but black is referenced at bit zero, not a mid-level.

In one embodiment, the RGB values encoded in the 6P stream are based on ITU-R BT.709. In another embodiment, the RGB values encoded are based on SMPTE RP431. Advantageously, these two embodiments require almost no processing to recover values for legacy display.

Two decoding methods are proposed. The first is a preferred method that uses very limited processing, negating any issues with latency. The second is a more straightforward method using a set of matrices at the end of the signal path to conform the 6P image to RGB.

In one embodiment, the decoding is for a 4:4:4 system. In one embodiment, the assumption of black places the correct data with each channel. If the 6P decoder is in the signal path, 11-bit values for RGB are arranged above bit value 2048, while CYM level are arranged below bit value 2047 as 11-bit. However, if this same data set is sent to a display or process that does not understand 6P processing, then that image data is assumed as black at bit value 0 as a full 12-bit word.

Figure 43:
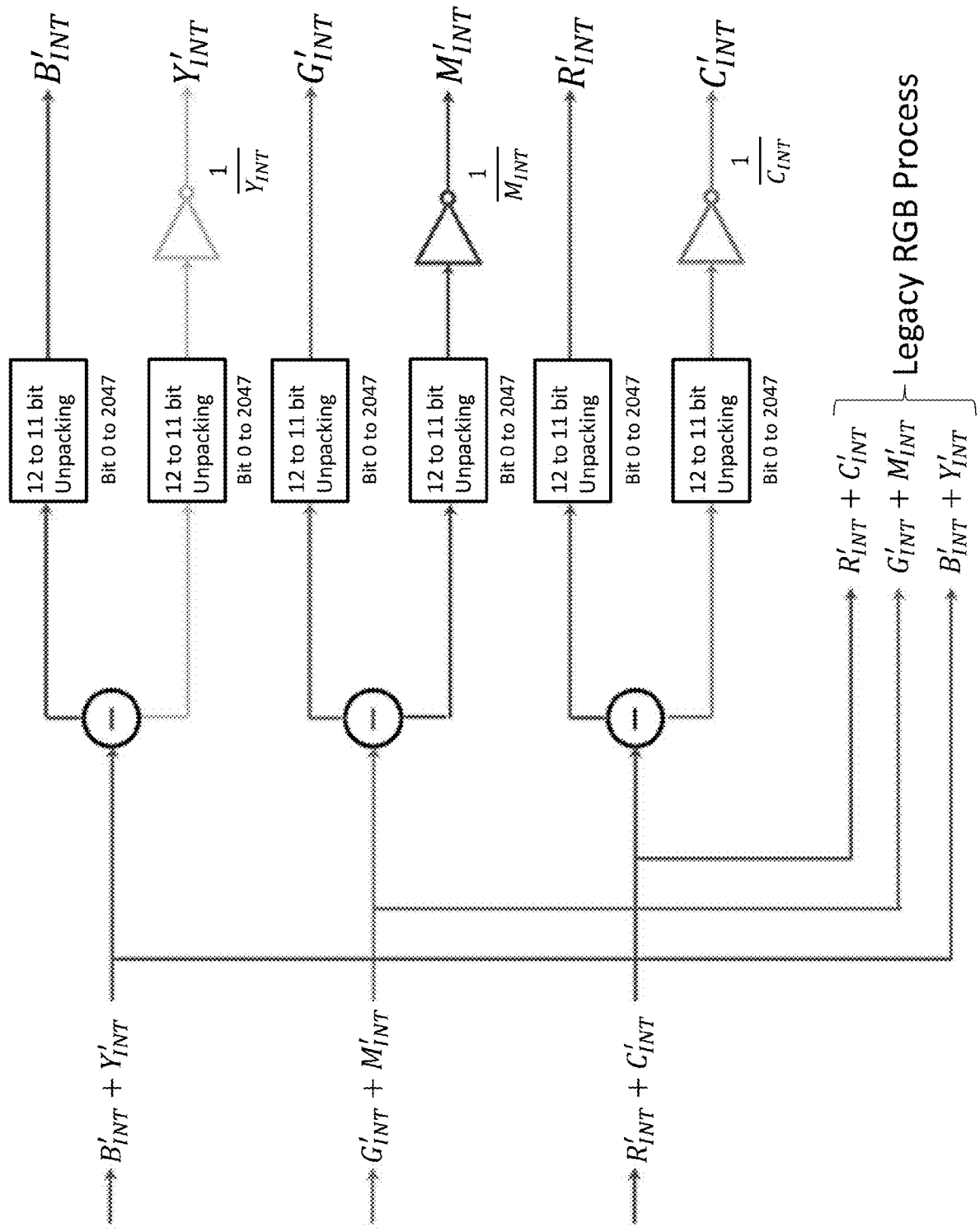
FIG. 43 illustrates one embodiment of the six-primary color unstack process in a 4:2:2 video system.
Figure 44:
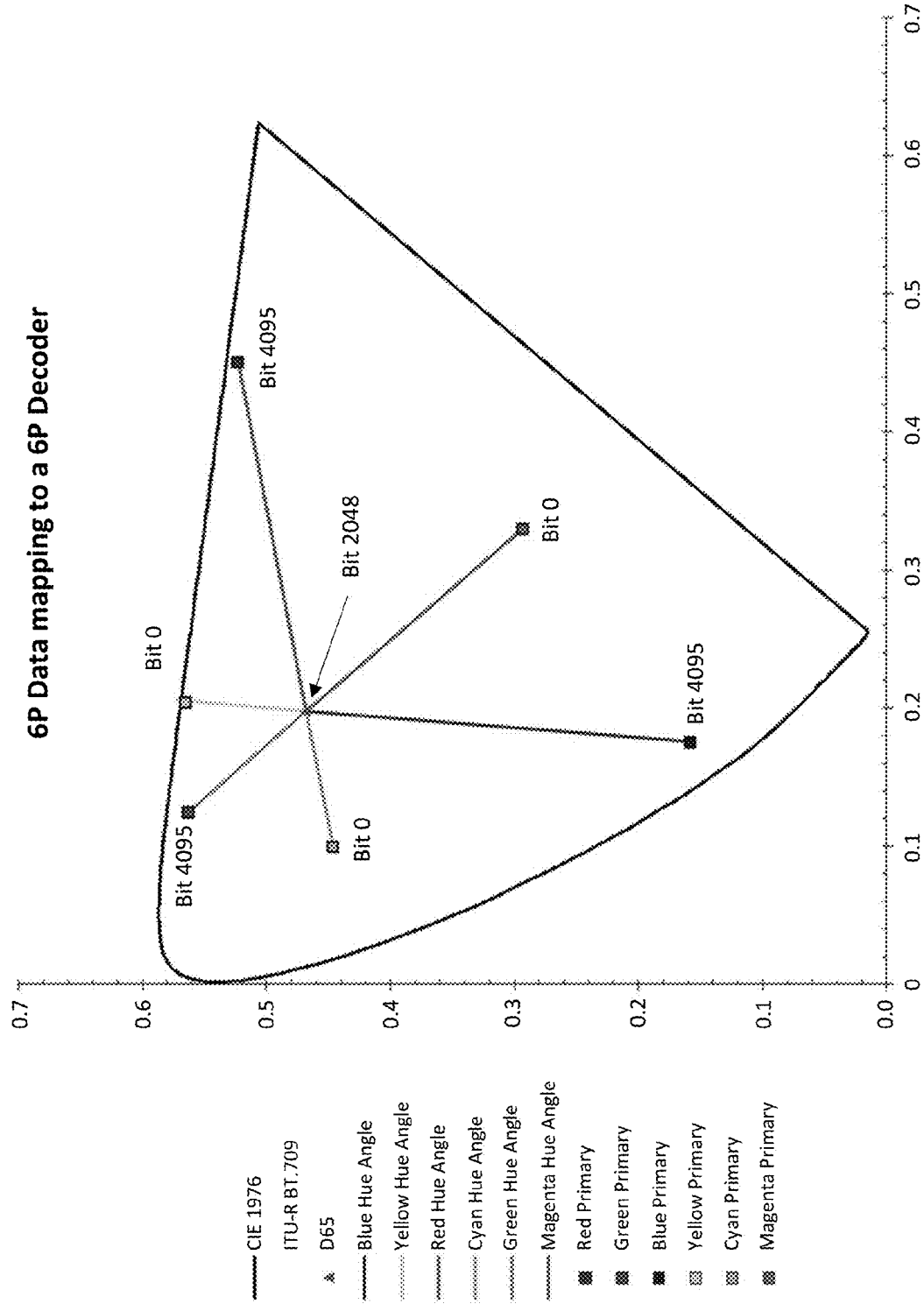
FIG. 44 illustrates one embodiment of mapping input to the six-primary color system unstack process.
Figure 45:
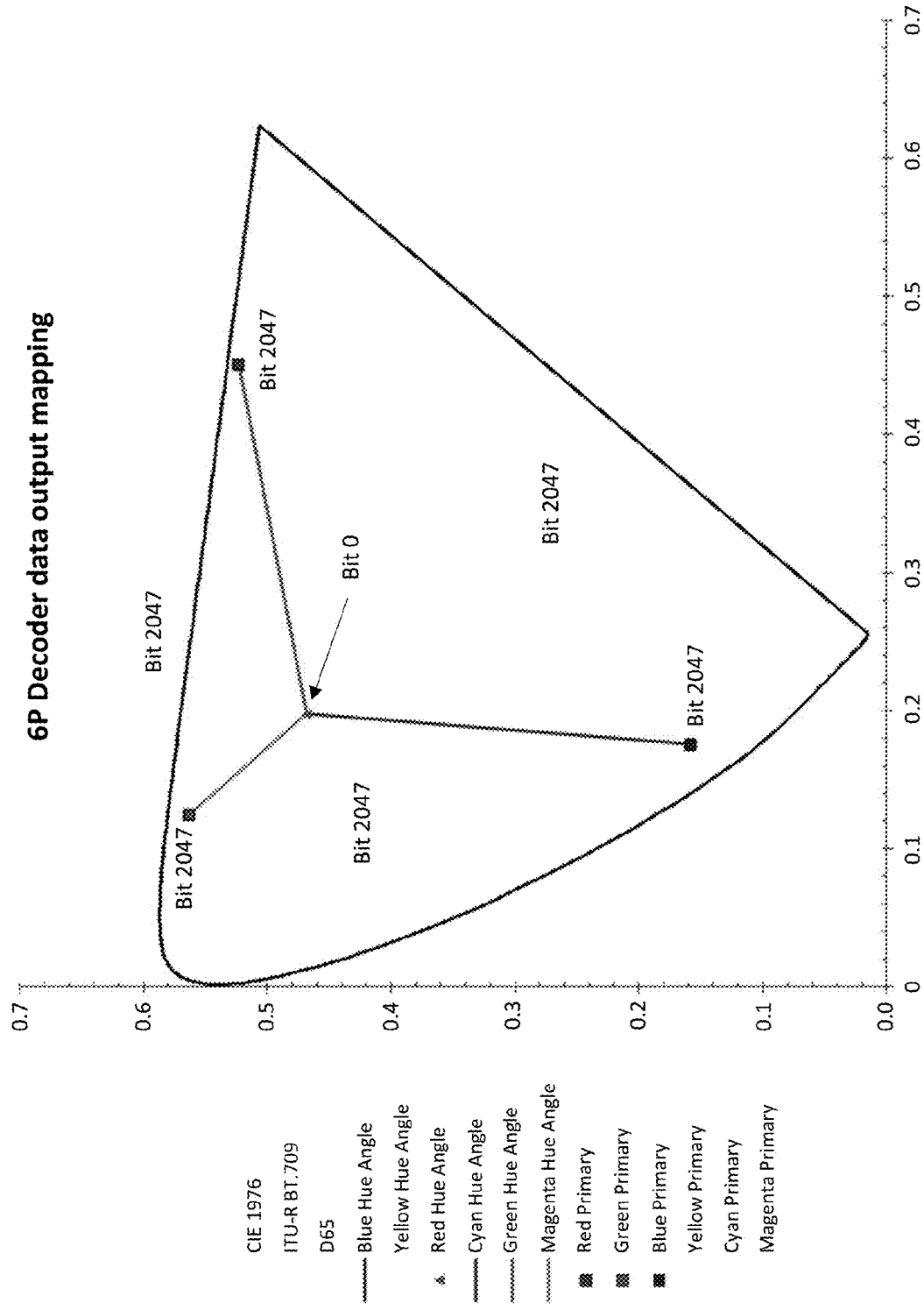
FIG. 45 illustrates one embodiment of mapping the output of a six-primary color system decoder.
Figure 46:
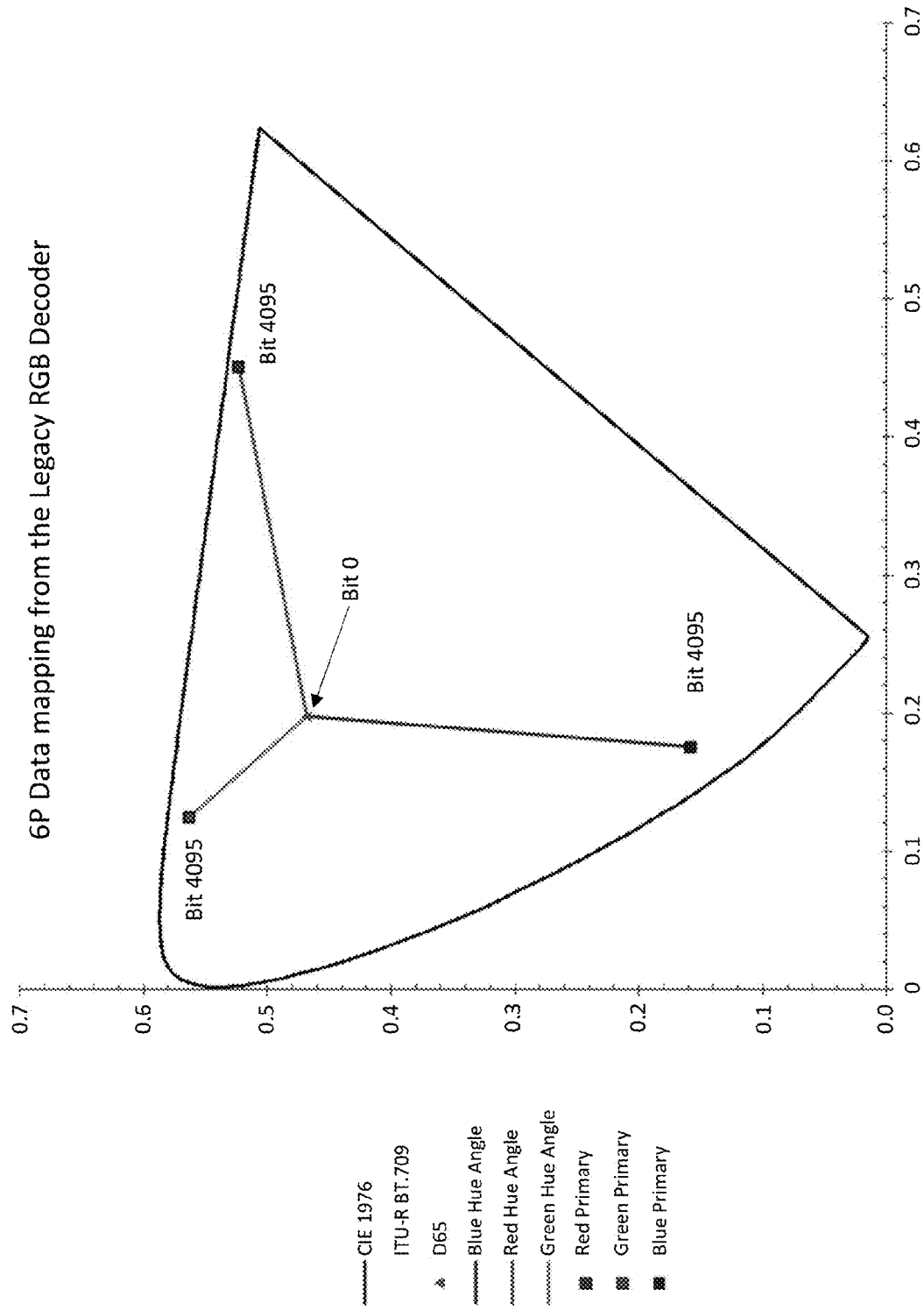
FIG. 46 illustrates one embodiment of mapping the RGB decode for a six-primary color system.

FIG. 43 illustrates one embodiment of the six-primary color unstack process in a 4:2:2 video system. Decoding starts by tapping image data prior to the unstacking process. The input to the 6P unstack will map as shown in FIG. 44. The output of the 6P decoder will map as shown in FIG. 45. This same data is sent uncorrected as the legacy RGB image data. The interpretation of the RGB decode will map as shown in FIG. 46.

Figure 49:
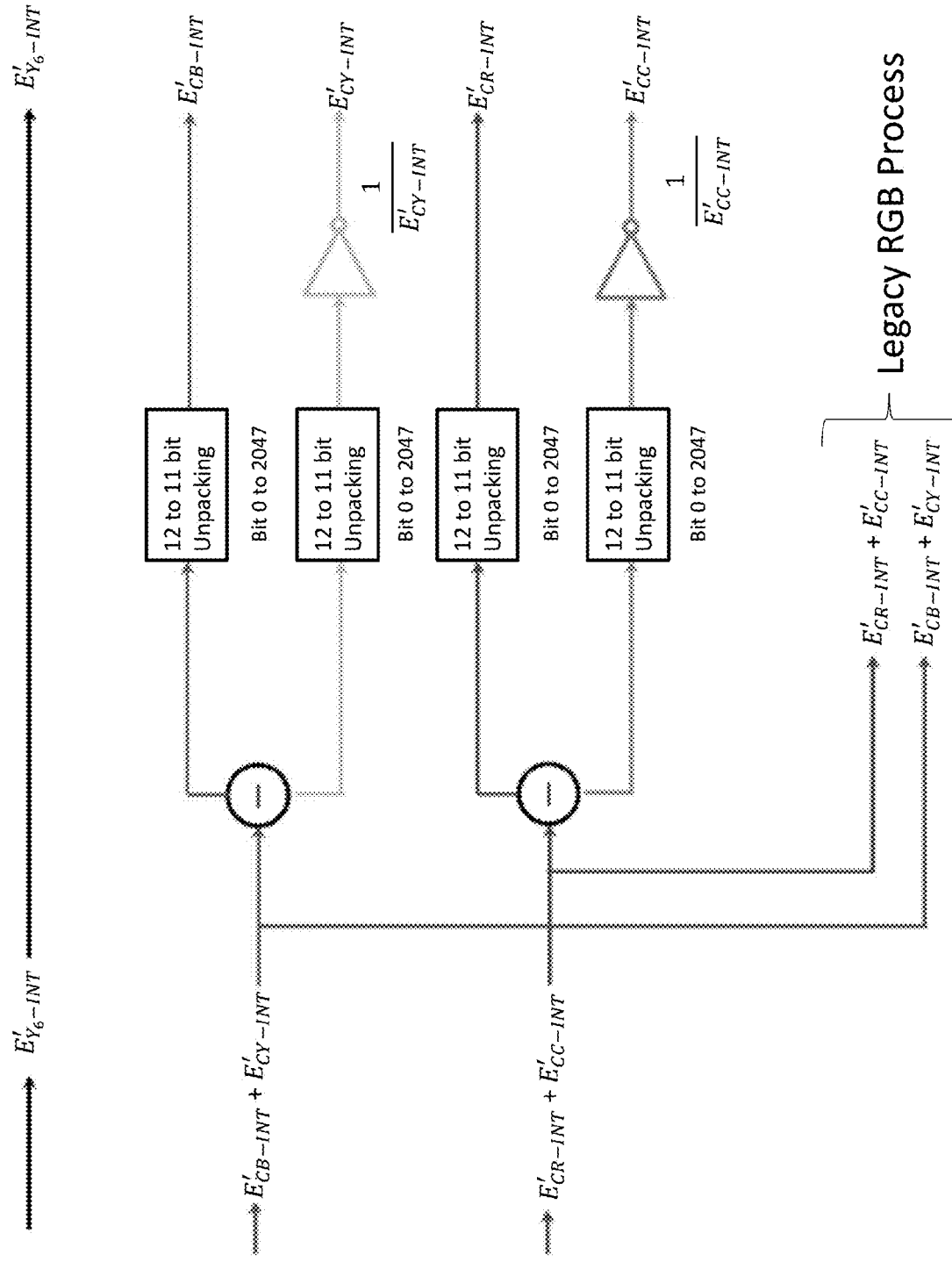
FIG. 49 illustrates one embodiment of an unstack system for a six-primary color system.

Alternatively, the decoding is for a 4:2:2 system. This decode uses the same principles as the 4:4:4 decoder, but because a luminance channel is used instead of discrete color channels, the processing is modified. Legacy image data is still taken prior to unstack from the $E_{CB\text{-}INT}'+E_{CY\text{-}INT}'$ and $E_{CR\text{-}INT}'+E_{CC\text{-}INT}'$ channels as shown in FIG. 49.

Figure 50:
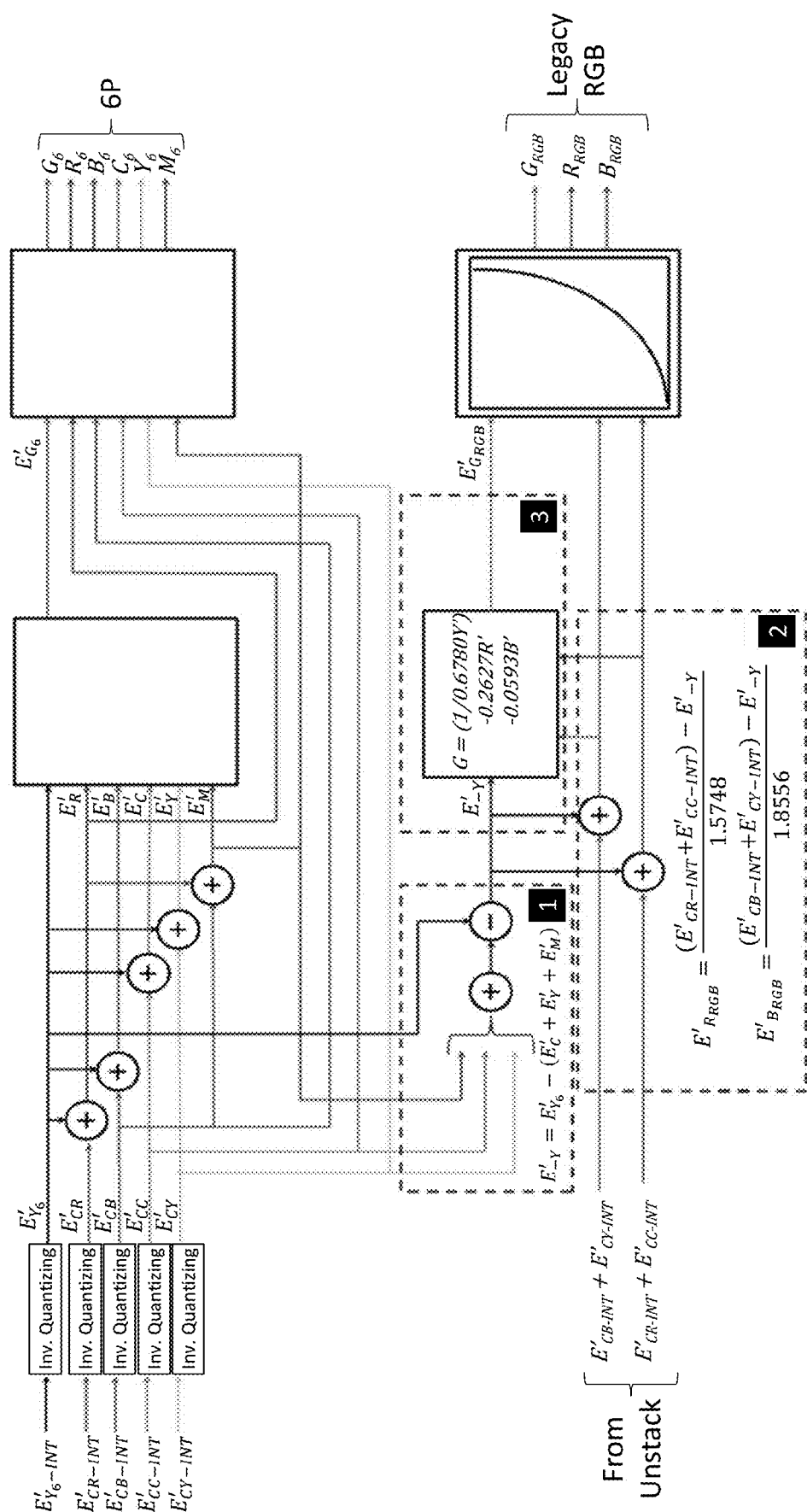
FIG. 50 illustrates one embodiment of a legacy RGB decoder for a six-primary, non-constant luminance system.

FIG. 50 illustrates one embodiment of a non-constant luminance decoder with a legacy process. The dotted box marked (1) shows the process where a new component called $E_{-Y}'$ is used to subtract the luminance levels that are present from the CYM channels from the $E_{CB\text{-}INT}'+E_{CY\text{-}INT}'$ and $E_{CR\text{-}INT}'+E_{CC\text{-}INT}'$ components as shown in box (2). The resulting output is now the R and B image components of the EOTF process. $E_{-Y}'$ is also sent to the G matrix to convert the luminance and color difference components to a green output as shown in box (3). Thus, R'G'B' is input to the EOTF process and output as $G_{RGB}$, $R_{RGB}$, and $B_{RGB}$. In another embodiment, the decoder is a legacy RGB decoder for non-constant luminance systems.

Figure 51:
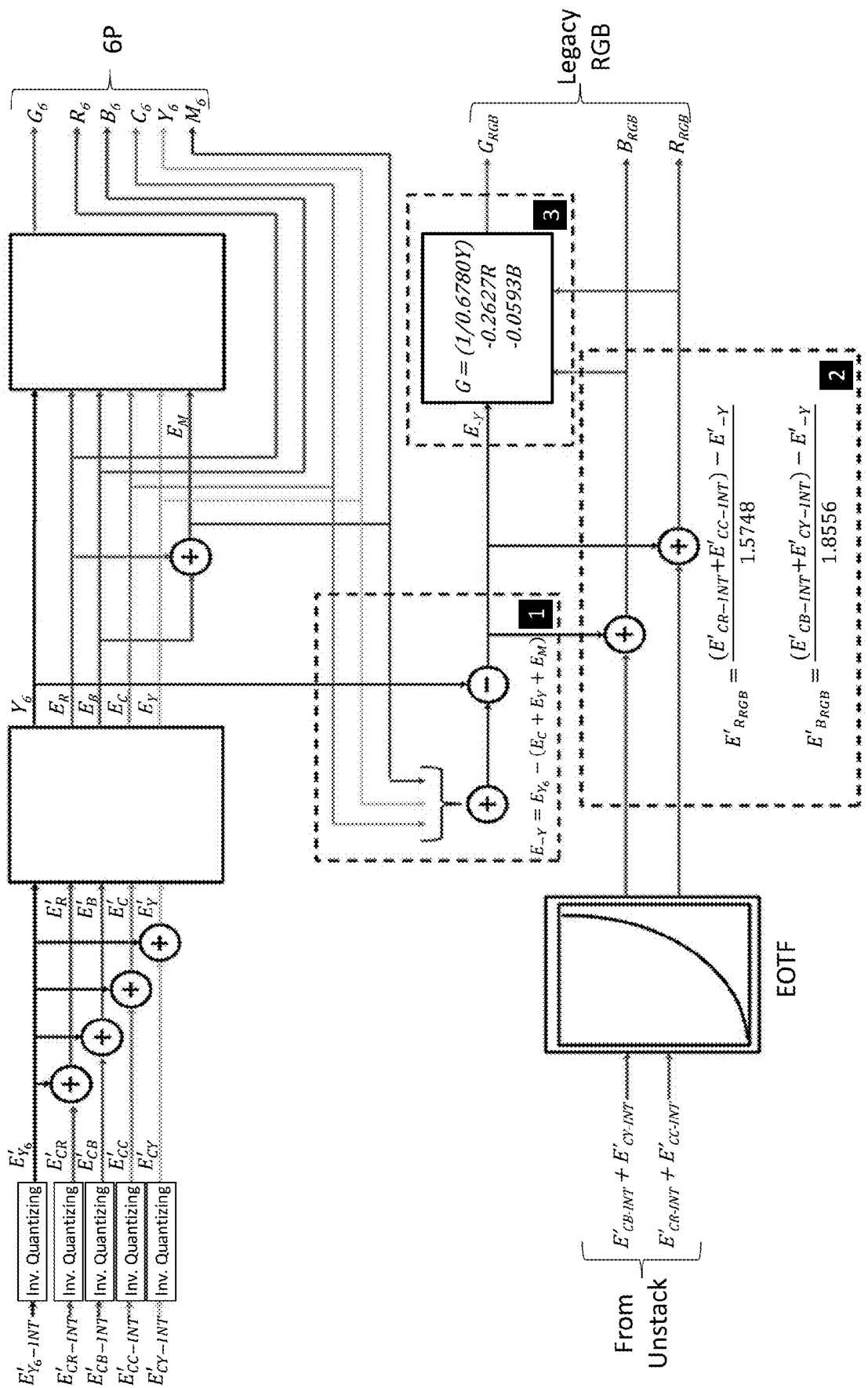
FIG. 51 illustrates one embodiment of a legacy RGB decoder for a six-primary, constant luminance system.

For a constant luminance system, the process is very similar with the exception that green is calculated as linear as shown in FIG. 51.

Six-Primary Color System Using a Matrix Output

Figure 52:
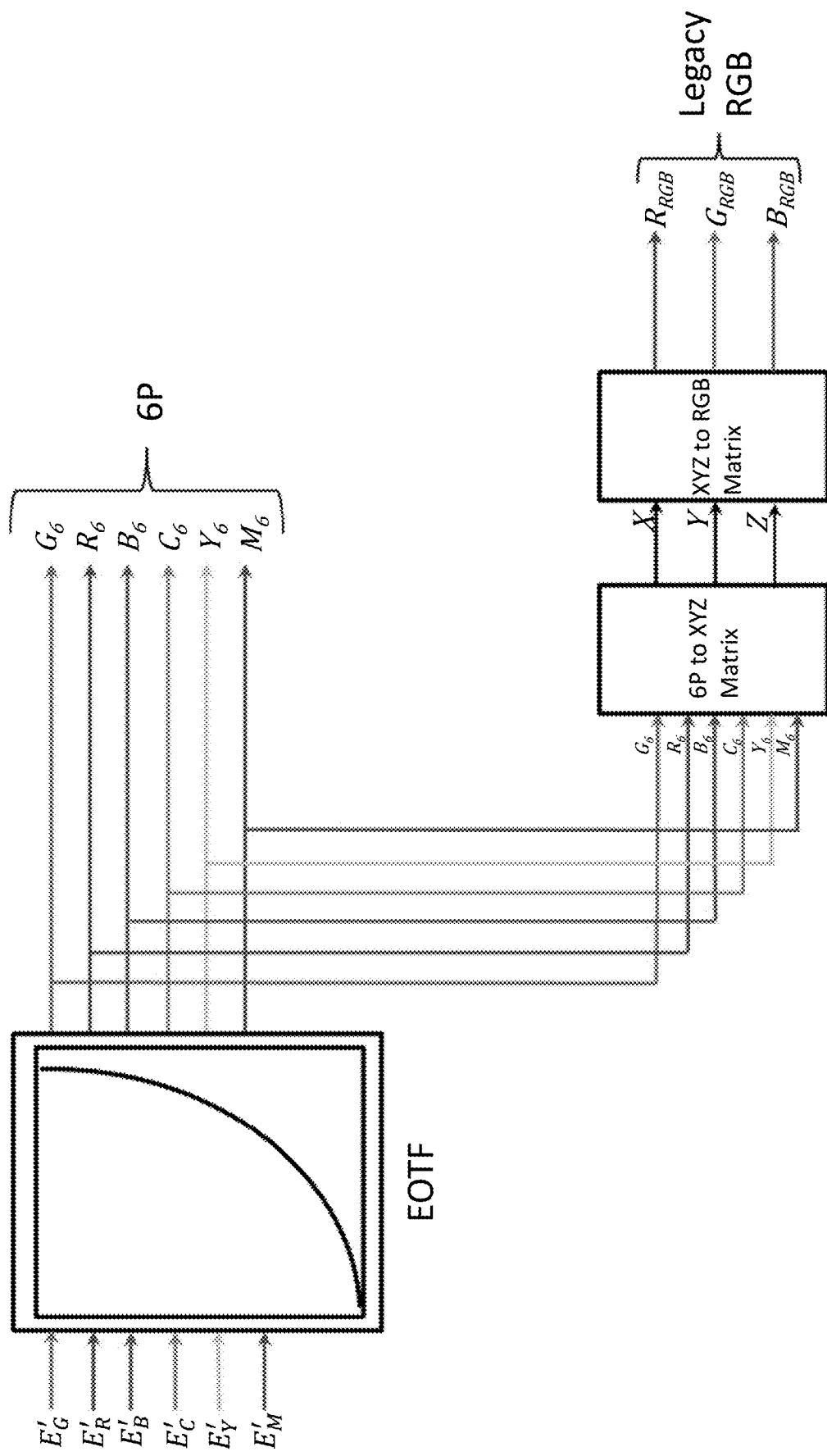
FIG. 52 illustrates one embodiment of a six-primary color system with output to a legacy RGB system.

In one embodiment, the six-primary color system outputs a legacy RGB image. This requires a matrix output to be built at the very end of the signal path. FIG. 52 illustrates one embodiment of a legacy RGB image output at the end of the signal path. The design logic of the CYM primaries is in that they are of equal saturation and placed at 180 degrees compared to RGB primaries. In one embodiment, two different color saturations are used, wherein the two different color saturations are based on standardized gamuts already in use. In one embodiment, the gamut is the ITU-R BT.709-6 gamut. In another embodiment, the gamut is the SMPTE RP431-2 gamut.

For simplicity, the 6P gamut based on ITU-R BT.709 saturation is referred to as "6P-B". The gamut based on SMPTE RP431-2 is referred to as "6P-C". Referring back to the discussion on white point, 6P-B specifies a white point as D65. 6P-C uses a white point of D60. TABLE 14 and TABLE 15 show a comparison between the 6P RGBCYM and related RGB color primary placements.

TABLE 14

| | 6P-B | | ITU-R BT.709 | |
|---|---|---|---|---|
| | u' | v' | u' | v' |
| White | 0.1978 | 0.4683 | 0.1978 | 0.4683 |
| Red | 0.4507 | 0.5229 | 0.4507 | 0.5229 |
| Green | 0.1250 | 0.5625 | 0.1250 | 0.5625 |
| Blue | 0.1754 | 0.1579 | 0.1754 | 0.1579 |
| Yellow | 0.2040 | 0.5650 | | |
| Cyan | 0.1000 | 0.4460 | | |
| Magenta | 0.3300 | 0.2930 | | |

TABLE 15

| | 6P-C | | SMPTE RP431-2 | |
|---|---|---|---|---|
| | u' | v' | u' | v' |
| White | 0.2010 | 0.4740 | 0.2010 | 0.4740 |
| Red | 0.4964 | 0.5256 | 0.4964 | 0.5256 |
| Green | 0.098 | 0.5777 | 0.098 | 0.5777 |
| Blue | 0.1754 | 0.1579 | 0.1754 | 0.1579 |
| Yellow | 0.2078 | 0.5683 | | |
| Cyan | 0.0960 | 0.4540 | | |
| Magenta | 0.3520 | 0.3200 | | |

The unstack process includes output as six, 11-bit color channels that are separated and delivered to a decoder. To convert an image from a six-primary color system to an RGB image, at least two matrices are used. One matrix is a 3×3 matrix converting a six-primary color system image to XYZ values. A second matrix is a 3×3 matrix for converting from XYZ to the proper RGB color space.

Figure 47:
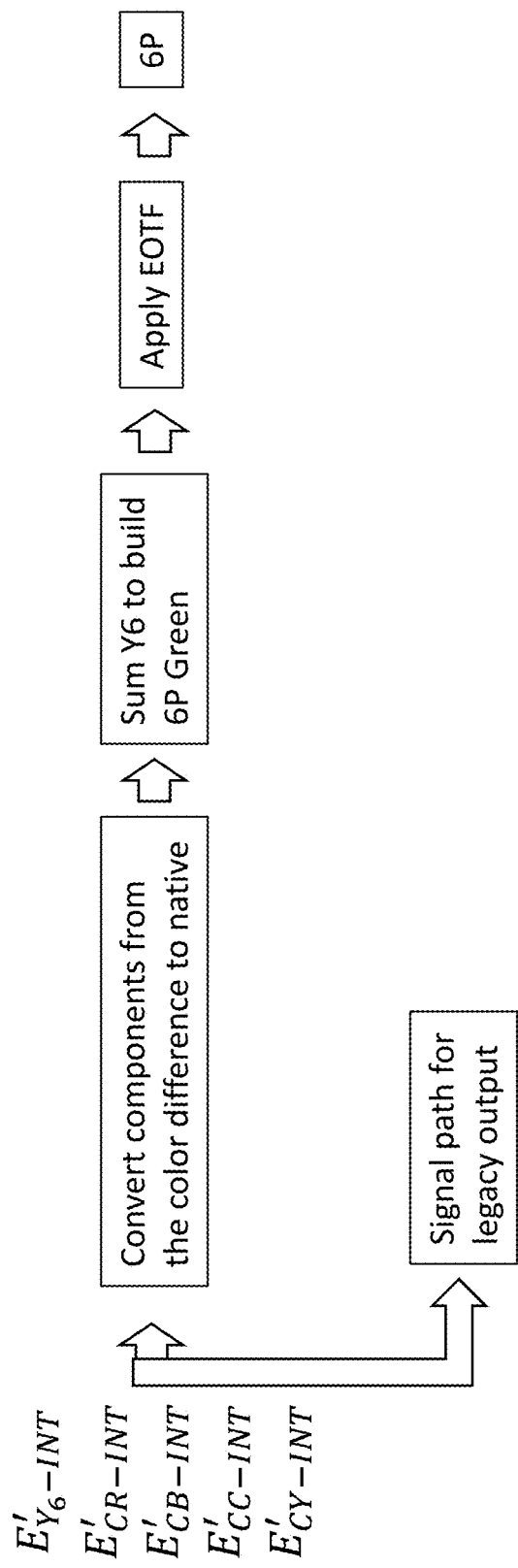
FIG. 47 illustrates one embodiment of six-primary color output using a non-constant luminance decoder.
Figure 48:
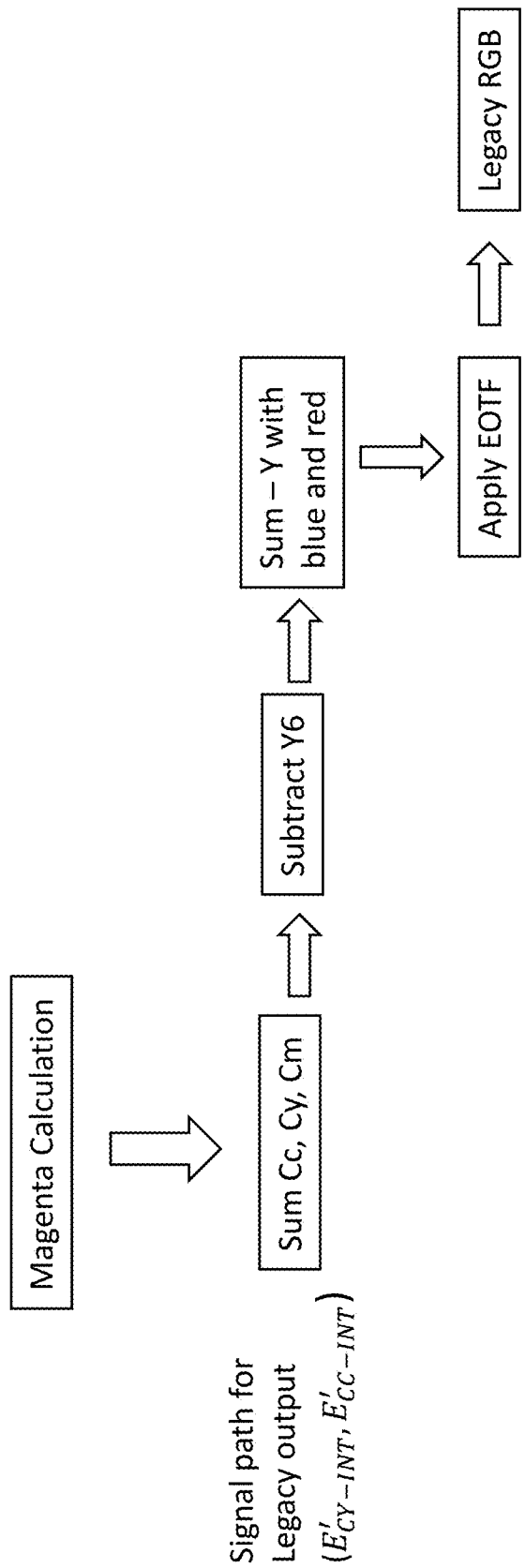
FIG. 48 illustrates one embodiment of a legacy RGB process within a six-primary color system.

When a six-primary display is connected to the six-primary output, each channel will drive each color. When this same output is sent to an RGB display, the CYM channels are ignored and only the RGB channels are displayed. An element of operation is that both systems drive from the black area. At this point in the decoder, all are coded as bit value 0 being black and bit value 2047 being peak color luminance. This process can also be reversed in a situation where an RGB source can feed a six-primary display. The six-primary display would then have no information for the CYM channels and would display the input in a standard RGB gamut. FIG. 47 illustrates one embodiment of six-primary color output using a non-constant luminance decoder. FIG. 48 illustrates one embodiment of a legacy RGB process within a six-primary color system.

The design of this matrix is a modification of the CIE process to convert RGB to XYZ. First, u'v' values are converted back to CIE 1931 xyz values using the following formulas:

$$x = \frac{9u\prime}{(6u' - 16v' + 12)}$$

$$y = \frac{4v\prime}{(6u' - 16v' + 12)}$$

$$z = 1 - x - y$$

Next, RGBCYM values are mapped to a matrix. The mapping is dependent upon the gamut standard being used. In one embodiment, the gamut is ITU-R BT.709-6. The mapping for RGBCYM values for an ITU-R BT.709-6 (6P-B) gamut are:

$$\begin{bmatrix} \begin{pmatrix} & x & y & z \\ R & 0.640 & 0.330 & 0.030 \\ G & 0.300 & 0.600 & 0.100 \\ B & 0.150 & 0.060 & 0.790 \\ C & 0.439 & 0.540 & 0.021 \\ Y & 0.165 & 0.327 & 0.509 \\ M & 0.320 & 0.126 & 0.554 \end{pmatrix} \begin{pmatrix} & R & G & B & C & Y & M \\ x & 0.640 & 0.300 & 0.150 & 0.439 & 0.165 & 0.319 \\ y & 0.330 & 0.600 & 0.060 & 0.540 & 0.327 & 0.126 \\ z & 0.030 & 0.100 & 0.790 & 0.021 & 0.509 & 0.554 \end{pmatrix} \end{bmatrix} = \begin{pmatrix} 0.519 & 0.393 & 0.140 \\ 0.393 & 0.460 & 0.160 \\ 0.140 & 0.160 & 0.650 \end{pmatrix}$$

In one embodiment, the gamut is SMPTE RP431-2. The mapping for RGBCYM values for a SMPTE RP431-2 (6P-C) gamut are:

$$\begin{bmatrix} \begin{pmatrix} & x & y & z \\ R & 0.680 & 0.320 & 0.000 \\ G & 0.264 & 0.691 & 0.045 \\ B & 0.150 & 0.060 & 0.790 \\ C & 0.450 & 0.547 & 0.026 \\ Y & 0.163 & 0.342 & 0.496 \\ M & 0.354 & 0.142 & 0.505 \end{pmatrix} \begin{pmatrix} & R & G & B & C & Y & M \\ x & 0.680 & 0.264 & 0.150 & 0.450 & 0.163 & 0.352 \\ y & 0.320 & 0.690 & 0.060 & 0.547 & 0.342 & 0.142 \\ z & 0.000 & 0.045 & 0.790 & 0.026 & 0.496 & 0.505 \end{pmatrix} \end{bmatrix} = \begin{pmatrix} 0.565 & 0.400 & 0.121 \\ 0.400 & 0.549 & 0.117 \\ 0.121 & 0.117 & 0.650 \end{pmatrix}$$

Following mapping the RGBCYM values to a matrix, a white point conversion occurs:

$$X = \frac{x}{y}$$

Y=1 Z=1−x−y

For a six-primary color system using an ITU-R BT.709-6 (6P-B) color gamut, the white point is D65:

$$0.9504 = \frac{0.3127}{0.3290}$$

For a six-primary color system using a SMPTE RP431-2 (6P-C) color gamut, the white point is D60:

$$0.9541 = \frac{0.3218}{0.3372}$$

Following the white point conversion, a calculation is required for RGB saturation values, $S_R$, $S_G$, and $S_B$. The results from the second operation are inverted and multiplied with the white point XYZ values. In one embodiment, the color gamut used is an ITU-R BT.709-6 color gamut. The values calculate as:

$$\begin{bmatrix} S_R \\ S_G \\ S_B \end{bmatrix}^{ITU-R\,BT.709-6} = \left[ \begin{pmatrix} 5.445 & -4.644 & -0.0253 \\ -4.644 & 6.337 & -0.563 \\ -0.0253 & -0.563 & 1.682 \end{pmatrix} \begin{pmatrix} 0.950 \\ 1 \\ 0.358 \end{pmatrix} \right]$$

Where $$\begin{bmatrix} S_R \\ S_G \\ S_B \end{bmatrix}^{ITU-R\,BT.709-6} = \begin{bmatrix} 0.522 \\ 1.722 \\ 0.015 \end{bmatrix}$$

In one embodiment, the color gamut is a SMPTE RP431-2 color gamut. The values calculate as:

$$\begin{bmatrix} S_R \\ S_G \\ S_B \end{bmatrix}^{SMPTE\,RP431-2} = \left[ \begin{pmatrix} 3.692 & -2.649 & -0.211 \\ -2.649 & 3.795 & -0.189 \\ -0.211 & -0.189 & 1.611 \end{pmatrix} \begin{pmatrix} 0.954 \\ 1 \\ 0.341 \end{pmatrix} \right]$$

Where $$\begin{bmatrix} S_R \\ S_G \\ S_B \end{bmatrix}^{SMPTE\,RP431-2} = \begin{bmatrix} 0.802 \\ 1.203 \\ 0.159 \end{bmatrix}$$

Next, a six-primary color-to-XYZ matrix must be calculated. For an embodiment where the color gamut is an ITU-R BT.709-6 color gamut, the calculation is as follows:

$$\begin{bmatrix} X \\ Y \\ Z \end{bmatrix} = \left[ \begin{pmatrix} 0.519 & 0.393 & 0.140 \\ 0.393 & 0.460 & 0.160 \\ 0.140 & 0.160 & 0.650 \end{pmatrix}^{ITU-R\,BT.709-6} \begin{pmatrix} 0.522 & 1.722 & 0.153 \\ 0.522 & 1.722 & 0.153 \\ 0.522 & 1.722 & 0.153 \end{pmatrix}^{D65} \right]$$

Wherein the resulting matrix is multiplied by the $S_R S_G S_B$ matrix:

$$\begin{bmatrix} X \\ Y \\ Z \end{bmatrix} = \begin{bmatrix} 0.271 & 0.677 & 0.002 \\ 0.205 & 0.792 & 0.003 \\ 0.073 & 0.276 & 0.010 \end{bmatrix} \begin{bmatrix} R \\ G \\ B \\ C \\ Y \\ M \end{bmatrix}^{ITU-R\,BT.709-6}$$

For an embodiment where the color gamut is a SMPTE RP431-2 color gamut, the calculation is as follows:

$$\begin{bmatrix} X \\ Y \\ Z \end{bmatrix} =$$

$$\left[ \begin{pmatrix} 0.565 & 0.401 & 0.121 \\ 0.401 & 0.549 & 0.117 \\ 0.121 & 0.117 & 0.650 \end{pmatrix}^{SMPTE\,RP431-2} \begin{pmatrix} 0.802 & 1.203 & 0.159 \\ 0.802 & 1.203 & 0.159 \\ 0.802 & 1.203 & 0.159 \end{pmatrix}^{D60} \right]$$

Wherein the resulting matrix is multiplied by the $S_R S_G S_B$ matrix:

$$\begin{bmatrix} X \\ Y \\ Z \end{bmatrix} = \begin{bmatrix} 0.453 & 0.482 & 0.019 \\ 0.321 & 0.660 & 0.019 \\ 0.097 & 0.141 & 0.103 \end{bmatrix} \begin{bmatrix} R \\ G \\ B \\ C \\ Y \\ M \end{bmatrix}^{SMPTE\,RP431-2}$$

Finally, the XYZ matrix must converted to the correct standard color space. In an embodiment where the color gamut used is an ITU-R BT709.6 color gamut, the matrices are as follows:

$$\begin{bmatrix} R \\ G \\ B \end{bmatrix}^{ITU-R\,BT709.6} = \begin{bmatrix} 3.241 & -1.537 & -0.499 \\ -0.969 & 1.876 & 0.042 \\ 0.056 & -0.204 & 1.057 \end{bmatrix} \begin{bmatrix} X \\ Y \\ Z \end{bmatrix}$$

In an embodiment where the color gamut used is a SMPTE RP431-2 color gamut, the matrices are as follows:

$$\begin{bmatrix} R \\ G \\ B \end{bmatrix}^{SMPTE\,RP431-2} = \begin{bmatrix} 2.73 & -1.018 & -0.440 \\ -0.795 & 1.690 & 0.023 \\ 0.041 & -0.088 & 1.101 \end{bmatrix} \begin{bmatrix} X \\ Y \\ Z \end{bmatrix}$$

Packing a Six-Primary Color System into $IC_T C_P$ $IC_T C_P$ (ITP) is a color representation format specified in the Rec. ITU-R BT.2100 standard that is used as a part of the color image pipeline in video and digital photography systems for high dynamic range (HDR) and wide color gamut (WCG) imagery. The I (intensity) component is a luma component that represents the brightness of the video. $C_T$ and $C_P$ are blue-yellow ("tritanopia") and red-green ("protanopia") chroma components. The format is derived from an associated RGB color space by a coordination transformation that includes two matrix transformations and an intermediate non-linear transfer function, known as a gamma pre-correction. The transformation produces three signals: I, $C_T$, and $C_P$. The ITP transformation can be used with RGB signals derived from either the perceptual quantizer (PQ) or hybrid log-gamma (HLG) nonlinearity functions.

Figure 53:
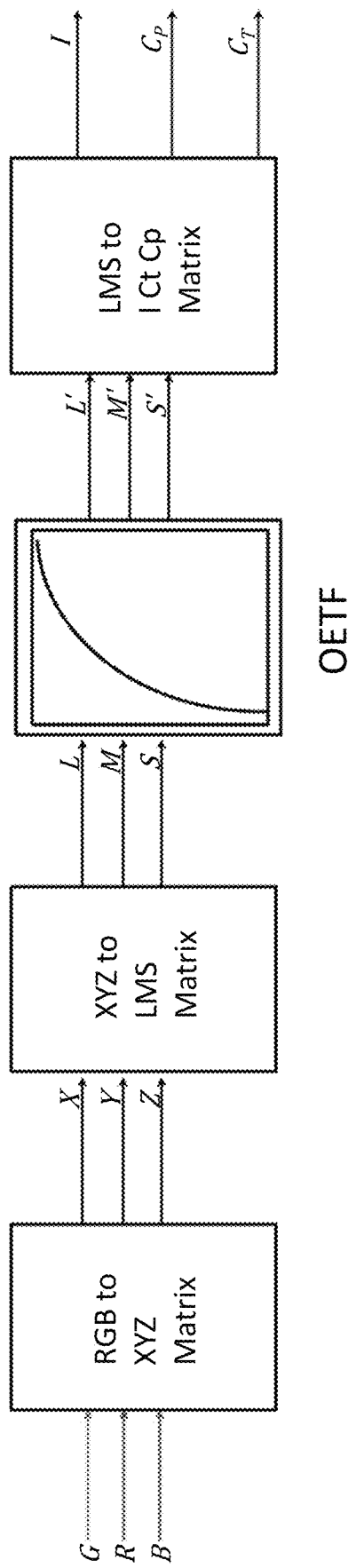
FIG. 53 illustrates one embodiment of packing six-primary color system image data into an ICrCP (ITP) format.

FIG. 53 illustrates one embodiment of packing six-primary color system image data into an $IC_TC_P$ (ITP) format. In one embodiment, RGB image data is converted to an XYZ matrix. The XYZ matrix is then converted to an LMS matrix. The LMS matrix is then sent to an optical electronic transfer function (OETF). The conversion process is represented below:

$$\begin{bmatrix} L \\ M \\ S \end{bmatrix} = \left[ \begin{pmatrix} a_{11} & a_{12} & a_{13} \\ a_{21} & a_{22} & a_{23} \\ a_{31} & a_{32} & a_{33} \end{pmatrix} \begin{pmatrix} 0.359 & 0.696 & -0.036 \\ -0.192 & 1.100 & 0.075 \\ 0.007 & 0.075 & 0.843 \end{pmatrix} \right] \begin{bmatrix} R \\ G \\ B \end{bmatrix}$$

Output from the OETF is converted to ITP format. The resulting matrix is:

$$\begin{pmatrix} 0.5 & 0.5 & 0 \\ 1.614 & -3.323 & 1.710 \\ 4.378 & -4.246 & -0.135 \end{pmatrix}$$

Figure 54:
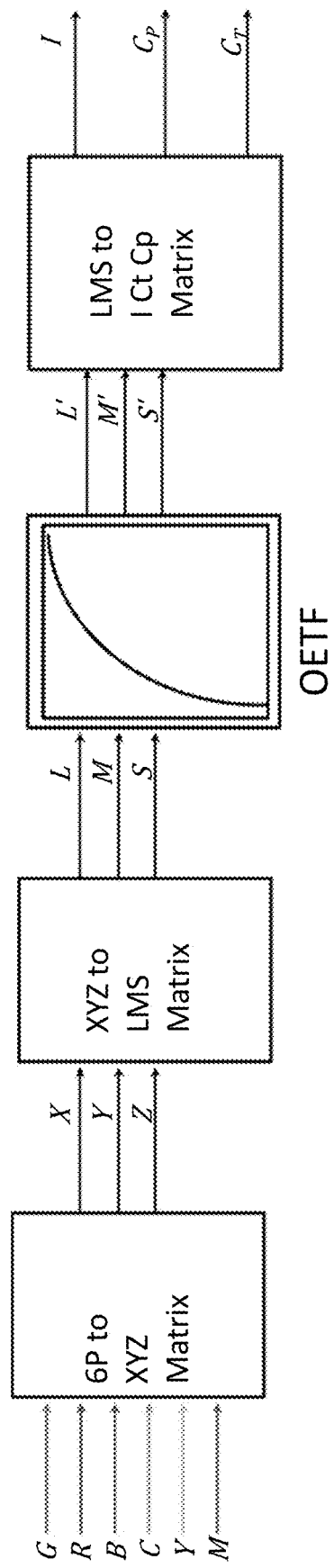
FIG. 54 illustrates one embodiment of a six-primary color system converting RGBCYM image data into XYZ image data for an ITP format.

FIG. 54 illustrates one embodiment of a six-primary color system converting RGBCYM image data into XYZ image data for an ITP format (e.g., 6P-B, 6P-C). For a six-primary color system, this is modified by replacing the RGB to XYZ matrix with a process to convert RGBCYM to XYZ. This is the same method as described in the legacy RGB process. The new matrix is as follows for an ITU-R BT.709-6 (6P-B) color gamut:

$$\begin{bmatrix} L \\ M \\ S \end{bmatrix} = \begin{pmatrix} 0.271 & 0.677 & 0.002 \\ 0.205 & 0.792 & 0.003 \\ 0.073 & 0.277 & 0.100 \end{pmatrix} \begin{pmatrix} 0.359 & 0.696 & -0.036 \\ -0.192 & 1.100 & 0.075 \\ 0.007 & 0.075 & 0.843 \end{pmatrix} \begin{bmatrix} R \\ G \\ B \\ C \\ Y \\ M \end{bmatrix}^{ITU-R\ BT.709-6}$$

RGBCYM data, based on an ITU-R BT.709-6 color gamut, is converted to an XYZ matrix. The resulting XYZ matrix is converted to an LMS matrix, which is sent to an OETF. Once processed by the OETF, the LMS matrix is converted to an ITP matrix. The resulting ITP matrix is as follows:

$$\begin{pmatrix} 0.5 & 0.5 & 0 \\ 1.614 & -3.323 & 1.710 \\ 4.378 & -4.246 & -0.135 \end{pmatrix}$$

In another embodiment, the LMS matrix is sent to an Optical Optical Transfer Function (OOTF). In yet another embodiment, the LMS matrix is sent to a Transfer Function other than OOTF or OETF.

In another embodiment, the RGBCYM data is based on the SMPTE ST431-2 (6P-C) color gamut. The matrices for an embodiment using the SMPTE ST431-2 color gamut are as follows:

$$\begin{bmatrix} L \\ M \\ S \end{bmatrix} =$$

$$\begin{pmatrix} 0.453 & 0.481 & 0.019 \\ 0.321 & 0.660 & 0.019 \\ 0.097 & 0.141 & 0.103 \end{pmatrix} \begin{pmatrix} 0.359 & 0.696 & -0.036 \\ -0.192 & 1.100 & 0.075 \\ 0.007 & 0.075 & 0.843 \end{pmatrix} \begin{bmatrix} R \\ G \\ B \\ C \\ Y \\ M \end{bmatrix}^{SMPTE\ ST431-2}$$

The resulting ITP matrix is:

$$\begin{pmatrix} 0.5 & 0.5 & 0 \\ 1.614 & -3.323 & 1.710 \\ 4.378 & -4.246 & -0.135 \end{pmatrix}$$

The decode process uses the standard ITP decode process, as the $S_R S_G S_B$ cannot be easily inverted. This makes it difficult to recover the six RGBCYM components from the ITP encode. Therefore, the display is operable to use the standard ICtCp decode process as described in the standards and is limited to just RGB output.

Mapping a Six-Primary Color System into Standardized Transport Formats

Each encode and/or decode system fits into existing video serial data streams that have already been established and standardized. This is key to industry acceptance. Encoder and/or decoder designs require little or no modification for a six-primary color system to map to these standard serial formats.

Figure 55:
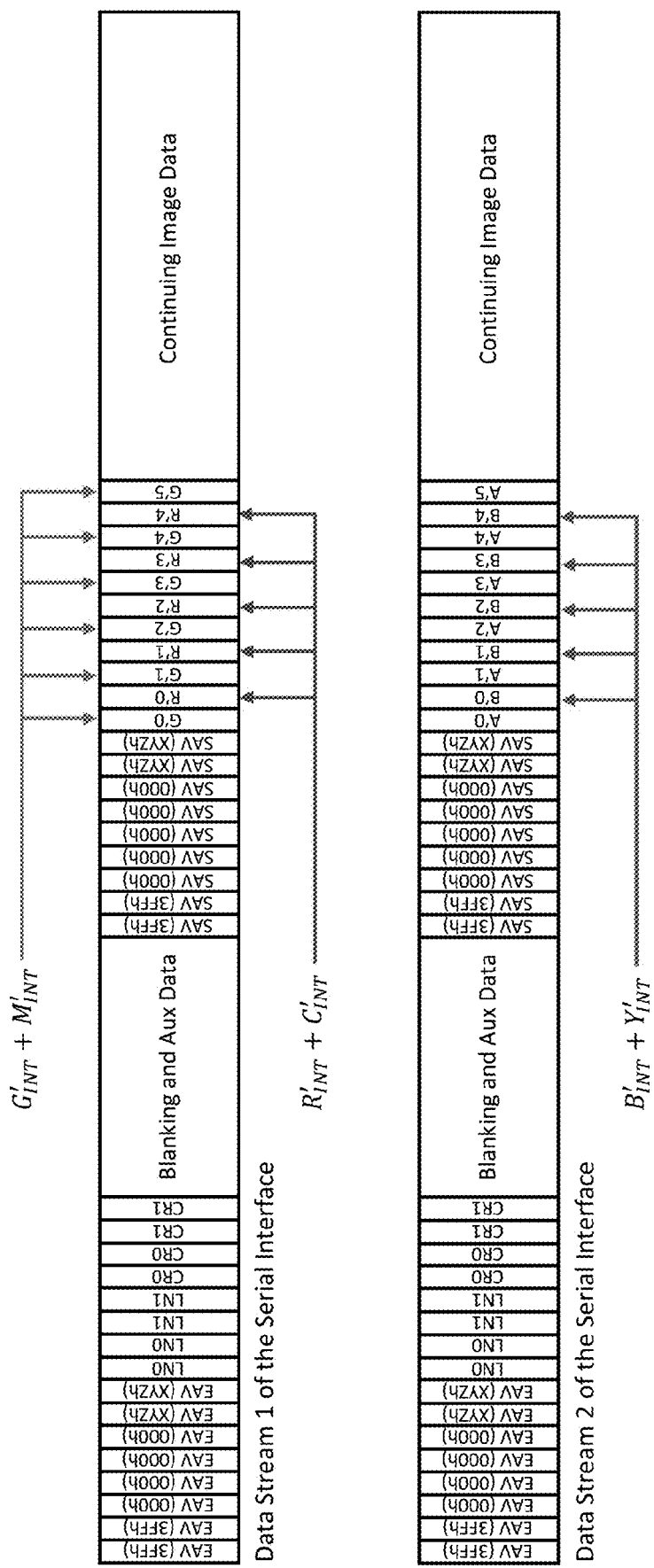
FIG. 55 illustrates one embodiment of six-primary color mapping with SMPTE ST424.

FIG. 55 illustrates one embodiment of a six-primary color system mapping to a SMPTE ST424 standard serial format. The SMPTE ST424/ST425 set of standards allow very high sampling systems to be passed through a single cable. This is done by using alternating data streams, each containing different components of the image. For use with a six-primary color system transport, image formats are limited to RGB due to the absence of a method to send a full bandwidth Y signal.

Figure 56:
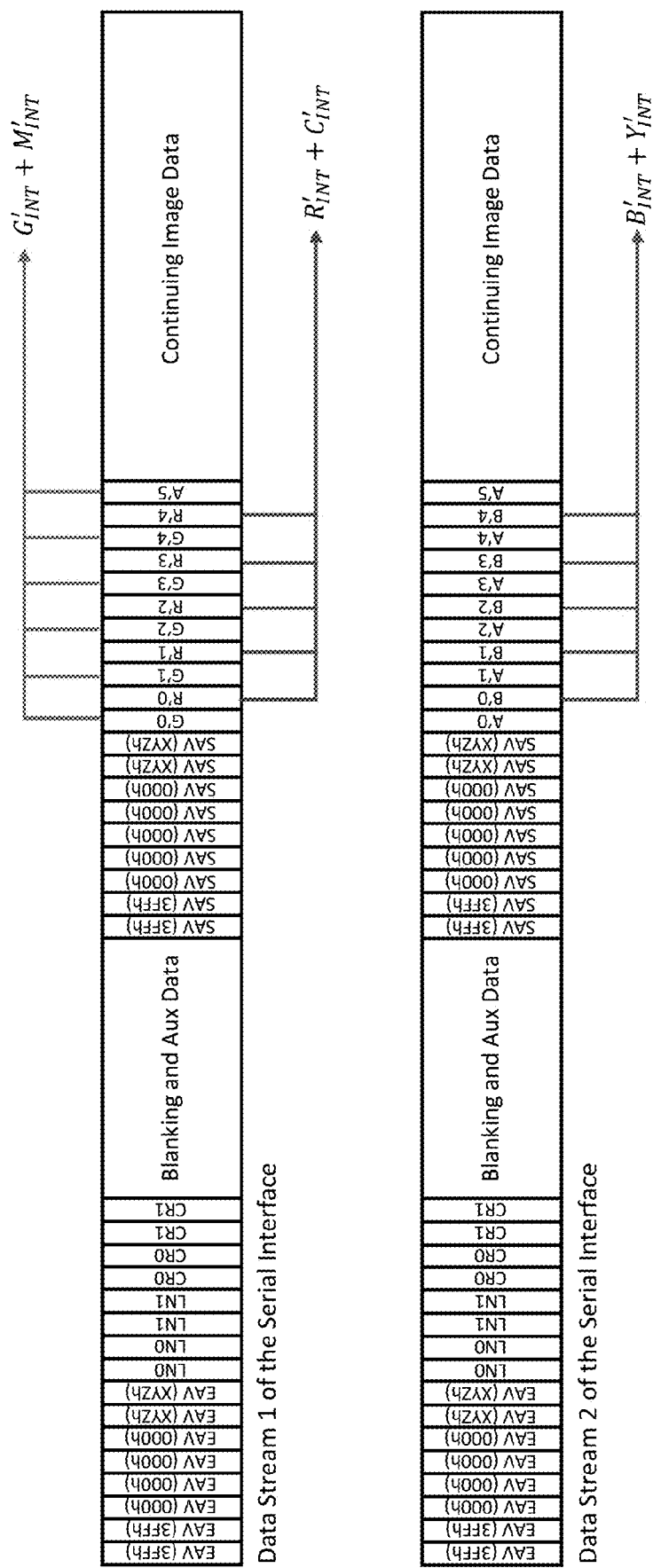
FIG. 56 illustrates one embodiment of a six-primary color system readout for a SMPTE ST424 standard.

The process for mapping a six-primary color system to a SMPTE ST425 format is the same as mapping to a SMPTE ST424 format. To fit a six-primary color system into a SMPTE ST425/424 stream involves the following substitutions: $G_{INT}'+M_{INT}'$ is placed in the Green data segments, $R_{INT}'+C_{INT}'$ is placed in the Red data segments, and $B_{INT}'+Y_{INT}'$ is placed into the Blue data segments. FIG. 56 illustrates one embodiment of an SMPTE 424 6P readout.

System 2 requires twice the data rate as System 1, so it is not compatible with SMPTE 424. However, it maps easily into SMPTE ST2082 using a similar mapping sequence. In one example, system 2 is used to have the same data speed defined for 8K imaging to show a 4K image.

Figure 57:
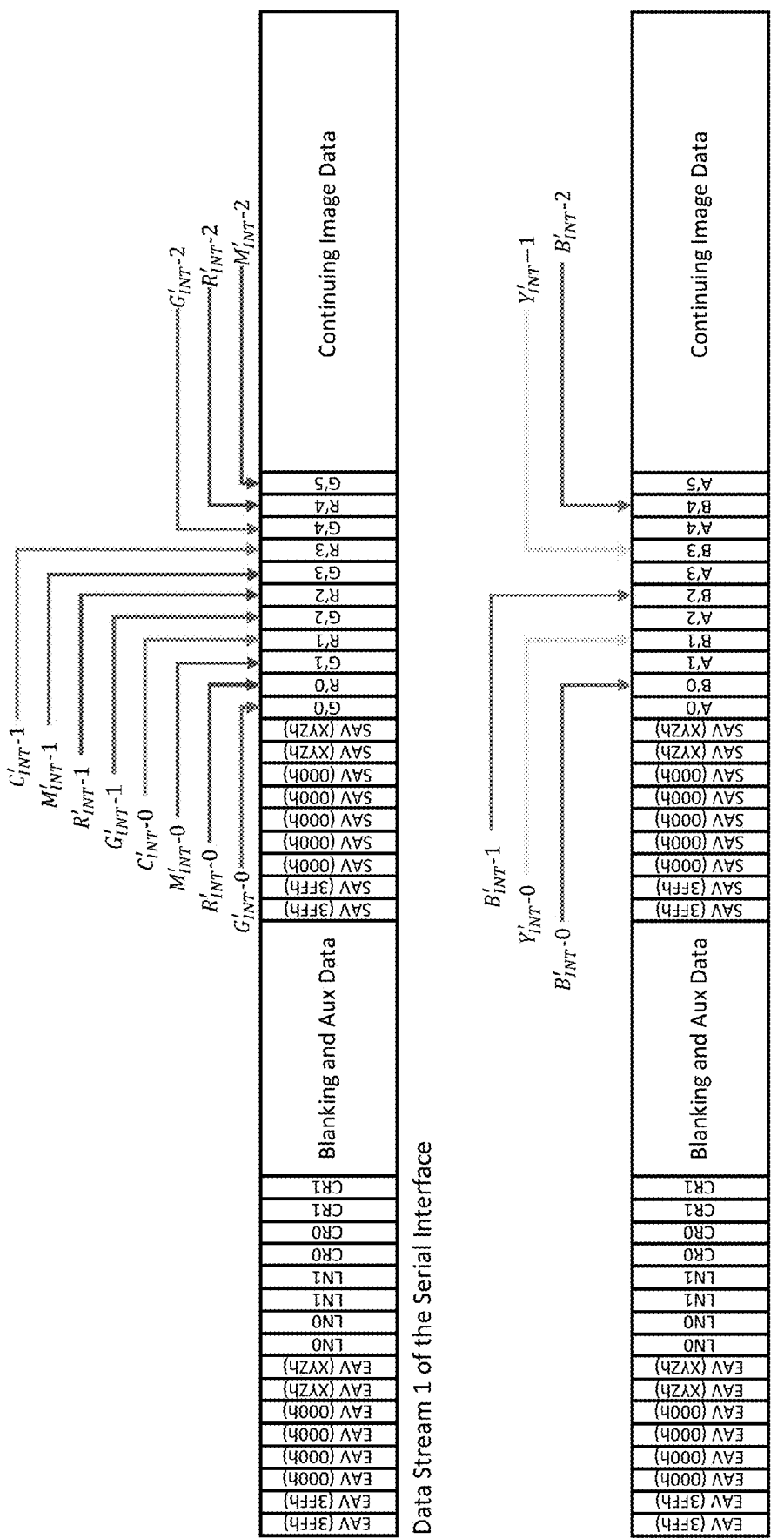
FIG. 57 illustrates one embodiment for mapping RGBCYM data to the SMPTE ST2082 standard for a six-primary color system.
Figure 58:
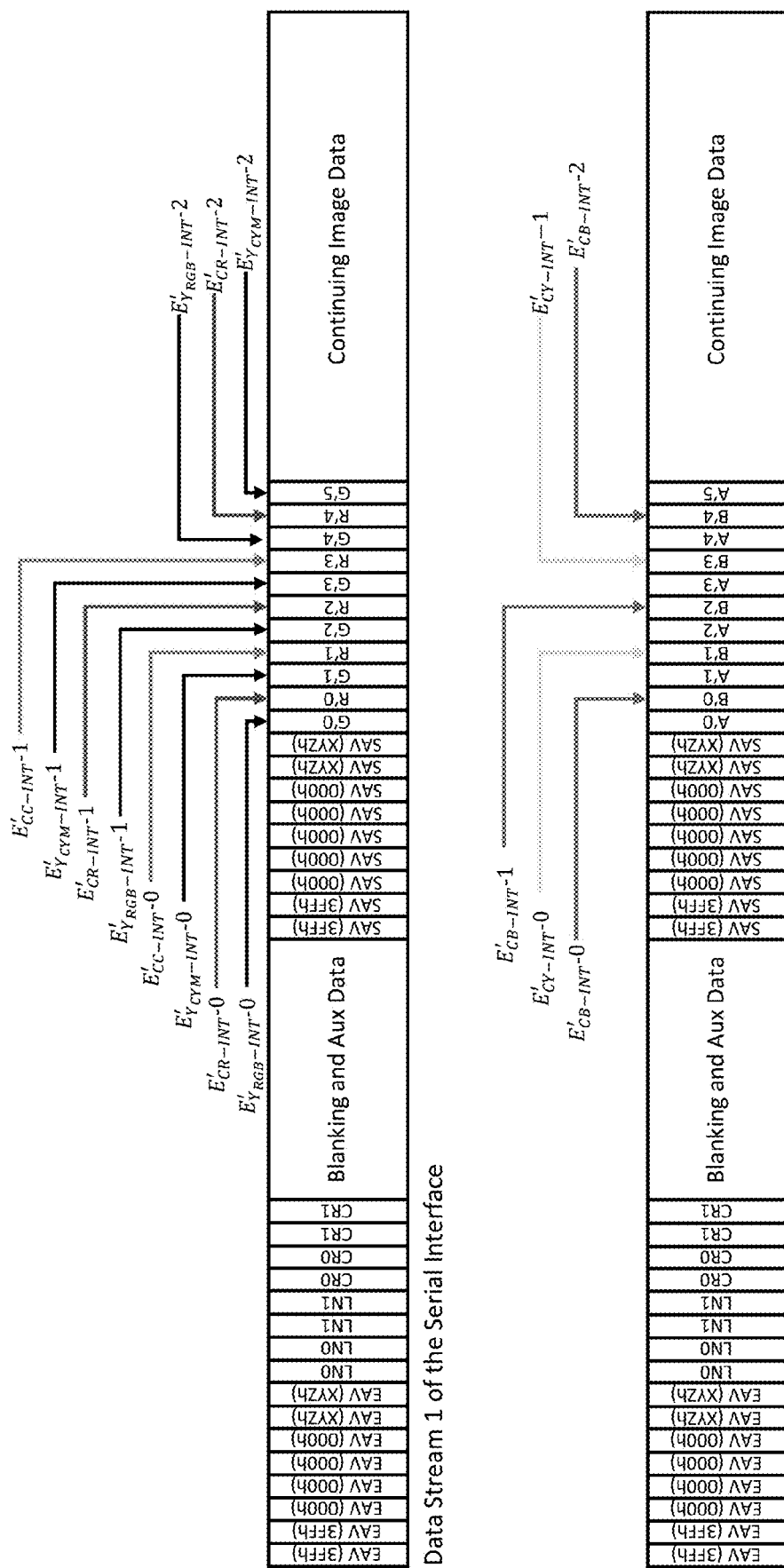
FIG. 58 illustrates one embodiment for mapping $Y_{RGB}$ $Y_{CYM} C_R C_B C_C C_Y$ data to the SMPTE ST2082 standard for a six-primary color system.

FIG. 57 and FIG. 58 illustrate serial digital interfaces for a six-primary color system using the SMPTE ST2082 standard. In one embodiment, the six-primary color system data is RGBCYM data, which is mapped to the SMPTE ST2082 standard (FIG. 57). In one embodiment, the six-primary color system data is $Y_{RGB} Y_{CYM} C_R C_B C_C C_Y$ data, which is mapped to the SMPTE ST2082 standard (FIG. 58).

In one embodiment, the standard serial format is SMPTE ST292. SMPTE ST292 is an older standard than ST424 and is a single wire format for 1.5 GB video, whereas ST424 is designed for up to 3 GB video. However, while ST292 can identify the payload ID of SMPTE ST352, it is constrained to only accepting an image identified by a hex value, 0h. All other values are ignored. Due to the bandwidth and identifications limitations in ST292, a component video six-primary color system incorporates a full bit level luminance component. To fit a six-primary color system into a SMPTE ST292 stream involves the following substitutions: $E_{Y_6\text{-}INT}'$ is placed in the Y data segments, $E_{Cb\text{-}INT}'+E_{Cy\text{-}INT}'$ is placed in the Cb data segments, and $E_{Cr\text{-}INT}'+E_{Cc\text{-}INT}'$ is placed in the Cr data segments. In another embodiment, the standard serial format is SMPTE ST352.

SMPTE ST292 and ST424 Serial Digital Interface (SDI) formats include payload identification (ID) metadata to help the receiving device identify the proper image parameters. The tables for this need modification by adding at least one flag identifying that the image source is a six-primary color RGB image. Therefore, six-primary color system format additions need to be added. In one embodiment, the standard is the SMPTE ST352 standard.

Figure 59:
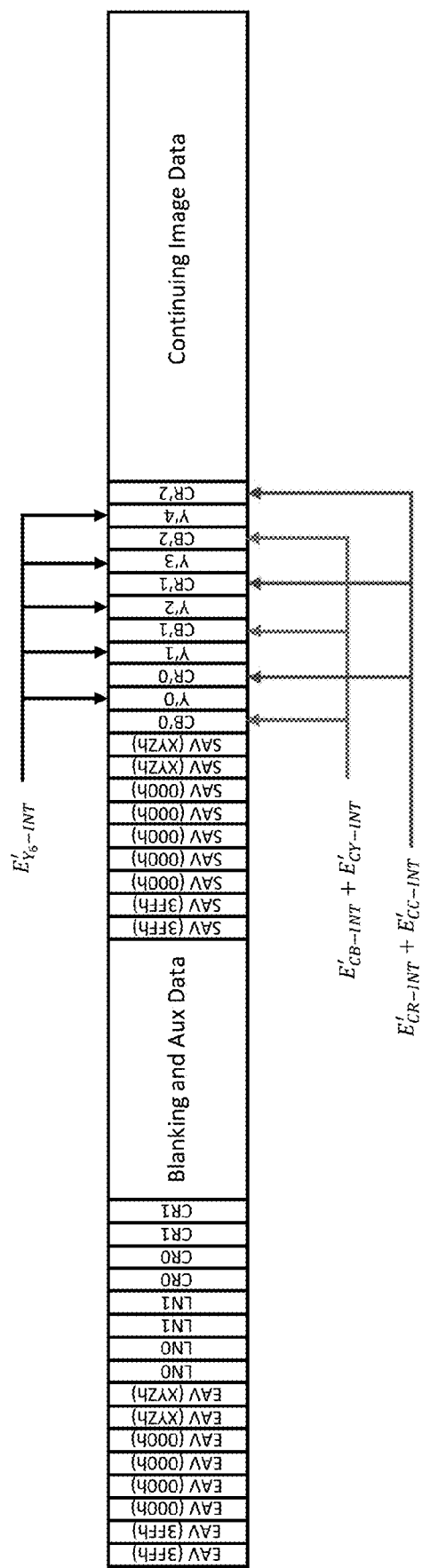
FIG. 59 illustrates one embodiment for mapping six-primary color system data using the SMPTE ST292 standard.
Figure 60:
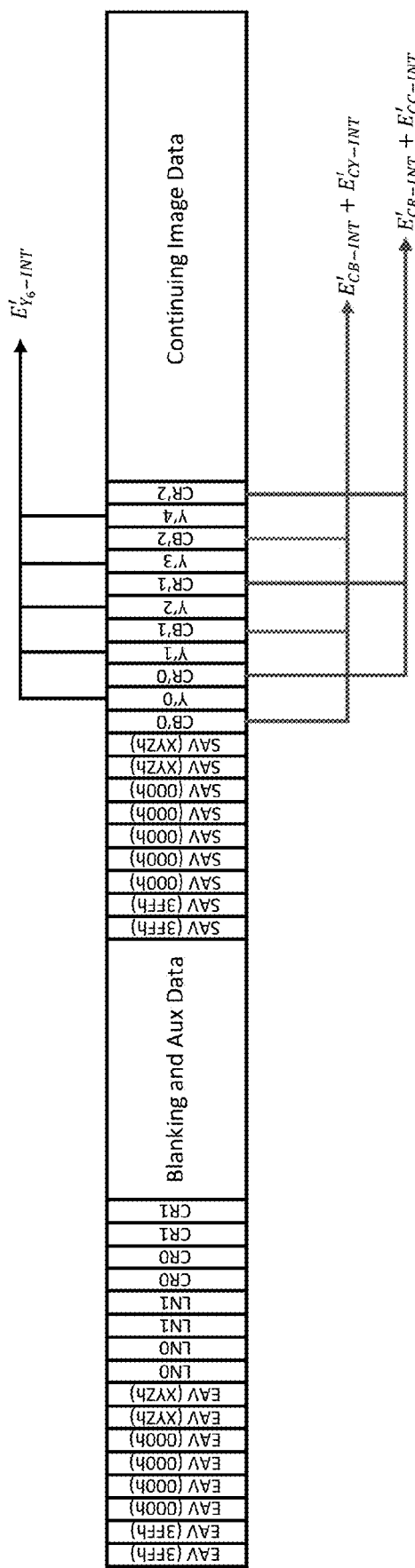
FIG. 60 illustrates one embodiment of the readout for a six-primary color system using the SMPTE ST292 standard.

FIG. 59 illustrates one embodiment of an SMPTE ST292 6P mapping. FIG. 60 illustrates one embodiment of an SMPTE ST292 6P readout.

FIG. 61 illustrates modifications to the SMPTE ST352 standards for a six-primary color system. Hex code "Bh" identifies a constant luminance source and flag "Fh" indicates the presence of a six-primary color system. In one embodiment, Fh is used in combination with at least one other identifier located in byte 3. In another embodiment, the Fh flag is set to 0 if the image data is formatted as System 1 and the Fh flag is set to 1 if the image data is formatted as System 2.

In another embodiment, the standard serial format is SMPTE ST2082. Where a six-primary color system requires more data, it may not always be compatible with SMPTE ST424. However, it maps easily into SMPTE ST2082 using the same mapping sequence. This usage would have the same data speed defined for 8K imaging in order to display a 4K image.

In another embodiment, the standard serial format is SMPTE ST2022. Mapping to ST2022 is similar to mapping to ST292 and ST242, but as an ETHERNET format. The output of the stacker is mapped to the media payload based on Real-time Transport Protocol (RTP) 3550, established by the Internet Engineering Task Force (IETF). RTP provides end-to-end network transport functions suitable for applications transmitting real-time data, including, but not limited to, audio, video, and/or simulation data, over multicast or unicast network services. The data transport is augmented by a control protocol (RTCP) to allow monitoring of the data delivery in a manner scalable to large multicast networks, and to provide control and identification functionality.

FIG. 62 illustrates one embodiment of a modification for a six-primary color system using the SMPTE ST2202 standard. For SMPTE ST2202-6:2012 (HBRMT), there are no changes needed in formatting or mapping of the bit packing. ST2022 relies on header information to correctly configure the media payload. Parameters for this are established within the payload header using the video source format fields including, but not limited to, MAP, FRAME, FRATE, and/or SAMPLE. MAP, FRAME, and FRATE remain as described in the standard. MAP is used to identify if the input is ST292 or ST425 (RGB or Y Cb Cr). SAMPLE is operable for modification to identify that the image is formatted as a six-primary color system image. In one embodiment, the image data is sent using flag "0h" (unknown/unspecified).

In another embodiment, the standard is SMPTE ST2110. SMPTE ST2110 is a relatively new standard and defines moving video through an Internet system. The standard is based on development from the IETF and is described under RFC3550. Image data is described through "pgroup" construction. Each pgroup consists of an integer number of octets. In one embodiment, a sample definition is RGB or YCbCr and is described in metadata. In one embodiment, the metadata format uses a Session Description Protocol (SDP) format. Thus, pgroup construction is defined for 4:4:4, 4:2:2, and 4:2:0 sampling as 8-bit, 10-bit, 12-bit, and in some cases 16-bit and 16-bit floating point wording. In one embodiment, six-primary color image data is limited to a 10-bit depth. In another embodiment, six-primary color image data is limited to a 12-bit depth. Where more than one sample is used, it is described as a set. For example, 4:4:4 sampling for blue, as a non-linear RGB set, is described as C0'B, C1'B, C2'B, C3'B, and C4'B. The lowest number index being left most within the image. In another embodiment, the method of substitution is the same method used to map six-primary color content into the ST2110 standard.

In another embodiment, the standard is SMPTE ST2110. SMPTE ST2110-20 describes the construction for each pgroup. In one embodiment, six-primary color system content arrives for mapping as non-linear data for the SMPTE ST2110 standard. In another embodiment, six-primary color system content arrives for mapping as linear data for the SMPTE ST2110 standard.

FIG. 63 illustrates a table of 4:4:4 sampling for a six-primary color system for a 10-bit video system. For 4:4:4 10-bit video, 15 octets are used and cover 4 pixels.

FIG. 64 illustrates a table of 4:4:4 sampling for a six-primary color system for a 12-bit video system. For 4:4:4 12-bit video, 9 octets are used and cover 2 pixels before restarting the sequence.

Non-linear GRBMYC image data would arrive as: $G_{INT}'+M_{INT}'$, $R_{INT}'+C_{INT}'$, and $B_{INT}'+Y_{INT}'$. Component substitution would follow what has been described for SMPTE ST424, where $G_{INT}'+M_{INT}'$ is placed in the Green data segments, $R_{INT}'+C_{INT}'$ is placed in the Red data segments, and $B_{INT}'+Y_{INT}'$ is placed in the Blue data segments. The sequence described in the standard is shown as R0', G0', B0', R1', G1', B1', etc.

FIG. 65 illustrates sequence substitutions for 10-bit and 12-bit video in 4:2:2 sampling systems in a Y Cb Cr Cc Cy color space. Components are delivered to a 4:2:2 pgroup including, but not limited to, $E_{Y_6\text{-}INT}'$, $E_{Cb\text{-}INT}'+E_{Cy\text{-}INT}'$, and $E_{Cr\text{-}INT}'+E_{Cc\text{-}INT}'$. For 4:2:2 10-bit video, 5 octets are used and cover 2 pixels. For 4:2:2 12-bit video, 6 octets are used and cover 2 pixels before restarting the sequence. Component substitution follows what has been described for SMPTE ST292, where $E_{Y_6\text{-}INT}'$ is placed in the Y data segments, $E_{Cb\text{-}INT}'+E_{Cy\text{-}INT}'$ is placed in the Cb data segments, and $E_{Cr\text{-}INT}'+E_{Cc\text{-}INT}'$ is placed in the Cr data segments. The sequence described in the standard is shown as Cb0', Y0', Cr0', Y1', Cr1', Y3', Cb2', Y4', Cr2', Y5', etc. In another embodiment, the video data is represented at a bit level other than 10-bit or 12-bit. In another embodiment, the sampling system is a sampling system other than 4:2:2. In another embodiment, the standard is STMPE ST2110.

Figure 66:
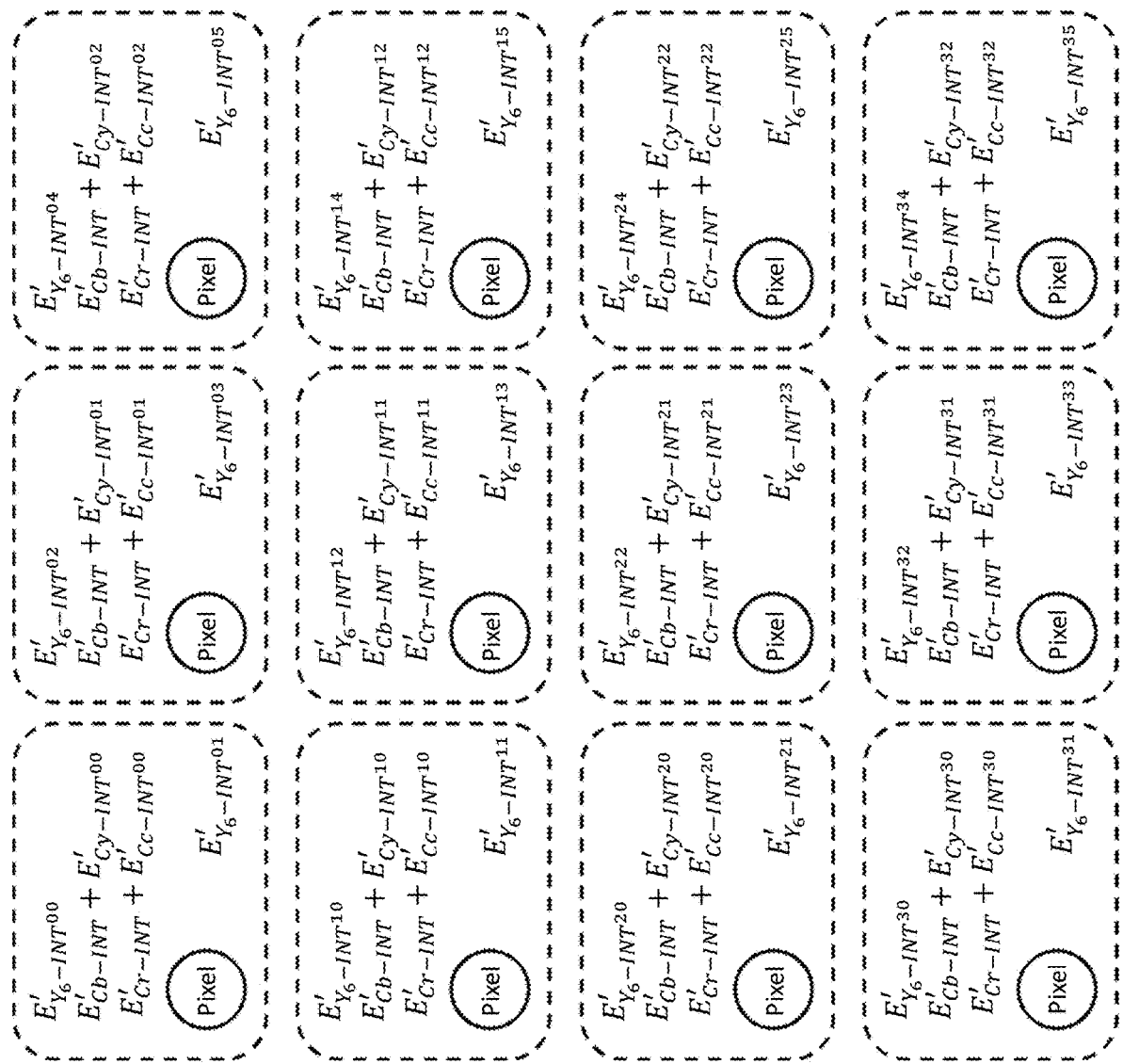
FIG. 66 illustrates sample placements of six-primary system components for a 4:2:2 sampling system image.

FIG. 66 illustrates sample placements of six-primary system components for a 4:2:2 sampling system image. This follows the substitutions illustrated in FIG. 65, using a 4:2:2 sampling system.

FIG. 67 illustrates sequence substitutions for 10-bit and 12-bit video in 4:2:0 sampling systems using a Y Cb Cr Cc Cy color space. Components are delivered to a pgroup including, but not limited to, $E_{Y6\text{-}INT}'$, $E_{Cb\text{-}INT}'+E_{Cy\text{-}INT}'$, and $E_{Cr\text{-}INT}'+E_{Cc\text{-}INT}'$. For 4:2:0 10-bit video data, 15 octets are used and cover 8 pixels. For 4:2:0 12-bit video data, 9 octets are used and cover 4 pixels before restarting the sequence. Component substitution follows what is described in SMPTE ST292 where $E_{Y6\text{-}INT}'$ is placed in the Y data segments, $E_{Cb\text{-}INT}'+E_{Cy\text{-}INT}'$ is placed in the Cb data segments, and $E_{Cr\text{-}INT}'+E_{Cc\text{-}INT}'$ is placed in the Cr data segments. The sequence described in the standard is shown as Y'00, Y'01, Y', etc.

Figure 68:
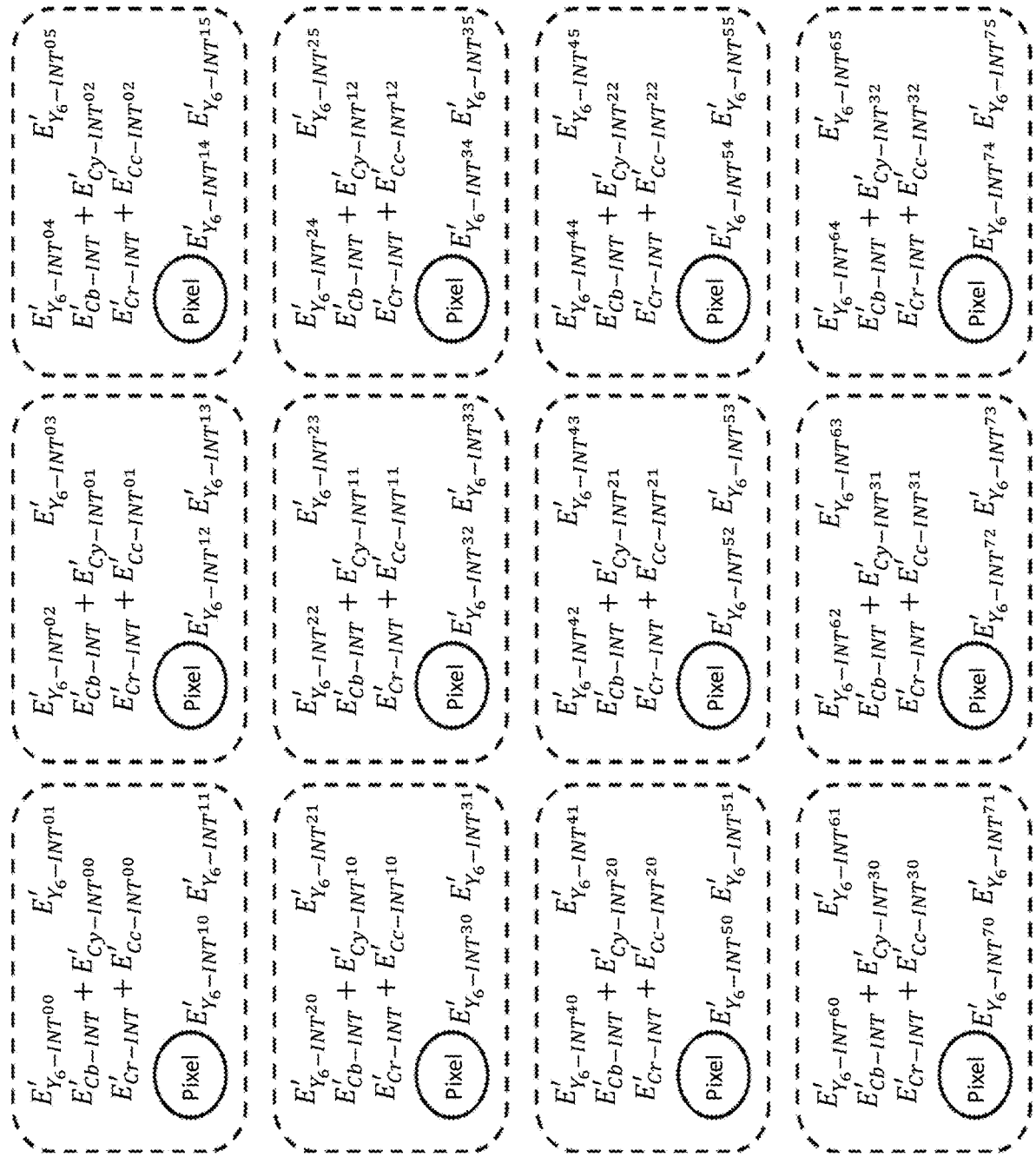
FIG. 68 illustrates sample placements of six-primary system components for a 4:2:0 sampling system image.

FIG. 68 illustrates sample placements of six-primary system components for a 4:2:0 sampling system image. This follows the substitutions illustrated in FIG. 67, using a 4:2:0 sampling system.

FIG. 69 illustrates modifications to SMPTE ST2110-20 for a 10-bit six-primary color system in 4:4:4 video. SMPTE ST2110-20 describes the construction of each "pgroup". Normally, six-primary color system data and/or content would arrive for mapping as non-linear. However, with the present system there is no restriction on mapping data and/or content. For 4:4:4, 10-bit video, 15 octets are used and cover 4 pixels before restarting the sequence. Non-linear, six-primary color system image data would arrive as $G_{INT}'$, $B_{INT}'$, $R_{INT}'$, $M_{INT}'$, $Y_{INT}'$, and $C_{INT}'$. The sequence described in the standard is shown as R0', G0', B0', R1', G1', B1', etc.

FIG. 70 illustrates modifications to SMPTE ST2110-20 for a 12-bit six-primary color system in 4:4:4 video. For 4:4:4, 12-bit video, 9 octets are used and cover 2 pixels before restarting the sequence. Non-linear, six-primary color system image data would arrive as $G_{INT}'$, $B_{INT}'$, $R_{INT}'$, $M_{INT}'$, $Y_{INT}'$, and $C_{INT}'$. The sequence described in the standard is shown as R0', G0', B0', R1', G1', B1', etc.

FIG. 71 illustrates modifications to SMPTE ST2110-20 for a 10-bit six primary color system in 4:2:2 video. Components that are delivered to a SMPTE ST2110 pgroup include, but are not limited to, $E_{Yrgb\text{-}INT}'$, $E_{Ycym\text{-}INT}'$, $E_{Cb\text{-}INT}'$, $E_{Cr\text{-}INT}'$, $E_{Cy\text{-}INT}'$, and $E_{Cc\text{-}INT}'$. For 4:2:2, 10-bit video, 5 octets are used and cover 2 pixels before restarting the sequence. For 4:2:2:2, 12-bit video, 6 octets are used and cover 2 pixels before restarting the sequence. Component substitution follows what is described for SMPTE ST292, where $E_{Yrgb\text{-}INT}'$ or $E_{Ycym\text{-}INT}'$ are placed in the Y data segments, $E_{Cr\text{-}INT}'$ or $E_{Cc\text{-}INT}'$ are placed in the Cr data segments, and $E_{Cb\text{-}INT}'$ or $E_{Cy\text{-}INT}'$ are placed in the Cb data segments. The sequence described in the standard is shown as Cb'0, Y'0, Cr'0, Y'1, Cb'1, Y'2, Cr'1, Y'3, Cb'2, Y'4, Cr'2, etc.

FIG. 72 illustrates modifications to SMPTE ST2110-20 for a 12-bit six-primary color system in 4:2:0 video. Components that are delivered to a SMPTE ST2110 pgroup are the same as with the 4:2:2 method. For 4:2:0, 10-bit video, 15 octets are used and cover 8 pixels before restarting the sequence. For 4:2:0, 12-bit video, 9 octets are used and cover 4 pixels before restarting the sequence. Component substitution follows what is described for SMPTE ST292, where $E_{Yrgb\text{-}INT}'$ or $E_{Ycym\text{-}INT}'$ are placed in the Y data segments, $E_{Cr\text{-}INT}'$ or $E_{Cc\text{-}INT}'$ are placed in the Cr data segments, and $E_{Cb\text{-}INT}'$ or $E_{Cy\text{-}INT}'$ are placed in the Cb data segments. The sequence described in the standard is shown as Y'00, Y'01, Y', etc.

Session Description Protocol (SDP) Modification for a Six-Primary Color System

SDP is derived from IETF RFC 4566 which sets parameters including, but not limited to, bit depth and sampling parameters. In one embodiment, SDP parameters are contained within the RTP payload. In another embodiment, SDP parameters are contained within the media format and transport protocol. This payload information is transmitted as text. Therefore, modifications for the additional sampling identifiers requires the addition of new parameters for the sampling statement. SDP parameters include, but are not limited to, color channel data, image data, framerate data, a sampling standard, a flag indicator, an active picture size code, a timestamp, a clock frequency, a frame count, a scrambling indicator, and/or a video format indicator. For non-constant luminance imaging, the additional parameters include, but are not limited to, RGBCYM-4:4:4, YBRCY-4:2:2, and YBRCY-4:2:0. For constant luminance signals, the additional parameters include, but are not limited to, CLYBRCY-4:2:2 and CLYBRCY-4:2:0.

Additionally, differentiation is included with the colorimetry identifier in one embodiment. For example, 6PB1 defines 6P with a color gamut limited to ITU-R BT.709 formatted as system 1, 6PB2 defines 6P with a color gamut limited to ITU-R BT.709 formatted as system 2, 6PB3 defines 6P with a color gamut limited to ITU-R BT.709 formatted as system 3, 6PC1 defines 6P with a color gamut limited to SMPTE RP 431-2 formatted as system 1, and 6PC2 defines 6P with a color gamut limited to SMPTE RP 431-2 formatted as system 2.

Colorimetry can also be defined between a six-primary color system using the ITU-R BT.709-6 standard and the SMPTE ST431-2 standard, or colorimetry can be left defined as is standard for the desired standard. For example, the SDP parameters for a 1920×1080 six-primary color system using the ITU-R BT.709-6 standard with a 10-bit signal as system 1 are as follows: m=video 30000 RTP/AVP 112, a=rtpmap:112 raw/90000, a=fmtp:112, sampling=YBRCY-4:2:2, width=1920, height=1080, exactframerate=30000/1001, depth=10, TCS=SDR, colorimetry=6PB1, PM=2110GPM, SSN=ST2110-20:2017.

In one embodiment, the six-primary color system is integrated with a Consumer Technology Association (CTA) 861-based system. CTA-861 establishes protocols, requirements, and recommendations for the utilization of uncompressed digital interfaces by consumer electronics devices including, but not limited to, digital televisions (DTVs), digital cable, satellite or terrestrial set-top boxes (STBs), and related peripheral devices including, but not limited to, DVD players and/or recorders, and other related Sources or Sinks.

These systems are provided as parallel systems so that video content is parsed across several line pairs. This enables each video component to have its own transition-minimized differential signaling (TMDS) path. TMDS is a technology for transmitting high-speed serial data and is used by the Digital Visual Interface (DVI) and High-Definition Multimedia Interface (HDMI) video interfaces, as well as other digital communication interfaces. TMDS is similar to low-voltage differential signaling (LVDS) in that it uses differential signaling to reduce electromagnetic interference (EMI), enabling faster signal transfers with increased accuracy. In addition, TMDS uses a twisted pair for noise reduction, rather than a coaxial cable that is conventional for carrying video signals. Similar to LVDS, data is transmitted serially over the data link. When transmitting video data, and using HDMI, three TMDS twisted pairs are used to transfer video data.

In such a system, each pixel packet is limited to 8 bits only. For bit depths higher than 8 bits, fragmented packs are used. This arrangement is no different than is already described in the current CTA-861 standard.

Based on CTA extension Version 3, identification of a six-primary color transmission would be performed by the sink device (e.g., the monitor). Adding recognition of the additional formats would be flagged in the CTA Data Block Extended Tag Codes (byte 3). Since codes 33 and above are reserved, any two bits could be used to identify that the format is RGB, RGBCYM, Y Cb Cr, or Y Cb Cr Cc Cy and/or identify System 1 or System 2. Should byte 3 define a six-primary sampling format, and where the block 5 extension identifies byte 1 as ITU-R BT.709, then logic assigns as 6P-B. However, should byte 4 bit 7 identify colorimetry as DCI-P3, the color gamut would be assigned as 6P-C.

Figure 73:
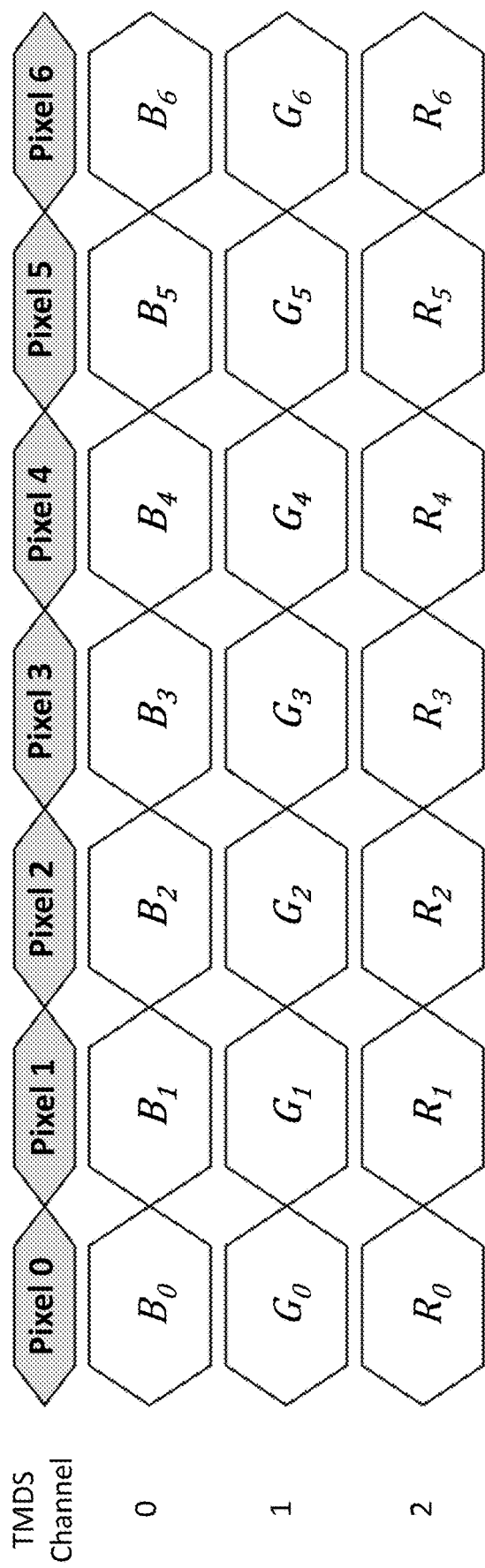
FIG. 73 illustrates a RGB sampling transmission for a 4:4:4 sampling system.
Figure 74:
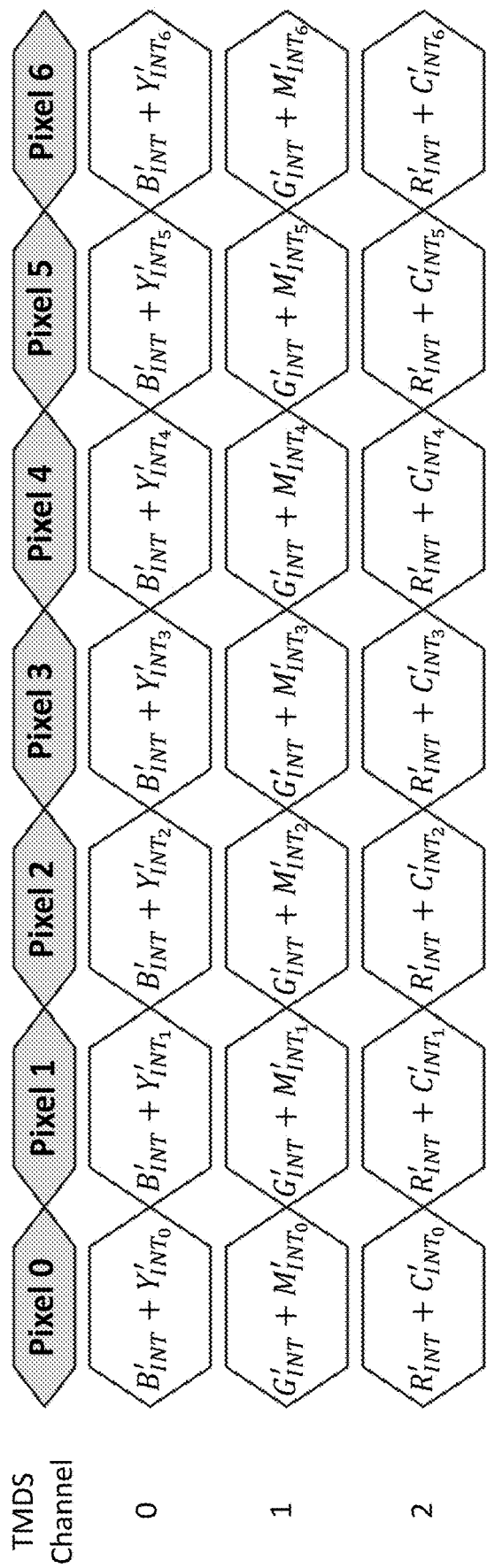
FIG. 74 illustrates a RGBCYM sampling transmission for a 4:4:4 sampling system.
Figure 75:
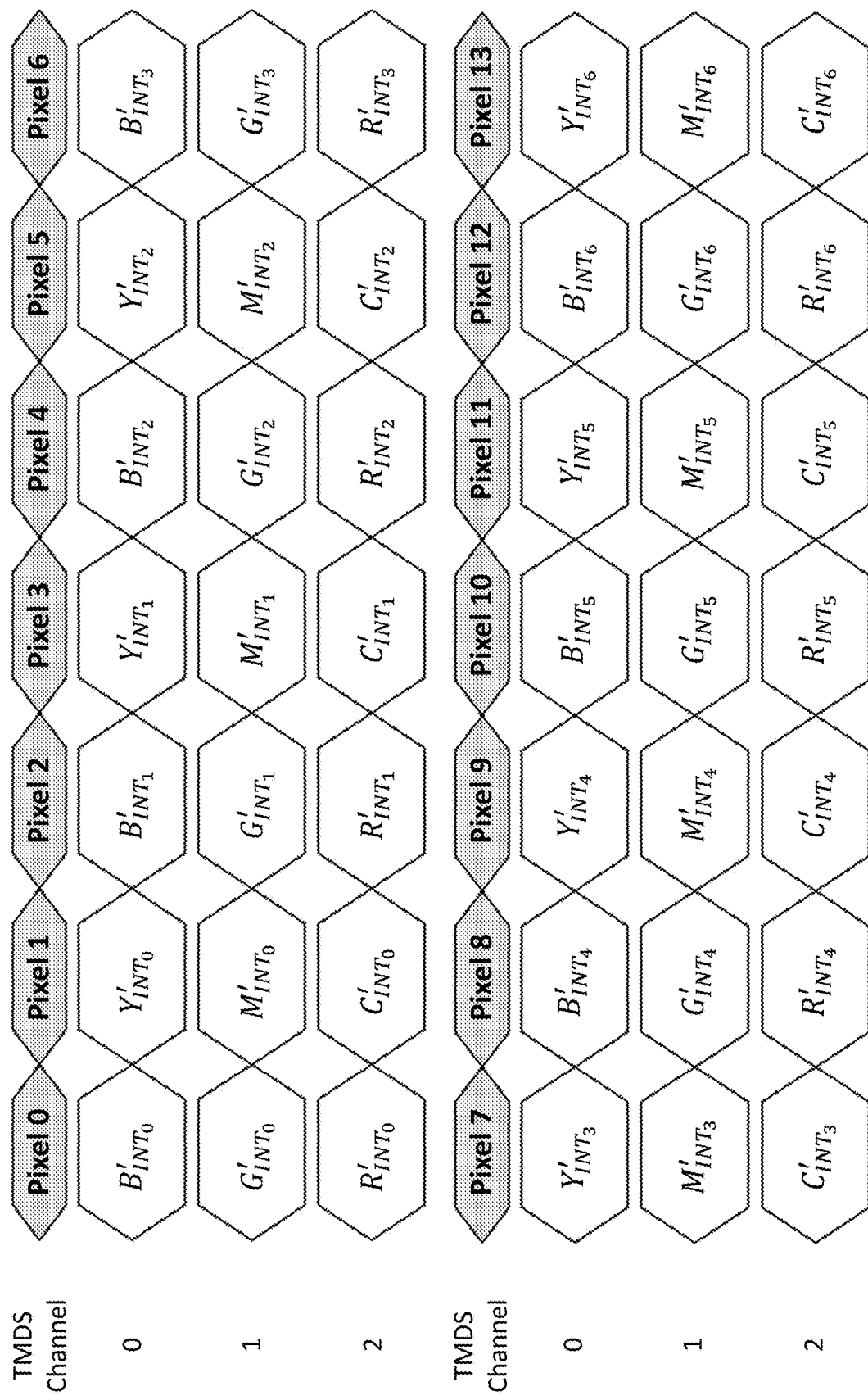
FIG. 75 illustrates an example of System 2 to RGBCYM 4:4:4 transmission.
Figure 76:
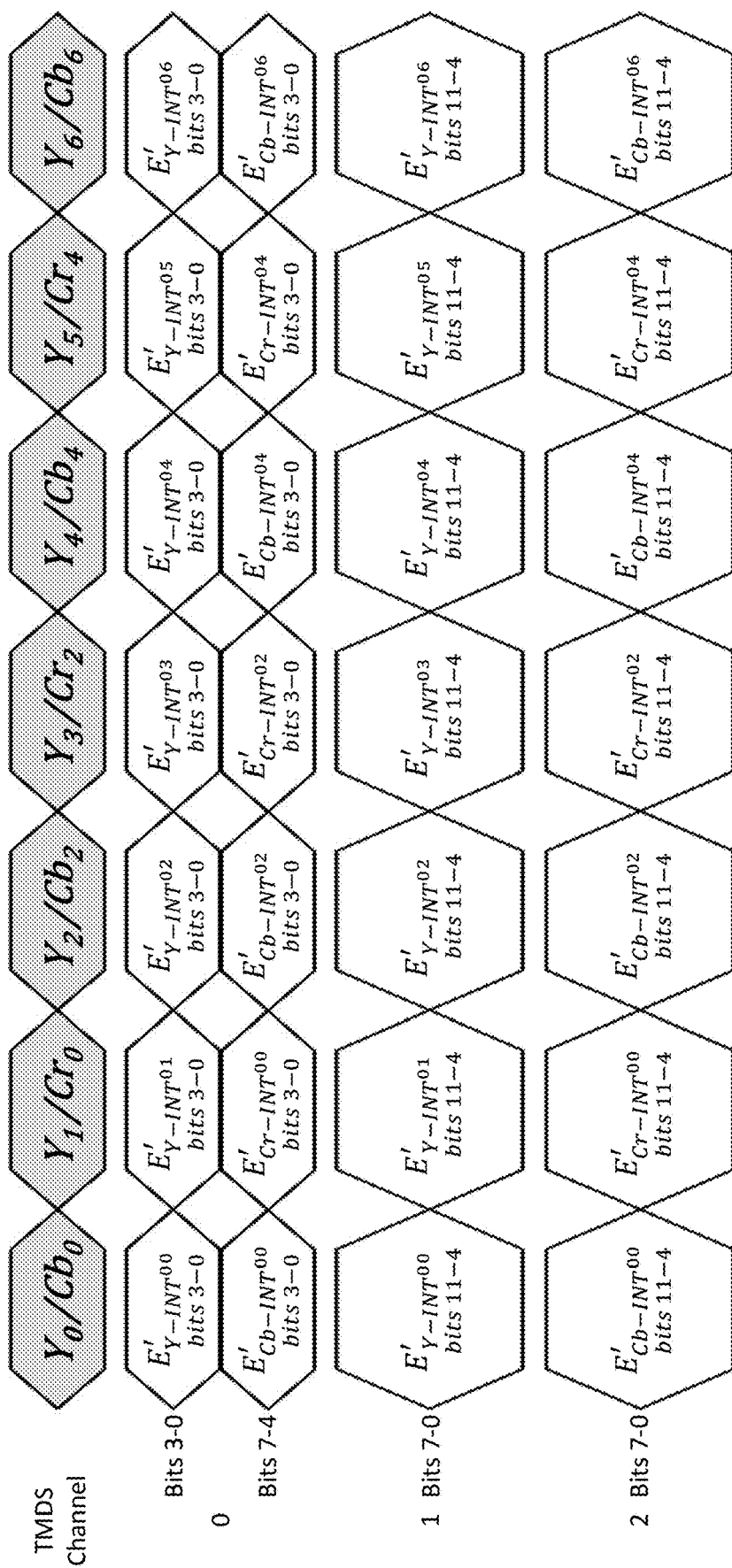
FIG. 76 illustrates a Y Cb Cr sampling transmission using a 4:2:2 sampling system.
Figure 77:
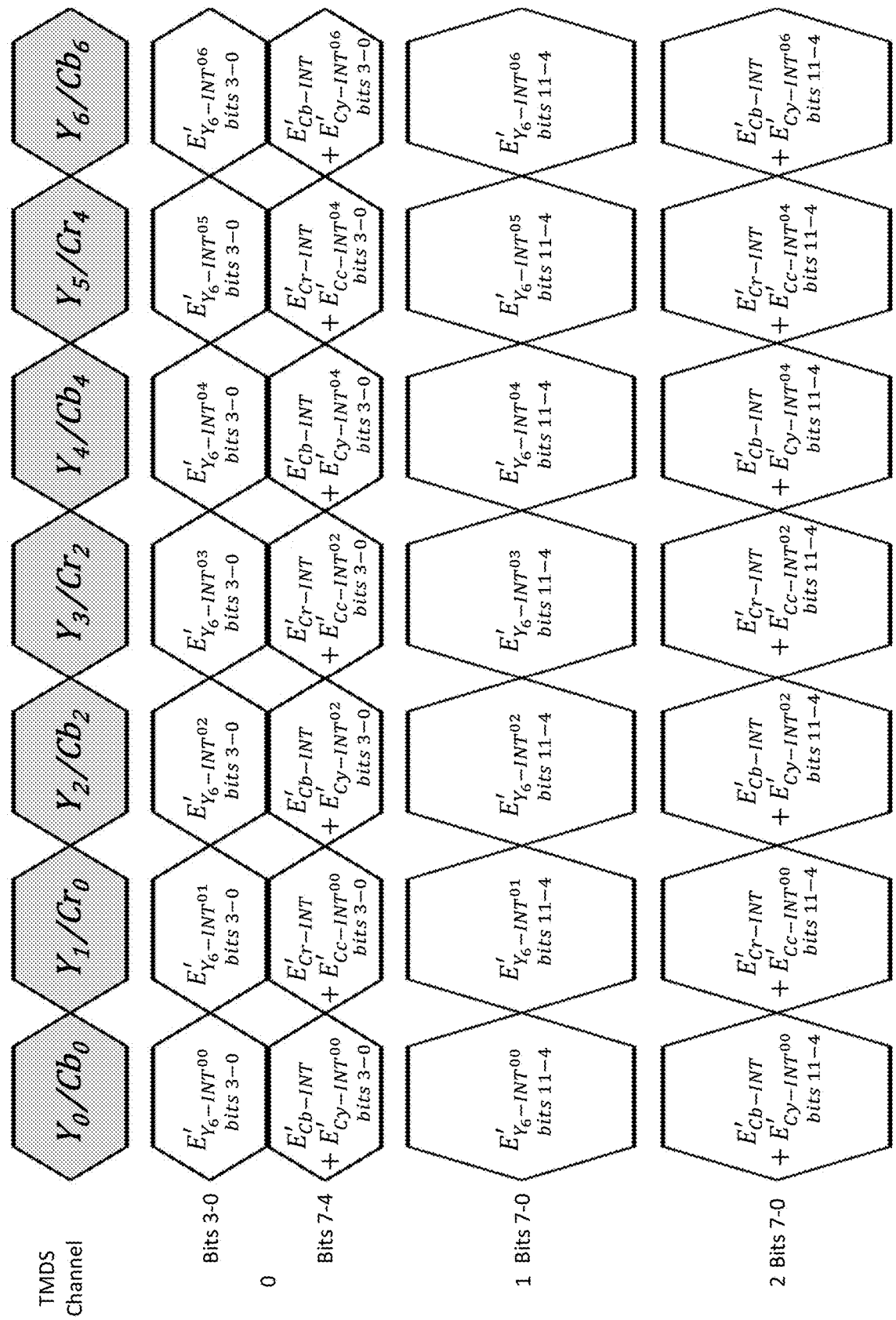
FIG. 77 illustrates a Y Cr Cb Cc Cy sampling transmission using a 4:2:2 sampling system.
Figure 78:
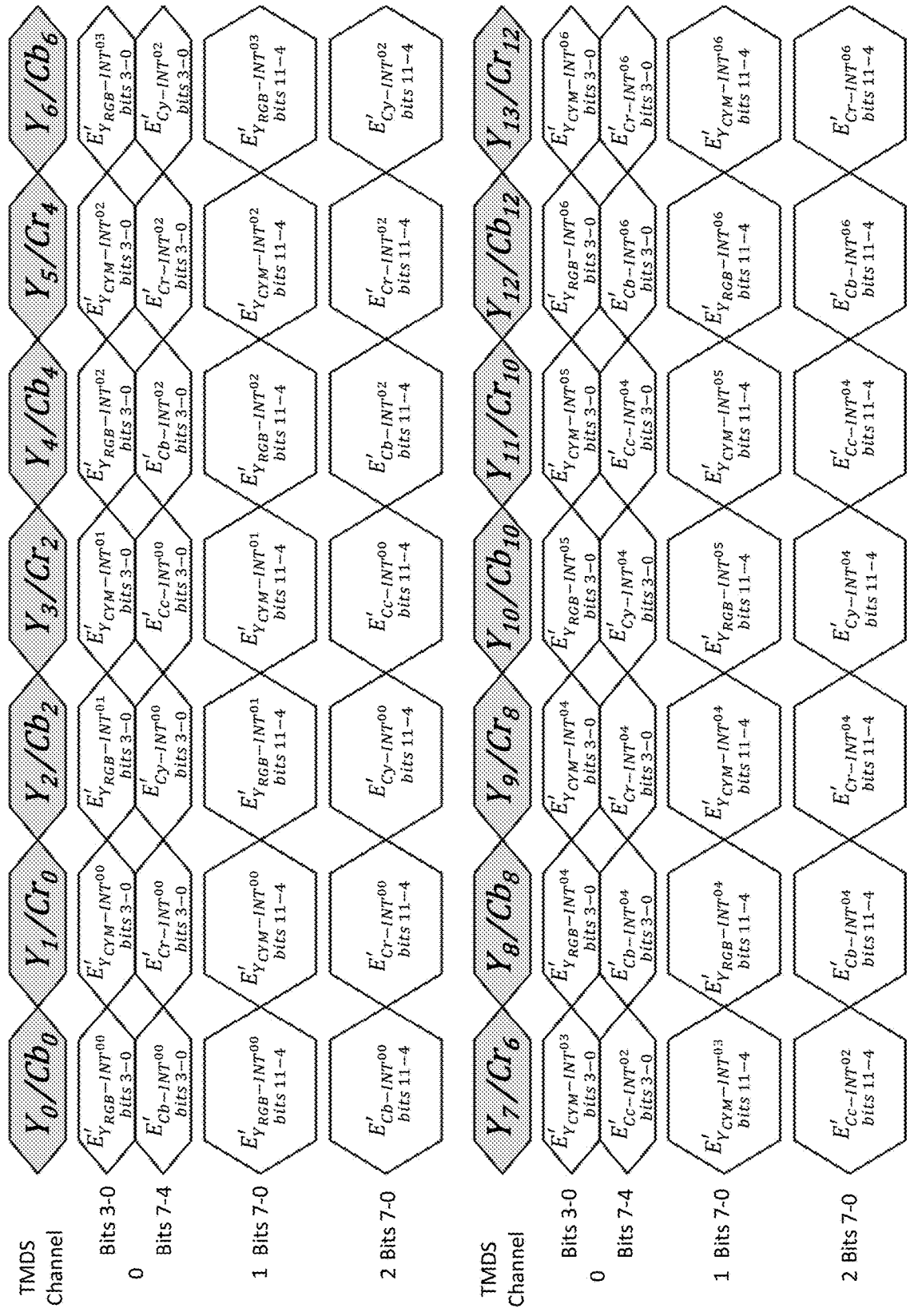
FIG. 78 illustrates an example of a System 2 to Y Cr Cb Cc Cy 4:2:2 Transmission as non-constant luminance.
Figure 79:
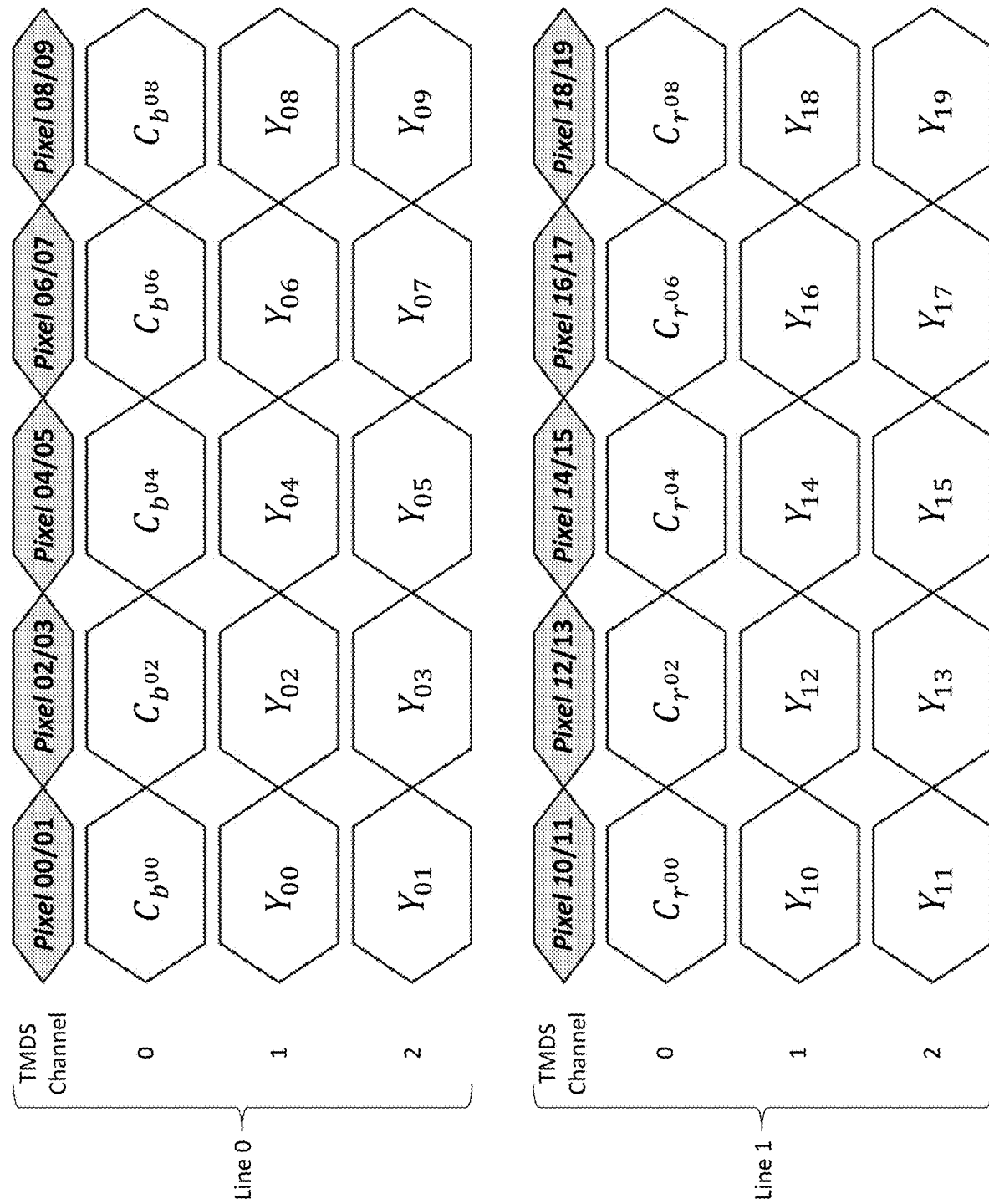
FIG. 79 illustrates a Y Cb Cr sampling transmission using a 4:2:0 sampling system.
Figure 80:
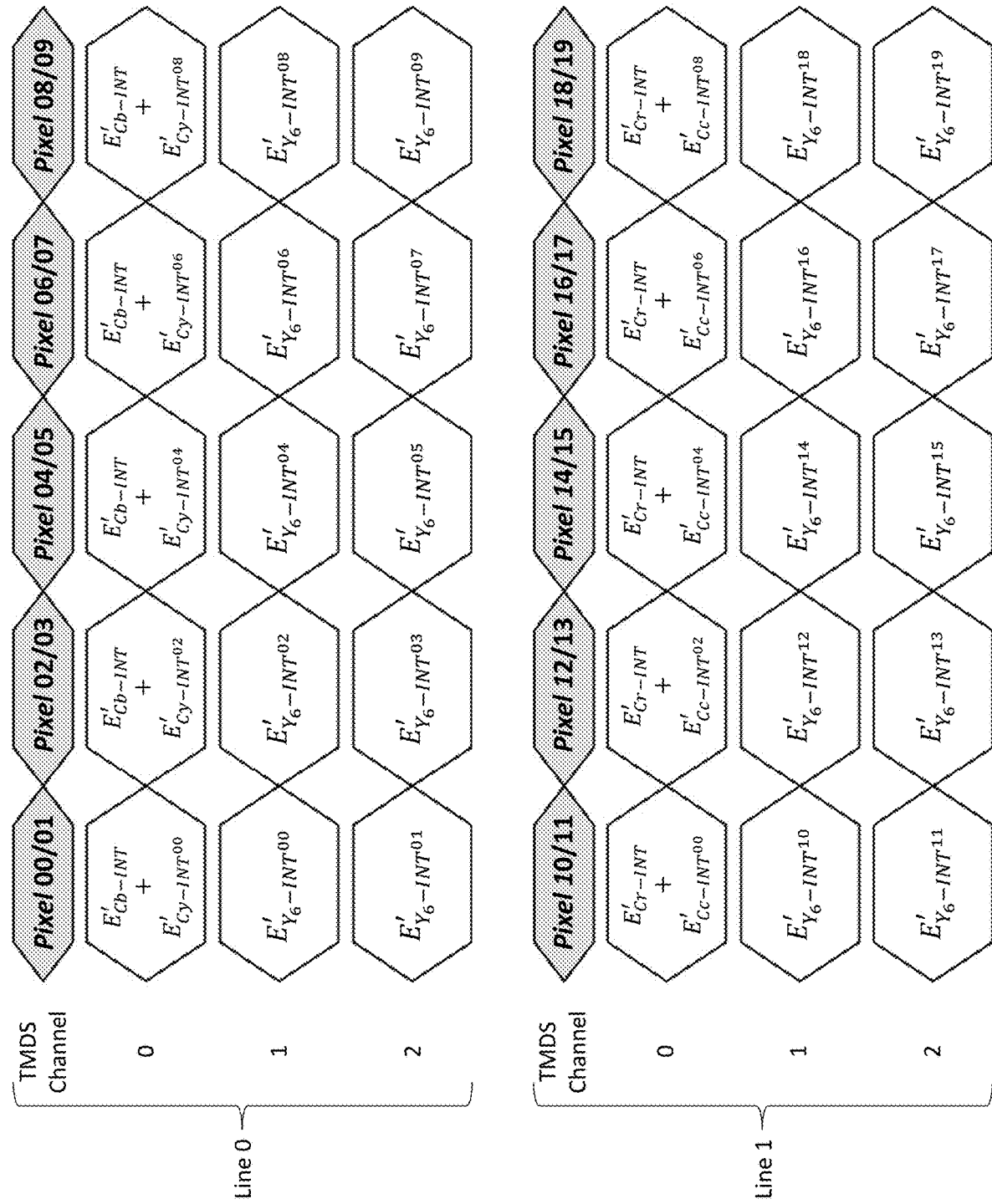
FIG. 80 illustrates a Y Cr Cb Cc Cy sampling transmission using a 4:2:0 sampling system.

FIG. 73 illustrates the current RGB sampling structure for 4:4:4 sampling video data transmission. For HDMI 4:4:4 sampling, video data is sent through three TMDS line pairs. FIG. 74 illustrates a six-primary color sampling structure, RGBCYM, using System 1 for 4:4:4 sampling video data transmission. FIG. 75 illustrates an example of System 2 to RGBCYM 4:4:4 transmission. FIG. 76 illustrates current Y Cb Cr 4:2:2 sampling transmission as non-constant luminance. FIG. 77 illustrates a six-primary color system (System 1) using Y Cr Cb Cc Cy 4:2:2 sampling transmission as non-constant luminance. FIG. 78 illustrates an example of a System 2 to Y Cr Cb Cc Cy 4:2:2 Transmission as non-constant luminance. FIG. 79 illustrates current Y Cb Cr 4:2:0 sampling transmission. FIG. 80 illustrates a six-primary color system (System 1) using Y Cr Cb Cc Cy 4:2:0 sampling transmission.

HDMI sampling systems include Extended Display Identification Data (EDID) metadata. EDID metadata describes the capabilities of a display device to a video source. The data format is defined by a standard published by the Video Electronics Standards Association (VESA). The EDID data structure includes, but is not limited to, manufacturer name and serial number, product type, phosphor or filter type, timings supported by the display, display size, luminance data, and/or pixel mapping data. The EDID data structure is modifiable and modification requires no additional hardware and/or tools.

EDID information is transmitted between the source device and the display through a display data channel (DDC), which is a collection of digital communication protocols created by VESA. With EDID providing the display information and DDC providing the link between the display and the source, the two accompanying standards enable an information exchange between the display and source.

In addition, VESA has assigned extensions for EDID. Such extensions include, but are not limited to, timing extensions (00), additional time data black (CEA EDID Timing Extension (02)), video timing block extensions (VTB-EXT (10)), EDID 2.0 extension (20), display information extension (DI-EXT (40)), localized string extension (LS-EXT (50)), microdisplay interface extension (MI-EXT (60)), display ID extension (70), display transfer characteristics data block (DTCDB (A7, AF, BF)), block map (F0), display device data block (DDDB (FF)), and/or extension defined by monitor manufacturer (FF).

In one embodiment, SDP parameters include data corresponding to a payload identification (ID) and/or EDID information.

Six-Primary Color System Display

Figure 81:
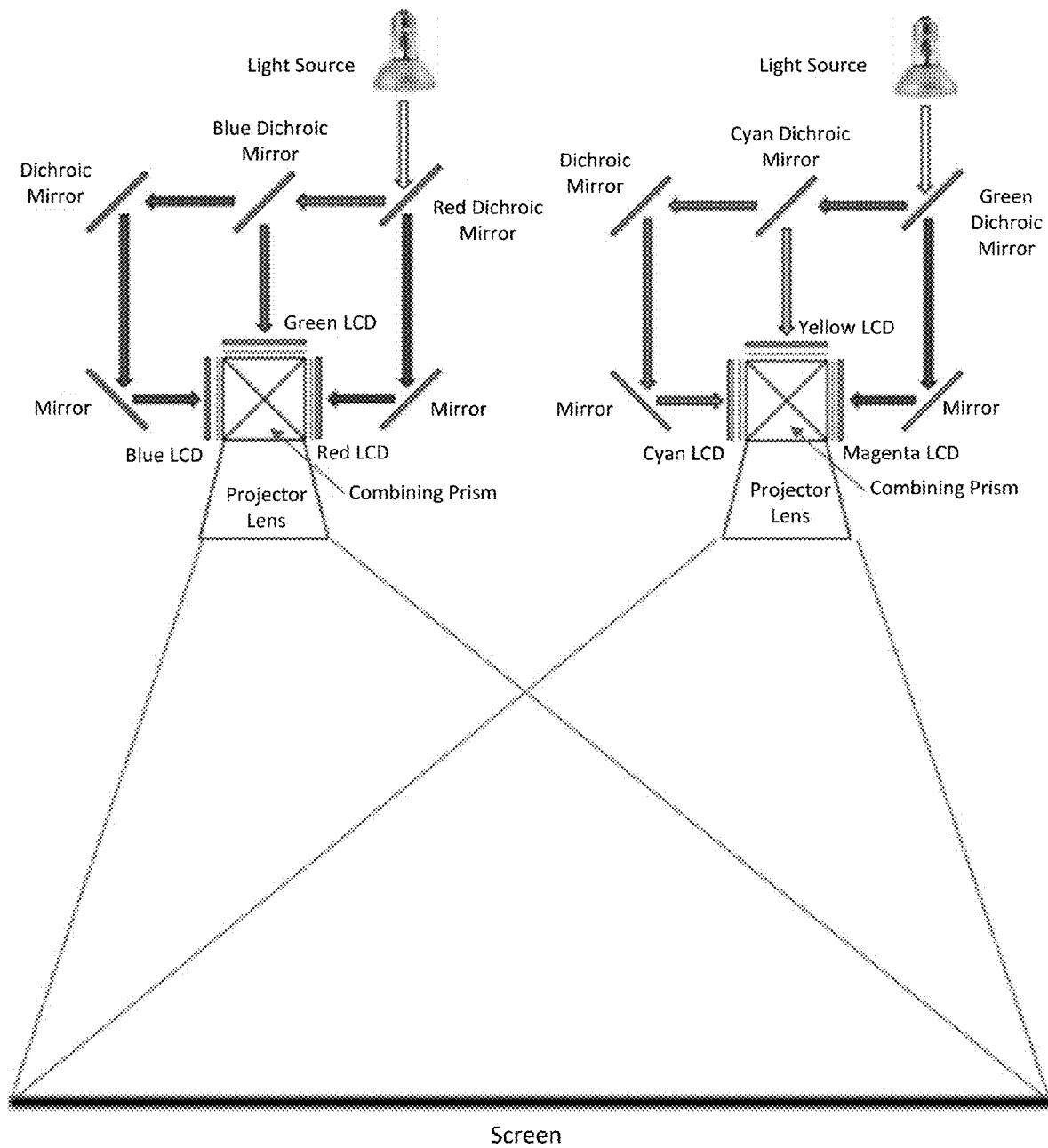
FIG. 81 illustrates a dual stack LCD projection system for a six-primary color system.

FIG. 81 illustrates a dual stack LCD projection system for a six-primary color system. In one embodiment, the display is comprised of a dual stack of projectors. This display uses two projectors stacked on top of one another or placed side by side. Each projector is similar, with the only difference being the color filters in each unit. Refresh and pixel timings are synchronized, enabling a mechanical alignment between the two units so that each pixel overlays the same position between projector units. In one embodiment, the two projectors are Liquid-Crystal Display (LCD) projectors. In another embodiment, the two projectors are Digital Light Processing (DLP) projectors. In yet another embodiment, the two projectors are Liquid-Crystal on Silicon (LCOS) projectors. In yet another embodiment, the two projectors are Light-Emitting Diode (LED) projectors.

Figure 82:
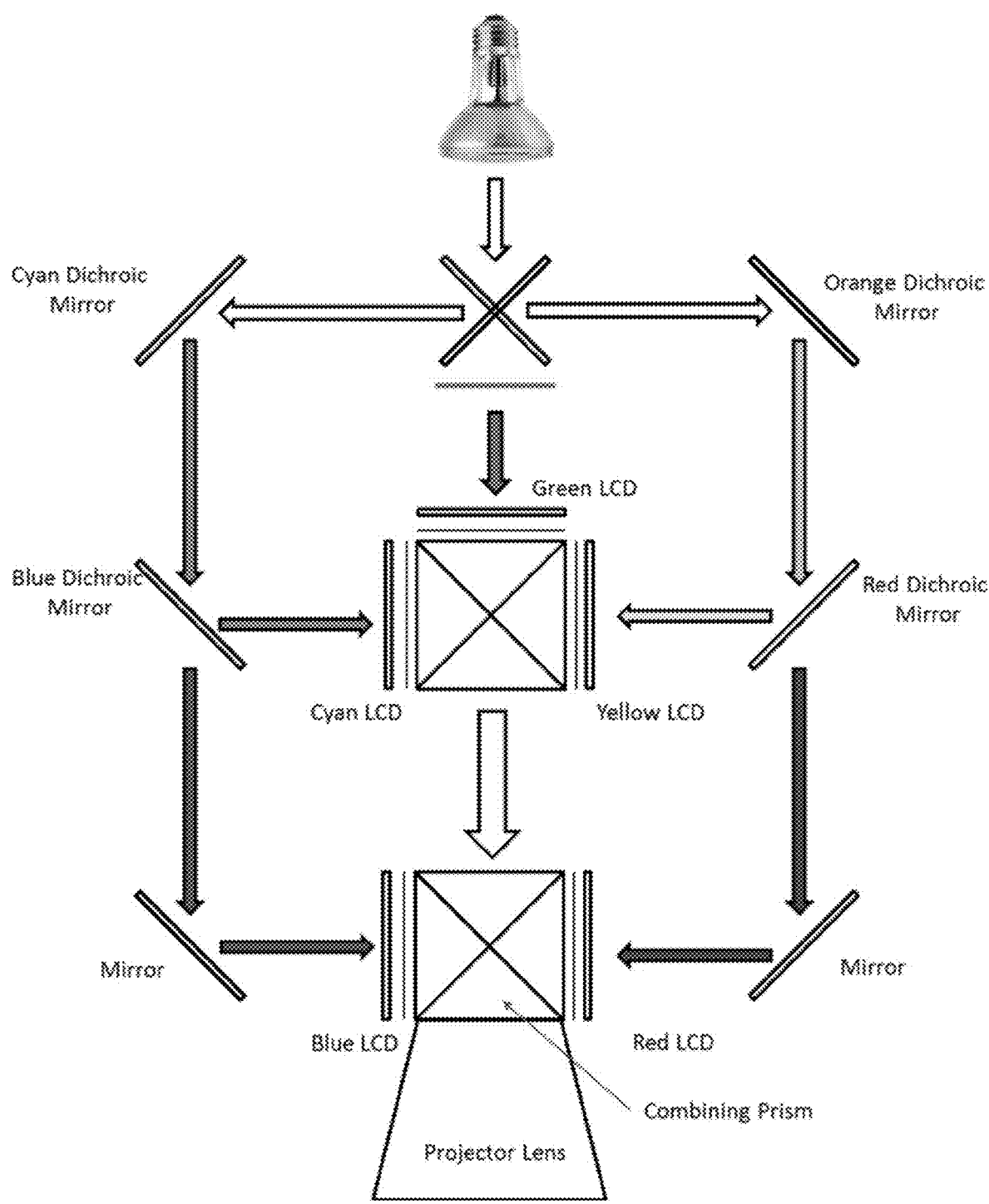
FIG. 82 illustrates one embodiment of a single projector.

In one embodiment, the display is comprised of a single projector. A single projector six-primary color system requires the addition of a second cross block assembly for the additional colors. One embodiment of a single projector (e.g., single LCD projector) is shown in FIG. 82. A single projector six-primary color system includes a cyan dichroic mirror, an orange dichroic mirror, a blue dichroic mirror, a red dichroic mirror, and two additional standard mirrors. In one embodiment, the single projector six-primary color system includes at least six mirrors. In another embodiment, the single projector six-primary color system includes at least two cross block assembly units.

Figure 83:
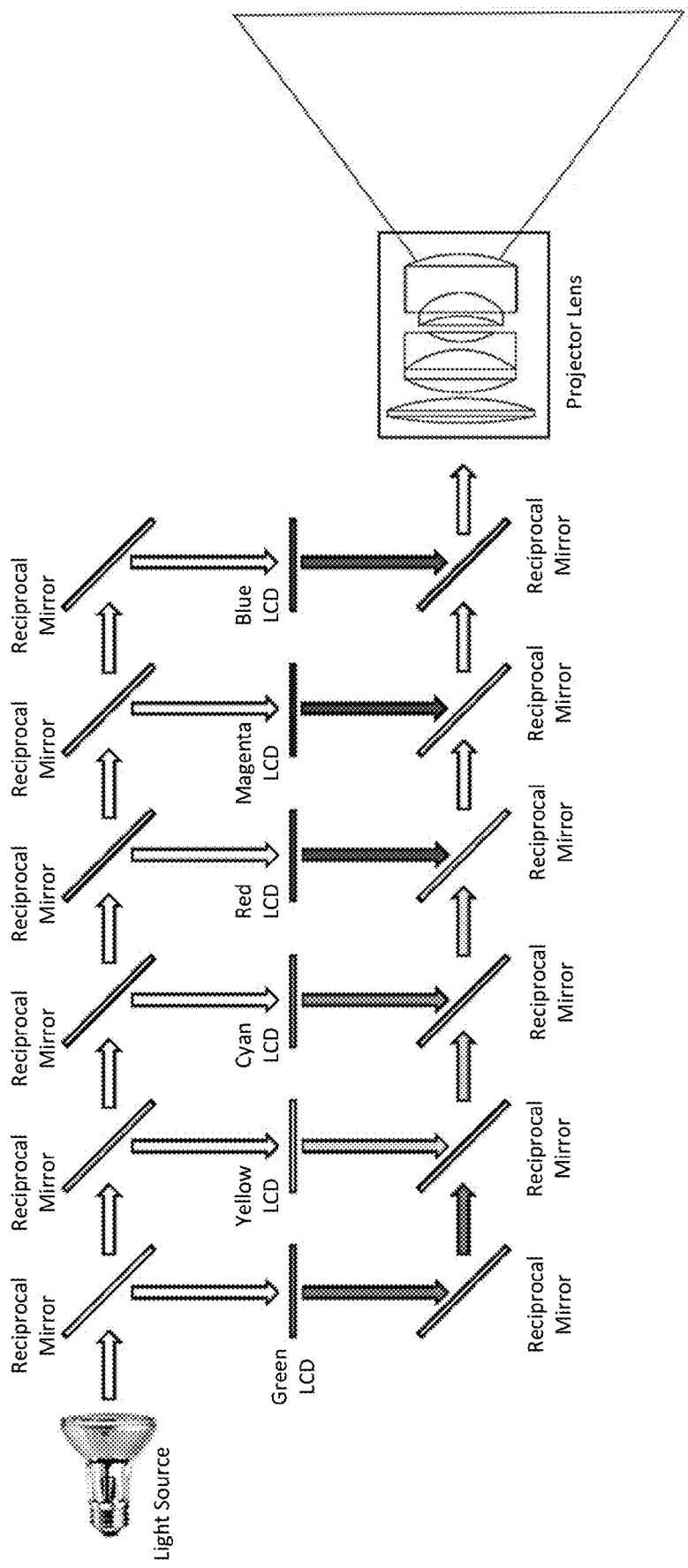
FIG. 83 illustrates a six-primary color system using a single projector and reciprocal mirrors.

FIG. 83 illustrates a six-primary color system using a single projector and reciprocal mirrors. In one embodiment, the display is comprised of a single projector unit working in combination with at first set of at least six reciprocal mirrors, a second set of at least six reciprocal mirrors, and at least six LCD units. Light from at least one light source emits towards the first set of at least six reciprocal mirrors. The first set of at least six reciprocal mirrors reflects light towards at least one of the at least six LCD units. The at least six LCD units include, but are not limited to, a Green LCD, a Yellow LCD, a Cyan, LCD, a Red LCD, a Magenta LCD, and/or a Blue LCD. Output from each of the at least six LCDs is received by the second set of at least six reciprocal mirrors. Output from the second set of at least six reciprocal mirrors is sent to the single projector unit. Image data output by the single projector unit is output as a six-primary color system. In another embodiment, there are more than two sets of reciprocal mirrors. In another embodiment, more than one projector is used.

Figure 84:
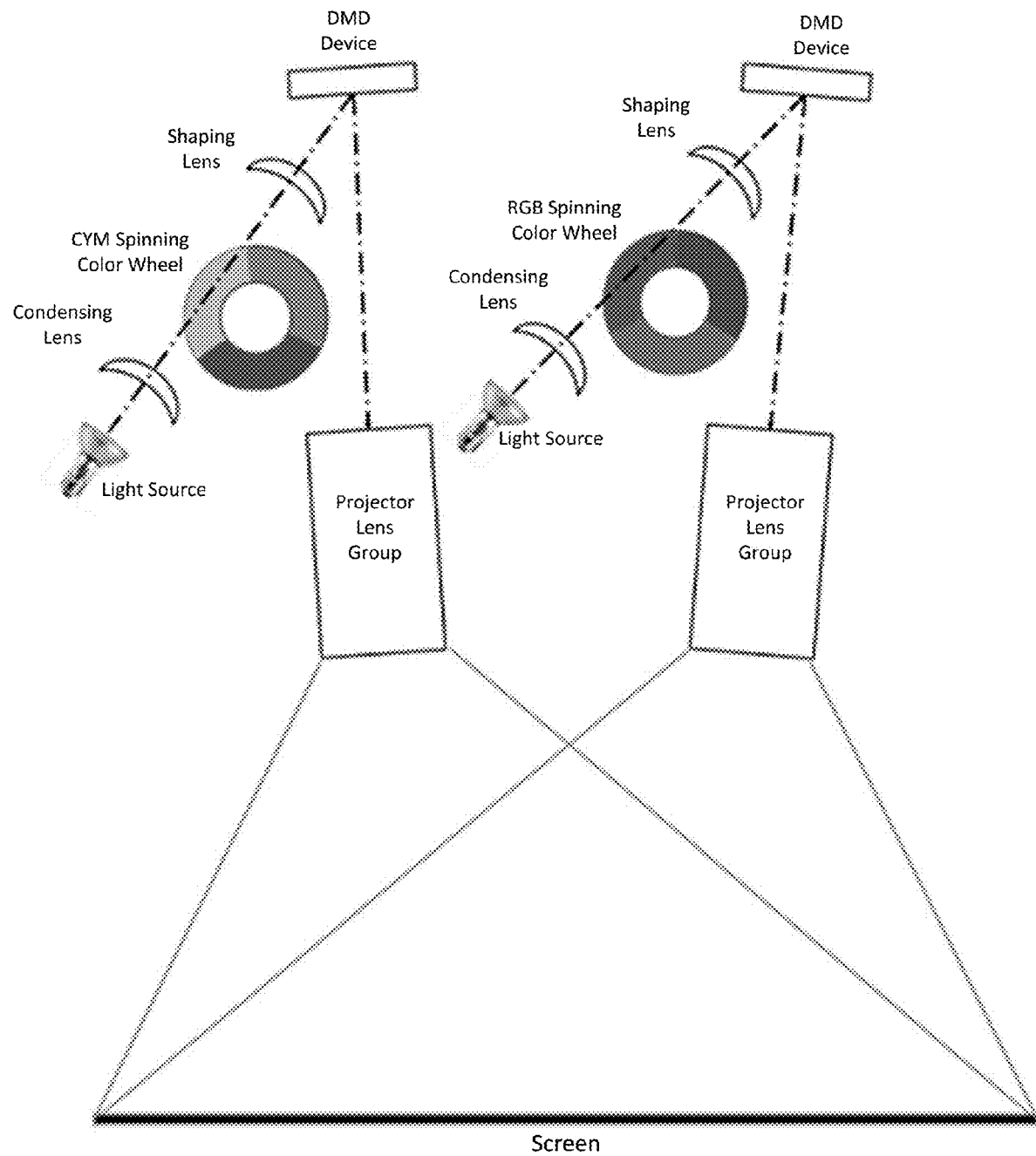
FIG. 84 illustrates a dual stack DMD projection system for a six-primary color system.

In another embodiment, the display is comprised of a dual stack Digital Micromirror Device (DMD) projector system. FIG. 84 illustrates one embodiment of a dual stack DMD projector system. In this system, two projectors are stacked on top of one another. In one embodiment, the dual stack DMD projector system uses a spinning wheel filter. In another embodiment, the dual stack DMD projector system uses phosphor technology. In one embodiment, the filter systems are illuminated by a xenon lamp. In another embodiment, the filter system uses a blue laser illuminator system. Filter systems in one projector are RGB, while the second projector uses a CYM filter set. The wheels for each projector unit are synchronized using at least one of an input video sync or a projector to projector sync, and timed so that the inverted colors are output of each projector at the same time.

In one embodiment, the projectors are phosphor wheel systems. A yellow phosphor wheel spins in time with a DMD imager to output sequential RG. The second projector is designed the same, but uses a cyan phosphor wheel. The output from this projector becomes sequential BG. Combined, the output of both projectors is YRGGCB. Magenta is developed by synchronizing the yellow and cyan wheels to overlap the flashing DMD.

Figure 85:
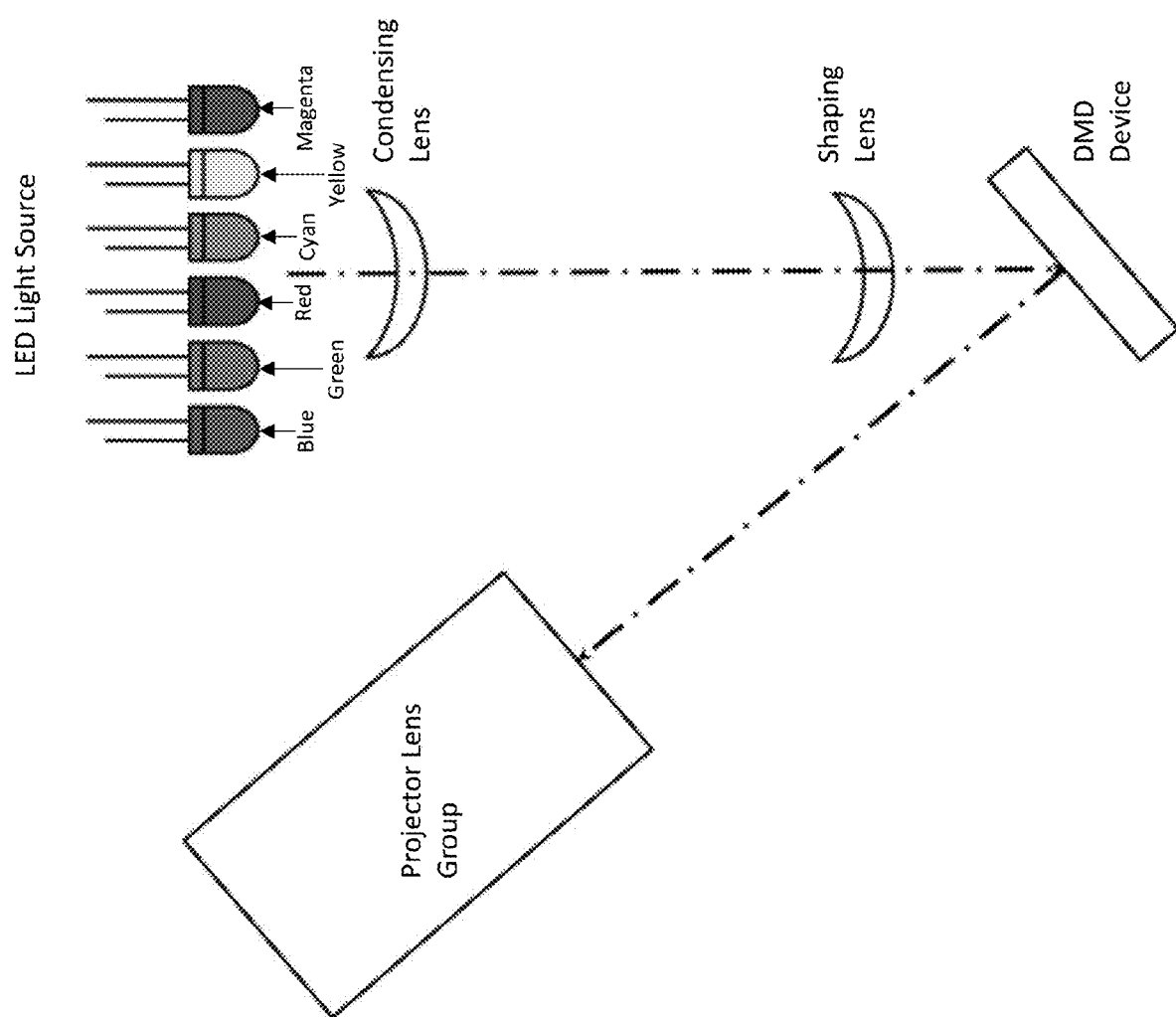
FIG. 85 illustrates one embodiment of a single DMD projector solution.

In another embodiment, the display is a single DMD projector solution. A single DMD device is coupled with an RGB diode light source system. In one embodiment, the DMD projector uses LED diodes. In one embodiment, the DMD projector includes CYM diodes. In another embodiment, the DMD projector creates CYM primaries using a double flashing technique. FIG. 85 illustrates one embodiment of a single DMD projector solution.

Figure 86:
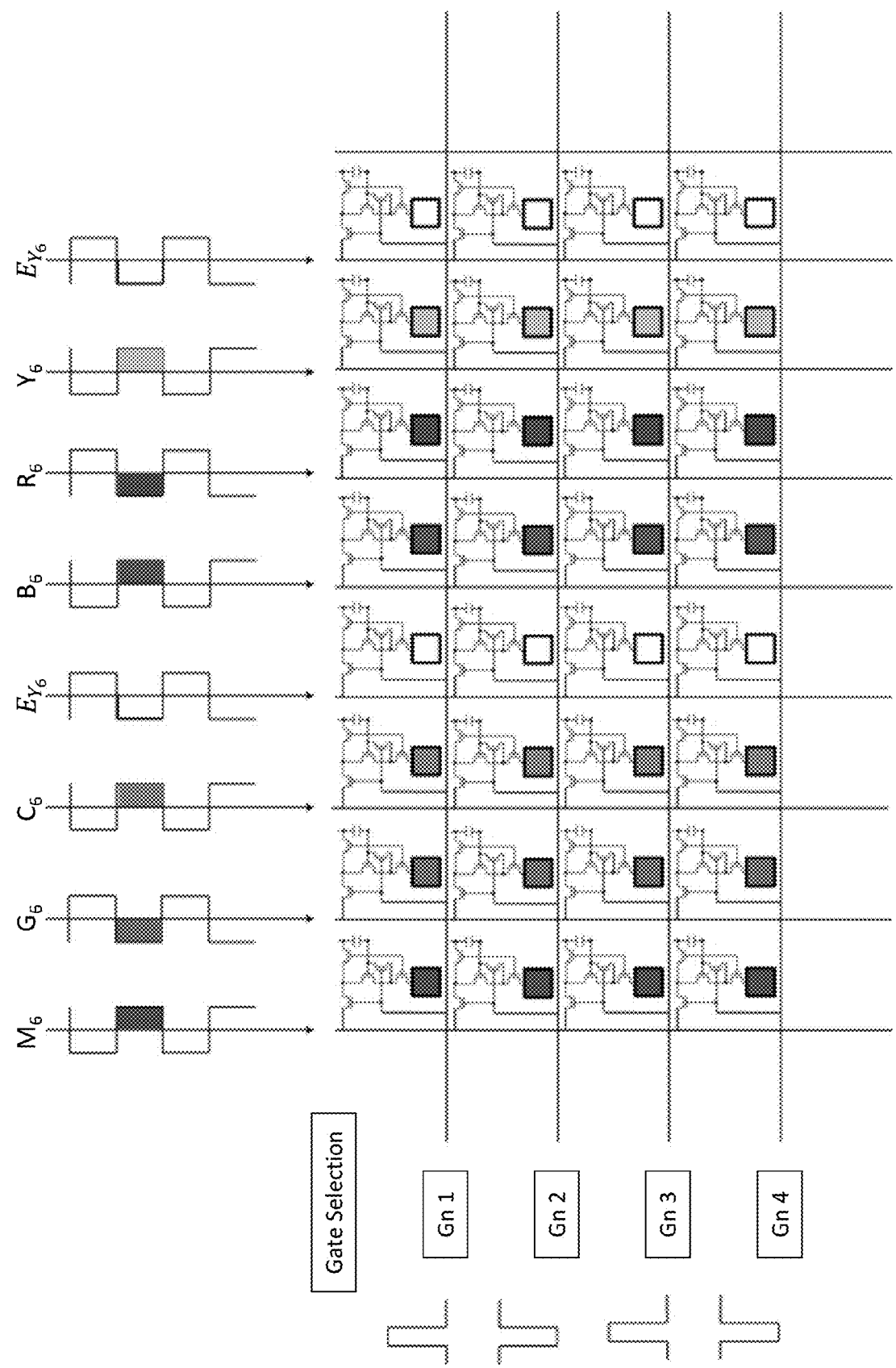
FIG. 86 illustrates one embodiment of a color filter array for a six-primary color system with a white OLED monitor.

FIG. 86 illustrates one embodiment of a six-primary color system using a white OLED display. In yet another embodiment, the display is a white OLED monitor. Current emissive monitor and/or television designs use a white emissive OLED array covered by a color filter. Changes to this type of display only require a change to pixel indexing and new six color primary filters. Different color filter arrays are used, placing each subpixel in a position that provides the least light restrictions, color accuracy, and off axis display.

Figure 87:
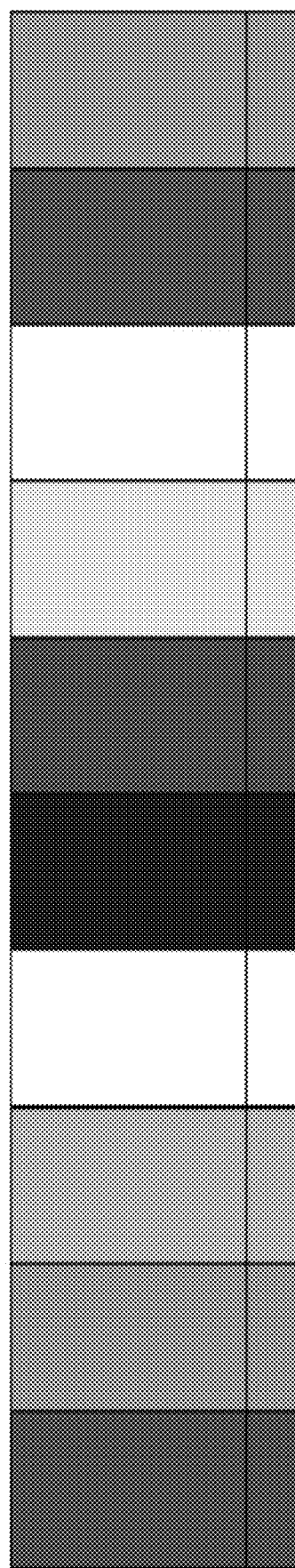
FIG. 87 illustrates one embodiment of an optical filter array for a six-primary color system with a white OLED monitor.

FIG. 87 illustrates one embodiment of an optical filter array for a white OLED display.

Figure 88:
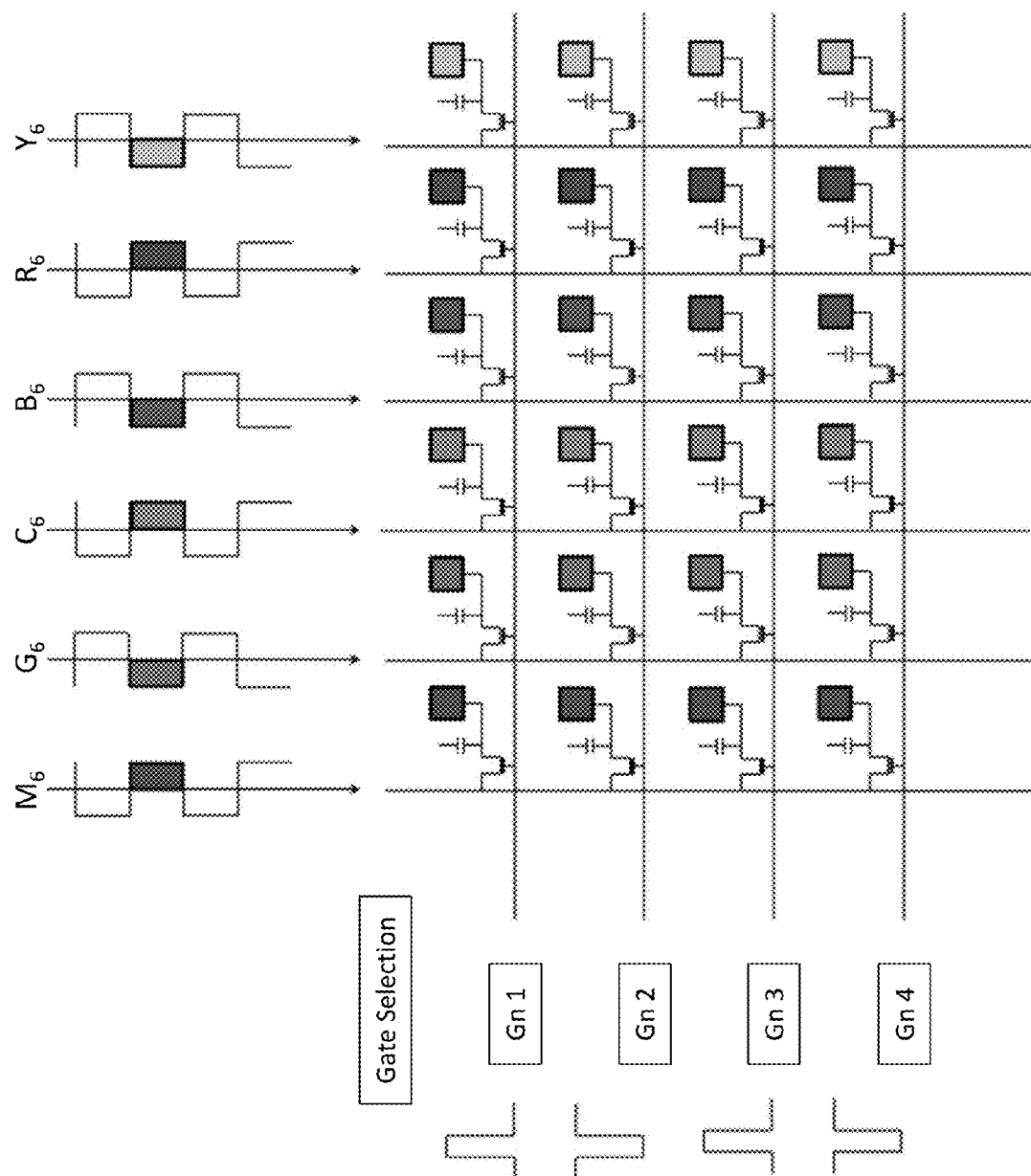
FIG. 88 illustrates one embodiment of a matrix of an LCD drive for a six-primary color system with a backlight illuminated LCD monitor.

FIG. 88 illustrates one embodiment of a matrix of an LCD drive for a six-primary color system with a backlight illuminated LCD monitor. In yet another embodiment, the display is a backlight illuminated LCD display. The design of an LCD display involves adding the CYM subpixels. Drives for these subpixels are similar to the RGB matrix drives. With the advent of 8K LCD televisions, it is technically feasible to change the matrix drive and optical filter and have a 4K six-primary color TV.

Figure 89:
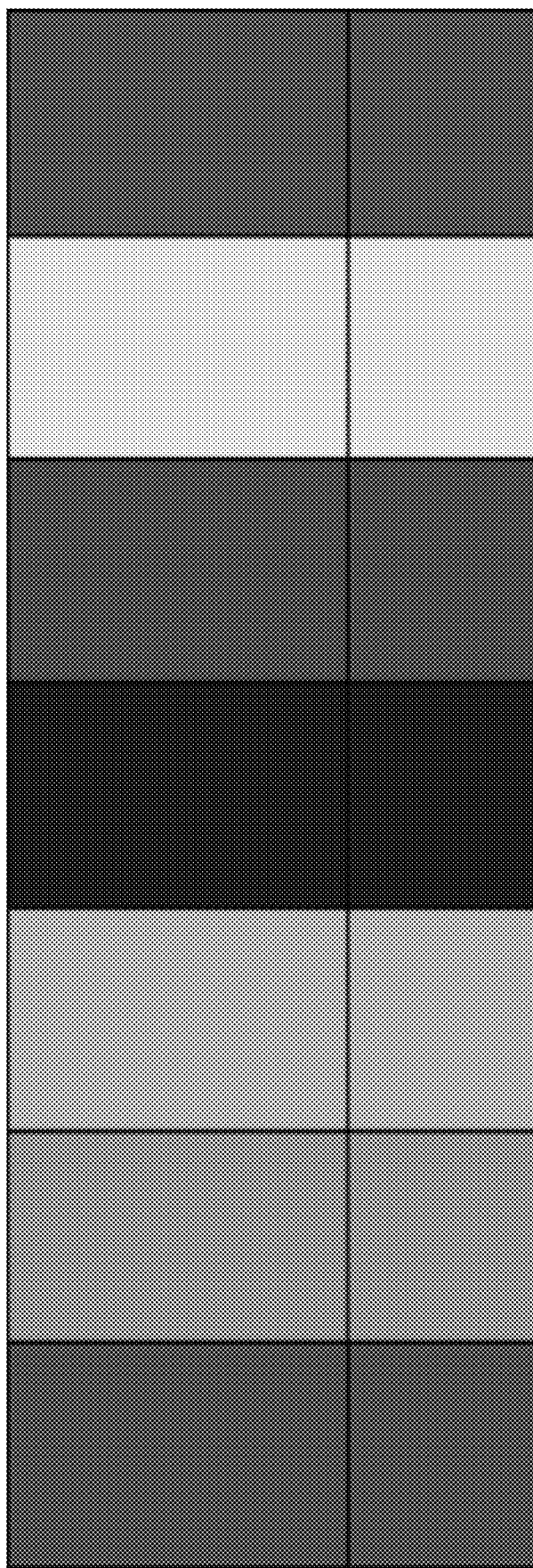
FIG. 89 illustrates one embodiment of an optical filter array for a six-primary color system with a backlight illuminated LCD monitor.

FIG. 89 illustrates one embodiment of an optical filter array for a six-primary color system with a backlight illuminated LCD monitor. The optical filter array includes the additional CYM subpixels.

In yet another embodiment, the display is a direct emissive assembled display. The design for a direct emissive assembled display includes a matrix of color emitters grouped as a six-color system. Individual channel inputs drive each Quantum Dot (QD) element illuminator and/or micro LED element.

Figure 90:
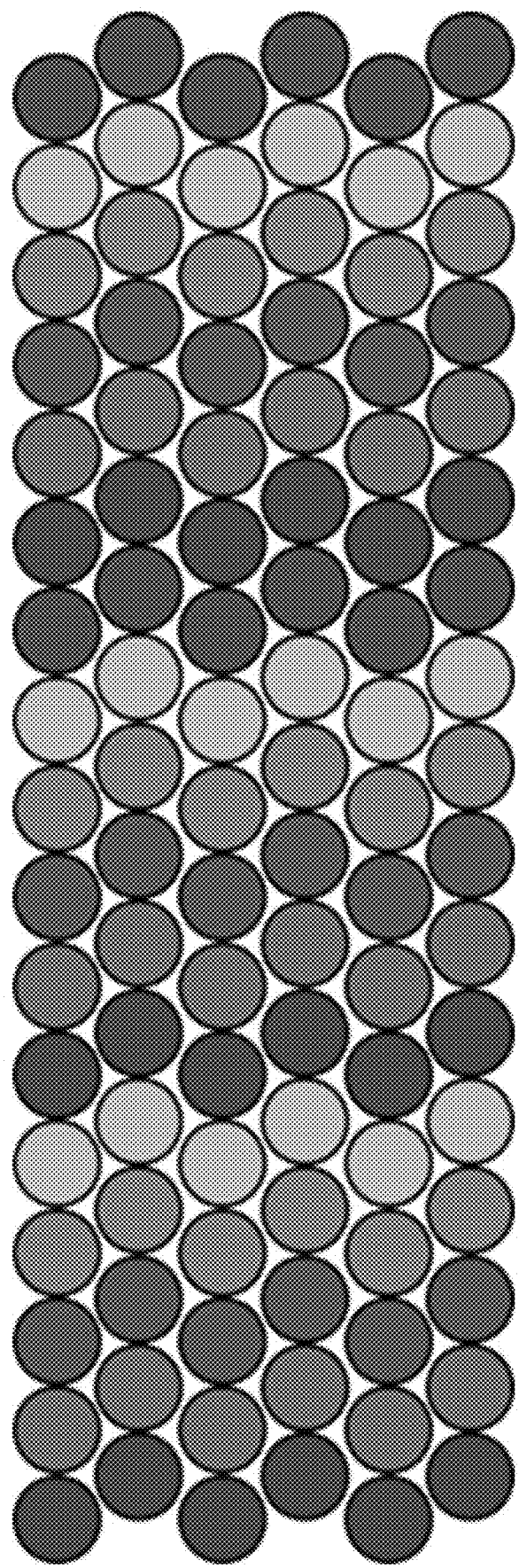
FIG. 90 illustrates an array for a Quantum Dot (QD) display device.

FIG. 90 illustrates an array for a Quantum Dot (QD) display device.

Figure 91:
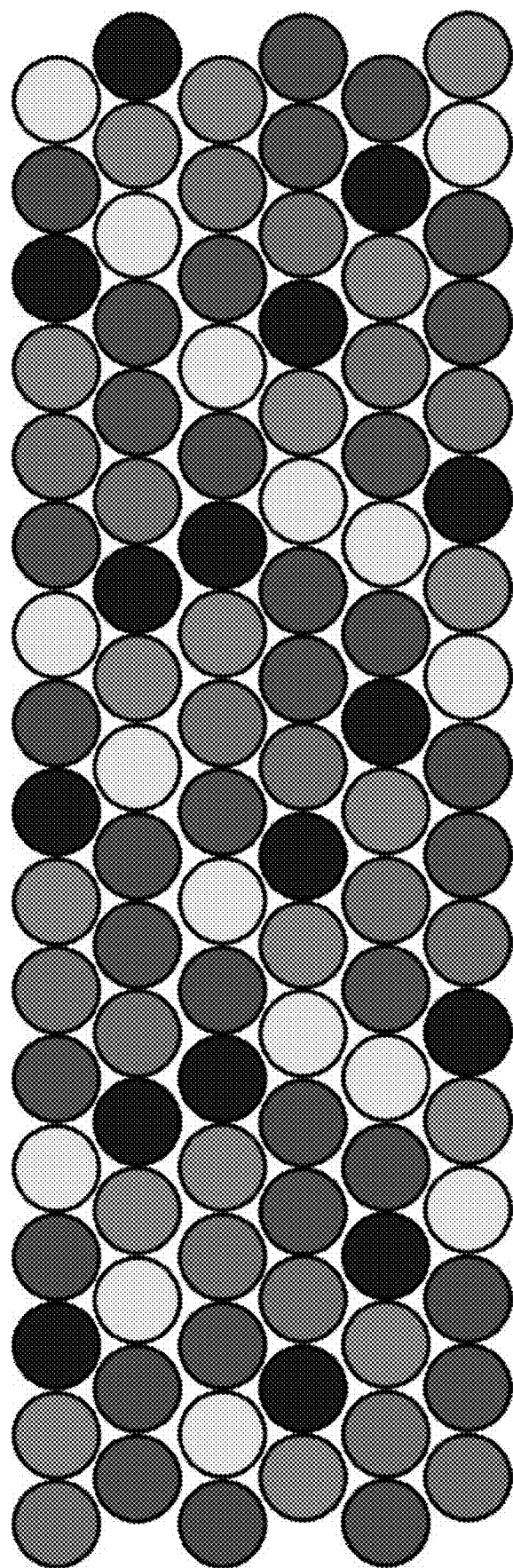
FIG. 91 illustrates one embodiment of an array for a six-primary color system for use with a direct emissive assembled display.

FIG. 91 illustrates one embodiment of an array for a six-primary color system for use with a direct emissive assembled display.

Figure 92:
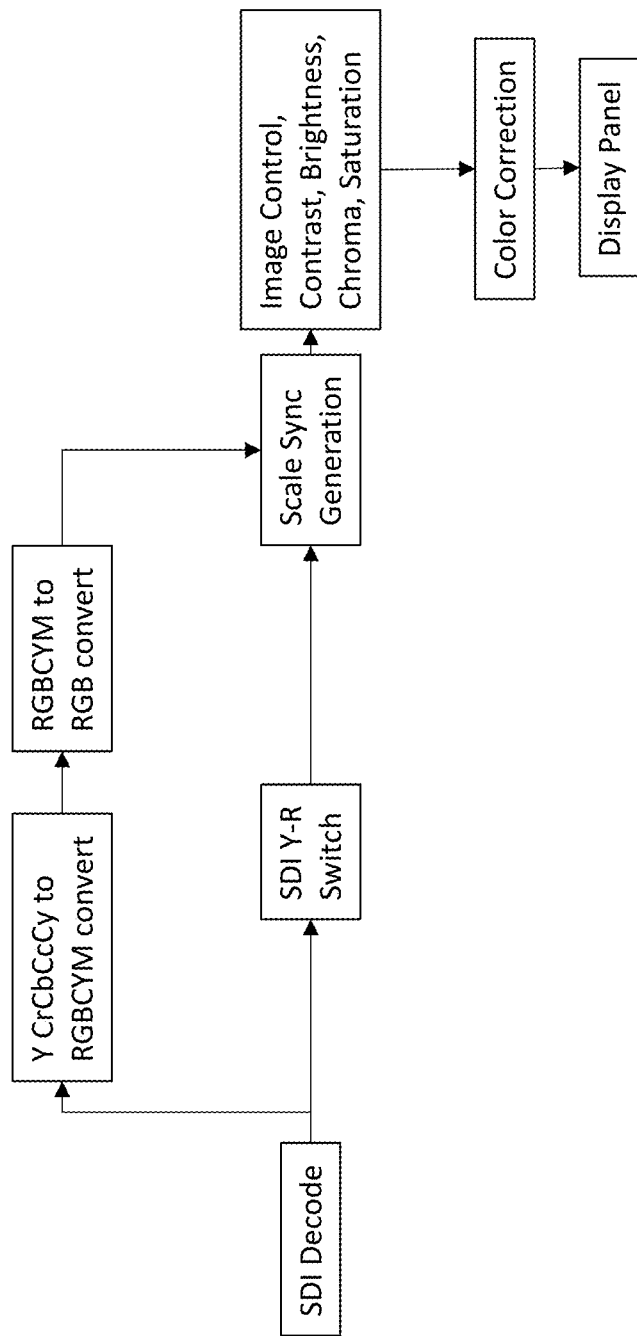
FIG. 92 illustrates one embodiment of a six-primary color system in an emissive display that does not incorporate color filtered subpixels.

FIG. 92 illustrates one embodiment of a six-primary color system in an emissive display that does not incorporate color filtered subpixels. For LCD and WOLED displays, this can be modified for a six-primary color system by expanding the RGB or WRGB filter arrangement to an RGBCYM matrix. For WRGB systems, the white subpixel could be removed as the luminance of the three additional primaries will replace it. SDI video is input through an SDI decoder. In one embodiment, the SDI decoder outputs to a Y CrCbCcCy-RGBCYM converter. The converter outputs RGBCYM data, with the luminance component (Y) subtracted. RGBCYM data is then converted to RGB data. This RGB data is sent to a scale sync generation component, receives adjustments to image controls, contrast, brightness, chroma, and saturation, is sent to a color correction component, and output to the display panel as LVDS data. In another embodiment the SDI decoder outputs to an SDI Y-R switch component. The SDI Y-R switch component outputs RGBCYM data. The RGBCYM data is sent to a scale sync generation component, receives adjustments to image controls, contrast, brightness, chroma, and saturation, is sent to a color correction component, and output to a display panel as LVDS data.

Figure 98:
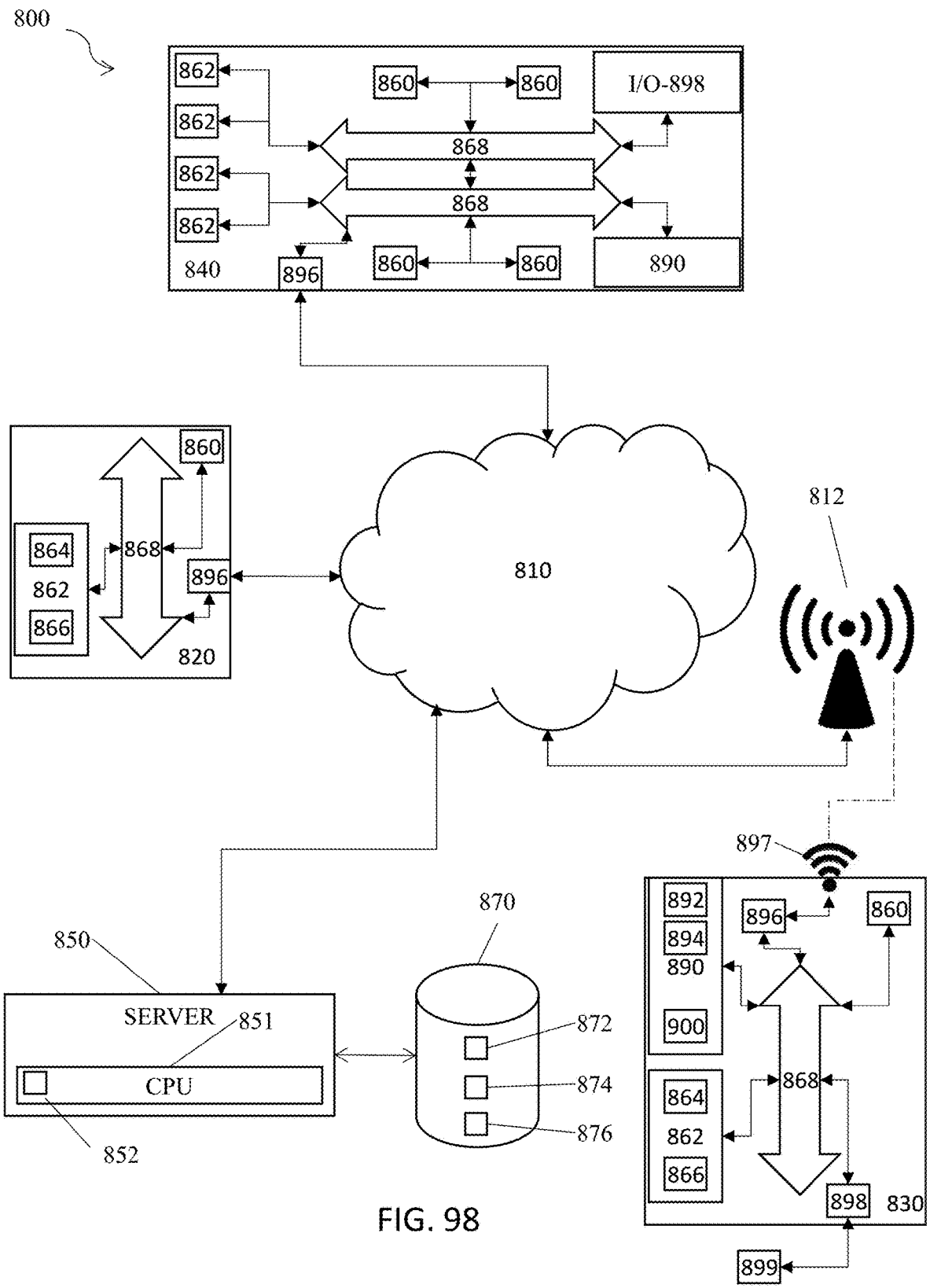
FIG. 98 is a schematic diagram of an embodiment of the invention illustrating a computer system.

FIG. 98 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, notebook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 98 multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multiprocessor system). Alternatively, some steps or methods may be performed by circuitry that is specific to a given function.

According to various embodiments, the computer system 800 may operate in a networked environment using logical connections to local and/or remote computing devices 820, 830, 840 through a network 810. A computing device 830 may connect to a network 810 through a network interface unit 896 connected to a bus 868. Computing devices may communicate communication media through wired networks, direct-wired connections or wirelessly, such as acoustic, RF, or infrared, through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications, or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any deliver media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology, discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for computing devices 820, 830, and 840. The distributed computing devices 820, 830, and 840 are connected to an edge server in the edge computing network based on proximity, availability, latency, bandwidth, and/or other factors.

It is also contemplated that the computer system 800 may not include all of the components shown in FIG. 98 may include other components that are not explicitly shown in FIG. 98 or may utilize an architecture completely different than that shown in FIG. 98. The various illustrative logical blocks, modules, elements, circuits, and algorithms described in connection with the embodiments discussed herein may be implemented as electronic hardware, computer software, or combinations of both. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or positioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A system for displaying a six-primary color system, comprising:
  a single imager camera system, wherein the single imager camera system is operable to capture a set of camera signal data, wherein the single imager camera system includes at least one optical filter, and wherein the single imager camera system is operable to modify the set of camera signal data, thereby creating a set of image data;

a set of Session Description Protocol (SDP) parameters;
an image data converter; and
at least one display device;
wherein the single imager camera system is operable to invert the set of camera signal data, thereby creating an inverted set of camera signal data;
wherein the set of camera signal data and the inverted set of camera signal data have equal saturation values;
wherein the at least one display device and the image data converter are in network communication; and
wherein the image data converter is operable to convert the set of image data for display on the at least one display device.

2. The system of claim 1, wherein the at least one optical filter is an absorptive optical filter.

3. The system of claim 1, wherein the at least one optical filter is a dichroic optical filter.

4. The system of claim 1, wherein the at least one optical filter selectively transmits and blocks light based on at least one cutoff frequency.

5. The system of claim 1, wherein the at least one optical filter is a neutral density filter.

6. The system of claim 1, wherein the at least one optical filter is a machine vision filter.

7. The system of claim 1, wherein the at least one optical filter is a Bayer pattern optical filter.

8. The system of claim 7, wherein the Bayer pattern optical filter is modified to include Cyan (C), Yellow (Y), and Magenta (M) color primaries.

9. The system of claim 7, wherein the Bayer pattern optical filter is modified to include Cyan (C) and Yellow (Y) color primaries.

10. The system of claim 1, wherein the single image camera system includes an imager timing generator, wherein the imager timing generator handles demultiplexing.

11. The system of claim 1, wherein the set of camera signal data is RAW data.

12. The system of claim 1, wherein the image data converter includes a digital interface, and wherein the digital interface is operable to encode and decode the set of image data.

13. A system for displaying a six-primary color system, comprising:
a single imager camera system, wherein the single imager camera system is operable to capture a set of camera signal data, and wherein the single imager camera system is operable to modify the set of camera signal data, thereby creating a set of image data;
a set of Session Description Protocol (SDP) parameters, wherein the set of SDP parameters is modifiable;
an image data converter; and
at least one display device;
wherein the single imager camera system is operable to invert the set of camera signal data, thereby creating an inverted set of camera signal data;
wherein the set of camera signal data and the inverted set of camera signal data have equal saturation values;
wherein the at least one display device and the image data converter are in network communication; and
wherein the image data converter is operable to convert the set of image data for display on the at least one display device.

14. The system of claim 13, wherein the set of camera signal data includes Red (R), Green (G), and Blue (B) primary color values.

15. The system of claim 13, wherein the set of image data includes the set of camera signal data and the inverted set of camera signal data.

16. The system of claim 13, wherein the set of camera signal data is RAW data.

17. A system for displaying a six-primary color system, comprising:
a single imager camera system, wherein the single imager camera system is operable to capture a set of camera signal data, and wherein the single imager camera system is operable to modify the set of camera signal data, thereby creating a set of image data;
a set of Session Description Protocol (SDP) parameters, wherein the set of SDP parameters is modifiable;
an image data converter, wherein the image data converter includes a digital interface, and wherein the digital interface is operable to encode and decode the set of image data; and
at least one display device;
wherein the single imager camera system is operable to invert the set of camera signal data, thereby creating an inverted set of camera signal data;
wherein the set of camera signal data and the inverted set of camera signal data have equal saturation values;
wherein the single imager camera system eliminates inconsistencies with gamma tracking and white point designation in the set of image data;
wherein the at least one display device and the image data converter are in network communication; and
wherein the image data converter is operable to convert the set of image data for display on the at least one display device.

18. The system of claim 17, wherein the set of camera signal data includes Red (R), Green (G), and Blue (B) primary color values.

19. The system of claim 17, wherein the set of image data includes the set of camera signal data and the inverted set of camera signal data.

20. The system of claim 17, wherein the set of camera signal data is RAW data.

* * * * *